US012508305B2

(12) United States Patent
Sun et al.

(10) Patent No.: US 12,508,305 B2
(45) Date of Patent: Dec. 30, 2025

(54) COMPOSITIONS AND METHODS FOR TREATING AND/OR PREVENTING GLYCOGEN STORAGE DISEASE TYPE III

(71) Applicant: Duke University, Durham, NC (US)

(72) Inventors: Baodong Sun, Durham, NC (US); Priya S. Kishnani, Durham, NC (US); Jeong-A Lim, Durham, NC (US); Aravind Asokan, Durham, NC (US)

(73) Assignee: Duke University, Durham, NC (US)

( * ) Notice: Subject to any disclaimer, the term of this patent is extended or adjusted under 35 U.S.C. 154(b) by 857 days.

(21) Appl. No.: 17/560,595

(22) Filed: Dec. 23, 2021

(65) Prior Publication Data
US 2022/0202916 A1 Jun. 30, 2022

Related U.S. Application Data

(60) Provisional application No. 63/130,657, filed on Dec. 26, 2020.

(51) Int. Cl.
A61K 38/47 (2006.01)
A61K 31/436 (2006.01)
A61K 31/519 (2006.01)
A61K 31/69 (2006.01)
A61K 35/76 (2015.01)
A61K 38/39 (2006.01)
A61K 39/395 (2006.01)
A61K 48/00 (2006.01)
A61P 3/00 (2006.01)

(52) U.S. Cl.
CPC ............ A61K 38/47 (2013.01); A61K 31/436 (2013.01); A61K 31/519 (2013.01); A61K 31/69 (2013.01); A61K 35/76 (2013.01); A61K 38/39 (2013.01); A61K 39/3955 (2013.01); A61K 48/0066 (2013.01); A61P 3/00 (2018.01)

(58) Field of Classification Search
None
See application file for complete search history.

(56) References Cited

U.S. PATENT DOCUMENTS

2008/0108126 A1* 5/2008 England et al. ............................
C12Y 302/01041
435/210

OTHER PUBLICATIONS

Hii et al., "Pullulanase: role in starch hydrolysis and potential industrial applications". Enzyme Res. (Year: 2012).*
Faust et al. "CpG depleted adeno-associated virus vectors evade immune detection" J. Clin. Invest. (Year: 2013).*
Naso et al. "Adeno-associated virus (AAV) as a vector for gene therapy" BioDrugs (Year: 2017).*
Nair et al. "Computationally designed liver-specific transcriptional modules and hyperactive factor IX to improve hepatic gene therapy" Blood Brief Report (Year: 2014).*
Fukazawa et al. "Development of a cancer-targeted tissue-specific promoter system" Experimental Therapeutics, Molecular Targets , and Chemical Biology. (Year: 2004).*
Wang et al. "Construction and analysis of a compact muscle-specific promoters for AAV vectors" Gene Therapy (Year: 2008).*
Mingozzi., et al., "Induction of immune tolerance to coagulation factor IX antigen by in vivo hepatic gene transfer", The Journal of Clinical Investigation, May 2003, vol. 111, No. 9, pp. 1347-1356.
Mitchell A.M. et al., "Mechanistic Insights into the Enhancement of Adeno-Associated Virus Transduction by Proteasome Inhibitors," Journal of Virology, 2013, vol. 87, No. 23, pp. 13035-13041.
Mogahed A.E., et al., "Skeletal and Cardiac Muscle Involvement in Children with Glycogen Storage Disease Type III," European Journal of Pediatrics, Nov. 2015, vol. 174(11), pp. 1545-1548.
Moses W.S., et al., "Neuromuscular Involvement in Glycogen Storage Disease Type III," Acta Paediatrica Scandinavica, Mar. 1986, vol. 75(2), pp. 289-296.
Mount J.D., et al., "Sustained Phenotypic Correction of Hemophilia B Dogs with a Factor IX Null Mutation by Liver-Directed Gene Therapy," Blood, 2002, vol. 99, No. 8, pp. 2670-2676.
Nathwani A.C., et al., "Long-Term Safety and Efficacy of Factor IX Gene Therapy in Hemophilia B," The New England Journal of Medicine, vol. 371, No. 21, pp. 1994-2004.
Olson J.L., et al., "Cardiac Involvement in Glycogen Storage Disease III: Morphologic and Biochemical Characterization with Endomyocardial Biopsy," American Journal of Cardiology, Mar. 15, 1984, vol. 53(7), pp. 980-981.
Pankowicz F.P., et al., "Rapid Disruption of Genes Specifically in Livers of Mice Using Multiplex CRISPR/Cas9 Editing," Gastroenterology, 2018, vol. 155, No. 6:1967, pp. 1-10.
Ponder K.P., et al., "Mouse Hepatocytes Migrate to Liver Parenchyma and Function Indefinitely after Intrasplenic Transplantation," Proceedings of the National Academy of Sciences of the United States of America, 1991, vol. 88, No. 4, pp. 1217-1221.
Pursell N., et al., "Inhibition of Glycogen Synthase II with RNAi Prevents Liver Injury in Mouse Models of Glycogen Storage Diseases," Molecular Therapy, 2018, vol. 26, No. 7, pp. 1771-1782.
Rittie L., et al., "The Landscape of Early Clinical Gene Therapies outside of Oncology," Molecular Therapy, 2019, vol. 27, No. 10, pp. 1706-1717.
Rogers G.L., et al., "Innate Immune Responses to AAV Vectors," Frontiers in Microbiology, 2013, vol. 2, Article 194, pp. 1-10.
Rogers G.L., et al., "Unique Roles of TLR9- and My D88 -Dependent and -Independent Pathways in Adaptive Immune Responses to AAV-Mediated Gene Transfer," Journal of Innate Immunity, 2015, vol. 7, No. 3, pp. 302-314.

(Continued)

Primary Examiner — Robert M Kelly
Assistant Examiner — John David Moore
(74) Attorney, Agent, or Firm — POLSINELLI PC

(57) ABSTRACT

Adult form glycogen storage disease type III (GSD III) is an orphan neuromuscular disorder caused by a deficiency of glycogen debranching enzyme. Long-term complications include progressive liver fibrosis, hepatic failure, and end-stage liver cirrhosis, and progressive muscle myopathy. Presently, there are no clinically approved therapies or cures for GSD III. Disclosed herein are compositions for and methods of treating and/or preventing GSD III disease progression.

9 Claims, 16 Drawing Sheets

Specification includes a Sequence Listing.

(56) References Cited

OTHER PUBLICATIONS

Schreuder A. B., et al., "Glycogen Storage Disease Type III," GeneReviews, Editors, 2022, University of Washington, Seattle, pp. 1-21.
Sentner C.P., et al., "Heart Failure Due to Severe Hypertrophic Cardiomyopathy Reversed by Low Calorie, High Protein Dietary Adjustments in a Glycogen Storage Disease Type IIIa Patient," JIMD Reports, 2012, vol. 5, pp. 13-16.
Shim H., et al., "Role of Maltogenic Amylase and Pullulanase in Maltodextrin and Glycogen Metabolism of Bacillus Subtilis 168," Journal of Bacterialogy, Aug. 2009, vol. 191(15), pp. 4835-4844.
Shin J.H., et al., "Microdystrophin Ameliorates Muscular Dystrophy in the Canine Model of Duchenne Muscular Dystrophy," Molecular Therapy, 2013, vol. 21, No. 4, pp. 750-757.
Sluiter W., et al., "Rapid Ultraperformance Liquid Chromatography-Tandem Mass Spectrometry Assay for a Characteristic Glycogen-Derived Tetrasaccharide in Pompe Disease and Other Glycogen Storage Diseases," Clinical Chemistry, 2012, vol. 58, No. 7, pp. 1139-1147.
Sun B., et al., "Correction of Glycogen Storage Disease Type II by an Adeno-associated virus Vector Containing a Muscle-specific Promoter," Mol Ther, 2005, 11(6): 889-898.
Sun B., et al., "Correction of Multiple Striated Muscles in Murine Pompe Disease Through Adena-associated Virus-mediated Gene Therapy," Molecular Therapy, Aug. 2008, vol. 16(8), pp. 1366-1371.
Sun B., et al., "Immunomodulatory Gene Therapy Prevents Antibody Formation and Lethal Hypersensitivity reactions in Murine Pompe Disease," Molecular Therapy, vol. 18(2), Feb. 2010, Epublication Aug. 18, 2009, pp. 353-360.
Sun et al., "Alglucosidase alfa enzyme replacement therapy as a therapeutic approach for glycogen storage disease type III", Molecular Genetics and Metabolism, Feb. 2013, vol. 108, No. 2, pp. 145-147.
Taylor C., et al., "Debranching Enzyme from Rabbit Skeletal Muscle. Purification, Properties and Physiological Role," European Journal of Biochemistry, 1975, vol. 51, No. 1, pp. 105-115.
Themis M., et al., "Oncogenesis Following Delivery of a Nonprimate Lentiviral Gene Therapy Vector to Fetal and Neonatal Mice," Molecular Therapy, 2005, vol. 12, No. 4, pp. 763-771.
Thomas J., et al., "Pegvaliase for the Treatment of Phenylketonuria: Results of a Long-term Phase 3 Clinical Trial Program (PRISM)," Molecular Genetics and Metabolism, May 2018, vol. 124(1), pp. 27-38.
Uspenskaya O., et al., "Design of Phase 1/2a Study of AAV9-Based Gene Therapy for Parkinson's Disease with Pathogenic GBA1 Mutations (PROPEL Trial)," Neurology, 2020, vol. 94, No. 15, pp. 1-6.
Van Der Ploeg A.T., et al., "A Randomized Study of Alglucosidase Alfa in Late-Onset Pompe's Disease," The New England Journal of Medicine, 2010, vol. 362, No. 15, pp. 1396-1406.
Van Der Ploeg A.T., et al., "Open-Label Extension Study Following the Late-Onset Treatment Study (LOTS) of Alglucosidase Alfa," Molecular Genetics and Metabolism, 2012, vol. 107, No. 3, pp. 456-461.
Vidal P., et al., "Rescue of GSDIII Phenotype with Gene Transfer Requires Liver-and Muscle-Targeted GDE Expression," Molecular Theraphy, Mar. 7, 2018, vol. 26(3), pp. 890-901.
Wang., et al., "Sustained Correction Of Bleeding Disorder In Hemophilia B Mice By Gene Therapy", Proceedings National Academy Sciences, USA, Mar. 1999, vol. 96(7), pp. 13906-13910.
Wang., et al., "Sustained Expression Of Therpeutic Level Of Factor IX in Hemophilia B Dogs by AAV-Mediated Gene Therapy in Liver", Molecular Therapy, Feb. 2000, vol. 1(2), pp. 154-158.
Wang Z., et al., "Sustained AAV-Mediated Dystrophin Expression in a Canine Model of Duchenne Muscular Dystrophy with a Brief Course of Immunosuppression," Molecular Therapy, 2007, vol. 15, No. 6, pp. 1160-1166.
Wang Z.J., et al., "Analyzing Cellular Immunity to AAV in a Canine Model Using ELISPOT Assay," Handbook of Elispot: Methods and Protocols, Second Edition, 2012, vol. 792, pp. 65-74.
Wright J.F., et al., "Codon Modification and PAMPs in Clinical AAV Vectors: The Tortoise or the Hare?," Molecular Therapy, 2020, vol. 28, No. 3, pp. 701-703.
Yi H., et al., "Characterization of a Canine Model of Glycogen Storage Disease Type IIIa," Disease Models & Mechanism, Nov. 2012, vol. 5(6), pp. 804-811.
Yi H., et al., "Correction of Glycogen Storage Disease Type III With Rapamycin in a Canine Model," Journal of Molecular Medicine, Jun. 2014, vol. 92(6), pp. 641-650.
Yi H., et al., "Systemic Correction of Murine Glycogen Storage Disease Type IV by an AAV-Mediated Gene Therapy," Human Gene Theraphy, Mar. 2017, vol. 28(3), pp. 286-294.
Young P.S., et al., "Analysis of a Glucose Tetrasaccharide Elevated in Pompe Disease by Stable Isotope Dilution-electrospray Ionization Tandem Mass Spectrometry," Analytical Biochemistry, May 15, 2003, vol. 316(2), pp. 175-180.
Zhai L., et al., "Crystal Structure of Glycogen Debranching Enzyme and Insights into its Catalysis and Disease-Causing Mutations," Nature Communications, 2016, vol. 7, No. 11229, pp. 1-11.
Zhang P., et al., "Immunodominant Liver-specific Expression Suppresses Transgene-directed Immune Responses in Murine Pompe Disease," Human Gene Theraphy, May 2012, vol. 23(5), pp. 460-472.
Zhu J.G., et al., "The TLR9-MyD88 Pathway is Critical for Adaptive Immune Responses to Adeno-Associated Virus Gene Therapy Vectors in Mice," Journal of Clinical Investigation, 2009, vol. 119, No. 8, pp. 2388-2398.
Zincarelli C., et al., "Analysis of AAV Serotypes 1-9 Mediated Gene Expression and Tropism in Mice After Systemic Injection," Molecular Therapy, Jun. 2008, vol. 16(6), pp. 1073-1080.
Barzi M., et al., "A Novel Humanized Mouse Lacking Murine P450 Oxidoreductase for Studying Human Drug Metabolism," Nature Communications, 2017, vol. 8, No. 1, Article 39, pp. 1-9.
Bates E.J., et al., "Debranching Enzyme From Rabbit Skeletal Muscle; Evidence for the Location of Two Active Centres on a Single Polypeptide Chain," FEBS Letters, Oct. 1975, vol. 58(1), pp. 181-185.
Bell P., et al., "Evaluation of Adeno-Associated Viral Vectors for Liver-Directed Gene Transfer in Dogs," Human Gene Therapy, 2011, vol. 22, No. 8, pp. 985-997.
Bissig K.D., et al., "Human Liver Chimeric Mice Provide a Model for Hepatitis B and C Virus Infection and Treatment," Journal of Clinical Investigation, 2010, vol. 120, No. 3, pp. 924-930.
Bissig K.D., et al., "Repopulation of Adult and Neonatal Mice with Human Hepatocytes: A Chimeric Animal Model," Proceedings of the National Academy of Sciences of the United States of America, 2007, vol. 104, No. 51, pp. 20507-20511.
Bissig-Choisat B., et al., "Development and Rescue of Human Familial Hypercholesterolaemia in a Xenograft Mouse Model," Nature Communications, 2015, vol. 6, No. 7339, pp. 1-9.
Brooks D.E., et al., "Natural Progression of Canine Glycogen Storage Disease Type IIIa," Comparative Medicine, Feb. 2016, vol. 66(1), pp. 41-51.
Callan M.B., et al., "Successful Phenotype Improvement following Gene Therapy for Severe Hemophilia A in Privately Owned Dogs," PLoS One, 2016, vol. 11, No. 3, e0151800, pp. 1-12.
Cao O., et al., "Role of Regulatory T Cells in Tolerance to Coagulation Factors," Journal of Thrombosis and Haemostasis, 2009, vol. 7, pp. 88-91.
Carbonaro-Sarracino D.A., et al., "Dosing and Re-Administration of Lentiviral Vector for In Vivo Gene Therapy in Rhesus Monkeys and ADA-Deficient Mice," Molecular Therapy—Methods & Clinical Development, 2020, vol. 16, pp. 78-93.
Chao H., et al., "Persistent Expression of Canine Factor IX in Hemophilia B Canines," Gene therapy, 1999, vol. 6, No. 10, pp. 1695-1704.
Childers M.K., et al., "Gene Therapy Prolongs Survival and Restores Function in Murine and Canine Models of Myotubular Myopathy," Science Translational Medicine, 2014, vol. 6, No. 220, 220ra10, pp. 1-31.

(56) References Cited

OTHER PUBLICATIONS

Crudele J.M., et al., "AAV Liver Expression of FIX-Padua Prevents and Eradicates FIX Inhibitor without Increasing Thrombogenicity in Hemophilia B Dogs and Mice," Blood, 2015, vol. 125, No. 10, pp. 1553-1561.

Dayton R.D., et al., "The Advent of AAV9 Expands Applications for Brain and Spinal Cord Gene Delivery," Expert Opinion on Biological Therapy, 2012, vol. 12, No. 6, pp. 757-766.

De Los Reyes E., et al., "Single-Dose AAV9-CLN6 Gene Transfer Stabilizes Motor and Language Function in CLN6-Type Batten Disease: Interim Results from the First Clinical Gene Therapy Trial," Molecular Genetics and Metabolism, 2020, vol. 129, No. 2, pp. S46-S47.

Demo E., et al., "Glycogen Storage Disease Type III-Hepatocellular Carcinoma a Long-term Complication," Mar. 2007, Journal of Hepatology, vol. 46(3), pp. 492-498.

Dobrzynski E., et al., "Prevention of Cytotoxic T Lymphocyte Responses to Factor IX-Expressing Hepatocytes by Gene Transfer-Induced Regulatory T Cells," Proceedings of the National Academy of Sciences of the United States of America, 2006, vol. 103, No. 12, pp. 4592-4597.

Dupont J.B., et al., "AAV-Mediated Gene Transfer Restores a Normal Muscle Transcriptome in a Canine Model of X-Linked Myotubular Myopathy," Molecular Therapy, 2020, vol. 28, No. 2, pp. 382-393.

Escors D., et al., "Lentiviral Vectors in Gene Therapy: Their Current Status and Future Potential," Archivum Immunologiae et Therapiae Experimentalis, 2010, vol. 58, No. 2, pp. 107-119.

Faust S.M., et al., "CpG-Depleted Adeno-Associated Virus Vectors Evade Immune Detection," Journal of Clinical Investigation, 2013, vol. 123, No. 7, pp. 2994-3001.

Feldman A.G., et al., "Subacute Liver Failure Following Gene Replacement Therapy for Spinal Muscular Atrophy Type 1," The Journal of Pediatrics, 2020, 22 pages.

Flanigan K.M., et al., "Transpher A, A Multicenter, Single-Dose, Phase 1/2 Clinical Trial of ABO-102, An Intravenous AAV9-Based Gene Therapy for Sanfilippo Syndrome Type A (Mucopolysaccharidosis IIIA)," Neurology, 2020, vol. 94, No. 15, pp. S56-S57.

Franco L M., et al., "Evasion of Immune Responses to Introduced Human Acid Alpha-Glucosidase by Liver-Restricted Expression in Glycogen Storage Disease Type II", Molecular Therapy., Nov. 2005, vol. 12(5), pp. 876-884.

Gonzalez T.J., et al., "Cross-Species Evolution of Synthetic AAV Strains for Clinical Translation," Molecular Therapy, 2020, vol. 28, No. 4S1, pp. 12-13.

Gregory B.L., et al., "Glycogen Storage Disease Type IIIa in Curly-Coated Retrievers," Journal of Veterinary Internal Medicine, Jan.-Feb. 2007, vol. 21(1), pp. 40-46.

Gupta S., et al., "Association of Immune Response with Efficacy and Safety Outcomes in Adults with Phenylketonuria Administered Pegvaliase in Phase 3 Clinical Trials," EBioMedicine, Nov. 2018, vol. 37, pp. 366-373.

Halaby C.A., et al., "Liver Fibrosis during Clinical Ascertainment of Glycogen Storage Disease Type III: A Need for Improved and Systematic Monitoring," Genetics in Medicine, 2019, vol. 21, No. 12, pp. 2686-2694.

Harding O.C., et al., "Pegvaliase for the Treatment of Phenylketonuria: A Pivotal, Double-blind Randomized Discontinuation Phase 3 Clinical Trial," Molecular Genetics and Metabolism, May 2018, vol. 124(1), pp. 20-26.

Hinderer C., et al., "Severe Toxicity in Nonhuman Primates and Piglets Following High-Dose Intravenous Administration of an Adeno-Associated Virus Vector Expressing Human SMN," Human Gene Therapy, 2018, vol. 29, No. 3, pp. 285-298.

Ill R C., et al, "Optimization of theHuman Factor VIII Complementary DNA Expression Plasmid For Gene Therapy Of Hemophilia A", Blood Coagulation and Fibrinolysis, 1997, vol. 8, No. 2, pp. S23-S30.

Inagaki K., et al., "Robust Systemic Transduction with AAV9 Vectors in Mice: Efficient Global Cardiac Gene Transfer Superior to that of AAV8," Molecular Theraphy, Jul. 2006, vol. 14(1), pp. 45-53.

Jacobs F., et al., "Adeno-Associated Viral Vectors for Correction of Inborn Errors of Metabolism: Progressing Towards Clinical Application," Current Pharmaceutical Design, 2011, vol. 17, No. 24, pp. 2500-2515.

Keeler G.D., et al., "Liver Induced Transgene Tolerance with AAV vectors," Cellular Immunology, 2019, vol. 342, No. 103728, pp. 1-26.

Kimura T., et al., "Production of Adeno-Associated Virus Vectors for in Vitro and in Vivo Applications," Scientific Reports, 2019, vol. 9, No. 1, Article 13601, pp. 1-13.

Kishnani., et al., "Cross-Reactive Immunologic Material Status Affects Treatment Outcomes in Pompe Disease Infants." Mol. Genet. Metab, Jan. 2010, vol. 99, No. 1, pp. 26-33.

Kishnani P.S., et al., "Early Treatment with Alglucosidase Alpha Prolongs Long-term Survival of Infants with Pompe Disease," Pediatric Research, vol. 66(3), Sep. 2009, pp. 329-335.

Kishnani P.S., et al., "Liver Depot Gene Therapy for Pompe Disease," Annals of Translational Medicine, 2019, vol. 7, No. 3:288, pp. 1-8.

Kishnani S.P., et al., "Glycogen Storage Disease Type III Diagnosis and Management Guidelines," Genetics in Medicine, Journal of the American College of Medical Genetics, Jul. 2010, vol. 12(7), pp. 446-463.

Koeberl D., et al., "A Phase 1 study of Gene Therapy with ACTUS-101 in Late-Onset Pompe disease," Molecular Genetics and Metabolism, 2020, vol. 129, No. 2, 1 page.

Koeberl D.D., et al., "AAV Vector-Mediated Reversal of Hypoglycemia in Canine and Murine Glycogen Storage Disease Type Ia," Molecular Therapy, 2008, vol. 16, No. 4, pp. 665-672.

Kuzmin D.A., et al., "A Systematic Review of Clinical Safety and Efficacy of AAV Gene Therapies," Molecular Therapy, 2020, vol. 28, No. 4, pp. 559-559.

Labrune P., et al., "Cardiomyopathy in Glycogen-storage Disease Type III: Clinical and Echographic Study of 18 Patients," Pediatric Cardiology, Jul. 1991, vol. 12(3), pp. 161-163.

Lee C.S., et al., "Adenovirus-Mediated Gene Delivery: Potential Applications for Gene and Cell-Based Therapies in the New Era of Personalized Medicine," Genes & Diseases, 2017, vol. 4, No. 2, pp. 43-63.

Lee J.P., et al., "Comparison of the Functional Significance of Left Ventricular Hypertrophy in Hypertrophic Cardiomyopathy and Glycogenesis Type III," The American Journal of Cardiology, Mar. 15, 1997, vol. 79(6), pp. 834-838.

Lim J.,, et al., "A Novel Gene Therapy Approach for Gsd III Using an AAV Vector Encoding a Bacterial Glycogen Debranching Enzyme," Molecular Theraphy, Methods & Clinical Development, Jun. 2, 2020, vol. 18, pp. 240-249.

Lim J.A., et al., "A Single Intravenous Injection of an AAV-PHP. B Vector Encoding Human Acid Alpha-Glucosidase Corrects Both Muscle and Brain Defects in Murine Pompe Disease," Molecular Therapy, 2018, vol. 26, No. 5, pp. 382-383.

Mack D.L., et al., "Systemic AAV8-Mediated Gene Therapy Drives Whole-Body Correction of Myotubular Myopathy in Dogs," Molecular Therapy, 2017, vol. 25, No. 4, pp. 839-854.

Manno C.S., et al., "Successful Transduction of Liver in Hemophilia by AAV-Factor IX and Limitations Imposed by the Host Immune Response," Nature Medicine, vol. 12(3), Mar. 2006, Epublication Feb. 12, 2006, pp. 342-347.

Martino A.T., et al., "Measuring Immune Responses to Recombinant AAV Gene Transfer," Adeno-Associated Virus: Methods and Protocols, vol. 807, pp. 259-272.

Mcintosh J., et al., "Therapeutic Levels of FVIII following a Single Peripheral Vein Administration of rAAV Vector Encoding a Novel Human Factor VIII variant," Blood, 2013, vol. 121, No. 17, pp. 3335-3344.

(56) References Cited

OTHER PUBLICATIONS

Jauze L, et al. (2019) Challenges of Gene Therapy for the Treatment of Glycogen Storage Diseases Type I and Type III. Hum Gene Ther. 30(10):1263-1273.

* cited by examiner

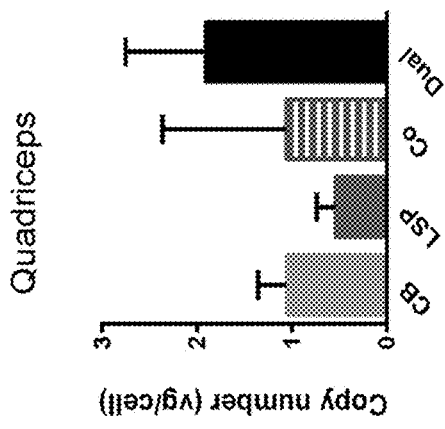
FIG. 1D Quadriceps
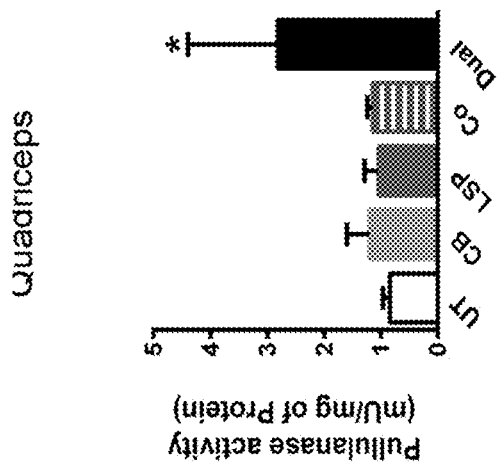
FIG. 1G Quadriceps
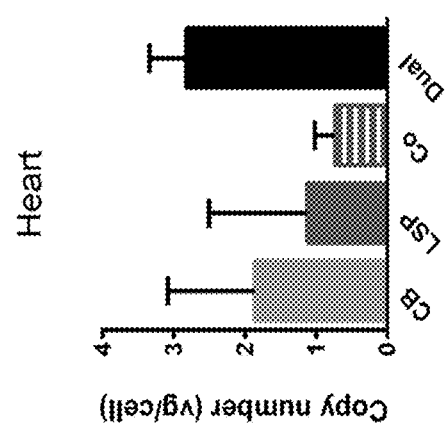
FIG. 1C Heart
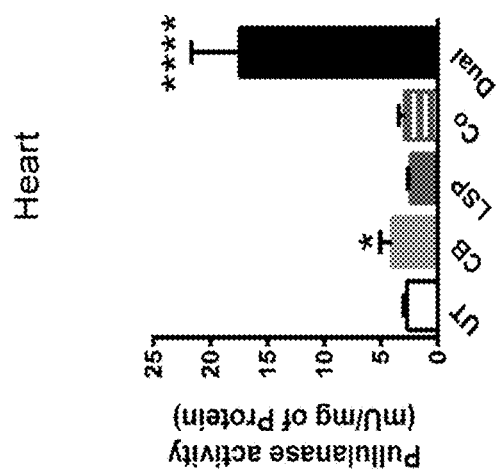
FIG. 1F Heart
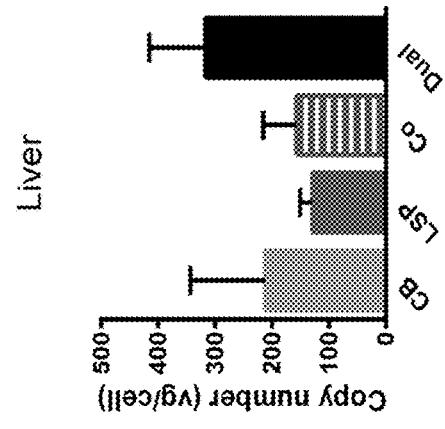
FIG. 1B Liver
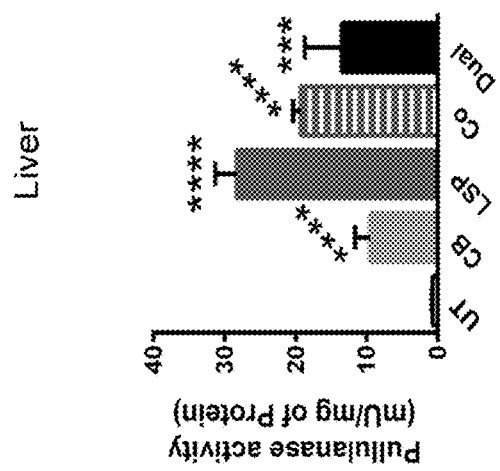
FIG. 1E Liver

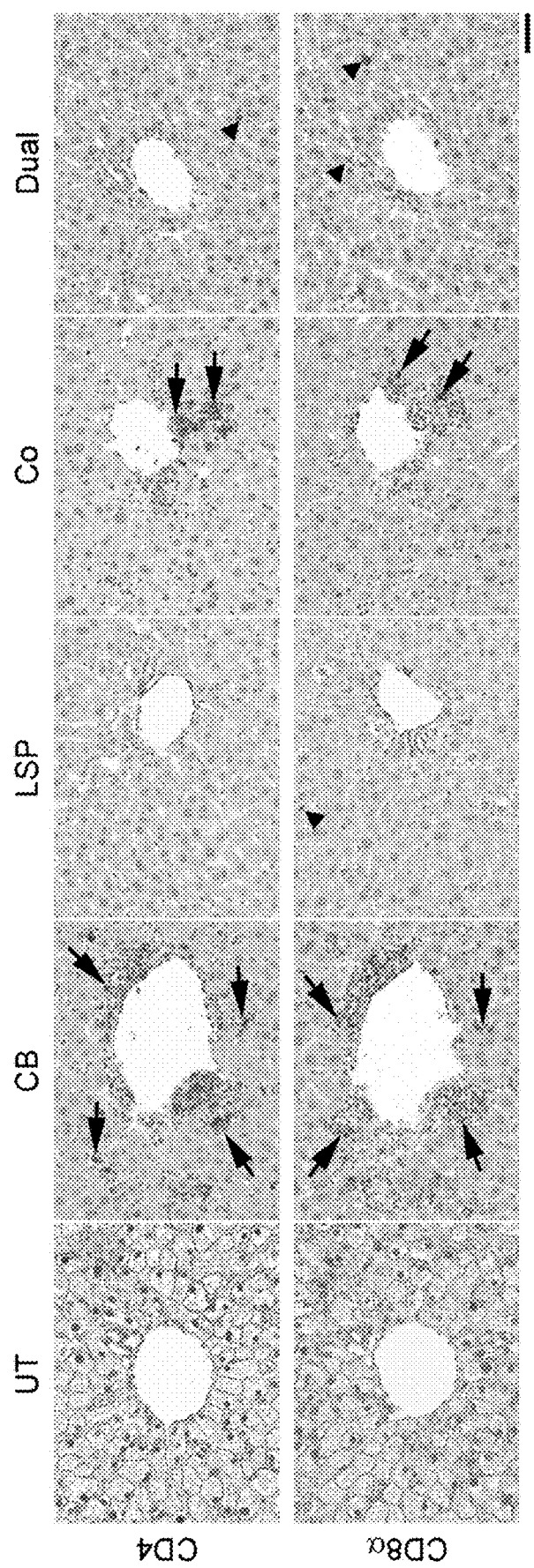

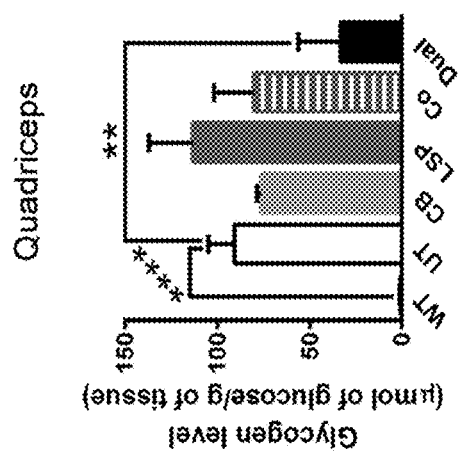
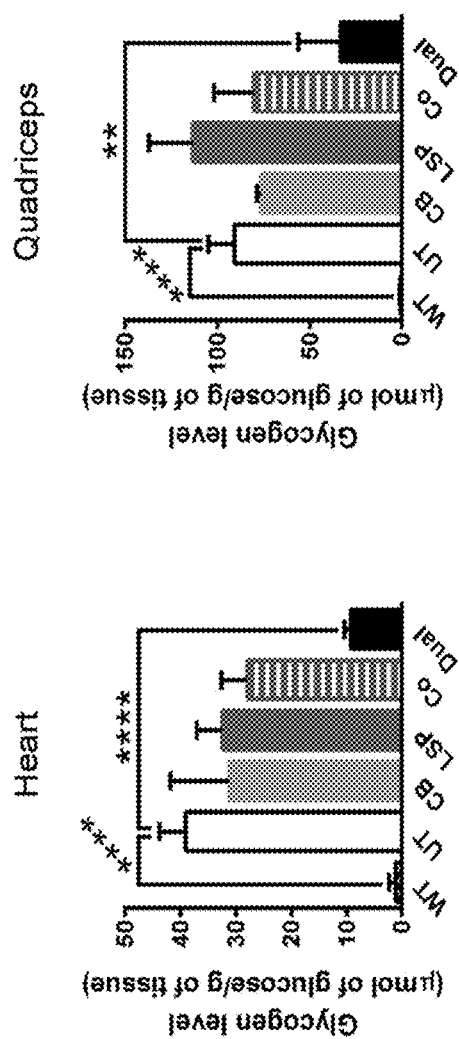
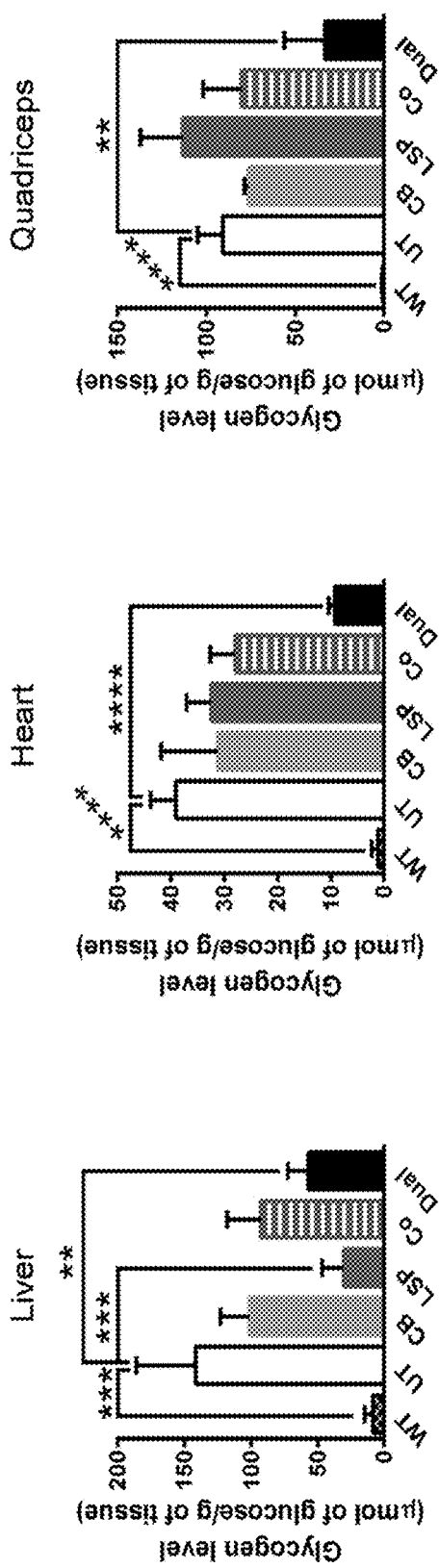
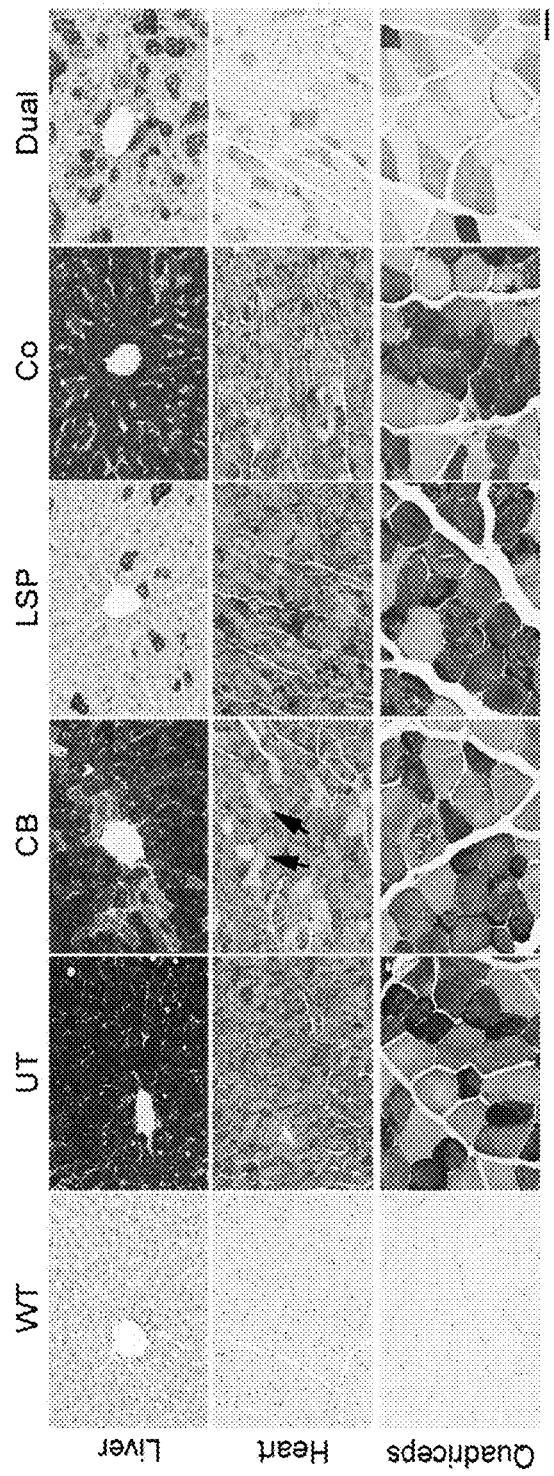

FIG. 5A
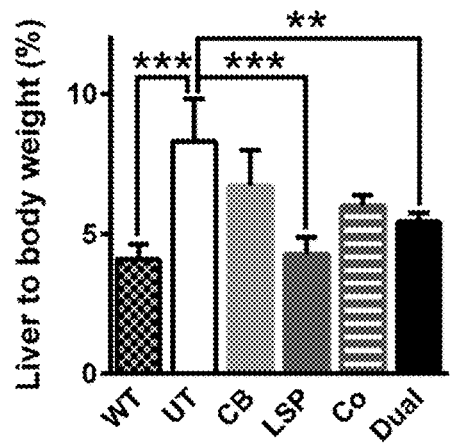
FIG. 5B
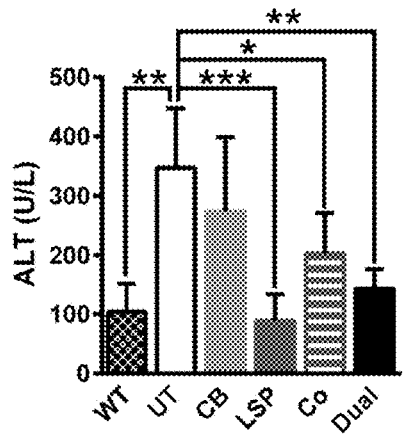
FIG. 5C
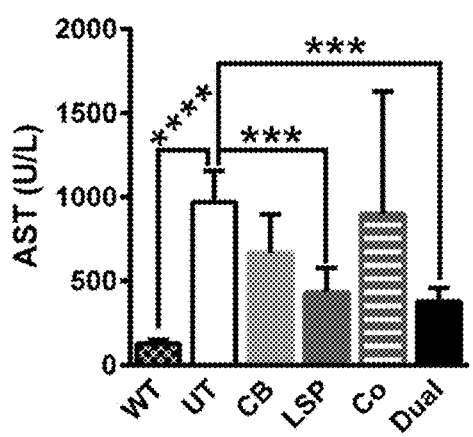
FIG. 5D
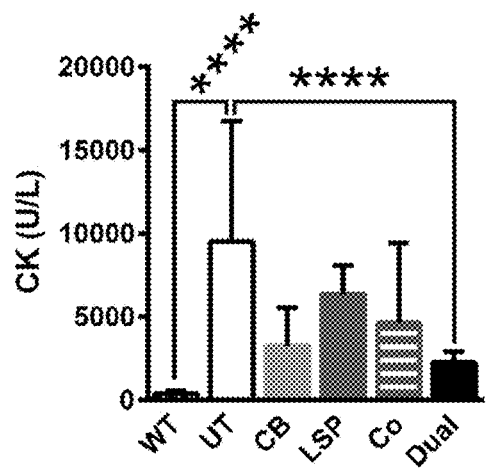
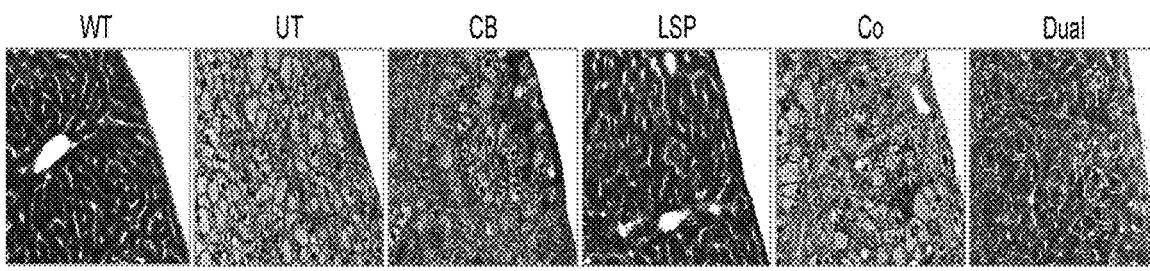
FIG. 5E

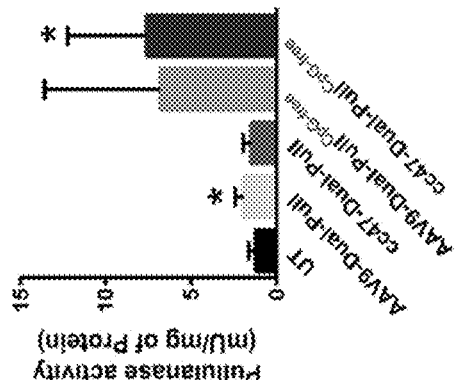
FIG. 7A Liver
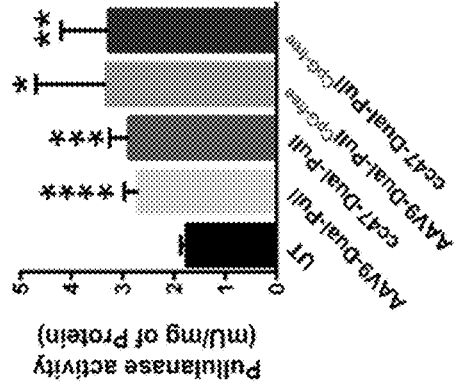
FIG. 7B Heart
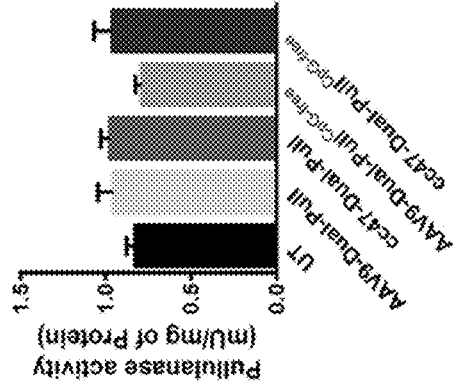
FIG. 7C Quadriceps
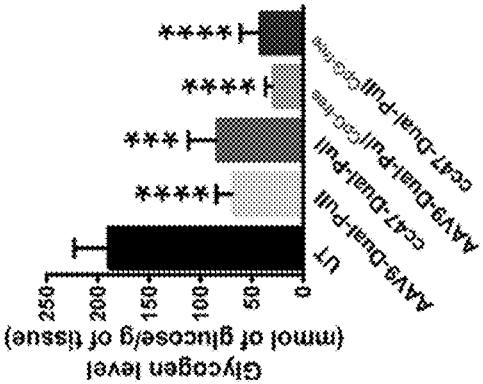
FIG. 7D Liver
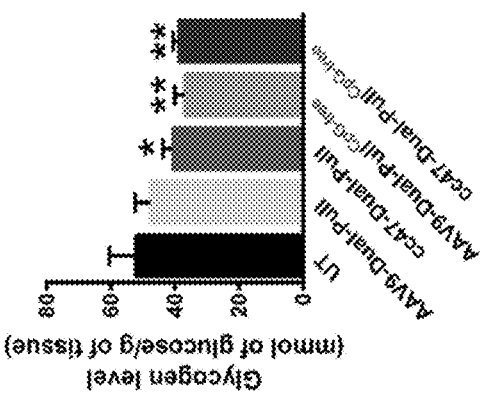
FIG. 7E Heart
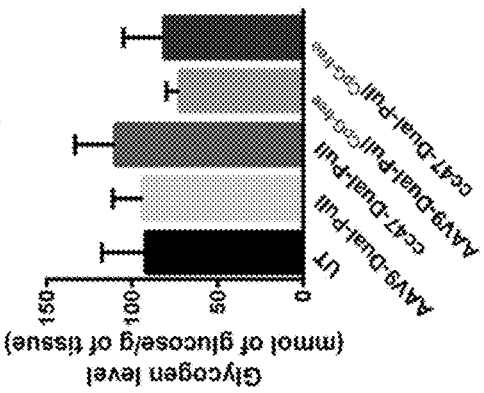
FIG. 7F Quadriceps

FIG. 11A  FIG. 11B  FIG. 11C
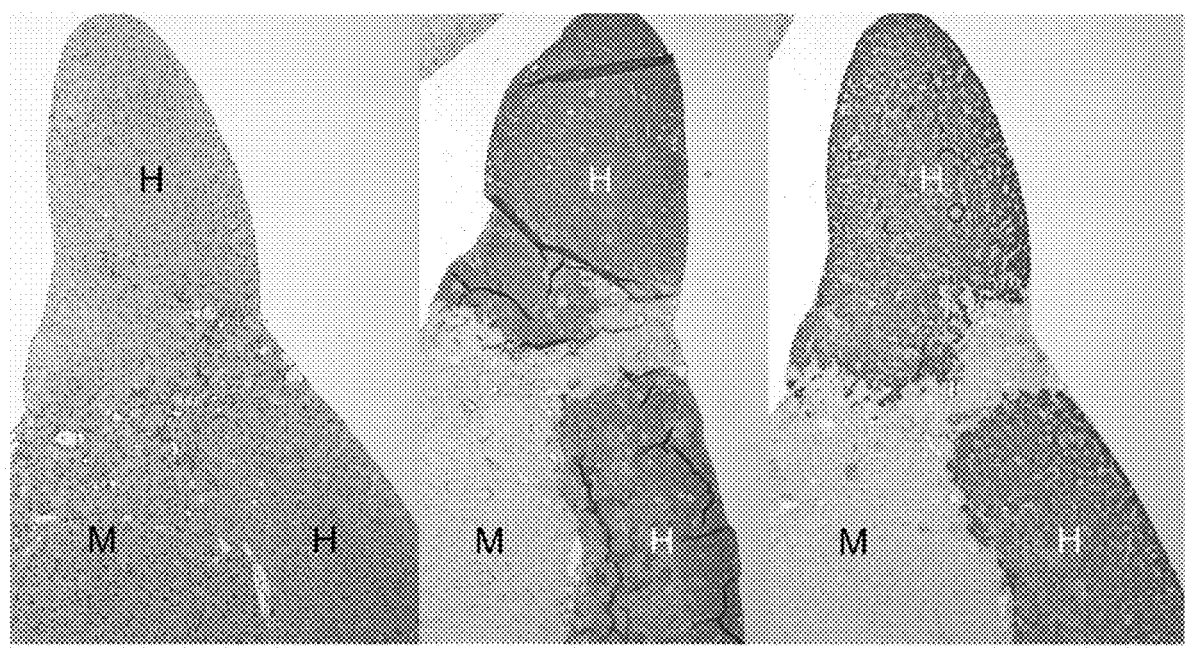
FIG. 11D
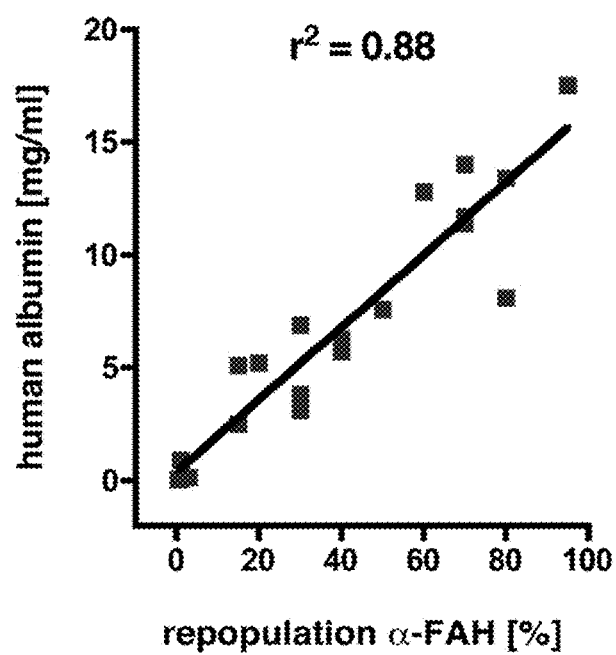
FIG. 11E
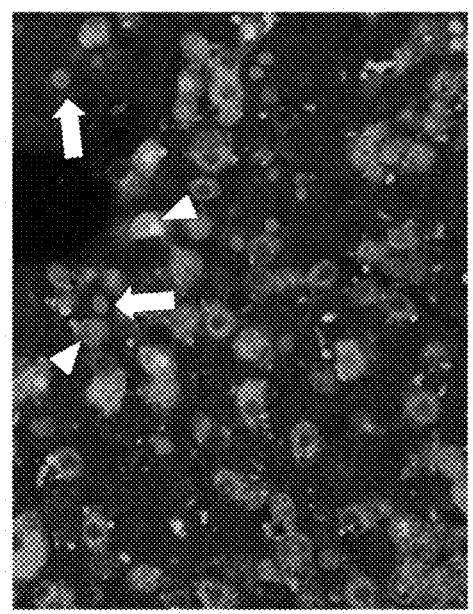

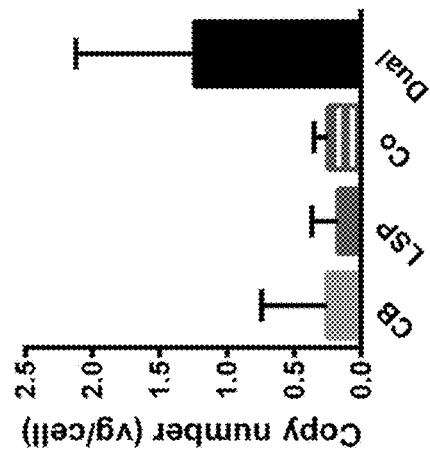
FIG. 13A Liver
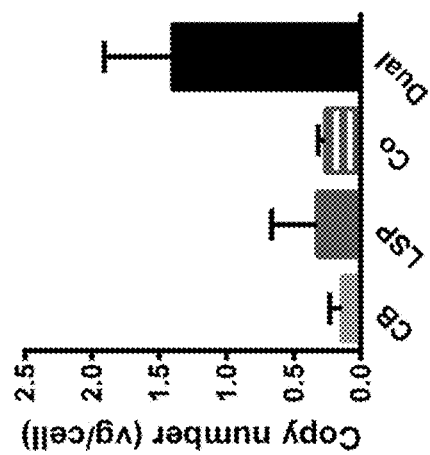
FIG. 13B Heart
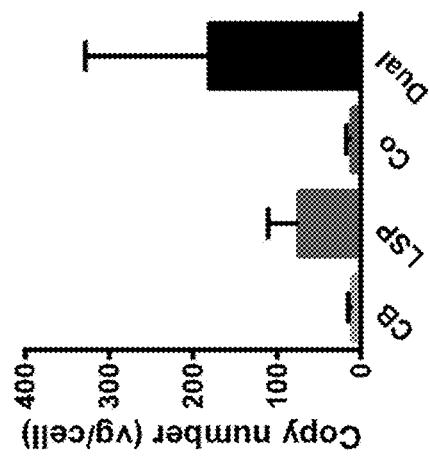
FIG. 13C Quadriceps
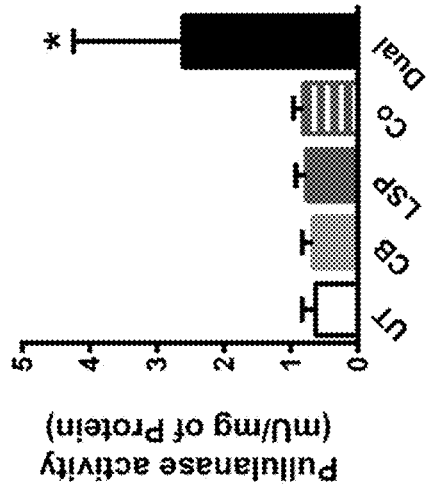
FIG. 13D Liver
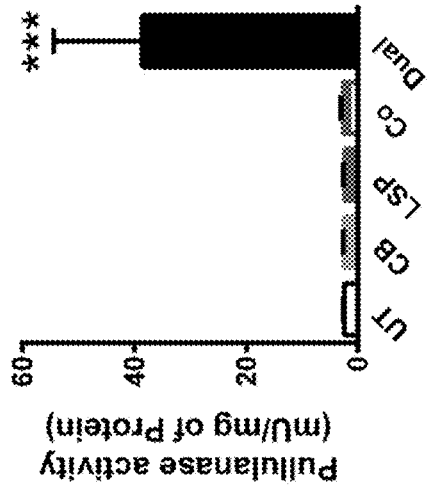
FIG. 13E Heart
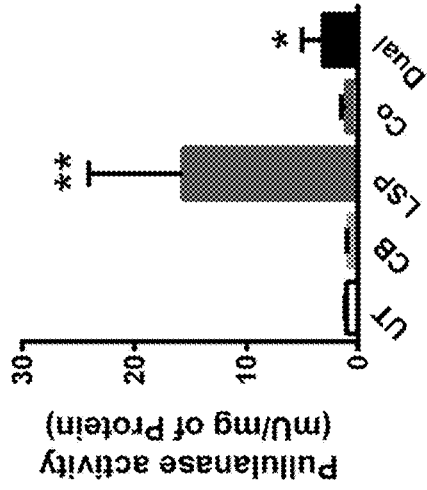
FIG. 13F Quadriceps

COMPOSITIONS AND METHODS FOR TREATING AND/OR PREVENTING GLYCOGEN STORAGE DISEASE TYPE III

CROSS REFERENCE TO RELATED APPLICATIONS

This application claims priority to U.S. Provisional Application Ser. No. 63/130,657, filed Dec. 26, 2020, which is incorporated by reference herein in its entirety for all purposes.

FIELD OF THE DISCLOSURE

The present disclosure relates to isolated nucleic acid molecules and methods of use thereof comprising a nucleic acid sequence encoding either a microbial polypeptide or a truncated human glycogen debranching enzyme for preventing glycogen accumulation and/or degrading accumulated glycogen. In some embodiments, nucleic acid sequences herein may be CpG-depleted and/or may comprise at least one codon-optimized for expression in a mammalian cell.

INCORPORATION BY REFERENCE OF SEQUENCE LISTING PROVIDED ELECTRONICALLY

An electronic version of the Sequence Listing is filed herewith, the contents of which are incorporated by reference in their entirety. The electronic file is 76 kilobytes in size and titled 20_2005_US_Sequence_Listing.txt.

BACKGROUND

GSD III is an autosomal recessive orphan condition (estimated at 1 in every 100,000 births and approximate 3,000 patients in the US) caused by the deficiency of glycogen debranching enzyme. There are 2 major subtypes, GSD IIIa (~85% of all GSD III) is characterized by the accumulation of abnormal glycogen (limit dextrin) in multiple tissues, primarily the liver, heart, and skeletal muscle, and GSD IIIb (remaining 15%), with accumulation primarily in the liver. Patients present within the first year of life with significant hepatomegaly, hypoglycemia, hyperlipidemia, elevated hepatic transaminases, and elevated creatine kinase. Long-term complications include progressive liver fibrosis, hepatic failure, and some patients develop end-stage liver cirrhosis, hepatic adenoma, or hepatocellular carcinomas. [1-4] Progressive myopathy, and cardiomyopathy are the major causes of morbidity and mortality. Muscle weakness and myopathy often begin in the first decade of life and become more prominent in the third or fourth decade of life; some patients can become wheelchair-bound due to severe impairment of skeletal muscle function. Ventricular hypertrophy is a frequent finding and sudden deaths due to life threatening cardiac arrhythmias or cardiac failure have been reported. [5-9] To date, no curative treatment is available for GSD III and current symptomatic treatment does not prevent ongoing disease progression. Dietary interventions do little to alter the long-term course and morbidity of the disease. [1, 2, 10] Liver and heart transplant is the only treatment option for patients with severe cirrhosis or hepatocellular carcinoma and cardiac failure, respectively, yet muscle disease continues to progress. [1, 2]

Gene therapy with adeno-associated virus (AAV) vectors, particularly AAV serotype 9 (AAV9), is an optimal treatment approach for GSD III as AAV vectors can reliably transduce liver and muscle tissues. Numerous preclinical studies in multiple animal models and clinical trials have established safety and efficacy profiles [18-26] In the past decade, AAV has become the most common gene delivery vector in clinical trials for a broad range of human genetic diseases, especially disorders of inborn errors of metabolism [27] However, the human glycogen debranching enzyme cDNA is 4.6 kb in size and a minimal expression cassette carrying this cDNA would be ~5.6 kb, which is far beyond the packaging limit of AAV (~4.7 kb).

There is a need for a minimally invasive, definitive therapy to address the underlying cause of as well as the sequelae of symptoms associated with GSD III. The present disclosure provides gene therapy for the treatment and mitigation of GSD III.

BRIEF DESCRIPTION OF THE FIGURES

FIGS. 1B-1D shows AAV genome copy numbers determined by real-time PCR in the liver (FIG. 1B), heart (FIG. 1C), and quadriceps (FIG. 1D) of GSD Ma mice after two weeks of AAV treatment. FIGS. 1E-1G shows pullulanase activity evaluated in the liver (FIG. 1E), heart (FIG. 1F) and skeletal muscle (FIG. 1G) of GSD Ma mice after two weeks of AAV treatment.

FIG. 2 shows immunohistochemical detection of CD8+ and CD4+ lymphocytes in the livers of GSD IIIa mice two weeks after AAV administration. Liver sections from untreated (UT), AAV-CB-Pull treated (CB), AAV-LSP-Pull treated (LSP), and AAV-Dual-Pull treated (Dual) mice were stained with an anti-CD4 or anti-CD8α monoclonal antibody. Infiltration of CD4+ and CD8+ lymphocytes were abundant in the CB treated liver (black arrows), absent in the LSP-treated liver, barely detectable in the Dual-treated liver (arrowheads). The images represent at least three mice in each group. Scale bar=50 μm.

FIG. 3D shows PAS staining of glycogen (purple) in tissues. All AAV treatments reduced glycogen accumulation in liver but only the Dual treatment also cleared glycogen in heart and quadriceps. The representative images were chosen from sampling at least three mice in each group. Bar=50 μm.

FIGS. 4A-4D show AAV-Dual-Pull treatment reduced glycogen accumulation in the liver, heart, skeletal muscle after ten weeks of AAV treatment. Glycogen contents were measured in the liver (FIG. 4A), heart (FIG. 4B), and skeletal muscle (FIG. 4C). The graphs represent the mean±SD. n=5. Multiple t-tests, p<0.01, *p<0.001, and ****p<0.0001 vs UT. FIG. 4D shows periodic acid-Schiff (PAS) staining of tissue sections was performed to confirm the results of glycogen content assay. The arrows pointed out the glycogen-free cardiac cells occasionally seen in the CB treated heart. No glycogen accumulation was observed in any tissues of the WT mice. The images represent at least three mice in each group. Bar=50 μm.

FIGS. 5A-5E show recovery of hepatic abnormalities and prevention of liver fibrosis ten weeks after AAV administration. FIG. 5A shows the ratio of liver to body weight, which was measured to determine hepatomegaly. FIG. 5B, FIG. 5C, and FIG. 5D show the plasma ALT, AST, and CK activities, which were measured to evaluate liver and muscle enzymes. WT, age-matched wild-type mice; UT, untreated GSD IIIa mice; CB, LSP, Dual, AAV-treated GSD IIIa mice. Data shown as mean±SD (n=5 mice/group). Student's test. p<0.01, *p<0.001, and ****p<0.0001. FIG. 5E shows Trichrome staining of liver sections for detection of fibrotic tissue. The images represent at least three mice each group. Bar=50 µm.

FIGS. 7A-7C shows Pullulanase expression in the liver (FIG. 7A), heart (FIG. 7B) and quadriceps (FIG. 7C) and FIGS. 7D-7F shows glycogen contents in the liver (FIG. 7D), heart (FIG. 7E) and quadriceps (FIG. 7F) of GSD IIIa mice four weeks after intravenous administration of AAV9 vectors carrying either the CpG-free (Pull$^{CpG-free}$) or unmodified (Pull) Pullulanase open-reading frame (ORF) under control of the LSP-CB dual promoter at a dose of $5 \times 10^{12}$ vg/kg. UT, untreated GSD IIIa mice. Data shown as mean±SD (n=5 mice/group). Student's test. *p<0.05, p<0.01, *p<0.001, and ****p<0.0001.

FIG. 9A shows AAV9 variable region 4 (VR4, red) and VR8 (blue) where the two libraries were generated. FIG. 9B show how AAV9 libraries were cycled through mice, pigs, and non-human primates.

FIG. 10A shows AAV9 control and AAVcc.47 packaging mCherry under a chicken beta-actin (CBA) promoter following IV injection at a dose of $1 \times 10^{12}$ vg/mouse. FIG. 10B shows AAVcc.81 packaging GFP under the CBA promoter following IV injection at a dose of $1 \times 10^{12}$ vg/mouse. Muscle was harvested 3 weeks post-injection and stained with DAPI. Native fluorescence of longitudinal sections (top row) and cross sections (bottom row) at 10× magnification are shown. These images are representative of 3 animals. p<0.05; *p<0.005.

FIGS. 11A-11E show data related to human liver chimeric mouse. FIGS. 11A-11C show serial sections of the same murine liver lobe with (FIG. 11A) H&E staining, (FIG. 11B) FAH immunostaining, and (FIG. 11C) CK18 immunostaining. Note that the FRG mouse is a knock-out for Fah (mouse tissue negative) and the human specific CK18 stain does not cross-react with mouse tissue. M=mouse tissue and H=human tissue. FIG. 11D shows the correlation of human albumin measured in the murine serum to repopulation rates by immunostaining (a-FAH). FIG. 11E shows double staining for FAH and nuclear LacZ expressed from AAV9-lacZ gene therapy vector. Transduced human hepatocytes are identified with arrowheads and mouse hepatocytes are identified with arrows.

FIGS. 13A-13F show that the LSP-CB dual promoter (AAV-Dual-Pull) allowed sustained pullulanase expression in major affected tissues of GSD IIIa mice. AAV genome copy numbers were determined by real-time PCR using gene-specific primers for Pullulanase in the liver (FIG. 13A), heart (FIG. 13B), and quadriceps (FIG. 13C) after ten weeks of treatment. Pullulanase activities were evaluated in the liver (FIG. 13D), heart (FIG. 13E), and skeletal muscle (FIG. 13F) after ten weeks of treatment. The graphs represent the mean±SD. n=5. Multiple t-tests, *p<0.05, p<0.01 and *p<0.001 vs UT.

FIG. 14A shows AAV genome copies in the liver and skeletal muscle. Quad means quadriceps. FIG. 14B shows pullulanase activity in the liver. FIG. 14C shows glycogen content in the liver. Pre means pre-treatment; Post means post-treatment. High dose: $2.5 \times 10^{13}$ vg/kg; Low dose: $5 \times 10^{12}$ vg/kg. Data shown as mean±SD of two samples in duplicates for each tissue. *=p<0.05; =p<0.01; *=p<0.001.

BRIEF SUMMARY

Figure 1A:
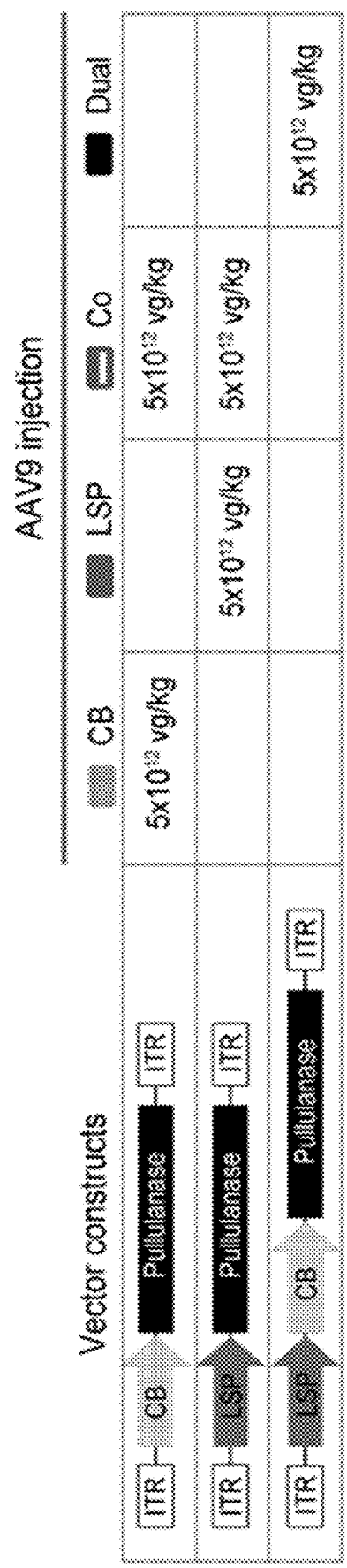
FIG. 1A. shows the AAV vector constructs for injection into GSD Ma mice. AAV vectors containing a 2.2-kb codon-optimized Pullulanase cDNA (Pull) under the control of the CB promoter (AAV-CB-Pull), the LSP promoter (AAV-LSP-Pull), or the LSP-CB dual promoter (AAV-Dual-Pull) were packaged as AAV9, and then intravenously injected into 10-week-old GSD Ma mice at the same dose.

Disclosed herein is an isolated nucleic acid molecule comprising a nucleic acid sequence encoding either a microbial polypeptide or a truncated human glycogen debranching enzyme for preventing glycogen accumulation and/or degrading accumulated glycogen, wherein the nucleic acid sequence is CpG-depleted and codon-optimized for expression in a human or a mammalian cell.

Disclosed herein is a vector comprising an isolated nucleic acid molecule comprising a nucleic acid sequence encoding either a microbial polypeptide and/or a truncated human glycogen debranching enzyme for preventing glycogen accumulation and/or degrading accumulated glycogen, wherein the nucleic acid sequence is CpG-depleted and codon-optimized for expression in a human or a mammalian cell.

Disclosed herein is a vector comprising a nucleic acid sequence encoding either a microbial polypeptide or a truncated human glycogen debranching enzyme for preventing glycogen accumulation and/or degrading accumulated glycogen, wherein the nucleic acid sequence is CpG-depleted and codon-optimized for expression in a human or a mammalian cell, and wherein a liver-specific promoter is operably linked to the nucleic acid sequence.

Disclosed herein is a vector comprising a gene expression cassette comprising an isolated nucleic acid molecule comprising a nucleic acid sequence encoding a polypeptide for preventing glycogen accumulation and/or degrading accumulated glycogen under the control of a dual promoter comprising a liver-specific promoter and a ubiquitous promoter.

Disclosed herein is a vector comprising a gene expression cassette comprising an isolated nucleic acid molecule, wherein the isolated nucleic acid sequence encodes either a microbial polypeptide or a truncated human glycogen debranching enzyme for preventing glycogen accumulation and/or degrading accumulated glycogen, wherein the isolated nucleic acid sequence is CpG-depleted and codon-optimized for expression in a human or a mammalian cell, and wherein expression of the polypeptide is under the control of an immunotolerant dual promoter.

Disclosed herein is an AAV vector comprising an isolated nucleic acid molecule, wherein the isolated nucleic acid sequence encodes either a microbial polypeptide or a truncated human glycogen debranching enzyme for preventing glycogen accumulation and/or degrading accumulated glycogen, and wherein the isolated nucleic acid sequence is CpG-depleted and codon-optimized for expression in a human or a mammalian cell.

Disclosed herein is a pharmaceutical formulation comprising a vector comprising a nucleic acid sequence encoding either a microbial polypeptide or a truncated human glycogen debranching enzyme for preventing glycogen accumulation and/or degrading accumulated glycogen, wherein the nucleic acid sequence is CpG-depleted and codon-optimized for expression in a human or a mammalian cell, in a pharmaceutically acceptable carrier.

Disclosed herein is a method of treating and/or preventing GSD III disease progression comprising administering to a subject in need thereof a therapeutically effective amount of a vector comprising a nucleic acid sequence encoding either a microbial polypeptide or a truncated human glycogen debranching enzyme, wherein the nucleic acid sequence is CpG-depleted and codon-optimized for expression in a human or a mammalian cell, and preventing glycogen accumulation and/or degrading accumulated glycogen in the subject.

Disclosed herein is a method of and/or preventing GSD III comprising preventing glycogen accumulation and/or degrading accumulated glycogen in a subject in need thereof by administering to the subject a therapeutically effective amount of a vector comprising a nucleic acid sequence encoding either a microbial polypeptide or a truncated human glycogen debranching enzyme, wherein the nucleic acid sequence is CpG-depleted and codon-optimized for expression in a human or a mammalian cell.

Disclosed herein is a method of and/or preventing GSD III comprising administering to a subject in need thereof a therapeutically effective amount of a vector comprising a nucleic acid sequence encoding either a microbial polypeptide or a truncated human glycogen debranching enzyme, wherein the nucleic acid sequence is CpG-depleted and codon-optimized for expression in a human or a mammalian cell, wherein glycogen accumulation is prevented and/or accumulated glycogen is degraded in the subject.

Disclosed herein is a method of preventing glycogen accumulation and/or degrading accumulated glycogen comprising administering to a subject having GSD III a therapeutically effective amount of a vector comprising a nucleic acid sequence encoding either a microbial polypeptide or a truncated human glycogen debranching enzyme, wherein the nucleic acid sequence is CpG-depleted and codon-optimized for expression in a human or a mammalian cell.

Disclosed herein is a method of treating GSD III comprise administering to a subject in need thereof an isolated nucleic acid molecule comprising a nucleic acid sequence encoding either a microbial polypeptide or a truncated human glycogen debranching enzyme, wherein the nucleic acid sequence is CpG-depleted and codon-optimized for expression in a human or a mammalian cell, and preventing glycogen accumulation and/or degrading accumulated a glycogen in the subject.

Disclosed herein is a method of treating and/or preventing GSD III disease progression comprising preventing glycogen accumulation and/or degrading accumulated glycogen in a subject in need thereof by administering to the subject an isolated nucleic acid molecule comprising a nucleic acid sequence encoding either a microbial polypeptide or a truncated human glycogen debranching enzyme, wherein the nucleic acid sequence is CpG-depleted and codon-optimized for expression in a human or a mammalian cell.

Disclosed herein is a method of treating and/or preventing GSD III disease progression comprising administering to a subject in need thereof an isolated nucleic acid molecule comprising a nucleic acid sequence encoding either a microbial polypeptide or a truncated human glycogen debranching enzyme, wherein the nucleic acid sequence is CpG-depleted and codon-optimized for expression in a human or a mammalian cell, wherein glycogen accumulation is prevented and/or accumulated glycogen is degraded in the subject.

Disclosed herein is a method of preventing glycogen accumulation and/or degrading accumulated glycogen comprising administering to a subject having GSD III an isolated nucleic acid molecule comprising a nucleic acid sequence encoding either a microbial polypeptide or a truncated human glycogen debranching enzyme, wherein the nucleic acid sequence is CpG-depleted and codon-optimized for expression in a human or a mammalian cell.

DETAILED DESCRIPTION

The present disclosure describes formulations, compounded compositions, kits, capsules, containers, and/or methods thereof. It is to be understood that the inventive aspects of which are not limited to specific synthetic methods unless otherwise specified, or to particular reagents unless otherwise specified, as such may, of course, vary. It is also to be understood that the terminology used herein is for the purpose of describing particular aspects only and is not intended to be limiting. Although any methods and materials similar or equivalent to those described herein can be used in the practice or testing of the present invention, example methods and materials are now described.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention.

I. Definitions

Before the present compounds, compositions, articles, systems, devices, and/or methods are disclosed and described, it is to be understood that they are not limited to specific synthetic methods unless otherwise specified, or to particular reagents unless otherwise specified, as such may, of course, vary. It is also to be understood that the terminology used herein is for the purpose of describing particular aspects only and is not intended to be limiting. Although any methods and materials similar or equivalent to those described herein can be used in the practice or testing of the present invention, example methods and materials are now described.

This disclosure describes inventive concepts with reference to specific examples. However, the intent is to cover all modifications, equivalents, and alternatives of the inventive concepts that are consistent with this disclosure.

As used in the specification and the appended claims, the singular forms "a", "an", and "the" include plural referents unless the context clearly dictates otherwise.

The phrase "consisting essentially of" limits the scope of a claim to the recited components in a composition or the recited steps in a method as well as those that do not materially affect the basic and novel characteristic or characteristics of the claimed composition or claimed method. The phrase "consisting of" excludes any component, step, or element that is not recited in the claim. The phrase "comprising" is synonymous with "including", "containing", or "characterized by", and is inclusive or open-ended. "Comprising" does not exclude additional, unrecited components or steps.

As used herein, when referring to any numerical value, the term "about" means a value falling within a range that is±10% of the stated value.

Ranges can be expressed herein as from "about" one particular value, and/or to "about" another particular value. When such a range is expressed, a further aspect includes from the one particular value and/or to the other particular value. Similarly, when values are expressed as approximations, by use of the antecedent "about," it will be understood that the particular value forms a further aspect. It will be further understood that the endpoints of each of the ranges are significant both in relation to the other endpoint and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

References in the specification and concluding claims to parts by weight of a particular element or component in a composition denotes the weight relationship between the element or component and any other elements or components in the composition or article for which a part by weight is expressed. Thus, in a compound containing 2 parts by weight component X and 5 parts by weight component Y, X and Y are present at a weight ratio of 2:5, and are present in such ratio regardless of whether additional components are contained in the compound.

As used herein, the terms "optional" or "optionally" means that the subsequently described event or circumstance can or cannot occur, and that the description includes instances where said event or circumstance occurs and instances where it does not. In an aspect, a disclosed method can optionally comprise one or more additional steps, such as, for example, repeating an administering step (e.g., the vector administering step or the immune modulator administering step) or altering an administering step.

As used herein, the term "subject" refers to the target of administration, e.g., a human being. The term "subject" also includes domesticated animals (e.g., cats, dogs, etc.), livestock (e.g., cattle, horses, pigs, sheep, goats, etc.), and laboratory animals (e.g., mouse, rabbit, rat, guinea pig, fruit fly, etc.). Thus, the subject of the herein disclosed methods can be a vertebrate, such as a mammal, a fish, a bird, a reptile, or an amphibian. Alternatively, the subject of the herein disclosed methods can be a human, non-human primate, horse, pig, rabbit, dog, sheep, goat, cow, cat, guinea pig, or rodent. The term does not denote a particular age or sex, and thus, adult and child subjects, as well as fetuses, whether male or female, are intended to be covered. In an aspect, a subject can be a human patient. In an aspect, a subject can have a glycogen storage disease, be suspected of having a glycogen storage disease, or be at risk of developing a glycogen storage disease. In an aspect, a glycogen storage disease can be GSD III. In an aspect, GSD III can be GSD IIIa or GSD IIIb.

As used herein, the term "diagnosed" means having been subjected to an examination by a person of skill, for example, a physician, and found to have a condition that can be diagnosed or treated by one or more of the disclosed isolated nucleic acid molecules, disclosed vectors, disclosed pharmaceutical formulations, or a combination thereof, or by one or more of the disclosed methods. For example, "diagnosed with a glycogen storage disease" means having been subjected to an examination by a person of skill, for example, a physician, and found to have a condition that can be treated by one or more of the disclosed isolated nucleic acid molecules, disclosed vectors, disclosed pharmaceutical formulations, or a combination thereof, or by one or more of the disclosed methods. For example, "suspected of having a glycogen storage disease" can mean having been subjected to an examination by a person of skill, for example, a physician, and found to have a condition that can likely be treated by one or more of by one or more of the disclosed isolated nucleic acid molecules, disclosed vectors, disclosed pharmaceutical formulations, or a combination thereof, or by one or more of the disclosed methods. In an aspect, an examination can be physical, can involve various tests (e.g., blood tests, genotyping, biopsies, etc.) and assays (e.g., enzymatic assay), or a combination thereof.

A "patient" refers to a subject afflicted with a glycogen storage disease. In an aspect, a patient can refer to a subject that has been diagnosed with or is suspected of having a glycogen storage disease. In an aspect, a patient can refer to a subject that has been diagnosed with or is suspected of having a glycogen storage disease (GSD) and is seeking treatment or receiving treatment for a GSD (such as, for example, GSD IIIa or GSD IIIb).

As used herein, the phrase "identified to be in need of treatment for a disorder," or the like, refers to selection of a subject based upon need for treatment of the disorder. For example, a subject can be identified as having a need for treatment of a disorder (e.g., GSD III) based upon an earlier diagnosis by a person of skill and thereafter subjected to treatment for the disorder (e.g., GSD III). In an aspect, the identification can be performed by a person different from the person making the diagnosis. In an aspect, the administration can be performed by one who performed the diagnosis.

As used herein, "inhibit," "inhibiting", and "inhibition" mean to diminish or decrease an activity, level, response, condition, severity, disease, or other biological parameter. This can include, but is not limited to, the complete ablation of the activity, level, response, condition, severity, disease, or other biological parameter. This can also include, for example, a 10% inhibition or reduction in the activity, level, response, condition, severity, disease, or other biological parameter as compared to the native or control level (e.g., a subject not having a GSD such as GSD III). Thus, in an aspect, the inhibition or reduction can be a 10%, 20%, 30%, 40%, 50%, 60%, 70%, 80%, 90%, 100%, or any amount of reduction in between as compared to native or control levels. In an aspect, the inhibition or reduction can be 10-20%, 20-30%, 30-40%, 40-50%, 50-60%, 60-70%, 70-80%, 80-90%, or 90-100% as compared to native or control levels. In an aspect, the inhibition or reduction can be 0-25%, 25-50%, 50-75%, or 75-100% as compared to native or control levels.

The words "treat" or "treating" or "treatment" include palliative treatment, that is, treatment designed for the relief of symptoms rather than the curing of the disease, pathological condition, or disorder; preventative treatment, that is, treatment directed to minimizing or partially or completely inhibiting the development of the associated disease, pathological condition, or disorder; and supportive treatment, that is, treatment employed to supplement another specific therapy directed toward the improvement of the associated disease, pathological condition, or disorder. In an aspect, the terms cover any treatment of a subject, including a mammal (e.g., a human), and includes: (i) preventing the undesired physiological change, disease, pathological condition, or disorder from occurring in a subject that can be predisposed to the disease but has not yet been diagnosed as having it; (ii) inhibiting the physiological change, disease, pathological condition, or disorder, i.e., arresting its development; or (iii) relieving the physiological change, disease, pathological condition, or disorder, i.e., causing regression of the disease. For example, in an aspect, treating a GSD (such as GSD III) can reduce the severity of an established GSD in a subject by 1%-100% as compared to a control (such as, for example, an individual not having a glycogen storage disease). In an aspect, treating can refer to a 1%, 2%, 3%, 4%, 5%, 6%, 7%, 8%, 9%, 10%, 20%, 30%, 40%, 50%, 60%, 70%, 80%, 90%, or 100% reduction in the severity of a GSD. For example, treating a GSD can reduce one or more symptoms of a GSD in a subject by 1%-100% as compared to a control (such as, for example, an individual not having a glycogen storage disease). In an aspect, treating can refer to 1%, 2%, 3%, 4%, 5%, 6%, 7%, 8%, 9%, 10%, 20%, 30%, 40%, 50%, 60%, 70%, 80%, 90%, 100% reduction of one or more symptoms of an established GSD. It is understood that treatment does not necessarily refer to a cure or complete ablation or eradication of a GSD. However, in an aspect, treatment can refer to a cure or complete ablation or eradication of a GSD.

As used herein, the term "prevent" or "preventing" or "prevention" refers to precluding, averting, obviating, forestalling, stopping, or hindering something from happening, especially by advance action. It is understood that where reduce, inhibit, or prevent are used herein, unless specifically indicated otherwise, the use of the other two words is also expressly disclosed. In an aspect, preventing a GSD is intended. The words "prevent" and "preventing" and "prevention" also refer to prophylactic or preventative measures for protecting or precluding a subject (e.g., an individual) not having a given GSD or GSD-related complication from progressing to that complication.

As used herein, the terms "administering" and "administration" refer to any method of providing one or more of the disclosed isolated nucleic acid molecules, disclosed vectors, disclosed pharmaceutical formulations, or a combination thereof to a subject. Such methods are well known to those skilled in the art and include, but are not limited to, the following: oral administration, transdermal administration, administration by inhalation, nasal administration, topical administration, intravaginal administration, in utero administration, ophthalmic administration, intraaural administration, otic administration, intracerebral administration, rectal administration, sublingual administration, buccal administration, and parenteral administration, including injectable such as intravenous administration, intrathecal administration, intra-arterial administration, intramuscular administration, and subcutaneous administration. Administration can be continuous or intermittent.

In an aspect, the skilled person can determine an efficacious dose, an efficacious schedule, and an efficacious route of administration for one or more of the disclosed isolated nucleic acid molecules, disclosed vectors, disclosed pharmaceutical formulations, or a combination thereof so as to treat or prevent an GSD (such as GSD III). In an aspect, the skilled person can also alter, change, or modify an aspect of an administering step to improve efficacy of one or more of the disclosed isolated nucleic acid molecules, disclosed vectors, disclosed pharmaceutical formulations, or a combination thereof.

As used herein, "modifying the method" can comprise modifying or changing one or more features or aspects of one or more steps of a disclosed method. For example, in an aspect, a method can be altered by changing the amount of one or more of the disclosed isolated nucleic acid molecules, disclosed vectors, disclosed pharmaceutical formulations, or a combination thereof administered to a subject, or by changing the frequency of administration of one or more of the disclosed isolated nucleic acid molecules, disclosed vectors, disclosed pharmaceutical formulations, or a combination thereof to a subject, or by changing the duration of time one or more of the disclosed isolated nucleic acid molecules, disclosed vectors, disclosed pharmaceutical formulations, or a combination are administered to a subject.

As used herein, "concurrently" means (1) simultaneously in time, or (2) at different times during the course of a common treatment schedule.

The term "contacting" as used herein refers to bringing one or more of the disclosed isolated nucleic acid molecules, disclosed vectors, disclosed pharmaceutical formulations, or a combination thereof together with a target area or intended target area in such a manner that the one or more of the disclosed isolated nucleic acid molecules, disclosed vectors, disclosed pharmaceutical formulations, or a combination thereof exert an effect on the intended target or targeted area either directly or indirectly. A target area or intended target area can be one or more of a subject's organs (e.g., lungs, heart, liver, kidney, brain, etc.). In an aspect, a target area or intended target area can be any cell or any organ infected by a GSD (such as GSD III). In an aspect, a target area or intended target area can be the liver.

As used herein, "determining" can refer to measuring or ascertaining the presence and severity of a glycogen storage disease, such as, for example, GSD III. Methods and techniques used to determine the presence and/or severity of a GSD are typically known to the medical arts. For example, the art is familiar with the ways to identify and/or diagnose the presence, severity, or both of a GSD.

As used herein, "effective amount" and "amount effective" can refer to an amount that is sufficient to achieve the desired result such as, for example, the treatment and/or prevention of a glycogen storage disease (e.g., GSD III) or a suspected a glycogen storage disease (e.g., a GSD IX). As used herein, the terms "effective amount" and "amount effective" can refer to an amount that is sufficient to achieve the desired an effect on an undesired condition (e.g., a GSD). For example, a "therapeutically effective amount" refers to an amount that is sufficient to achieve the desired therapeutic result or to have an effect on undesired symptoms, but is generally insufficient to cause adverse side effects. In an aspect, "therapeutically effective amount" means an amount of a disclosed composition that (i) treats the particular disease, condition, or disorder (e.g., a GSD), (ii) attenuates, ameliorates, or eliminates one or more symptoms of the particular disease, condition, or disorder e.g., a glycogen storage disease), or (iii) delays the onset of one or more symptoms of the particular disease, condition, or disorder described herein (e.g., a GSD). The specific therapeutically effective dose level for any particular patient will depend upon a variety of factors including the disorder being treated and the severity of the disorder; the disclosed isolated nucleic acid molecules, disclosed vectors, disclosed pharmaceutical formulations employed; the disclosed methods employed; the age, body weight, general health, sex and diet of the patient; the time of administration; the route of administration; the rate of excretion of the disclosed isolated nucleic acid molecules, disclosed vectors, or disclosed pharmaceutical formulations employed; the duration of the treatment; drugs used in combination or coincidental with the disclosed isolated nucleic acid molecules, disclosed vectors, or disclosed pharmaceutical formulations employed, and other like factors well known in the medical arts. For example, it is well within the skill of the art to start doses of the disclosed isolated nucleic acid molecules, disclosed vectors, or disclosed pharmaceutical formulations at levels lower than those required to achieve the desired therapeutic effect and to gradually increase the dosage until the desired effect is achieved. If desired, then the effective daily dose can be divided into multiple doses for purposes of administration. Consequently, a single dose of the disclosed isolated nucleic acid molecules, disclosed vectors, or disclosed pharmaceutical formulations can contain such amounts or submultiples thereof to make up the daily dose. The dosage can be adjusted by the individual physician in the event of any contraindications. Dosage can vary, and can be administered in one or more dose administrations daily, for one or several days. Guidance can be found in the literature for appropriate dosages for given classes of pharmaceutical products. In an aspect, a preparation can be administered in a "prophylactically effective amount"; that is, an amount effective for prevention of a disease or condition, such as, for example, a glycogen storage disease (e.g., GSD III). In an aspect, an effective amount of a disclosed isolated nucleic acid molecules, disclosed vectors, or disclosed pharmaceutical formulations can be administered to prevent an immune response.

As used herein, the term "pharmaceutically acceptable carrier" refers to sterile aqueous or nonaqueous solutions, dispersions, suspensions or emulsions, as well as sterile powders for reconstitution into sterile injectable solutions or dispersions just prior to use. Examples of suitable aqueous and nonaqueous carriers, diluents, solvents, or vehicles include water, ethanol, polyols (such as glycerol, propylene glycol, polyethylene glycol and the like), carboxymethylcellulose and suitable mixtures thereof, vegetable oils (such as olive oil) and injectable organic esters such as ethyl oleate. In an aspect, a pharmaceutical carrier employed can be a solid, liquid, or gas. In an aspect, examples of solid carriers can include lactose, terra alba, sucrose, talc, gelatin, agar, pectin, acacia, magnesium stearate, and stearic acid. In an aspect, examples of liquid carriers can include sugar syrup, peanut oil, olive oil, and water. In an aspect, examples of gaseous carriers can include carbon dioxide and nitrogen. In preparing a disclosed composition for oral dosage form, any convenient pharmaceutical media can be employed. For example, water, glycols, oils, alcohols, flavoring agents, preservatives, coloring agents and the like can be used to form oral liquid preparations such as suspensions, elixirs and solutions; while carriers such as starches, sugars, microcrystalline cellulose, diluents, granulating agents, lubricants, binders, disintegrating agents, and the like can be used to form oral solid preparations such as powders, capsules and tablets. Because of their ease of administration, tablets and capsules are the preferred oral dosage units whereby solid pharmaceutical carriers are employed. Optionally, tablets can be coated by standard aqueous or nonaqueous techniques. Proper fluidity can be maintained, for example, by the use of coating materials such as lecithin, by the maintenance of the required particle size in the case of dispersions and by the use of surfactants. These compositions can also contain adjuvants such as preservatives, wetting agents, emulsifying agents and dispersing agents. Prevention of the action of microorganisms can be ensured by the inclusion of various antibacterial and antifungal agents such as paraben, chlorobutanol, phenol, sorbic acid and the like. It can also be desirable to include isotonic agents such as sugars, sodium chloride and the like. Prolonged absorption of the injectable pharmaceutical form can be brought about by the inclusion of agents, such as aluminum monostearate and gelatin, which delay absorption. Injectable depot forms are made by forming microencapsule matrices of the drug in biodegradable polymers such as polylactide-polyglycolide, poly(orthoesters) and poly(anhydrides). Depending upon the ratio of drug to polymer and the nature of the particular polymer employed, the rate of drug release can be controlled. Depot injectable formulations are also prepared by entrapping the drug in liposomes or microemulsions that are compatible with body tissues. The injectable formulations can be sterilized, for example, by filtration through a bacterial-retaining filter or by incorporating sterilizing agents in the form of sterile solid compositions which can be dissolved or dispersed in sterile water or other sterile injectable media just prior to use. Suitable inert carriers can include sugars such as lactose. Desirably, at least 95% by weight of the particles of the active ingredient have an effective particle size in the range of 0.01 to 10 micrometers.

As used herein, the term "excipient" refers to an inert substance which is commonly used as a diluent, vehicle, preservative, binder, or stabilizing agent, and includes, but is not limited to, proteins (e.g., serum albumin, etc.), amino acids (e.g., aspartic acid, glutamic acid, lysine, arginine, glycine, histidine, etc.), fatty acids and phospholipids (e.g., alkyl sulfonates, caprylate, etc.), surfactants (e.g., SDS, polysorbate, nonionic surfactant, etc.), saccharides (e.g., sucrose, maltose, trehalose, etc.) and polyols (e.g., mannitol, sorbitol, etc.). See, also, for reference, Remington's Pharmaceutical Sciences, (1990) Mack Publishing Co., Easton, Pa., which is hereby incorporated by reference in its entirety.

In an aspect, "CpG-free" can mean completely free of CpGs or partially free of CpGs. In an aspect, CpG-free can mean CpG-depleted. In an aspect, CpG-depleted can mean completely depleted of CpGs or partially depleted of CpGs. In an aspect, CpG-free can mean CpG-optimized.

As used herein, "RNA therapeutics" can refer to the use of oligonucleotides to target RNA. RNA therapeutics can offer the promise of uniquely targeting the precise nucleic acids involved in a particular disease with greater specificity, improved potency, and decreased toxicity. This could be particularly powerful for genetic diseases where it is most advantageous to aim for the RNA as opposed to the protein. RNA therapeutics can comprise antisense oligonucleotides (ASOs) that inhibit mRNA translation, oligonucleotides that function via RNA interference (RNAi) pathway, RNA molecules that behave like enzymes (ribozymes), RNA oligonucleotides that bind to proteins and other cellular molecules, and ASOs that bind to mRNA and form a structure that is recognized by RNase H resulting in cleavage of the mRNA target. In an aspect, RNA therapeutics can comprise RNAi and ASOs that inhibit mRNA translation of liver or muscle glycogen synthase.

As used herein, "promoter" or "promoters" are known to the art. Depending on the level and tissue-specific expression desired, a variety of promoter elements can be used. A promoter can be tissue-specific or ubiquitous and can be constitutive or inducible, depending on the pattern of the gene expression desired. A promoter can be native or foreign and can be a natural or a synthetic sequence. By foreign, it is intended that the transcriptional initiation region is not found in the wild-type host into which the transcriptional initiation region is introduced.

"Tissue-specific promoters" are known to the art and include, but are not limited to, neuron-specific promoters, muscle-specific promoters, liver-specific promoters, skeletal muscle-specific promoters, and heart-specific promoters.

"Neuron-specific promoters" are known to the art and include, but are not limited to, the synapsin I (SYN) promoter, the calcium/calmodulin-dependent protein kinase II promoter, the tubulin alpha I promoter, the neuron-specific enolase promoter, and the platelet-derived growth factor beta chain promoter.

"Liver-specific promoters" are known to the art and include, but are not limited to, the $\alpha$1-microglobulin/bikunin enhancer/thyroid hormone-binding globulin promoter, the human albumin (hALB) promoter, the thyroid hormone-binding globulin promoter, the thyroxin binding globulin promoter, the $\alpha$-1-anti-trypsin promoter, the bovine albumin (bAlb) promoter, the murine albumin (mAlb) promoter, the human $\alpha$1-antitrypsin (hAAT) promoter, the ApoEhAAT promoter composed of the ApoE enhancer and the hAAT promoter, the transthyretin (TTR) promoter, the liver fatty acid binding protein promoter, the hepatitis B virus (HBV) promoter, the DC172 promoter consisting of the hAAT promoter and the al-microglobulin enhancer, the DC190 promoter containing the human albumin promoter and the prothrombin enhancer, and other natural and synthetic liver-specific promoters.

In an aspect, a liver specific promoter can comprise about 845-bp and comprise the thyroid hormone-binding globulin promoter sequences (2382 to 13), two copies of $\alpha$1-microglobulinybikunin enhancer sequences (22,804 through 22,704), and a 71-bp leader sequence as described by Ill C R, et al. (1997). In an aspect, a disclosed liver-specific promoter can comprise the sequence set forth in SEQ ID NO:15. In an aspect, a disclosed liver-specific promoter can comprise a sequence having at least 40%, 50%, 60%, 70%, 80%, 85%, 86%, 87%, 88%, 89%, 90%, 91%, 92%, 93%, 94%, 95%, 96%, 97%, 98%, or 99% identity to the sequence set forth in SEQ ID NO:15. In an aspect, a disclosed liver-specific promoter can comprise a sequence having at least 40%-60%, at least 60%-80%, at least 80%-90%, or at least 90%-100% identity to the sequence set forth in SEQ ID NO:15.

"Muscle-specific promoters" are known to the art and include, but are not limited to, the MHCK7 promoter, the muscle creatine kinase (MCK) promoter/enhancer, the slow isoform of troponin I (TnIS) promoter, the MYODI promoter, the MYLK2 promoter, the SPc5-12 promoter, the desmin (Des) promoter, the unc45b promoter, and other natural and synthetic muscle-specific promoters.

"Skeletal muscle-specific promoters" are known to the art and include, but are not limited to, the HSA promoter, the human $\alpha$-skeletal actin promoter.

"Heart-specific promoters" are known to the art and include, but art not limited to, the MYH6 promoter, the TNNI3 promoter, the cardiac troponin C (cTnC) promoter, the alpha-myosin heavy chain ($\alpha$-MHC) promoter, myosin light chain 2 (MLC-2), and the MYBPC3 promoter.

As used herein, a "ubiquitous/constitutive promoter" refer to a promoter that allows for continual transcription of its associated gene. A ubiquitous/constitutive promoter is always active and can be used to express genes in a wide range of cells and tissues, including, but not limited to, the liver, kidney, skeletal muscle, cardiac muscle, smooth muscle, diaphragm muscle, brain, spinal cord, endothelial cells, intestinal cells, pulmonary cells (e.g., smooth muscle or epithelium), peritoneal epithelial cells, and fibroblasts. Ubiquitous/constitutive promoters include, but are not limited to, a CMV major immediate-early enhancer/chicken beta-actin promoter, a cytomegalovirus (CMV) major immediate-early promoter, an Elongation Factor 1-$\alpha$ (EF1-$\alpha$) promoter, a simian vacuolating virus 40 (SV40) promoter, an AmpR promoter, a P$\gamma$K promoter, a human ubiquitin C gene (Ubc) promoter, a MFG promoter, a human beta actin promoter, a CAG promoter, a EGR1 promoter, a FerH promoter, a FerL promoter, a GRP78 promoter, a GRP94 promoter, a HSP70 promoter, a $\beta$-kin promoter, a murine phosphoglycerate kinase (mPGK) or human PGK (hPGK) promoter, a ROSA promoter, human Ubiquitin B promoter, a Rous sarcoma virus promoter, or any other natural or synthetic ubiquitous/constitutive promoters.

As used herein, an "inducible promoter" refers to a promoter that can be regulated by positive or negative control. Factors that can regulate an inducible promoter include, but are not limited to, chemical agents (e.g., the metallothionein promoter or a hormone inducible promoter), temperature, and light.

As used herein, the term "serotype" is a distinction used to refer to an AAV having a capsid that is serologically distinct from other AAV serotypes. Serologic distinctiveness can be determined on the basis of the lack of cross-reactivity between antibodies to one AAV as compared to another AAV. Such cross-reactivity differences are usually due to differences in capsid protein sequences/antigenic determinants (e.g., due to VP1, VP2, and/or VP3 sequence differences of AAV serotypes).

As used herein, "tropism" refers to the specificity of an AAV capsid protein present in an AAV viral particle, for infecting a particular type of cell or tissue. The tropism of an AAV capsid for a particular type of cell or tissue may be determined by measuring the ability of AAV vector particles comprising the hybrid AAV capsid protein to infect or to transduce a particular type of cell or tissue, using standard assays that are well-known in the art such as those disclosed in the examples of the present application. As used herein, the term "liver tropism" or "hepatic tropism" refers to the tropism for liver or hepatic tissue and cells, including hepatocytes.

"Sequence identity" and "sequence similarity" can be determined by alignment of two peptide or two nucleotide sequences using global or local alignment algorithms. Sequences may then be referred to as "substantially identical" or "essentially similar" when they are optimally aligned. For example, sequence similarity or identity can be determined by searching against databases such as FASTA, BLAST, etc., but hits should be retrieved and aligned pairwise to compare sequence identity. Two proteins or two protein domains, or two nucleic acid sequences can have "substantial sequence identity" if the percentage sequence identity is at least 70%, 75%, 80%, 85%, 90%, 95%, 98%, 99% or more, preferably 90%, 95%, 98%, 99% or more. Such sequences are also referred to as "variants" herein, e.g., other variants of microbial and human glycogen debranching enzymes. It should be understood that sequence with substantial sequence identity do not necessarily have the same length and may differ in length. For example, sequences that have the same nucleotide sequence but of which one has additional nucleotides on the 3'-and/or 5'-side are 100% identical.

As used herein, "codon optimization" can refer to a process of modifying a nucleic acid sequence for enhanced expression in the host cells of interest by replacing one or more codons or more of the native sequence with codons that are more frequently or most frequently used in the genes of that host cell while maintaining the native amino acid sequence. Various species exhibit particular bias for certain codons of a particular amino acid. As contemplated herein, genes can be tailored for optimal gene expression in a given organism based on codon optimization. Codon usage tables are readily available, for example, at the "Codon Usage Database." Many methods and software tools for codon optimization have been reported previously. (See, for example, genomes.urv.es/OPTIMIZER/).

As used herein, "immune tolerance," "immunological tolerance," and "immunotolerance" refers to a state of unresponsiveness or blunted response of the immune system to substances (e.g., a disclosed isolated nucleic acid molecule, a disclosed vector, a disclosed transgene product, a disclosed pharmaceutical formulation, a disclosed therapeutic agent, etc.) that have the capacity to elicit an immune response in a subject. Immune tolerance is induced by prior exposure to a specific antigen. Immune tolerance can be determined in a subject by measuring antibodies against a particular antigen or by liver-restricted transgene expression with an AAV vector. Low or absent antibody titers over time is an indicator of immune tolerance. For example, in some embodiments, immune tolerance can be established by having IgG antibody titers of less than or equal to about 12,000, 11,500, 11,000, 10,500, 10,000, 9,500, 9,000, 8,500, 8,000, 7,500, 7,000, 6,500, or 6,000 within following gene therapy (such as, for example, the administration of the transgene encoding a truncated human glycogen debranching enzyme or a microbial Pullulanase).

As used herein, "immune-modulating" refers to the ability of a disclosed isolated nucleic acid molecules, a disclosed vector, a disclosed pharmaceutical formulation, or a disclosed agent to alter (modulate) one or more aspects of the immune system. The immune system functions to protect the organism from infection and from foreign antigens by cellular and humoral mechanisms involving lymphocytes, macrophages, and other antigen-presenting cells that regulate each other by means of multiple cell-cell interactions and by elaborating soluble factors, including lymphokines and antibodies, that have autocrine, paracrine, and endocrine effects on immune cells.

As known to the art, antibodies (Abs) can mitigate AAV infection through multiple mechanisms by binding to AAV capsids and blocking critical steps in transduction such as cell surface attachment and uptake, endosomal escape, productive trafficking to the nucleus, or uncoating as well as promoting AAV opsonization by phagocytic cells, thereby mediating their rapid clearance from the circulation. For example, in humans, serological studies reveal a high prevalence of NAbs in the worldwide population, with about 67% of people having antibodies against AAV1, 72% against AAV2, and approximately 40% against AAV serotypes 5 through 9. Vector immunogenicity represents a major challenge in re-administration of AAV vectors.

As used herein, "immune modulator" refers to an agent that is capable of adjusting a given immune response to a desired level, as in immunopotentiation, immunosuppression, or induction of immunologic tolerance. Examples of immune modulators include but are not limited to, betamethasone dipropionate, betamethasone valerate, fluocinolone acetonide, triamcinolone acetonide, prednisone, methylprednisolone, prednisolone indomethacin, sulindac, ibuprofen, aspirin, naproxen, tolmetin, azathioprine, cyclosporine, cyclophosphamide, deoxyspergualin, bredinin, didemnin B, methotrexate, rituximab (anti-CD20 monoclonal antibody), intravenous gamma globulin (IVIG), synthetic vaccine particles containing rapamycin (SVP-Rapamycin or ImmTOR) bortezomib, thalidomide, and sirolimus. In an aspect, a disclosed immune modulator can be bortezomib or SVP-Rapamycin. In an aspect, an immune modulator can be administered by any suitable route of administration including, but not limited to, intravenously, subcutaneously, transdermally, intradermally, intramuscularly, orally, transcutaneously, intraperitoneally (IP), or intravaginally.

As used herein, the term "immunotolerant" refers to unresponsiveness to an antigen (e.g., a vector, a therapeutic protein, a bacterial glycogen debranching enzyme, etc.). An immunotolerant promoter can reduce, ameliorate, or prevent transgene-induced immune responses that can be associated with gene therapy. Assays known in the art to measure immune responses, such as immunohistochemical detection of cytotoxic T cell responses, can be used to determine whether one or more promoters can confer immunotolerant properties.

As used herein, the term "package insert" is used to refer to instructions customarily included in commercial packages of therapeutic products, that contain information about the indications, usage, dosage, administration, contraindications and/or warnings concerning the use of such therapeutic products.

As used herein, the term "in combination" in the context of the administration of other therapies (e.g., other agents) includes the use of more than one therapy (e.g., drug therapy). Administration "in combination with" one or more further therapeutic agents includes simultaneous (e.g., concurrent) and consecutive administration in any order. The use of the term "in combination" does not restrict the order in which therapies are administered to a subject. By way of non-limiting example, a first therapy (e.g., a disclosed isolated nucleic acid molecule, a disclosed vector, a disclosed pharmaceutical formulation, or a combination thereof) may be administered before (e.g., 1 minute, 15 minutes, 30 minutes, 45 minutes, 1 hour, 2 hours, 3 hours, 4 hours, 5 hours, 6 hours, 7 hours, 8 hours, 12 hours, 24 hours, 48 hours, 72 hours, 96 hours, 1 week, 2 weeks, 3 weeks, 4 weeks, 5 weeks, 6 weeks, 8 weeks, 8 weeks, 9 weeks, 10 weeks, 11 weeks, or 12 weeks), concurrently, or after (e.g., 1 minute, 15 minutes, 30 minutes, 45 minutes, 1 hour, 2 hours, 3 hours, 4 hours, 5 hours, 6 hours, 7 hours, 8 hours, 12 hours, 24 hours, 48 hours, 72 hours, 96 hours, 1 week, 2 weeks, 3 weeks, 4 weeks, 5 weeks, 6 weeks, 7 weeks, 8 weeks, 9 weeks, 10 weeks, 11 weeks, or 12 weeks or longer) the administration of a second therapy (e.g., agent) to a subject having or diagnosed with a GSD.

Disclosed are the components to be used to prepare the disclosed isolated nucleic acid molecules, disclosed vectors, or disclosed pharmaceutical formulations as well as the disclosed isolated nucleic acid molecules, disclosed vectors, or disclosed pharmaceutical formulations used within the methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the invention. Thus, if there are a variety of additional steps that can be performed it is understood that each of these additional steps can be performed with any specific embodiment or combination of embodiments of the methods of the invention.

II. Compositions for Treating and/or Preventing GSD III Disease Progression

(a) Nucleic Acid Molecules

Disclosed herein is an isolated nucleic acid molecule comprising a nucleic acid sequence encoding either a microbial polypeptide or a truncated human glycogen debranching enzyme for preventing glycogen accumulation and/or degrading accumulated glycogen, wherein the nucleic acid sequence is CpG-depleted and codon-optimized for expression in a human or a mammalian cell. In an aspect, a disclosed nucleic acid sequence can have a coding sequence that is less than about 4.5 kilobases.

Disclosed herein is an isolated nucleic acid molecule comprising the sequence set forth in any one of SEQ ID NO:16-SEQ ID NO:21.

In an aspect, a disclosed encoded polypeptide can cleave α glycosidic bonds in glycogen, limit dextrin, or both. In an aspect, a disclosed encoded polypeptide can cleave the α(1→6) bond at the branching point in glycogen, limit dextrin, or both. In an aspect, a disclosed encoded polypeptide can cleave the α(1→6) bond and the α(1→4) bond in glycogen, limit dextrin, or both. In an aspect, a disclosed encoded polypeptide can be a truncated human glycogen debranching enzyme. In an aspect, a disclosed encoded microbial polypeptide can be a bacterial glycogen debranching enzyme or a non-bacterial glycogen debranching enzyme. In an aspect, a disclosed encoded microbial polypeptide can be a type I Pullulanase from Bacillus subtilis.

In an aspect, a disclosed encoded microbial polypeptide can comprise the sequence set forth in SEQ ID NO:01. In an aspect, a disclosed encoded microbial polypeptide can comprise a sequence having at least 50%, at least 60%, at least 70%, at least 80%, or at least 90% identity to the sequence set forth in SEQ ID NO:01. In an aspect, a disclosed human glycogen debranching enzyme can comprise the sequence set forth in SEQ ID NO:02. In an aspect, a disclosed truncated human glycogen debranching enzyme can comprise a sequence having at least 30%, at least 40%, at least 50%, at least 60%, at least 70%, at least 80%, or at least 90% identity to the sequence set forth in SEQ ID NO:02. In an aspect, a disclosed nucleic acid sequence can comprise the sequence set forth in SEQ ID NO:04. In an aspect, a disclosed nucleic acid sequence can comprise a sequence having at least 50-69%, at least 70-89%, or at least 90-99% identity to the sequence set forth in SEQ ID NO:04.

Nucleotide Sequences

In an aspect, a disclosed original polynucleotide open reading frame (ORF) sequence of Pullulanase derived from B. subtilis strain 168 can have the following sequence or a fragment thereof:

```
(SEQ ID NO: 03)
ATGGTCAGCATCCGCCGCAGCTTCGAAGCGTATGTCGATGACATGAATAT

CATTACTGTTCTGATTCCTGCTGAACAAAAGGAAATCATGACACCGCCGT

TTCGGCTTGAGACAGAAATAACAGATTTTCCTCTGGCTGTCAGGGAGGAA

TACTCCCTTGAAGCAAAATACAAGTACGTCTGCGTATCCGACCATCCTGT

GACATTTGGAAAAATCCATTGCGTCAGAGCATCCAGCGGCCACAAAACGG

ATCTCCAAATTGGCGCGGTCATCCGGACGGCAGCGTTTGATGACGAATTT

TATTATGACGGAGAGCTGGGCGCCGTTTATACCGCGGATCATACCGTATT

TAAAGTATGGGCGCCTGCTGCAACCTCAGCTGCTGTCAAGCTTTCACACC

CCAATAAAAGCGGGCGCACATTCCAAATGACTCGCTTGGAAAAAGGCGTC

TATGCCGTTACGGTCACAGGTGACCTTCACGGATATGAGTATTTGTTTTG

CATCTGCAACAATTCAGAATGGATGGAAACAGTTGACCAGTATGCCAAGG

CTGTGACTGTAAATGGAGAGAAGGGCGTCGTCTTGCGCCCGGATCAAATG

AAATGGACTGCTCCTCTTAAACCATTCTCACACCCTGTGGATGCCGTCAT

CTATGAGACGCATCTTCGCGACTTCTCCATCCATGAAAACAGCGGCATGA

TAAACAAGGGAAAATACTTAGCGCTGACGGAAACTGATACACAAACCGCA

AATGGCAGTTCTTCGGGATTAGCGTATGTAAAAGAGCTTGGTGTGACACA

TGTGGAGCTTCTGCCGGTGAATGATTTTGCCGGAGTTGATGAAGAGAAGC

CGCTTGATGCATACAATTGGGGATATAACCCGCTTCATTTCTTTGCCCCG

GAGGGAAGCTATGCCTCAAATCCTCATGATCCTCAAACGAGAAAAACAGA

GCTGAAACAAATGATCAATACCCTGCATCAGCACGGTCTGCGAGTCATTC

TGGATGTTGTTTTTAACCATGTGTATAAGAGGGAGAATTCCCCCTTTGAA

AAGACAGTGCCCGGTTATTTTTTCCGGCACGACGAATGTGGGATGCCATC

AAACGGCACCGGCGTTGGCAATGATATTGCATCAGAAAGAAGGATGGCAA

GAAAATTCATTGCGGATTGCGTGGTCTATTGGCTTGAAGAATACAATGTT

GACGGCTTCCGCTTTGATCTCCTCGGGATTTTAGATATTGACACCGTGCT

TTATATGAAAGAGAAAGCAACTAAGGCAAAGCCCGGAATCCTGCTTTTTG

GAGAAGGGTGGGACCTGGCTACACCGCTGCCGCATGAACAGAAAGCTGCT

TTGGCGAACGCGCCAAGAATGCCGGGCATCGGCTTTTTTAATGATATGTT

TCGTGACGCTGTAAAAGGGAACACCTTTCACCTTAAGGCAACAGGGTTTG

CGCTCGGCAACGGTGAATCAGCACAAGCTGTGATGCATGGAATTGCCGGG
```

-continued
TCTTCCGGATGGAAGGCATTAGCACCGATTGTTCCGGAACCAAGCCAGTC

CATCAATTATGTCGAATCACACGACAATCACACCTTTTGGGATAAAATGA

GCTTTGCGCTTCCTCAAGAAAATGACAGCCGAAAGCGAAGCAGGCAAAGG

CTTGCAGCCGCGATTATTTTGCTTGCCCAAGGGGTGCCGTTTATTCACAG

CGGCCAGGAATTTTTCCGGACGAAGCAGGGAGTGGAAAACAGCTATCAAT

CCAGTGACAGCATCAACCAGCTCGACTGGGATCGCCGTGAAACATTCAAA

GAAGATGTTCACTATATCCGCAGGCTGATCTCGCTGAGAAAAGCGCATCC

TGCATTCCGTCTTAGGTCCGCTGCAGACATCCAGCGCCATCTTGAATGCT

TGACGCTAAAAGAACACCTTATCGCATACAGGCTTTATGATCTTGACGAG

GTTGACGAATGGAAAGATATCATTGTTATCCATCACGCGAGTCCAGACTC

CGTCGAGTGGAGGCTGCCAAACGACATACCTTATCGGCTTTTATGTGATC

CATCAGGATTTCAGGAAGACCCAACAGAAATCAAGAAAACGGTTGCAGTA

AACGGCATCGGAACGGTTATCTTATATTTAGCATCAGATCTTAAGAGTTT

TGCTTGA.

In an aspect, a disclosed CpG-free and codon-optimized polynucleotide ORF sequence for expressing Pullulanase derived from *Bacillus subtilis* strain 168 in human cells can have the following sequence or a fragment thereof:

(SEQ ID NO: 04)
ATGGTGAGCATCAGAAGATCCTTTGAGGCCTATGTGGATGATATGAACAT

CATCACAGTGCTGATCCCAGCTGAGCAGAAGGAGATCATGACACCCCCTT

TCAGACTGGAGACAGAGATCACAGACTTTCCCCTGGCTGTGAGAGAGGAG

TATAGCCTGGAGGCCAAGTACAAGTATGTGTGTGTGTCTGACCATCCTGT

GACCTTTGGCAAGATCCACTGTGTGAGAGCAAGCTCTGGACACAAGACAG

ACCTGCAGATTGGAGCTGTGATCAGGACAGCAGCCTTTGATGATGAGTTT

TACTATGATGGAGAGCTGGGAGCTGTGTACACAGCAGATCACACAGTGTT

CAAGGTCTGGGCACCAGCAGCCACATCTGCTGCAGTGAAGCTGAGCCACC

CCAACAAGTCTGGCAGGACCTTTCAGATGACAAGACTGGAGAAGGGAGTG

TATGCTGTGACAGTGACAGGAGATCTGCATGGCTATGAGTATCTGTTCTG

CATCTGTAACAATTCTGAGTGGATGGAGACAGTGGATCAGTATGCCAAGG

CTGTGACAGTGAATGGAGAGAAGGGAGTGGTGCTGAGGCCAGACCAGATG

AAGTGGACAGCACCCCTGAAGCCTTTCAGCCACCCTGTGGATGCTGTGAT

CTATGAGACACACCTGAGAGATTTTTCTATCCATGAGAACTCTGGCATGA

TCAATAAGGGCAAGTACCTGGCCCTGACAGAGACAGACACCCAGACAGCC

AATGGCTCTAGCTCTGGCCTGGCCTATGTGAAGGAGCTGGGAGTGACCCA

TGTGGAGCTGCTGCCTGTGAATGACTTTGCTGGAGTGGATGAGGAGAAGC

CACTGGATGCCTACAACTGGGGCTATAATCCACTGCACTTCTTTGCCCCT

GAGGGCTCTTATGCCAGCAACCCACATGACCCCCAGACCAGGAAGACAGA

GCTGAAGCAGATGATCAATACACTGCACCAGCATGGCCTGAGAGTGATCC

TGGATGTGGTGTTCAACCATGTGTACAAGAGAGAGAATAGCCCTTTTGAG

AAGACAGTGCCAGGCTATTTCTTTAGACATGATGAGTGTGGCATGCCATC

TAATGGCACAGGAGTGGGCAATGATATTGCCTCTGAGAGGAGAATGGCCA

GAAAGTTCATTGCTGACTGTGTGGTGTACTGGCTGGAGGAGTATAATGTG

GATGGCTTCAGATTTGATCTGCTGGGCATCCTGGACATTGATACAGTGCT

GTACATGAAGGAGAAGGCCACAAAGGCCAAGCCAGGCATCCTGCTGTTTG

GAGAGGGATGGGACCTGGCAACCCCACTGCCACATGAGCAGAAGGCTGCC

CTGGCAAATGCACCTAGGATGCCAGGCATTGGCTTCTTCAATGACATGTT

TAGAGATGCTGTGAAGGGCAATACCTTCCACCTGAAGGCCACAGGCTTTG

CACTGGGAAATGGAGAGTCTGCCCAGGCTGTGATGCATGGAATTGCAGGA

TCTTCTGGATGGAAGGCCCTGGCACCAATTGTGCCTGAGCCAAGCCAGTC

CATCAACTATGTGGAGTCCCATGACAATCACACCTTCTGGGATAAGATGT

CTTTTGCCCTGCCTCAGGAGAATGATTCTAGGAAGAGAAGCAGGCAGAGA

CTGGCAGCAGCAATCATCCTGCTGGCCCAGGGAGTGCCATTCATCCACTC

TGGCCAGGAGTTCTTTAGAACCAAGCAGGGAGTGGAGAACTCCTACCAGT

CCTCTGATTCTATCAATCAGCTGGACTGGGATAGGAGAGAGACATTCAAG

GAGGATGTGCACTATATCAGGAGACTGATCAGCCTGAGAAAGGCACACCC

AGCCTTTAGACTGAGATCTGCTGCAGACATCCAGAGGCACCTGGAGTGCC

TGACCCTGAAGGAGCACCTGATTGCCTACAGACTGTATGACCTGGATGAG

GTGGATGAGTGGAAGGATATCATTGTGATCCACCATGCCTCCCCTGACTC

TGTGGAGTGGAGACTGCCCAATGATATCCCTTACAGACTGCTGTGTGACC

CCTCTGGCTTCCAGGAGGATCCTACAGAGATCAAGAAGACAGTGGCTGTG

AATGGCATTGGCACAGTGATCCTGTATCTGGCCTCTGACCTGAAGTCTTT

TGCCTGA.

In an aspect, a disclosed LSP promoter can have the following sequence or a fragment thereof:

(SEQ ID NO: 15)
GAGTTAATTTTTAAAAAGCAGTCAAAAGTCCAAGTGGCCCTTGCGAGCAT

TTACTCTCTCTGTTTGCTCTGGTTAATAATCTCAGGAGCACAAAATTCCT

TACTAGTCCTAGAAGTTAATTTTTAAAAAGCAGTCAAAAGTCCAAGTCCA

AGTGGCCCTTGCGAGCATTTACTCTCTCTGTTTGCTCTGGTTAATAATCT

CAGGAGCACAAACATTCCTTACTAGTTCTAGAGCGGCCGCCAGTGTGCTG

GAATTCGGCTTTTTTAGGGCTGGAAGCTACCTTTGACATCATTTCCTCTG

CGAATGCATGTATAATTTCTACAGAACCTATTAGAAAGGATCACCCAGCC

TCTGCTTTTGTACAACTTTCCCTTAAAAAATGCCAATTCCACTGCTGTTT

GGCCCAATAGTGAGAACTTTTTCCTGCTGCCTCTTGGTGCTTTTGCCTAT

GGCCCCTATTCTGCCTGCTGAAGACACTCTTGCCAGCATGGACTTAAACC

CCTCCAGCTCTGACAATCCTCTTTCTCTTTTGTTTTACATGAAGGGTCTG

GCAGCCAAAGCAATCACTCAAAGGTTCAAACCTTATCATTTTTTGCTTTG

TTCCTCTTGGCCTTGGTTTTGTACATCAGCTTTGAAAATACCATCCCAGG

GTTAATGCTGGGGTTAATTTATAACTAAGAGTGCTCTAGTTTTGCAATAC

AGGACATGCTATAAAAATGGAAAGATGTTGCTTTCTGAGAGATCAGCTTA

CATGT.

In an aspect, a disclosed LSP-CB dual promoter can have the following sequence or a fragment thereof:

(SEQ ID NO: 05)
GAGTTAATTTTTAAAAAGCAGTCAAAAGTCCAAGTGGCCCTTGCGAGCAT
TTACTCTCTCTGTTTGCTCTGGTTAATAATCTCAGGAGCACAAAATTCCT
TACTAGTCCTAGAAGTTAATTTTTAAAAAGCAGTCAAAAGTCCAAGTCCA
AGTGGCCCTTGCGAGCATTTACTCTCTCTGTTTGCTCTGGTTAATAATCT
CAGGAGCACAAACATTCCTTACTAGTTCTAGAGCGGCCGCCAGTGTGCTG
GAATTCGGCTTTTTTAGGGCTGGAAGCTACCTTTGACATCATCTCCTCTG
CGAATGCATGTATAATTTCTACAGAACCTATTAGAAAGGATCACCCAGCC
TCTGCTTTTGTACAACTTTCCCTTAAAAAACTGCCAATCCCACTGCTGTT
TGGCCCAATAGTGAGAACTTTTTCTGCTGCCTCTTGGTGCTTTTGCCTAT
GGCCCCTATTCTGCTGCTGAAGACACTCTTGCCAGCATGGACTTAAACCC
CTCCAGCTCTGACAATCCTCTTTCTCTTTTGTTTTACATGAAGGGTCTGG
CAGCCAAAGCAATCACTCAAAGTTCAAACCTTATCATTTTTTGCTTTGTT
CCTCTTGGCCTTGGTTTTGTACATCAGCTTTGAAAATACCATCCCAGGGT
TAATGCTGGGGTTAATTTATAACTGAGAGTGCTCTAGTTTTGCAATACAG
GACATGCTATAAAAATGGCTTAAGGTTCCGCGTTACATAACTTACGGTAA
ATGGCCCGCCTGGCTGACCGCCCAACGACCCCCGCCCATTGACGTCAATA
ATGACGTATGTTCCCATAGTAACGCCAATAGGGACTTTCCATTGACGTCA
ATGGGTGGAGTATTTACGGTAAACTGCCCACTTGGCAGTACATCAAGTGT
ATCATATGCCAAGTACGCCCCCTATTGACGTCAATGACGGTAAATGGCCC
GCCTGGCATTATGCCCAGTACATGACCTTATGGGACTTTCCTACTTGGCA
GTACATCTACGTATTAGTCATCGCTATTACCATGCATGGTCGAGGTGAGC
CCCACGTTCTGCTTCACTCTCCCCATCTCCCCCCCCTCCCCACCCCCAAT
TTTGTATTTATTTATTTTTTAATTATTTTGTGCAGCGAGGGGCGGGGCGG
GGCGAGGCGGAGAGGTGCGGCGGCAGCCAATCAGAGCGGCGCGCTCCGAA
AGTTTCCTTTTATGGCGAGGCGGCGGCGGCGGCGGCCCTATAAAAGCGA
AGCGCGCGGCGGGCG.

In an aspect, a disclosed LSP-mCMV/hEF1α$^{CpG\text{-}free}$ dual promoter can have the following sequence or a fragment thereof:

(SEQ ID NO: 6)
GAGTTAATTTTTAAAAAGCAGTCAAAAGTCCAAGTGGCCCTTGCGAGCAT
TTACTCTCTCTGTTTGCTCTGGTTAATAATCTCAGGAGCACAAAATTCCT
TACTAGTCCTAGAAGTTAATTTTTAAAAAGCAGTCAAAAGTCCAAGTCCA
AGTGGCCCTTGCGAGCATTTACTCTCTCTGTTTGCTCTGGTTAATAATCT
CAGGAGCACAAACATTCCTTACTAGTTCTAGAGCGGCCGCCAGTGTGCTG
GAATTCGGCTTTTTTAGGGCTGGAAGCTACCTTTGACATCATCTCCTCTG
CGAATGCATGTATAATTTCTACAGAACCTATTAGAAAGGATCACCCAGCC
TCTGCTTTTGTACAACTTTCCCTTAAAAAACTGCCAATCCCACTGCTGTT
TGGCCCAATAGTGAGAACTTTTTCTGCTGCCTCTTGGTGCTTTTGCCTA

-continued

TGGCCCCTATTCTGCTGCTGAAGACACTCTTGCCAGCATGGACTTAAACC
CCTCCAGCTCTGACAATCCTCTTTCTCTTTTGTTTTACATGAAGGGTCTG
GCAGCCAAAGCAATCACTCAAAGTTCAAACCTTATCATTTTTGCTTTGT
TCCTCTTGGCCTTGGTTTTGTACATCAGCTTTGAAAATACCATCCCAGGG
TTAATGCTGGGGTTAATTTATAACTGAGAGTGCTCTAGTTTTGCAATACA
GGACATGCTATAAAAATGGCTTAAGGAGTCAATGGGAAAAACCCATTGGA
GCCAAGTACACTGACTCAATAGGGACTTTCCATTGGGTTTTGCCCAGTAC
ATAAGGTCAATAGGGGGTGAGTCAACAGGAAAGTCCCATTGGAGCCAAGT
ACATTGAGTCAATAGGGACTTTCCAATGGGTTTTGCCCAGTACATAAGGT
CAATGGGAGGTAAGCCAATGGGTTTTTCCCATTACTGACATGTATACTGA
GTCATTAGGGACTTTCCAATGGGTTTTGCCCAGTACATAAGGTCAATAGG
GGTGAATCAACAGGAAAGTCCCATTGGAGCCAAGTACACTGAGTCAATAG
GGACTTTCCATTGGGTTTTGCCCAGTACAAAAGGTCAATAGGGGGTGAGT
CAATGGGTTTTTCCCATTATTGGCACATACATAAGGTCAATAGGGGTGAC
TAGTGGAGAAGAGCATGCTTGAGGGCTGAGTGCCCCTCAGTGGGCAGAGA
GCACATGGCCCACAGTCCCTGAGAAGTTGGGGGGAGGGGTGGGCAATTGA
ACTGGTGCCTAGAGAAGGTGGGGCTTGGGTAAACTGGGAAAGTGATGTGG
TGTACTGGCTCCACCTTTTTCCCCAGGGTGGGGGAGAACCATATATAAGT
GCAGTAGTCTCTGTGAACATTC.

Polypeptide Sequences

In an aspect, a disclosed Pullulanase [*Bacillus subtilis* subsp. *subtilis* str. 168] can have the sequence set forth in NCBI Reference Sequence No. NP_390871.2. In an aspect, a disclosed Pullulanase can have the following sequence or a fragment thereof:

(SEQ ID NO: 01)
MVSIRRSFEAYVDDMNIITVLIPAEQKEIIVITPPFRLETEITDFPLAVR
EEYSLEAKYKYVCVSDHPVTFGKIHCVRASSGHKTDLQIGAVIRTAAFDD
EFYYDGELGAVYTADHTVFKVWAPAATSAAVKLSHPNKSGRTFQMTRLEK
GVYAVTVTGDLHGYEYLFCICNNSEWMETVDQYAKAVTVNGEKGVVLRPD
QMKWTAPLKPFSHPVDAVIYETHLRDFSIHENSGMINKGKYLALTETDTQ
TANGSSSGLAYVKELGVTHVELLPVNDFAGVDEEKPLDAYNWGYNPLHFF
APEGSYASNPHDPQTRKTELKQMINTLHQHGLRVILDVVFNHVYKRENSP
FEKTVPGYFFRHDECGMPSNGTGVGNDIASERRMARKFIADCVVYWLEEY
NVDGFRFDLLGILDIDTVLYMKEKATKAKPGILLFGEGWDLATPLPHEQK
AALANAPRMPGIGFFNDMFRDAVKGNTFHLKATGFALGNGESAQAVMHGI
AGSSGWKALAPIVPEPSQSINYVESHDNHTFWDKMSFALPQENDSRKRSR
QRLAAAIILLAQGVPFIHSGQEFFRTKQGVENSYQSSDSINQLDWDRRET
FKEDVHYIRRLISLRKAHPAFRLRSAADIQRHLECLTLKEHLIAYRLYDL
DEVDEWKDIIVIHHASPDSVEWRLPNDIPYRLLCDPSGFQEDPTEIKKTV
AVNGIGTVILYLASDLKSFA.

In an aspect, a disclosed human glycogen debranching enzyme isoform 1 can have the sequence set forth in NCBI Reference Sequence No. NP_000635.2. In an aspect, a disclosed human glycogen debranching enzyme isoform 1 can have the following sequence or a fragment thereof:

(SEQ ID NO: 02)
MGHSKQIRILLLNEMEKLEKTLFRLEQGYELQFRLGPTLQGKAVTVYTNY

PFPGETFNREKFRSLDWENPTEREDDSDKYCKLNLQQSGSFQYYFLQGNE

KSGGGYIVVDPILRVGADNHVLPLDCVTLQTFLAKCLGPFDEWESRLRVA

KESGYNMIHFTPLQTLGLSRSCYSLANQLELNPDFSRPNRKYTWNDVGQL

VEKLKKEWNVICITDVVYNHTAANSKWIQEHPECAYNLVNSPHLKPAWVL

DRALWRFSCDVAEGKYKEKGIPALIENDHHMNSIRKIIWEDIFPKLKLWE

FFQVDVNKAVEQFRRLLTQENRRVTKSDPNQHLTIIQDPEYRRFGCTVDM

NIALTTFIPHDKGPAAIEECCNWFHKRMEELNSEKHRLINYHQEQAVNCL

LGNVFYERLAGHGPKLGPVTRKHPLVTRYFTFPFEEIDFSMEESMIHLPN

KACFLMAHNGWVMGDDPLRNFAEPGSEVYLRRELICWGDSVKLRYGNKPE

DCPYLWAHMKKYTEITATYFQGVRLDNCHSTPLHVAEYWILDAARNLQPN

LYVVAELFTGSEDLDNVFVTRLGISSLIREAMSAYNSHEEGRLVYRYGGE

PVGSFVQPCLRPLMPAIAHALFMDITHDNECPIVHRSAYDALPSTTIVSM

ACCASGSTRGYDELVPHQISVVSEERFYTKWNPEALPSNTGEVNFQSGII

AARCAISKLHQELGAKGFIQVYVDQVDEDIVAVTRHSPSIHQSVVAVSRT

AFRNPKTSFYSKEVPQMCIPGKIEEVVLEARTIERNTKPYRKDENSINGT

PDITVEIREHIQLNESKIVKQAGVATKGPNEYIQEIEFENLSPGSVIIFR

VSLDPHAQVAVGILRNHLTQFSPHFKSGSLAVDNADPILKIPFASLASRL

TLAELNQILYRCESEEKEDGGGCYDIPNWSALKYAGLQGLMSVLAEIRPK

NDLGHPFCNNLRSGDWMIDYVSNRLISRSGTIAEVGKWLQAMFFYLKQIP

RYLIPCYFDAILIGAYTTLLDTAWKQMSSFVQNGSTFVKHLSLGSVQLCG

VGKFPSLPILSPALMDVPYRLNEITKEKEQCCVSLAAGLPHFSSGIFRCW

GRDTFIALRGILLITGRYVEARNIILAFAGTLRHGLIPNLLGEGIYARYN

CRDAVWWWLQCIQDYCKMVPNGLDILKCPVSRMYPTDDSAPLPAGTLDQP

LFEVIQEAMQKHMQGIQFRERNAGPQIDRNMKDEGFNITAGVDEETGFVY

GGNRFNCGTWMDKMGESDRARNRGIPATPRDGSAVEIVGLSKSAVRWLLE

LSKKNIFPYHEVTVKRHGKAIKVSYDEWNRKIQDNFEKLFHVSEDPSDLN

EKHPNLVHKRGIYKDSYGASSPWCDYQLRPNFTIAMVVAPELFTTEKAWK

ALEIAEKKLLGPLGMKTLDPDDMVYCGIYDNALDNDNYNLAKGFNYHQGP

EWLWPIGYFLRAKLYFSRLMGPETTAKTIVLVKNVLSRHYVHLERSPWKG

LPELTNENAQYCPFSCETQAWSIATILETLYDL.

(b) Vectors

Disclosed herein is a vector comprising an isolated nucleic acid molecule comprising a nucleic acid sequence encoding either a microbial polypeptide or a truncated human glycogen debranching enzyme for preventing glycogen accumulation and/or degrading accumulated glycogen, wherein the nucleic acid sequence is CpG-depleted and codon-optimized for expression in a human or a mammalian cell. In an aspect, a disclosed nucleic acid sequence can have a coding sequence that is less than about 4.5 kilobases.

In an aspect, a disclosed encoded polypeptide can cleave α glycosidic bonds in glycogen, limit dextrin, or both. In an aspect, a disclosed encoded polypeptide can cleave the α(1→6) bond at the branching point in glycogen, limit dextrin, or both. In an aspect, a disclosed encoded polypeptide can cleave the α(1→6) bond and the α(1→4) bond in glycogen, limit dextrin, or both. In an aspect, a disclosed encoded polypeptide can be a truncated human glycogen debranching enzyme. In an aspect, a disclosed encoded microbial polypeptide can be a bacterial glycogen debranching enzyme or a non-bacterial glycogen debranching enzyme. In an aspect, a disclosed encoded microbial polypeptide can be a type I Pullulanase from *Bacillus subtilis*. In an aspect, a disclosed encoded microbial polypeptide can comprise the sequence set forth in SEQ ID NO:01. In an aspect, a disclosed encoded microbial polypeptide can comprise a sequence having at least 50%, at least 60%, at least 70%, at least 80%, or at least 90% identity to the sequence set forth in SEQ ID NO:01. In an aspect, a disclosed human glycogen debranching enzyme can comprise the sequence set forth in SEQ ID NO:02. In an aspect, a disclosed truncated human glycogen debranching enzyme can comprise a sequence having at least 30%, at least 40%, at least 50%, at least 60%, at least 70%, at least 80%, or at least 90% identity to the sequence set forth in SEQ ID NO:02. In an aspect, a disclosed nucleic acid sequence can comprise the sequence set forth in SEQ ID NO:04. In an aspect, a disclosed nucleic acid sequence can comprise a sequence having at least 50-69%, at least 70-89%, or at least 90-99% identity to the sequence set forth in SEQ ID NO:04.

In an aspect, a disclosed vector can be a viral vector or a non-viral vector. In an aspect, a disclosed non-viral vector can be a polymer-based vector, a peptide based vector, a lipid nanoparticle, a solid lipid nanoparticle, or a cationic lipid based vector. In an aspect, a disclosed viral vector can be an adenovirus vector, an AAV, a herpes simplex virus vector, a retrovirus vector, a lentivirus vector, and alphavirus vector, a flavivirus vector, a rhabdovirus vector, a measles virus vector, a Newcastle disease viral vector, a poxvirus vector, or a picornavirus vector. In an aspect, a disclosed viral vector can be an AAV vector. AAV vectors include, but are not limited to, AAV1, AAV2, AAV3 (including 3a and 3b), AAV4, AAV5, AAV6, AAV7, AAV8, AAVrh8, AAV.hum8, AAV9, AAV10, AAVrh10, AAV11, AAV12, AAV13, AAVrh39, AAVrh43, AAVcy.7 as well as bovine AAV, caprine AAV, canine AAV, equine AAV, ovine AAV, avian AAV, primate AAV, non-primate AAV, and any other virus classified by the International Committee on Taxonomy of Viruses (ICTV) as an AAV. In an aspect, AAV capsids can be chimeras either created by capsid evolution or by rational capsid engineering from the naturally isolated AAV variants to capture desirable serotype features such as enhanced or specific tissue tropism and host immune response escape, including but not limited to AAV-DJ, AAV-HAE1, AAV-HAE2, AAVM41, AAV-1829, AAV2 Y/F, AAV2 T/V, AAV2i8, AAV2.5, AAV9.45, AAV9.61, AAV-B1, AAV-AS, AAV9.45A-String (e.g., AAV9.45-AS), AAV9.45Angiopep, AAV9.47-Angiopep, and AAV9.47-AS., AAV-PHP.B, AAV-PHP.eB, AAV-PHP.S, AAV-F, AAVcc.47, and AAVcc.81. In an aspect, an AAV vector can be AAV9, AAVcc.47, or AAVcc.81. In an aspect, a disclosed AAV vector can be AAV-Rh74 or a related variant (e.g., capsid variants such as RHM4-1).

In an aspect, a disclosed vector can comprise a ubiquitous promoter operably linked to the isolated nucleic acid molecule, wherein the ubiquitous promoter drives the expression of the polypeptide. In an aspect, a disclosed ubiquitous promoter can be a CMV enhancer/chicken β-actin promoter (CB promoter) or a CpG-free murine CMV enhancer/human elongation factor-1 alpha promoter (mCMV/hEF1α promoter). In an aspect, a disclosed vector can comprise a tissue-specific promoter operably linked to the isolated nucleic acid molecule. In an aspect, a disclosed tissue-specific promoter can be a liver-specific promoter, a muscle-specific promoter, a neuron-specific promoter, or a combination of two or more disclosed promoters. In an aspect, a liver-specific promoter can be a α1-microglobulin/bikunin enhancer/thyroid hormone-binding globulin promoter. In an aspect, a liver-specific promoter can comprise about 845-bp and comprise the thyroid hormone-binding globulin promoter sequences (2382 to 13), two copies of α1-microglobulinybikunin enhancer sequences (22,804 through 22,704), and a 71-bp leader sequence as described by Ill CR, et al. (1997). In an aspect, a disclosed liver-specific promoter can comprise the sequence set forth in SEQ ID NO:15. In an aspect, a disclosed liver-specific promoter can comprise a sequence having at least 40%, 50%, 60%, 70%, 80%, 85%, 86%, 87%, 88%, 89%, 90%, 91%, 92%, 93%, 94%, 95%, 96%, 97%, 98%, or 99% identity to the sequence set forth in SEQ ID NO:15. In an aspect, a disclosed liver-specific promoter can comprise a sequence having at least 40%-60%, at least 60%-80%, at least 80%-90%, or at least 90%-100% identity to the sequence set forth in SEQ ID NO:15.

In an aspect, a disclosed vector can comprise an immunotolerant dual promoter comprising a liver-specific promoter and a ubiquitous promoter. In an aspect, a disclosed immunotolerant dual promoter can comprise a α1-microglobulin/bikunin enhancer/thyroid hormone-binding globulin promoter and a CB promoter. In an aspect, a disclosed immunotolerant dual promoter can comprise a α1-microglobulin/bikunin enhancer/thyroid hormone-binding globulin promoter and a CpG-free mCMV/hEF1α promoter. In an aspect, a disclosed immunotolerant dual promoter can comprise the sequence set forth in SEQ ID NO:05 or SEQ ID NO:06. In an aspect, a disclosed immunotolerant dual promoter can comprise a sequence having at least 40%, 50%, 60%, 70%, 80%, 85%, 86%, 87%, 88%, 89%, 90%, 91%, 92%, 93%, 94%, 95%, 96%, 97%, 98%, or 99% identity to the sequence set forth in SEQ ID NO:05 or SEQ ID NO:06.

In an aspect, a disclosed vector can comprise an isolated nucleic acid molecule comprising the one or more promoters, the CpG-depleted and codon-optimized nucleic acid sequence encoding the polypeptide, and a polyadenylation sequence.

Disclosed herein is a vector comprising an isolated nucleic acid molecule comprising a nucleic acid sequence encoding either a microbial polypeptide or a truncated human glycogen debranching enzyme for preventing glycogen accumulation and/or degrading accumulated glycogen, wherein the nucleic acid sequence is CG-depleted and codon-optimized for expression in a human or a mammalian cell, wherein a liver-specific promoter is operably linked to the nucleic acid sequence.

In an aspect, a disclosed nucleic acid sequence can have a coding sequence that is less than about 4.5 kilobases.

In an aspect, a disclosed encoded polypeptide can cleave α glycosidic bonds in glycogen, limit dextrin, or both. In an aspect, a disclosed encoded polypeptide can cleave the α(1→6) bond at the branching point in glycogen, limit dextrin, or both. In an aspect, a disclosed encoded polypeptide can cleave the α(1→6) bond and at the α(1→4) bond in glycogen, limit dextrin, or both. In an aspect, a disclosed encoded polypeptide can be a truncated human glycogen debranching enzyme. In an aspect, a disclosed encoded microbial polypeptide can be a bacterial glycogen debranching enzyme or a non-bacterial glycogen debranching enzyme. In an aspect, a disclosed encoded microbial polypeptide can be a type I Pullulanase from *Bacillus subtilis*. In an aspect, a disclosed encoded microbial polypeptide can comprise the sequence set forth in SEQ ID NO:01. In an aspect, a disclosed encoded microbial polypeptide can comprise a sequence having at least 30%, at least 40%, at least 50%, at least 60%, at least 70%, at least 80%, or at least 90% identity to the sequence set forth in SEQ ID NO:01. In an aspect, a disclosed human glycogen debranching enzyme can comprise the sequence set forth in SEQ ID NO:02. In an aspect, a disclosed truncated human glycogen debranching enzyme can comprise a sequence having at least 30%, at least 40%, at least 50%, at least 60%, at least 70%, at least 80%, or at least 90% identity to the sequence set forth in SEQ ID NO:02. In an aspect, a disclosed nucleic acid sequence can comprise the sequence set forth in SEQ ID NO:04. In an aspect, a disclosed nucleic acid sequence can comprise a sequence having at least 50-69%, at least 70-89%, or at least 90-99% identity to the sequence set forth in SEQ ID NO:04.

In an aspect, a disclosed vector can be an AAV vector. AAV vectors include, but are not limited to, AAV1, AAV2, AAV3 (including 3a and 3b), AAV4, AAV5, AAV6, AAV7, AAV8, AAVrh8, AAV9, AAV10, AAVrh10, AAV11, AAV12, AAV13, AAVrh39, AAVrh43, AAVcy.7 as well as bovine AAV, caprine AAV, canine AAV, equine AAV, ovine AAV, avian AAV, primate AAV, non-primate AAV, and any other virus classified by the International Committee on Taxonomy of Viruses (ICTV) as an AAV. In an aspect, AAV capsids can be chimeras either created by capsid evolution or by rational capsid engineering from the naturally isolated AAV variants to capture desirable serotype features such as enhanced or specific tissue tropism and host immune response escape, including but not limited to AAV-DJ, AAV-HAE1, AAV-HAE2, AAVM41, AAV-1829, AAV2 Y/F, AAV2 T/V, AAV2i8, AAV2.5, AAV9.45, AAV9.61, AAV-B1, AAV-AS, AAV9.45A-String (e.g., AAV9.45-AS), AAV9.45Angiopep, AAV9.47-Angiopep, and AAV9.47-AS, AAV-PHP.B, AAV-PHP.eB, AAV-PHP.S, AAV-F, AAVcc.47, and AAVcc.81. In an aspect, an AAV vector can be AAV9, AAVcc.47, or AAVcc.81. In an aspect, a disclosed AAV vector can be AAV-Rh74 or a related variant (e.g., capsid variants such as RHM4-1).

In an aspect, a disclosed liver-specific promoter can be a α1-microglobulin/bikunin enhancer/thyroid hormone-binding globulin promoter. In an aspect, a liver-specific promoter can comprise about 845-bp and comprise the thyroid hormone-binding globulin promoter sequences (2382 to 13), two copies of α1-microglobulinybikunin enhancer sequences (22,804 through 22,704), and a 71-bp leader sequence. In an aspect, a disclosed liver-specific promoter can be the LSP described by Ill C R, et al. (1997). In an aspect, a disclosed liver-specific promoter can comprise the sequence set forth in SEQ ID NO:15. In an aspect, a disclosed liver-specific promoter can comprise a sequence having at least 40%, 50%, 60%, 70%, 80%, 85%, 86%, 87%, 88%, 89%, 90%, 91%, 92%, 93%, 94%, 95%, 96%, 97%, 98%, or 99% identity to the sequence set forth in SEQ ID NO:15. In an aspect, a disclosed liver-specific promoter can comprise a sequence having at least 40%-60%, at least 60%-80%, at least 80%-90%, or at least 90%-100% identity to the sequence set forth in SEQ ID NO:15.

In an aspect, a disclosed vector can comprise an isolated nucleic acid molecule comprising the one or more promoters, the CpG-depleted and codon-optimized nucleic acid sequence encoding the polypeptide, and a polyadenylation sequence.

Disclosed herein is an AAV vector comprising an isolated nucleic acid molecule, wherein the isolated nucleic acid sequence encodes either a microbial polypeptide or a truncated human glycogen debranching enzyme for preventing glycogen accumulation and/or degrading accumulated glycogen, and wherein the isolated nucleic acid sequence is CpG-depleted and codon-optimized for expression in a human or a mammalian cell. AAV vectors include, but are not limited to, AAV1, AAV2, AAV3 (including 3a and 3b), AAV4, AAV5, AAV6, AAV7, AAV8, AAVrh8, AAV.hum8, AAV9, AAV10, AAVrh10, AAV11, AAV12, AAV13, AAVrh39, AAVrh43, AAVcy.7 as well as bovine AAV, caprine AAV, canine AAV, equine AAV, ovine AAV, avian AAV, primate AAV, non-primate AAV, and any other virus classified by the International Committee on Taxonomy of Viruses (ICTV) as an AAV. In an aspect, AAV capsids can be chimeras either created by capsid evolution or by rational capsid engineering from the naturally isolated AAV variants to capture desirable serotype features such as enhanced or specific tissue tropism and host immune response escape, including but not limited to AAV-DJ, AAV-HAE1, AAV-HAE2, AAVM41, AAV-1829, AAV2 Y/F, AAV2 T/V, AAV2i8, AAV2.5, AAV9.45, AAV9.61, AAV-B1, AAV-AS, AAV9.45A-String (e.g., AAV9.45-AS), AAV9.45Angiopep, AAV9.47-Angiopep, and AAV9.47-AS., AAV-PHP.B, AAV-PHP.eB, AAV-PHP.S, AAV-F, AAVcc.47, and AAVcc.81. In an aspect, an AAV vector can be AAV9, AAVcc.47, or AAVcc.81. In an aspect, a disclosed AAV vector can be AAV-Rh74 or a related variant (e.g., capsid variants such as RHM4-1).

In an aspect, a disclosed nucleic acid sequence can have a coding sequence that is less than about 4.5 kilobases.

In an aspect, a disclosed encoded polypeptide can cleave α glycosidic bonds in glycogen, limit dextrin, or both. In an aspect, a disclosed encoded polypeptide can cleave the α(1→6) bond at the branching point in glycogen, limit dextrin, or both. In an aspect, a disclosed encoded polypeptide can cleave the α(1→6) bond and at the α(1→4) bond in glycogen, limit dextrin, or both. In an aspect, a disclosed encoded polypeptide can be a truncated human glycogen debranching enzyme. In an aspect, a disclosed encoded microbial polypeptide can be a bacterial glycogen debranching enzyme or a non-bacterial glycogen debranching enzyme. In an aspect, a disclosed encoded microbial polypeptide can be a type I Pullulanase from *Bacillus subtilis*. In an aspect, a disclosed encoded microbial polypeptide can comprise the sequence set forth in SEQ ID NO:01. In an aspect, a disclosed encoded microbial polypeptide can comprise a sequence having at least 50%, at least 60%, at least 70%, at least 80%, or at least 90% identity to the sequence set forth in SEQ ID NO:01. In an aspect, a disclosed human glycogen debranching enzyme can comprise the sequence set forth in SEQ ID NO:02. In an aspect, a disclosed truncated human glycogen debranching enzyme can comprise a sequence having at least 30%, at least 40%, at least 50%, at least 60%, at least 70%, at least 80%, or at least 90% identity to the sequence set forth in SEQ ID NO:02. In an aspect, a disclosed nucleic acid sequence can comprise the sequence set forth in SEQ ID NO:04. In an aspect, a disclosed nucleic acid sequence can comprise a sequence having at least 50-69%, at least 70-89%, or at least 90-99% identity to the sequence set forth in SEQ ID NO:04.

In an aspect, a disclosed vector can comprise a ubiquitous promoter operably linked to the isolated nucleic acid molecule, wherein the ubiquitous promoter drives the expression of the polypeptide. In an aspect, a disclosed ubiquitous promoter can be a CB promoter or a CpG-free mCMV/hEF1α promoter. In an aspect, a disclosed vector can comprise a tissue-specific promoter operably linked to the isolated nucleic acid molecule. In an aspect, a disclosed tissue-specific promoter can be a liver-specific promoter, a muscle-specific promoter, a neuron-specific promoter, or a combination of two or more disclosed promoters. In an aspect, a liver-specific promoter can be a α1-microglobulin/bikunin enhancer/thyroid hormone-binding globulin promoter. In an aspect, a liver-specific promoter can comprise about 845-bp and comprise the thyroid hormone-binding globulin promoter sequences (2382 to 13), two copies of α1-microglobuliny bikunin enhancer sequences (22,804 through 22,704), and a 71-bp leader sequence as described by Ill C R, et al. (1997). In an aspect, a disclosed liver-specific promoter can comprise the sequence set forth in SEQ ID NO:15. In an aspect, a disclosed liver-specific promoter can comprise a sequence having at least 40%, 50%, 60%, 70%, 80%, 85%, 86%, 87%, 88%, 89%, 90%, 91%, 92%, 93%, 94%, 95%, 96%, 97%, 98%, or 99% identity to the sequence set forth in SEQ ID NO:15. In an aspect, a disclosed liver-specific promoter can comprise a sequence having at least 40%-60%, at least 60%-80%, at least 80%-90%, or at least 90%-100% identity to the sequence set forth in SEQ ID NO:15.

In an aspect, a disclosed vector can comprise an immunotolerant dual promoter comprising a liver-specific promoter and a ubiquitous promoter. In an aspect, a disclosed immunotolerant dual promoter can comprise a α1-microglobulin/bikunin enhancer/thyroid hormone-binding globulin promoter and a CB promoter. In an aspect, a disclosed immunotolerant dual promoter can comprise a α1-microglobulin/bikunin enhancer/thyroid hormone-binding globulin promoter and a CpG-free mCMV/hEF1α promoter. In an aspect, a disclosed immunotolerant dual promoter can comprise the sequence set forth in SEQ ID NO:05 or SEQ ID NO:06. In an aspect, a disclosed immunotolerant dual promoter can comprise a sequence having at least 40%, 50%, 60%, 70%, 80%, 85%, 86%, 87%, 88%, 89%, 90%, 91%, 92%, 93%, 94%, 95%, 96%, 97%, 98%, or 99% identity to the sequence set forth in SEQ ID NO:05 or SEQ ID NO:06.

In an aspect, a disclosed vector can comprise an isolated nucleic acid molecule comprising the one or more promoters, the CpG-depleted and codon-optimized nucleic acid sequence encoding the polypeptide, and a polyadenylation sequence.

Disclosed herein is a vector comprising a gene expression cassette comprising an isolated nucleic acid molecule comprising a nucleic acid sequence encoding a polypeptide for preventing glycogen accumulation and/or degrading accumulated glycogen under the control of a dual promoter comprising a liver-specific promoter and a ubiquitous promoter. In an aspect, a disclosed nucleic acid sequence can be CpG-depleted and codon-optimized for expression in a human or a mammalian cell. In an aspect, a disclosed nucleic acid sequence can have a nucleotide sequence having about 4.5 kb or less.

In an aspect, a disclosed encoded polypeptide can cleave α glycosidic bonds in glycogen, limit dextrin, or both. In an aspect, a disclosed encoded polypeptide can cleave the α(1→6) bond at the branching point in glycogen, limit dextrin, or both. In an aspect, a disclosed encoded polypeptide can cleave the α(1→6) bond and at the α(1→4) bond in glycogen, limit dextrin, or both. In an aspect, a disclosed encoded polypeptide can be a truncated human glycogen debranching enzyme. In an aspect, a disclosed encoded microbial polypeptide can be a bacterial glycogen debranching enzyme or a non-bacterial glycogen debranching enzyme. In an aspect, a disclosed encoded microbial polypeptide can be a type I Pullulanase from *Bacillus subtilis*. In an aspect, a disclosed encoded microbial polypeptide can comprise the sequence set forth in SEQ ID NO:01. In an aspect, a disclosed encoded microbial polypeptide can comprise a sequence having at least 50%, at least 60%, at least 70%, at least 80%, or at least 90% identity to the sequence set forth in SEQ ID NO:01. In an aspect, a disclosed human glycogen debranching enzyme can comprise the sequence set forth in SEQ ID NO:02. In an aspect, a disclosed truncated human glycogen debranching enzyme can comprise a sequence having at least 30%, at least 40%, at least 50%, at least 60%, at least 70%, at least 80%, or at least 90% identity to the sequence set forth in SEQ ID NO:02. In an aspect, a disclosed nucleic acid sequence can comprise the sequence set forth in SEQ ID NO:04. In an aspect, a disclosed nucleic acid sequence can comprise a sequence having at least 50-69%, at least 70-89%, or at least 90-99% identity to the sequence set forth in SEQ ID NO:04.

In an aspect, a disclosed ubiquitous promoter can be operably linked to the isolated nucleic acid molecule. In an aspect, a disclosed ubiquitous promoter can be a CB promoter or a CpG-free mCMV/hEF1α promoter. In an aspect, a disclosed tissue-specific promoter can be operably linked to the isolated nucleic acid molecule. In an aspect, a disclosed tissue-specific promoter can be a liver-specific promoter, a muscle-specific promoter, a neuron-specific promoter, or a combination of two or more disclosed promoters. In an aspect, a liver-specific promoter can be a α1-microglobulin/bikunin enhancer/thyroid hormone-binding globulin promoter. In an aspect, a liver-specific promoter can comprise about 845-bp and comprise the thyroid hormone-binding globulin promoter sequences (2382 to 13), two copies of α1-microglobulinybikunin enhancer sequences (22,804 through 22,704), and a 71-bp leader sequence as described by Ill C R, et al. (1997). In an aspect, a disclosed liver-specific promoter can comprise the sequence set forth in SEQ ID NO:15. In an aspect, a disclosed liver-specific promoter can comprise a sequence having at least 40%, 50%, 60%, 70%, 80%, 85%, 86%, 87%, 88%, 89%, 90%, 91%, 92%, 93%, 94%, 95%, 96%, 97%, 98%, or 99% identity to the sequence set forth in SEQ ID NO:15. In an aspect, a disclosed liver-specific promoter can comprise a sequence having at least 40%-60%, at least 60%-80%, at least 80%-90%, or at least 90%-100% identity to the sequence set forth in SEQ ID NO:15.

In an aspect, a disclosed immunotolerant dual promoter can comprise the sequence set forth in SEQ ID NO:05 or SEQ ID NO:06. In an aspect, a disclosed immunotolerant dual promoter can comprise a sequence having at least 40%, 50%, 60%, 70%, 80%, 85%, 86%, 87%, 88%, 89%, 90%, 91%, 92%, 93%, 94%, 95%, 96%, 97%, 98%, or 99% identity to the sequence set forth in SEQ ID NO:05 or SEQ ID NO:06. In an aspect, a disclosed vector can comprise an isolated nucleic acid molecule comprising the one or more promoters, the CpG-depleted and codon-optimized nucleic acid sequence encoding the polypeptide, and a polyadenylation sequence.

In an aspect, a disclosed vector can be a viral vector or a non-viral vector. In an aspect, a disclosed non-viral vector can be a polymer-based vector, a peptide based vector, a lipid nanoparticle, a solid lipid nanoparticle, or a cationic lipid based vector. In an aspect, a disclosed viral vector can be an adenovirus vector, an adeno-associated virus vector, a herpes simplex virus vector, a retrovirus vector, a lentivirus vector, and alphavirus vector, a flavivirus vector, a rhabdovirus vector, a measles virus vector, a Newcastle disease viral vector, a poxvirus vector, or a picornavirus vector. In an aspect, a disclosed viral vector can be an AAV vector. AAV vectors include, but are not limited to, AAV1, AAV2, AAV3 (including 3a and 3b), AAV4, AAV5, AAV6, AAV7, AAV8, AAVrh8, AAV.hum8, AAV9, AAV10, AAVrh10, AAV11, AAV12, AAV13, AAVrh39, AAVrh43, AAVcy.7 as well as bovine AAV, caprine AAV, canine AAV, equine AAV, ovine AAV, avian AAV, primate AAV, non-primate AAV, and any other virus classified by the International Committee on Taxonomy of Viruses (ICTV) as an AAV. In an aspect, AAV capsids can be chimeras either created by capsid evolution or by rational capsid engineering from the naturally isolated AAV variants to capture desirable serotype features such as enhanced or specific tissue tropism and host immune response escape, including but not limited to AAV-DJ, AAV-HAE1, AAV-HAE2, AAVM41, AAV-1829, AAV2 Y/F, AAV2 T/V, AAV2i8, AAV2.5, AAV9.45, AAV9.61, AAV-B1, AAV-AS, AAV9.45A-String (e.g., AAV9.45-AS), AAV9.45Angiopep, AAV9.47-Angiopep, and AAV9.47-AS, AAV-PHP.B, AAV-PHP.eB, AAV-PHP.S, AAV-F, AAVcc.47, and AAVcc.81. In an aspect, an AAV vector can be AAV9, AAVcc.47, or AAVcc.81. In an aspect, a disclosed AAV vector can be AAV-Rh74 or a related variant (e.g., capsid variants such as RHM4-1).

Disclosed herein is a vector comprising a gene expression cassette comprising an isolated nucleic acid molecule, wherein the isolated nucleic acid sequence encodes either a microbial polypeptide or a truncated human glycogen debranching enzyme for preventing glycogen accumulation and/or degrading accumulated glycogen, wherein the isolated nucleic acid sequence is CpG-depleted and codon-optimized for expression in a human or a mammalian cell, and wherein expression of the polypeptide is under the control of an immunotolerant dual promoter. In an aspect, a disclosed nucleic acid sequence can have a nucleotide sequence having about 4.5 kb or less. In an aspect, a disclosed encoded polypeptide can cleave α glycosidic bonds in glycogen, limit dextrin, or both. In an aspect, a disclosed encoded polypeptide can cleave the α(1→6) bond at the branching point in glycogen, limit dextrin, or both. In an aspect, a disclosed encoded polypeptide can cleave the α(1→6) bond and the α(1→4) bond in glycogen, limit dextrin, or both. In an aspect, a disclosed encoded polypeptide can be a truncated human glycogen debranching enzyme. In an aspect, a disclosed encoded microbial polypeptide can be a bacterial glycogen debranching enzyme or a non-bacterial glycogen debranching enzyme. In an aspect, a disclosed encoded microbial polypeptide can be a type I Pullulanase from *Bacillus subtilis*. In an aspect, a disclosed encoded microbial polypeptide can comprise the sequence set forth in SEQ ID NO:01. In an aspect, a disclosed encoded microbial polypeptide can comprise a sequence having at least 50%, at least 60%, at least 70%, at least 80%, or at least 90% identity to the sequence set forth in SEQ ID NO:01. In an aspect, a disclosed human glycogen debranching enzyme can comprise the sequence set forth in SEQ ID NO:02. In an aspect, a disclosed truncated human glycogen debranching enzyme can comprise a sequence having at least 30%, at least 40%, at least 50%, at least 60%, at least 70%, at least 80%, or at least 90% identity to the sequence set forth in SEQ ID NO:02. In an aspect, a disclosed nucleic acid sequence can comprise the sequence set forth in SEQ ID NO:04. In an aspect, a disclosed nucleic acid sequence can comprise a sequence having at least 50-69%, at least 70-89%, or at least 90-99% identity to the sequence set forth in SEQ ID NO:04.

In an aspect, a disclosed vector can comprise an isolated nucleic acid molecule comprising the one or more promoters, the CpG-depleted and codon-optimized nucleic acid sequence encoding the polypeptide, and a polyadenylation sequence.

In an aspect, a disclosed vector can be a viral vector or a non-viral vector. In an aspect, a disclosed non-viral vector can be a polymer-based vector, a peptide based vector, a lipid nanoparticle, a solid lipid nanoparticle, or a cationic lipid based vector. In an aspect, a disclosed viral vector can be an adenovirus vector, an adeno-associated virus vector, a herpes simplex virus vector, a retrovirus vector, a lentivirus vector, and alphavirus vector, a flavivirus vector, a rhabdovirus vector, a measles virus vector, a Newcastle disease viral vector, a poxvirus vector, or a picornavirus vector. In an aspect, a disclosed viral vector can be an AAV vector. AAV vectors include, but are not limited to, AAV1, AAV2, AAV3 (including 3a and 3b), AAV4, AAV5, AAV6, AAV7, AAV8, AAVrh8, AAV.hum8, AAV9, AAV10, AAVrh10, AAV11, AAV12, AAV13, AAVrh39, AAVrh43, AAVcy.7 as well as bovine AAV, caprine AAV, canine AAV, equine AAV, ovine AAV, avian AAV, primate AAV, non-primate AAV, and any other virus classified by the International Committee on Taxonomy of Viruses (ICTV) as an AAV. In an aspect, AAV capsids can be chimeras either created by capsid evolution or by rational capsid engineering from the naturally isolated AAV variants to capture desirable serotype features such as enhanced or specific tissue tropism and host immune response escape, including but not limited to AAV-DJ, AAV-HAE1, AAV-HAE2, AAVM41, AAV-1829, AAV2 Y/F, AAV2 T/V, AAV2i8, AAV2.5, AAV9.45, AAV9.61, AAV-B1, AAV-AS, AAV9.45A-String (e.g., AAV9.45-AS), AAV9.45Angiopep, AAV9.47-Angiopep, and AAV9.47-AS, AAV-PHP.B, AAV-PHP.eB, AAV-PHP.S, AAV-F, AAVcc.47, and AAVcc.81. In an aspect, an AAV vector can be AAV9, AAVcc.47, or AAVcc.81. In an aspect, a disclosed AAV vector can be AAV-Rh74 or a related variant (e.g., capsid variants such as RHM4-1).

(c) Formulations

Disclosed herein is a pharmaceutical formulation comprising a vector comprising a nucleic acid sequence encoding either a microbial polypeptide or a truncated human glycogen debranching enzyme for preventing glycogen accumulation and/or degrading accumulated glycogen, wherein the nucleic acid sequence is codon-optimized for expression in a human or a mammalian cell, in a pharmaceutically acceptable carrier.

In an aspect, a disclosed formulation can comprise (i) one or more active agents, (ii) biologically active agents, (iii) one or more pharmaceutically active agents, (iv) one or more immune-based therapeutic agents, (v) one or more clinically approved agents, or (vi) a combination thereof. In an aspect, a disclosed composition can comprise one or more proteasome inhibitors. In an aspect, a disclosed composition can comprise one or more immunosuppressives or immunosuppressive agents. In an aspect, an immunosuppressive agent can be anti-thymocyte globulin (ATG), cyclosporine (CSP), mycophenolate mofetil (MMF), or a combination thereof. In an aspect, a disclosed formulation can comprise an anaplerotic agent (such as, for example, C7 compounds like triheptanoin).

In an aspect, a disclosed formulation can comprise a RNA therapeutic. A RNA therapeutic can comprise RNA-mediated interference (RNAi) and/or antisense oligonucleotides (ASO). In an aspect, a disclosed RNA therapeutic can be directed at GSY1, GSY2, or both.

(d) Knock-Out Mice

Disclosed herein is a knock-out mouse for use in characterizing liver-specific pathology of GSD III, wherein the mouse contains a targeted disruption of exons 6-10 of the Agl allele, wherein the disruption results in decreased glycogen debranching enzyme activity that prevents adequate degradation of glycogen, thereby causing glycogen accumulation in the liver, heart, skeletal muscle, and other tissues or a combination thereof in the mouse.

In an aspect, wherein a liver cell, heart cell, a skeletal muscle cell, a smooth muscle cell, a brain cell, a cell from the central nervous system, a nerve cell, any other cell, or a combination thereof in a disclosed knock-out mouse can experience increased glycogen content. In an aspect, a disclosed knock-out mouse can exhibit an increased level of ALT, AST, and/or CK, elevated disease urinary Glc4 (glucose tetrasaccharide), impaired muscle functions, or a combination thereof.

Disclosed herein is a cell isolated from a knock-out mouse for use in characterizing liver-specific pathology, heart-specific pathology, skeletal muscle-specific pathology, or a combination thereof in a GSD IIIa mouse, wherein the mouse contains a targeted disruption of exons 6-10 of the Agl allele, wherein the disruption results in decreased glycogen debranching enzyme activity that prevents adequate degradation of glycogen, thereby causing glycogen accumulation in the liver, heart, skeletal muscle, and other tissues or a combination thereof in the mouse. In an aspect, a disclosed cell can be from the liver, heart, or skeletal or other tissues where glycogen has accumulated of a disclosed knock-out mouse.

(e) Plasmids

Disclosed herein is a plasmid comprising a nucleic acid sequence encoding a CMV enhancer/chicken β-actin (CB) promoter and Pullulanase. In an aspect, a disclosed plasmid comprising a nucleic acid sequence encoding a CB promoter and Pullulanase can comprise the sequence set forth in SEQ ID NO:16 or a sequence having at least 30%, at least 40%, at least 50%, at least 60%, at least 70%, at least 80%, or at least 90% identity to the sequence set forth in SEQ ID NO:16 or a sequence having at least 40-59%, at least 50-69%, or at least 80-99% identity to the sequence set forth in SEQ ID NO:16.

Disclosed herein is a plasmid comprising a nucleic acid sequence encoding a CMV enhancer/chicken β-actin (CB) promoter and Pullulanase$^{CpG\text{-}free}$. In an aspect, a disclosed plasmid comprising a nucleic acid sequence encoding a CB promoter and Pullulanase$^{CpG\text{-}free}$ can comprise the sequence set forth in SEQ ID NO:17 or a sequence having at least 30%, at least 40%, at least 50%, at least 60%, at least 70%, at least 80%, or at least 90% identity to the sequence set forth in SEQ ID NO:17 or a sequence having at least 40-59%, at least 50-69%, or at least 80-99% identity to the sequence set forth in SEQ ID NO:17.

Disclosed herein is a plasmid comprising a nucleic acid sequence encoding a tandem LSP-CB fusion promoter (Dual) and Pullulanase. In an aspect, a disclosed plasmid comprising a nucleic acid sequence encoding a tandem LSP-CB fusion promoter and Pullulanase can comprise the sequence set forth in SEQ ID NO:18 or a sequence having at least 30%, at least 40%, at least 50%, at least 60%, at least 70%, at least 80%, or at least 90% identity to the sequence set forth in SEQ ID NO:18 or a sequence having at least 40-59%, at least 50-69%, or at least 80-99% identity to the sequence set forth in SEQ ID NO:18.

Disclosed herein is a plasmid comprising a nucleic acid sequence encoding a tandem LSP-CB fusion promoter (Dual) and Pullulanase$^{CpG-free}$. In an aspect, a disclosed plasmid comprising a nucleic acid sequence encoding a tandem LSP-CB fusion promoter and Pullulanase$^{CpG-free}$ can comprise the sequence set forth in SEQ ID NO:19 or a sequence having at least 30%, at least 40%, at least 50%, at least 60%, at least 70%, at least 80%, or at least 90% identity to the sequence set forth in SEQ ID NO:19 or a sequence having at least 40-59%, at least 50-69%, or at least 80-99% identity to the sequence set forth in SEQ ID NO:19.

Disclosed herein is a plasmid comprising a nucleic acid sequence encoding a LSP promoter and Pullulanase. In an aspect, a disclosed plasmid comprising a nucleic acid sequence encoding a LSP promoter and Pullulanase can comprise the sequence set forth in SEQ ID NO:20 or a sequence having at least 30%, at least 40%, at least 50%, at least 60%, at least 70%, at least 80%, or at least 90% identity to the sequence set forth in SEQ ID NO:20 or a sequence having at least 40-59%, at least 50-69%, or at least 80-99% identity to the sequence set forth in SEQ ID NO:20.

Disclosed herein is a plasmid comprising a nucleic acid sequence encoding a LSP promoter and Pullulanase$^{CpG-free}$. In an aspect, a disclosed plasmid comprising a nucleic acid sequence encoding a LSP promoter and Pullulanase$^{CpG-free}$ can comprise the sequence set forth in SEQ ID NO:20 or a sequence having at least 30%, at least 40%, at least 50%, at least 60%, at least 70%, at least 80%, or at least 90% identity to the sequence set forth in SEQ ID NO:21 or a sequence having at least 40-59%, at least 50-69%, or at least 80-99% identity to the sequence set forth in SEQ ID NO:21.

(f) Cells

Disclosed herein are cells comprising a disclosed isolated nucleic acid molecule, a disclosed vector, and/or a disclosed plasmid. Cells are known to the art. In an aspect, a disclosed cell can comprise the plasmid set forth in any one of SEQ ID NO:16-SEQ ID NO:21.

III. Methods for Treating and/or Preventing GSD III Disease Progression

Disclosed herein is a method of treating and/or preventing GSD III disease progression comprising administering to a subject in need thereof a therapeutically effective amount of a vector comprising a nucleic acid sequence encoding either a microbial polypeptide or a truncated human glycogen debranching enzyme, wherein the nucleic acid sequence is CpG-depleted and codon-optimized for expression in a human or a mammalian cell, and preventing glycogen accumulation and/or degrading accumulated glycogen in the subject. Disclosed herein is a method of treating and/or preventing GSD III disease progression comprising preventing glycogen accumulation and/or degrading accumulated glycogen in a subject in need thereof by administering to the subject a therapeutically effective amount of a vector comprising a nucleic acid sequence encoding either a microbial polypeptide or a truncated human glycogen debranching enzyme, wherein the nucleic acid sequence is CpG-depleted and codon-optimized for expression in a human or a mammalian cell. Disclosed herein is a method of treating and/or preventing GSD III disease progression comprising administering to a subject in need thereof a therapeutically effective amount of a vector comprising a nucleic acid sequence encoding either a microbial polypeptide or a truncated human glycogen debranching enzyme, wherein the nucleic acid sequence is CpG-depleted and codon-optimized for expression in a human or a mammalian cell, wherein glycogen accumulation is prevented and/or accumulated glycogen is degraded in the subject. Disclosed herein is a method of preventing glycogen accumulation and/or degrading accumulated glycogen comprising administering to a subject having GSD III a therapeutically effective amount of a vector comprising a nucleic acid sequence encoding either a microbial polypeptide or a truncated human glycogen debranching enzyme, wherein the nucleic acid sequence is CpG-depleted and codon-optimized for expression in a human or a mammalian cell.

In an aspect, a disclosed encoded polypeptide can cleave α glycosidic bonds in glycogen, limit dextrin, or both. In an aspect, a disclosed encoded polypeptide can cleave the α(1→6) bond at the branching point in glycogen, limit dextrin, or both. In an aspect, a disclosed encoded polypeptide can cleave the α(1→6) bond and the α(1→4) bond in glycogen, limit dextrin, or both. In an aspect, a disclosed encoded polypeptide can be a truncated human glycogen debranching enzyme. In an aspect, a disclosed encoded microbial polypeptide can be a bacterial glycogen debranching enzyme or a non-bacterial glycogen debranching enzyme. In an aspect, a disclosed encoded microbial polypeptide can be a type I Pullulanase from *Bacillus subtilis*. In an aspect, a disclosed encoded microbial polypeptide can comprise the sequence set forth in SEQ ID NO:01. In an aspect, a disclosed encoded microbial polypeptide can comprise a sequence having at least 50%, at least 60%, at least 70%, at least 80%, or at least 90% identity to the sequence set forth in SEQ ID NO:01. In an aspect, a disclosed human glycogen debranching enzyme can comprise the sequence set forth in SEQ ID NO:02. In an aspect, a disclosed truncated human glycogen debranching enzyme can comprise a sequence having at least 30%, at least 40%, at least 50%, at least 60%, at least 70%, at least 80%, or at least 90% identity to the sequence set forth in SEQ ID NO:02. In an aspect, a disclosed nucleic acid sequence can comprise the sequence set forth in SEQ ID NO:04. In an aspect, a disclosed nucleic acid sequence can comprise a sequence having at least 50-69%, at least 70-89%, or at least 90-99% identity to the sequence set forth in SEQ ID NO:04.

In an aspect, a disclosed nucleic acid sequence can have a coding sequence that is less than about 4.5 kilobases.

In an aspect, a disclosed vector can be administered via intravenous, intraarterial, intramuscular, intraperitoneal, subcutaneous, intrathecal, intraventricular, or in utero administration. In an aspect, a subject can be a human subject. In an aspect, a disclosed vector can be delivered to the subject's liver, heart, skeletal muscle, smooth muscle, CNS, PNS or a combination thereof.

In an aspect, a disclosed method can comprise reducing the expression level, activity level, or both of glycogen synthase. In an aspect, a glycogen synthase can be GYS1 (muscle glycogen synthase) or GYS2 (liver glycogen synthase) or both. In an aspect, a disclosed method of reducing the expression level, activity level, or both of glycogen synthase can comprise administering an RNA therapeutic. RNA therapeutics are known to the art and include double stranded RNA-mediated interference (RNAi) and antisense oligonucleotides (ASO). Thus, in an aspect, a disclosed method can comprise administering RNAi or administering ASO or both. In an aspect, a disclosed method can comprise administering RNAi or administering ASO or both directed at GSY1, GSY2, or both.

In an aspect, a disclosed method can further comprise administering to the subject a therapeutically effective amount of a therapeutic agent. In an aspect, a disclosed method can comprise reducing glycogen levels by administering a glycogen synthase inhibitor (e.g., RNAi, ASO, etc.) to the subject, or modifying the subject's diet, for example, by using cornstarch or another slow release starch to prevent hypoglycemia, or modifying the subject's diet, for example, by consuming a high amount of protein, fat, or other anaplerotic agents (such as, for example, C7 compounds like triheptanoin), exercise or a combination thereof.

In an aspect, a disclosed method can comprise treating a subject that has developed or is likely to develop neutralizing antibodies (ABs) to the vector, capsid, and/or transgene. In an aspect, treating a subject that has developed or is likely to develop neutralizing antibodies can comprise plasmapheresis and immunosuppression. In an aspect, a disclosed method can comprise using immunosuppression to decrease the T cell, B cell and/or plasma cell population, decrease the innate immune response, inflammatory response and antibody levels in general. In an aspect, a disclosed method can comprise administering an IgG-degrading agent that depletes pre-existing neutralizing antibodies. In an aspect, a disclosed method can comprise administering to the subject IdeS or IdeZ, rapamycin, and/or SVP-Rapamycin. In an aspect, a disclosed IgG-degrading agent is bacteria-derived IdeS or IdeZ.

Disclosed herein is a method of treating and/or preventing GSD III disease progression comprise administering to a subject in need thereof an isolated nucleic acid molecule comprising a nucleic acid sequence encoding either a microbial polypeptide or a truncated human glycogen debranching enzyme, wherein the nucleic acid sequence is CpG-depleted and codon-optimized for expression in a human or a mammalian cell, and preventing glycogen accumulation and/or degrading accumulated glycogen /limit dextrin in the subject. Disclosed herein is a method of treating and/or preventing GSD III disease progression, comprising: preventing glycogen accumulation and/or degrading accumulated glycogen in a subject in need thereof by administering to the subject an isolated nucleic acid molecule comprising a nucleic acid sequence encoding either a microbial polypeptide or a truncated human glycogen debranching enzyme, wherein the nucleic acid sequence is CpG-depleted and codon-optimized for expression in a human or a mammalian cell. Disclosed herein is a method of treating and/or preventing GSD III disease progression, comprising: administering to a subject in need thereof an isolated nucleic acid molecule comprising a nucleic acid sequence encoding either a microbial polypeptide or a truncated human glycogen debranching enzyme, wherein the nucleic acid sequence is CpG-depleted and codon-optimized for expression in a human or a mammalian cell, wherein glycogen accumulation is prevented and/or accumulated glycogen is degraded in the subject. Disclosed herein is a method of preventing glycogen accumulation and/or degrading accumulated glycogen, comprising: administering to a subject having GSD III an isolated nucleic acid molecule comprising a nucleic acid sequence encoding either a microbial polypeptide or a truncated human glycogen debranching enzyme, wherein the nucleic acid sequence is CpG-depleted and codon-optimized for expression in a human or a mammalian cell.

In an aspect, a disclosed nucleic acid sequence can have a coding sequence that is less than about 4.5 kilobases.

In an aspect, a disclosed encoded polypeptide can cleave α glycosidic bonds in glycogen, limit dextrin, or both. In an aspect, a disclosed encoded polypeptide can cleave the α(1→6) bond at the branching point in glycogen, limit dextrin, or both. In an aspect, a disclosed encoded polypeptide can cleave the α(1→6) bond and the α(1→4) bond in glycogen, limit dextrin, or both. In an aspect, a disclosed encoded polypeptide can be truncated human glycogen debranching enzyme. In an aspect, a disclosed encoded microbial polypeptide can be a bacterial glycogen debranching enzyme or a non-bacterial glycogen debranching enzyme. In an aspect, a disclosed encoded microbial polypeptide can be a type I Pullulanase from *Bacillus subtilis*. In an aspect, a disclosed encoded microbial polypeptide can comprise the sequence set forth in SEQ ID NO:01. In an aspect, a disclosed encoded microbial polypeptide can comprise a sequence having at least 50%, at least 60%, at least 70%, at least 80%, or at least 90% identity to the sequence set forth in SEQ ID NO:01. In an aspect, a disclosed human glycogen debranching enzyme can comprise the sequence set forth in SEQ ID NO:02. In an aspect, a disclosed truncated human glycogen debranching enzyme can comprise a sequence having at least 30%, at least 40%, at least 50%, at least 60%, at least 70%, at least 80%, or at least 90% identity to the sequence set forth in SEQ ID NO:02. In an aspect, a disclosed nucleic acid sequence can comprise the sequence set forth in SEQ ID NO:04. In an aspect, a disclosed nucleic acid sequence can comprise a sequence having at least 50-69%, at least 70-89%, or at least 90-99% identity to the sequence set forth in SEQ ID NO:04.

In an aspect, a disclosed the isolated nucleic acid molecule can be administered intravenously, intramuscularly, intrathecally, intraventricularly, intraarterially, intraperitoneally, subcutaneously, or directly into utero. In an aspect, a subject can be a human subject. In an aspect, a disclosed isolated nucleic acid molecule can be delivered to the subject's liver, heart, skeletal muscle, smooth muscle, CNS, PNS, other tissues, or a combination thereof.

In an aspect, a disclosed isolated nucleic acid molecule can be present in a vector. In an aspect, a disclosed vector can be a viral vector or a non-viral vector. In an aspect, a disclosed non-viral vector can be a polymer-based vector, a peptide-based vector, a lipid nanoparticle, a solid lipid nanoparticle, or a cationic lipid based vector. In an aspect, a disclosed viral vector can be an adenovirus vector, an adeno-associated virus vector, a herpes simplex virus vector, a retrovirus vector, a lentivirus vector, and alphavirus vector, a flavivirus vector, a rhabdovirus vector, a measles virus vector, a Newcastle disease viral vector, a poxvirus vector, or a picornavirus vector. In an aspect, a disclosed viral vector can be an AAV vector. AAV vectors include, but are not limited to, AAV1, AAV2, AAV3 (including 3a and 3b), AAV4, AAV5, AAV6, AAV7, AAV8, AAVrh8, AAV.hum8, AAV9, AAV10, AAVrh10, AAV11, AAV12, AAV13, AAVrh39, AAVrh43, AAVcy.7 as well as bovine AAV, caprine AAV, canine AAV, equine AAV, ovine AAV, avian AAV, primate AAV, non-primate AAV, and any other virus classified by the International Committee on Taxonomy of Viruses (ICTV) as an AAV. In an aspect, AAV capsids can be chimeras either created by capsid evolution or by rational capsid engineering from the naturally isolated AAV variants to capture desirable serotype features such as enhanced or specific tissue tropism and host immune response escape, including but not limited to AAV-DJ, AAV-HAE1, AAV-HAE2, AAVM41, AAV-1829, AAV2 Y/F, AAV2 T/V, AAV2i8, AAV2.5, AAV9.45, AAV9.61, AAV-B1, AAV-AS, AAV9.45A-String (e.g., AAV9.45-AS), AAV9.45Angiopep, AAV9.47-Angiopep, and AAV9.47-AS., AAV-PHP.B, AAV-PHP.eB, AAV-PHP.S, AAV-F, AAVcc.47, and AAVcc.81. In an aspect, an AAV vector can be AAV9, AAVcc.47, or AAVcc.81. In an aspect, a disclosed AAV vector can be AAV-Rh74 or a related variant (e.g., capsid variants such as RHM4-1).

In an aspect, a disclosed vector can comprise a ubiquitous promoter operably linked to the isolated nucleic acid molecule, wherein the ubiquitous promoter drives the expression of the polypeptide. In an aspect, a disclosed ubiquitous promoter can be a CB promoter or a CpG-free mCMV/hEF1α promoter.

In an aspect, a disclosed vector can comprise a tissue-specific promoter operably linked to the isolated nucleic acid molecule. In an aspect, a disclosed tissue-specific promoter can be a liver-specific promoter, a muscle-specific promoter, a neuron-specific promoter, or a combination of two or more disclosed promoters. In an aspect, a liver-specific promoter can be a α1-microglobulin/bikunin enhancer/thyroid hormone-binding globulin promoter. In an aspect, a liver specific promoter can comprise about 845-bp and comprise the thyroid hormone-binding globulin promoter sequences (2382 to 13), two copies of α1-microglobulinybikunin enhancer sequences (22,804 through 22,704), and a 71-bp leader sequence as described by Ill CR, et al. (1997). In an aspect, a disclosed liver-specific promoter can comprise the sequence set forth in SEQ ID NO:15. In an aspect, a disclosed liver-specific promoter can comprise a sequence having at least 40%, 50%, 60%, 70%, 80%, 85%, 86%, 87%, 88%, 89%, 90%, 91%, 92%, 93%, 94%, 95%, 96%, 97%, 98%, or 99% identity to the sequence set forth in SEQ ID NO:15. In an aspect, a disclosed liver-specific promoter can comprise a sequence having at least 40%-60%, at least 60%-80%, at least 80%-90%, or at least 90%-100% identity to the sequence set forth in SEQ ID NO:15.

In an aspect, a disclosed vector can comprise an immunotolerant dual promoter comprising a liver-specific promoter and a ubiquitous promoter. In an aspect, a disclosed immunotolerant dual promoter can comprise a α1-microglobulin/bikunin enhancer/thyroid hormone-binding globulin promoter and a CB promoter. In an aspect, a disclosed immunotolerant dual promoter can comprise a α1-microglobulin/bikunin enhancer/thyroid hormone-binding globulin promoter and a CpG-free mCMV/hEF1α promoter. In an aspect, a disclosed immunotolerant dual promoter can comprise the sequence set forth in SEQ ID NO:05 or SEQ ID NO:06. In an aspect, a disclosed immunotolerant dual promoter can comprise a sequence having at least 40%, 50%, 60%, 70%, 80%, 85%, 86%, 87%, 88%, 89%, 90%, 91%, 92%, 93%, 94%, 95%, 96%, 97%, 98%, or 99% identity to the sequence set forth in SEQ ID NO:05 or SEQ ID NO:06. In an aspect, a disclosed vector can comprise an isolated nucleic acid molecule comprising one or more promoters, the CpG-depleted and codon-optimized nucleic acid sequence encoding the polypeptide, and a polyadenylation sequence.

In an aspect, a disclosed method can comprise reducing the expression level, activity level, or both of glycogen synthase. In an aspect, a glycogen synthase can be GYS1 (muscle glycogen synthase) or GYS2 (liver glycogen synthase) or both. In an aspect, a disclosed method of reducing the expression level, activity level, or both of glycogen synthase can comprise administering an RNA therapeutic. RNA therapeutics are known to the art and include double stranded RNA-mediated interference (RNAi) and antisense oligonucleotides (ASO). Thus, in an aspect, a disclosed method can comprise administering RNAi or administering ASO or both. In an aspect, a disclosed method can comprise administering RNAi or administering ASO or both directed at GSY1, GSY2, or both.

In an aspect, a disclosed method can restore one or more aspects of the glycogen signaling pathway, restore one or more aspects of the glycogenolysis signaling pathway, can restore one or more aspects of the glycogenesis signaling pathway, or any combination thereof. In an aspect, a restoring one or more aspects of a disclosed signaling pathway can comprise restoring the activity and/or functionality of one or more enzymes associated with dysfunction and/or misfunction of the glycogen signaling pathway. In an aspect, restoration can be a 10%, 20%, 30%, 40%, 50%, 60%, 70%, 80%, 90%, 100%, or any amount of restoration when compared to a pre-existing level such as, for example, a pre-treatment level. In an aspect, the amount of restoration can be 10-20%, 20-30%, 30-40%, 40-50%, 50-60%, 60-70%, 70-80%, 80-90%, or 90-100% more than a pre-existing level such as, for example, a pre-treatment level. In an aspect, restoration can be measured against a control level (e.g., a level in a subject not having a GSD). In an aspect, restoration can be a partial or incomplete restoration. In an aspect, restoration can be complete or near complete restoration such that the level of expression, activity and/or functionality is similar to that of a wild-type or control level.

In an aspect, a disclosed method can restore one or more aspects of cellular homeostasis. Restoring one or more aspects of cellular homeostasis can comprise correcting cell starvation, normalizing aspects of autophagy pathway (correcting, preventing, and/or ameliorating autophagy, improving, enhancing, restoring, and/or preserving mitochondrial function, improving, enhancing, restoring, and/or preserving organelle function, improving, enhancing, restoring, and/or preserving hypoglycemia, ketosis, liver abnormalities, correcting/redressing neurogenic bladder, gait disturbances, and/or neuropathy, or any combination thereof. In an aspect, restoring one or more aspects of cellular homeostasis can comprise improving, enhancing, restoring, and/or preserving one or more aspects of mitochondrial function.

In an aspect, restoration can be a 10%, 20%, 30%, 40%, 50%, 60%, 70%, 80%, 90%, 100%, or any amount of restoration when compared to a pre-existing level such as, for example, a pre-treatment level. In an aspect, the amount of restoration can be 10-20%, 20-30%, 30-40%, 40-50%, 50-60%, 60-70%, 70-80%, 80-90%, or 90-100% more than a pre-existing level such as, for example, a pre-treatment level. In an aspect, restoration can be measured against a control level (e.g., a level in a subject not having a GSD). In an aspect, restoration can be a partial or incomplete restoration. In an aspect, restoration can be complete or near complete restoration such that the level of expression, activity and/or functionality is similar to that of a wild-type or control level.

In an aspect, a disclosed method can comprise administering to the subject a therapeutically effective amount of a therapeutic agent. In an aspect, a disclosed method can comprise reducing glycogen levels by administering a glycogen synthase inhibitor (e.g., RNAi, ASO, etc.) to the subject, or modifying the subject's diet, for example, by using cornstarch or another slow release starch to prevent hypoglycemia, or modifying the subject's diet, for example, by consuming a high amount of protein, fat, or other anaplerotic agents (such as, for example, C7 compounds like triheptanoin), or a combination thereof.

In an aspect, a disclosed method can comprise administering one or more immune modulators. In an aspect, a disclosed immune modulator can be methotrexate, rituximab, intravenous gamma globulin, or bortezomib, or a combination thereof. In an aspect, a disclosed immune modulator can be bortezomib or SVP-Rapamycin.

In an aspect, a disclosed immune modulator such as methotrexate can be administered at a transient low to high-dose. In an aspect, a disclosed immune modulator can be administered at a dose of about 0.1 mg/kg body weight to about 0.6 mg/kg body weight. In an aspect, a disclosed immune modulator can be administered at a dose of about 0.4 mg/kg body weight. In an aspect, a disclosed immune modulator can be administered at about a daily dose of 0.4 mg/kg body weight for 3 to 5 or greater cycles, with up to three days per cycle. In an aspect, a disclosed immune modulator can be administered at about a daily dose of 0.4 mg/kg body weight for a minimum of 3 cycles, with three days per cycle. In an aspect, a disclosed immune modulator can be administered as many times as necessary to achieve a desired clinical effect.

In an aspect, a disclosed immune modulator can be administered orally about one hour before a disclosed therapeutic agent. In an aspect, a disclosed immune modulator can be administered subcutaneously about 15 minutes before a disclosed therapeutic agent. In an aspect, a disclosed immune modulator can be administered concurrently with a disclosed therapeutic agent.

In an aspect, a disclosed immune modulator can be administered orally about one hour or a few days before a disclosed isolated nucleic acid molecule, a disclosed vector, a disclosed pharmaceutical formulation, or a combination thereof. In an aspect, a disclosed immune modulator can be administered subcutaneously about 15 minutes before or a few days before a disclosed isolated nucleic acid molecule, a disclosed vector, a disclosed pharmaceutical formulation, or a combination thereof. In an aspect, a disclosed immune modulator can be administered concurrently with a disclosed isolated nucleic acid molecule, a disclosed vector, a disclosed pharmaceutical formulation, or a combination thereof.

In an aspect, a disclosed method can comprise administering one or more proteasome inhibitors (e.g., bortezomib, carfilzomib, marizomib, ixazomib, and oprozomib). In an aspect, a proteasome inhibitor can be an agent that acts on plasma cells (e.g., daratumumab). In an aspect, an agent that acts on a plasma cell can be melphalan hydrochloride, melphalan, pamidronate disodium, carmustine, carfilzomib, carmustine, cyclophosphamide, daratumumab, doxorubicin hydrochloride liposome, doxorubicin hydrochloride liposome, elotuzumab, melphalan hydrochloride, panobinostat, ixazomib citrate, carfilzomib, lenalidomide, melphalan, melphalan hydrochloride, plerixafor, ixazomib citrate, pamidronate disodium, panobinostat, plerixafor, pomalidomide, pomalidomide, lenalidomide, selinexor, thalidomide, thalidomide, bortezomib, selinexor, zoledronic acid, or zoledronic acid.

In an aspect, a disclosed method can comprise administering one or more proteasome inhibitors or agents that act on plasma cells prior to administering a disclosed isolated nucleic acid molecule, a disclosed vector, or a disclosed pharmaceutical formulation. In an aspect, a disclosed method can comprise administering one or more proteasome inhibitors or one or more agents that act on plasma cells concurrently with administering a disclosed isolated nucleic acid molecule, a disclosed vector, or a disclosed pharmaceutical formulation. In an aspect, a disclosed method can comprise administering one or more proteasome inhibitors or one or more agents that act on plasma cells subsequent to administering a disclosed isolated nucleic acid molecule, a disclosed vector, or a disclosed pharmaceutical formulation.

In an aspect, a disclosed method can comprise administering one or more proteasome inhibitors more than 1 time. In an aspect, a disclosed method can comprise administering one or more proteasome inhibitors repeatedly over time.

In an aspect, a disclosed method can comprise administering one or more immunosuppressive agents. In an aspect, an immunosuppressive agent can be, but are not limited to, azathioprine, methotrexate, sirolimus, anti-thymocyte globulin (ATG), cyclosporine (CSP), mycophenolate mofetil (MMF), steroids, or a combination thereof. In an aspect, a disclosed method can comprise administering one or more immunosuppressive agents more than 1 time. In an aspect, a disclosed method can comprise administering one or more one or more immunosuppressive agents repeatedly over time. In an aspect, a disclosed method can comprise administering a compound that targets or alters antigen presentation or humoral or cell mediated or innate immune responses.

In an aspect, a disclosed method can comprise administering a compound that exerts a therapeutic effect against B cells and/or a compound that targets or alters antigen presentation or humoral or cell mediated immune response. In an aspect, a disclosed compound can be rituximab, methotrexate, intravenous gamma globulin, anti CD4 antibody, anti CD2, an anti-FcRN antibody, a BTK inhibitor, an anti-IGF1R antibody, a CD19 antibody (e.g., inebilizumab), an anti-IL6 antibody (e.g., tocilizumab), an antibody to CD40, an IL2 mutein, or a combination thereof. Also, Treg infusions as a way to help with immune tolerance, antigen specific Treg cells to AAV.

In an aspect, a disclosed method can further comprise monitoring the subject for adverse effects. In an aspect, in the absence of adverse effects, the method can further comprise continuing to treat the subject. In an aspect, in the presence of adverse effects, the method can further comprise modifying the treating step. In an aspect of a disclosed method, methods and techniques to monitor a subject can comprise qualitative (or subjective) means as well as quantitative (or objective) means. In an aspect, qualitative means (or subjective means) can comprise a subject's own perspective. For example, a subject can report how he/she is feeling, whether he/she has experienced improvements and/or setbacks, whether he/she has experienced an amelioration or an intensification of one or more symptoms, or a combination thereof. In an aspect, quantitative means (or objective means) can comprise methods and techniques that include, but are not limited to, the following: (i) fluid analysis (e.g., tests of a subject's fluids including but not limited to aqueous humor and vitreous humor, bile, blood, blood serum, breast milk, cerebrospinal fluid, cerumen (earwax), digestive fluids, endolymph and perilymph, female ejaculate, gastric juice, mucus (including nasal drainage and phlegm), peritoneal fluid, pleural fluid, saliva, sebum (skin oil), semen, sweat, synovial fluid, tears, vaginal secretion, vomit, and urine), (ii) imaging (e.g., ordinary x-rays, ultrasonography, radioisotope (nuclear) scanning, computed tomography (CT), magnetic resonance imaging (MRI), positron emission tomography (PET), and angiography), (iii) endoscopy (e.g., laryngoscopy, bronchoscopy, esophagoscopy, gastroscopy, GI endoscopy, coloscopy, cystoscopy, hysteroscopy, arthroscopy, laparoscopy, mediastinoscopy, and thoracoscopy), (iv) analysis of organ activity (e.g., electrocardiography (ECG), electroencephalography (EEG), and pulse oximetry), (v) biopsy (e.g., removal of tissue samples for microscopic evaluation), and (vi) genetic testing.

(a) Agents

Biologically Active Agents

As used herein, the term "biologically active agent" or "biologic active agent" or "bioactive agent" means an agent that is capable of providing a local or systemic biological, physiological, or therapeutic effect in the biological system to which it is applied. For example, the bioactive agent can act to control infection or inflammation, enhance cell growth and tissue regeneration, control tumor growth, act as an analgesic, promote anti-cell attachment, and enhance bone growth, among other functions. Other suitable bioactive agents can include anti-viral agents, vaccines, hormones, antibodies (including active antibody fragments sFv, Fv, and Fab fragments), aptamers, peptide mimetics, functional nucleic acids, therapeutic proteins, peptides, or nucleic acids. Other bioactive agents include prodrugs, which are agents that are not biologically active when administered but, upon administration to a subject are converted to bioactive agents through metabolism or some other mechanism. Additionally, any of the compositions of the invention can contain combinations of two or more bioactive agents. It is understood that a biologically active agent can be used in connection with administration to various subjects, for example, to humans (i.e., medical administration) or to animals (i.e., veterinary administration). As used herein, the recitation of a biologically active agent inherently encompasses the pharmaceutically acceptable salts thereof.

Pharmaceutically Active Agents

As used herein, the term "pharmaceutically active agent" includes a "drug" or a "vaccine" and means a molecule, group of molecules, complex or substance administered to an organism for diagnostic, therapeutic, preventative medical, or veterinary purposes. This term includes externally and internally administered topical, localized and systemic human and animal pharmaceuticals, treatments, remedies, nutraceuticals, cosmeceuticals, biologicals, devices, diagnostics and contraceptives, including preparations useful in clinical and veterinary screening, prevention, prophylaxis, healing, wellness, detection, imaging, diagnosis, therapy, surgery, monitoring, cosmetics, prosthetics, forensics and the like. This term may also be used in reference to agriceutical, workplace, military, industrial and environmental therapeutics or remedies comprising selected molecules or selected nucleic acid sequences capable of recognizing cellular receptors, membrane receptors, hormone receptors, therapeutic receptors, microbes, viruses or selected targets comprising or capable of contacting plants, animals and/or humans. This term can also specifically include nucleic acids and compounds comprising nucleic acids that produce a bioactive effect, for example deoxyribonucleic acid (DNA) or ribonucleic acid (RNA). Pharmaceutically active agents include the herein disclosed categories and specific examples. It is not intended that the category be limited by the specific examples. Those of ordinary skill in the art will recognize also numerous other compounds that fall within the categories and that are useful according to the invention. Examples include a radiosensitizer, the combination of a radiosensitizer and a chemotherapeutic, a steroid, a xanthine, a beta-2-agonist bronchodilator, an anti-inflammatory agent, an analgesic agent, a calcium antagonist, an angiotensin-converting enzyme inhibitors, a beta-blocker, a centrally active alpha-agonist, an alpha-1-antagonist, carbonic anhydrase inhibitors, prostaglandin analogs, a combination of an alpha agonist and a beta blocker, a combination of a carbonic anhydrase inhibitor and a beta blocker, an anticholinergic/antispasmodic agent, a vasopressin analogue, an antiarrhythmic agent, an antiparkinsonian agent, an antiangina/antihypertensive agent, an anticoagulant agent, an antiplatelet agent, a sedative, an ansiolytic agent, a peptidic agent, a biopolymeric agent, an antineoplastic agent, a laxative, an antidiarrheal agent, an antimicrobial agent, an antifungal agent, or a vaccine. In a further aspect, the pharmaceutically active agent can be coumarin, albumin, bromolidine, steroids such as betamethasone, dexamethasone, methylprednisolone, prednisolone, prednisone, triamcinolone, budesonide, hydrocortisone, and pharmaceutically acceptable hydrocortisone derivatives; xanthines such as theophylline and doxophylline; beta-2-agonist bronchodilators such as salbutamol, fenterol, clenbuterol, bambuterol, salmeterol, fenoterol; antiinflammatory agents, including antiasthmatic anti-inflammatory agents, antiarthritis antiinflammatory agents, and non-steroidal antiinflammatory agents, examples of which include but are not limited to sulfides, mesalamine, budesonide, salazopyrin, diclofenac, pharmaceutically acceptable diclofenac salts, nimesulide, naproxene, acetominophen, ibuprofen, ketoprofen and piroxicam; analgesic agents such as salicylates; calcium channel blockers such as nifedipine, amlodipine, and nicardipine; angiotensin-converting enzyme inhibitors such as captopril, benazepril hydrochloride, fosinopril sodium, trandolapril, ramipril, lisinopril, enalapril, quinapril hydrochloride, and moexipril hydrochloride; beta-blockers (i.e., beta adrenergic blocking agents) such as sotalol hydrochloride, timolol maleate, timol hemihydrate, levobunolol hydrochloride, esmolol hydrochloride, carteolol, propanolol hydrochloride, betaxolol hydrochloride, penbutolol sulfate, metoprolol tartrate, metoprolol succinate, acebutolol hydrochloride, atenolol, pindolol, and bisoprolol fumarate; centrally active alpha-2-agonists (i.e., alpha adrenergic receptor agonist) such as clonidine, brimonidine tartrate, and apraclonidine hydrochloride; alpha-1-antagonists such as doxazosin and prazosin; anticholinergic/antispasmodic agents such as dicyclomine hydrochloride, scopolamine hydrobromide, glycopyrrolate, clidinium bromide, flavoxate, and oxybutynin; vasopressin analogues such as vasopressin and desmopressin; prostaglandin analogs such as latanoprost, travoprost, and bimatoprost; cholinergics (i.e., acetylcholine receptor agonists) such as pilocarpine hydrochloride and carbachol; glutamate receptor agonists such as the N-methyl D-aspartate receptor agonist memantine; anti-Vascular endothelial growth factor (VEGF) aptamers such as pegaptanib; anti-VEGF antibodies (including but not limited to anti-VEGF-A antibodies) such as ranibizumab and bevacizumab; carbonic anhydrase inhibitors such as methazolamide, brinzolamide, dorzolamide hydrochloride, and acetazolamide; antiarrhythmic agents such as quinidine, lidocaine, tocainide hydrochloride, mexiletine hydrochloride, digoxin, verapamil hydrochloride, propafenone hydrochloride, flecaimide acetate, procainamide hydrochloride, moricizine hydrochloride, and diisopyramide phosphate; antiparkinsonian agents, such as dopamine, L-Dopa/Carbidopa, selegiline, dihydroergocryptine, pergolide, lisuride, apomorphine, and bromcryptine; antiangina agents and antihypertensive agents such as isosorbide mononitrate, isosorbide dinitrate, propranolol, atenolol and verapamil; anticoagulant and antiplatelet agents such as coumadin, warfarin, acetylsalicylic acid, and ticlopidine; sedatives such as benzodiazapines and barbiturates; ansiolytic agents such as lorazepam, bromazepam, and diazepam; peptidic and biopolymeric agents such as calcitonin, leuprolide and other LHRH agonists, hirudin, cyclosporin, insulin, somatostatin, protirelin, interferon, desmopressin, somatotropin, thymopentin, pidotimod, erythropoietin, interleukins, melatonin, granulocyte/macrophage-CSF, and heparin; antineoplastic agents such as etoposide, etoposide phosphate, cyclophosphamide, methotrexate, 5-fluorouracil, vincristine, doxorubicin, cisplatin, hydroxyurea, leucovorin calcium, tamoxifen, flutamide, asparaginase, altretamine, mitotane, and procarbazine hydrochloride; laxatives such as senna concentrate, casanthranol, bisacodyl, and sodium picosulphate; antidiarrheal agents such as difenoxine hydrochloride, loperamide hydrochloride, furazolidone, diphenoxylate hydrochloride, and microorganisms; vaccines such as bacterial and viral vaccines; antimicrobial agents such as penicillins, cephalosporins, and macrolides, antifungal agents such as imidazolic and triazolic derivatives; and nucleic acids such as DNA sequences encoding for biological proteins, and antisense oligonucleotides. It is understood that a pharmaceutically active agent can be used in connection with administration to various subjects, for example, to humans (i.e., medical administration) or to animals (i.e., veterinary administration). As used herein, the recitation of a pharmaceutically active agent inherently encompasses the pharmaceutically acceptable salts thereof.

Anti-Bacterial Agents

As used herein, anti-bacterial agents are known to the art. For example, the art generally recognizes several categories of anti-bacterial agents including (1) penicillins, (2) cephalosporins, (3) quinolones, (4) aminoglycosides, (5) monobactams, (6) carbapenems, (7) macrolides, and (8) other agents. For example, as used herein, an anti-bacterial agent can comprise Afenide, Amikacin, Amoxicillin, Ampicillin, Arsphenamine, Augmentin, Azithromycin, Azlocillin, Aztreonam, Bacampicillin, Bacitracin, Balofloxacin, Besifloxacin, Capreomycin, Carbacephem (loracarbef), Carbenicillin, Cefacetrile (cephacetrile), Cefaclomezine, Cefaclor, Cefadroxil (cefadroxyl), Cefalexin (cephalexin), Cefaloglycin (cephaloglycin), Cefalonium (cephalonium), Cefaloram, Cefaloridine (cephaloradine), Cefalotin (cephalothin), Cefamandole, Cefaparole, Cefapirin (cephapirin), Cefatrizine, Cefazaflur, Cefazedone, Cefazolin (cephazolin), Cefcanel, Cefcapene, Cefclidine, Cefdaloxime, Cefdinir, Cefditoren, Cefedrolor, Cefempidone, Cefepime, Cefetamet, Cefetrizole, Cefivitril, Cefixime, Cefluprenam, Cefmatilen, Cefmenoxime, Cefmepidium, Cefmetazole, Cefodizime, Cefonicid, Cefoperazone, Cefoselis, Cefotaxime, Cefotetan, Cefovecin, Cefoxazole, Cefoxitin, Cefozopran, Cefpimizole, Cefpirome, Cefpodoxime, Cefprozil (cefproxil), Cefquinome, Cefradine (cephradine), Cefrotil, Cefroxadine, Cefsumide, Ceftaroline, Ceftazidime, Ceftazidime/Avibactam, Cefteram, Ceftezole, Ceftibuten, Ceftiofur, Ceftiolene, Ceftioxide, Ceftizoxime, Ceftobiprole, Ceftriaxone, Cefuracetime, Cefuroxime, Cefuzonam, Cephalexin, Chloramphenicol, Chlorhexidine, Ciprofloxacin, Clarithromycin, Clavulanic Acid, Clinafloxacin, Clindamycin, Cloxacillin, Colimycin, Colistimethate, Colistin, Crysticillin, Cycloserine 2, Demeclocycline, Dicloxacillin, Dirithromycin, Doripenem, Doxycycline, Efprozil, Enoxacin, Ertapenem, Erythromycin, Ethambutol, Flucloxacillin, Flumequine, Fosfomycin, Furazolidone, Gatifloxacin, Geldanamycin, Gemifloxacin, Gentamicin, Glycopeptides, Grepafloxacin, Herbimycin, Imipenem, Isoniazid, Kanamycin, Levofloxacin, Lincomycin, Linezolid, Lipoglycopeptides, Lomefloxacin, Meropenem, Meticillin, Metronidazole, Mezlocillin, Minocycline, Mitomycin, Moxifloxacin, Mupirocin, Nadifloxacin, Nafcillin, Nalidixic Acid, Neomycin, Netilmicin, Nitrofurantoin, Norfloxacin, Ofloxacin, Oxacillin, Oxazolidinones, Oxolinic Acid, Oxytetracycline, Oxytetracycline, Paromomycin, Pazufloxacin, Pefloxacin, Penicillin G, Penicillin V, Pipemidic Acid, Piperacillin, Piromidic Acid, Pivampicillin, Pivmecillinam, Platensimycin, Polymyxin B, Pristinamycin, Prontosil, Prulifloxacin, Pvampicillin, Pyrazinamide, Quinupristin/dalfopristin, Rifabutin, Rifalazil, Rifampin, Rifamycin, Rifapentine, Rosoxacin, Roxithromycin, Rufloxacin, Sitafloxacin, Sparfloxacin, Spectinomycin, Spiramycin, Streptomycin, Sulbactam, Sulfacetamide, Sulfamethizole, Sulfamethoxazole, Sulfanilimide, Sulfisoxazole, Sulphonamides, Sultamicillin, Teicoplanin, Telavancin, Telithromycin, Temafloxacin, Tetracycline, Thiamphenicol, Ticarcillin, Tigecycline, Tinidazole, Tobramycin, Tosufloxacin, Trimethoprim, Trimethoprim-Sulfamethoxazole, Troleandomycin, Trovafloxacin, Tuberactinomycin, Vancomycin, Viomycin, or pharmaceutically acceptable salts thereof (e.g., such as, for example, chloride, bromide, iodide, and periodate), or a combination thereof. As used herein, the recitation of an anti-bacterial agent inherently encompasses the pharmaceutically acceptable salts thereof.

Anti-Fungal Agents

Anti-fungal agents are known to the art. The art generally recognizes several categories of anti-fungal agents including (1) azoles (imidazoles), (2) antimetabolites, (3) allylamines, (4) morpholine, (5) glucan synthesis inhibitors (echinocandins), (6) polyenes, (7) benoxaaborale; (8) other antifungal/onychomycosis agents, and (9) new classes of antifungal/onychomycosis agents. For example, as used herein, an anti-fungal agent can comprise Abafungin, Albaconazole, Amorolfin, Amphotericin B, Anidulafungin, Bifonazole, Butenafine, Butoconazole, Candicidin, Caspofungin, Ciclopirox, Clotrimazole, Econazole, Fenticonazole, Filipin, Fluconazole, Flucytosine, Griseofulvin, Haloprogin, Hamycin, Isavuconazole, Isoconazole, Itraconazole, Ketoconazole, Micafungin, Miconazole, Naftifine, Natamycin, Nystatin, Omoconazole, Oxiconazole, Polygodial, Posaconazole, Ravuconazole, Rimocidin, Sertaconazole, Sulconazole, Terbinafine, Terconazole, Tioconazole, Tolnaftate, Undecylenic Acid, Voriconazole, or pharmaceutically acceptable salts thereof, or a combination thereof. In an aspect, an anti-fungal agent can be an azole. Azoles include, but are not limited to, the following: clotrimazole, econazole, fluconazole, itraconazole, ketoconazole, miconazole, oxiconazole, sulconazole, and voriconazole. As used herein, the recitation of an anti-fungal agent inherently encompasses the pharmaceutically acceptable salts thereof.

Anti-Viral Agents

Anti-viral agents are known to the art. As used herein, for example, an anti-viral can comprise Abacavir, Acyclovir (Aciclovir), Adefovir, Amantadine, Ampligen, Amprenavir (Agenerase), Umifenovir (Arbidol), Atazanavir, Atripla, Baloxavir marboxil (Xofluza), Biktarvy, Boceprevir, Bulevirtide, Cidofovir, Cobicistat (Tybost), Combivir, Daclatasvir (Daklinza), Darunavir, Delavirdine, Descovy, Didanosine, Docosanol, Dolutegravir, Doravirine (Pifeltro), Edoxudine, Efavirenz, Elvitegravir, Emtricitabine, Enfuvirtide, Entecavir, Etravirine (Intelence), Famciclovir, Fomivirsen, Fosamprenavir, Foscarnet, Ganciclovir (Cytovene), Ibacitabine, Ibalizumab (Trogarzo), Idoxuridine, Imiquimod, Imunovir, Indinavir, Lamivudine, Letermovir (Prevymis), Lopinavir, Loviride, Maraviroc, Methisazone, Moroxydine, Nelfinavir, Nevirapine, Nexavir (formerly Kutapressin), Nitazoxanide, Norvir, Oseltamivir (Tamiflu), Penciclovir, Peramivir, Penciclovir, Peramivir (Rapivab), Pleconaril, Podophyllotoxin, Raltegravir, Remdesivir, Ribavirin, Rilpivirine (Edurant), Rilpivirine, Rimantadine, Ritonavir, Saquinavir, Simeprevir (Olysio), Sofosbuvir, Stavudine, Taribavirin (Viramidine), Telaprevir, Telbivudine (Tyzeka), Tenofovir alafenamide, Tenofovir disoproxil, Tenofovir, Tipranavir, Trifluridine, Trizivir, Tromantadine, Truvada, Umifenovirk, Valaciclovir, Valganciclovir (Valtrex), Vicriviroc, Vidarabine, Zalcitabine, Zanamivir (Relenza), Zidovudine, and combinations thereof. As used herein, the recitation of any anti-viral agent inherently encompasses the pharmaceutically acceptable salts thereof.

Corticosteroids

Corticosteroids are well-known in the art. Corticosteroids mimic the effects of hormones that the body produces naturally in your adrenal glands. Corticosteroids can suppress inflammation and can reduce the signs and symptoms of inflammatory conditions (e.g., arthritis and asthma). Corticosteroids can also suppress the immune system. Corticosteroids can act on a number of different cells (e.g., mast cells, neutrophils, macrophages and lymphocytes) and a number of different mediators (e.g., histamine, leukotriene, and cytokine subtypes).

Steroids include, but are not limited to, the following: triamcinolone and its derivatives (e.g., diacetate, hexacetonide, and acetonide), betamethasone and its derivatives (e.g., dipropionate, benzoate, sodium phosphate, acetate, and valerate), dexamethasone and its derivatives (e.g., dipropionate and valerate), flunisolide, prednisone and its derivatives (e.g., acetate), prednisolone and its derivatives (e.g., acetate, sodium phosphate, and tebutate), methylprednisolone and its derivatives (e.g., acetate and sodium succinate), fluocinolone and its derivatives (e.g., acetonide), diflorasone and its derivatives (e.g., diacetate), halcinonide, desoximetasone (desoxymethasone), diflucortolone and its derivatives (e.g., valerate), flucloronide (fluclorolone acetonide), fluocinonide, fluocortolone, fluprednidene and its derivatives (e.g., acetate), flurandrenolide (flurandrenolone), clobetasol and its derivatives (e.g., propionate), clobetasone and its derivatives (e.g., butyrate), alclometasone, flumethasone and its derivatives (e.g., pivalate), fluocortolone and its derivatives (e.g., hexanoate), amcinonide, beclometasone and its derivatives (e.g., dipropionate), fluticasone and its derivatives (e.g., propionate), difluprednate, prednicarbate, flurandrenolide, mometasone, and desonide. As used herein, the recitation of a corticosteroid inherently encompasses the pharmaceutically acceptable salts thereof.

Analgesics

The compositions of the present disclosure can also be used in combination therapies with opioids and other analgesics, including narcotic analgesics, Mu receptor antagonists, Kappa receptor antagonists, non-narcotic (i.e., non-addictive) analgesics, monoamine uptake inhibitors, adenosine regulating agents, cannabinoid derivatives, Substance P antagonists, neurokinin-1 receptor antagonists and sodium channel blockers, among others. Preferred combination therapies comprise a composition useful in methods described herein with one or more compounds selected from aceclofenac, acemetacin, .alpha.-acetamidocaproic acid, acetaminophen, acetaminosalol, acetanilide, acetylsalicylic acid (aspirin), S-adenosylmethionine, alclofenac, alfentanil, allylprodine, alminoprofen, aloxiprin, alphaprodine, aluminum bis (acetylsalicylate), amfenac, aminochlorthenoxazin, 3-amino-4-hydroxybutyric acid, 2-atnino-4-picoline, aminopropylon, aminopyrine, amixetrine, ammonium salicylate, ampiroxicam, amtolmetin guacil, anileridine, antipyrine, antipyrine salicylate, antrafenine, apazone, bendazac, benorylate, benoxaprofen, benzpiperylon, benzydamine, benzylmorphine, bermoprofen, bezitramide, .alpha.-bisabolol, bromfenac, p-bromoacetanilide, 5-bromosalicylic acid acetate, bromosaligenin, bucetin, bucloxic acid, bucolome, bufexamac, bumadizon, buprenorphine, butacetin, butibufen, butophanol, calcium acetylsalicylate, carbamazepine, carbiphene, carprofen, carsalam, chlorobutanol, chlorthenoxazin, choline salicylate, cinchophen, cinmetacin, ciramadol, clidanac, clometacin, clonitazene, clonixin, clopirac, clove, codeine, codeine methyl bromide, codeine phosphate, codeine sulfate, cropropamide, crotethamide, desomorphine, dexoxadrol, dextromoramide, dezocine, diampromide, diclofenac sodium, difenamizole, difenpiramide, diflunisal, dihydrocodeine, dihydrocodeinone enol acetate, dihydromorphine, dihydroxyalutninum acetylsalicylate, dimenoxadol, dimepheptanol, dimethylthiambutene, dioxaphetyl butyrate, dipipanone, diprocetyl, dipyrone, ditazol, droxicam, emorfazone, enfenamic acid, epirizole, eptazocine, etersalate, ethenzamide, ethoheptazine, ethoxazene, ethylmethylthiambutene, ethylmorphine, etodolac, etofenamate, etonitazene, eugenol, felbinac, fenbufen, fenclozic acid, fendosal, fenoprofen, fentanyl, fentiazac, fepradinol, feprazone, floctafenine, flufenamic acid, flunoxaprofen, fluoresone, flupirtine, fluproquazone, flurbiprofen, fosfosal, gentisic acid, glafenine, glucametacin, glycol salicylate, guaiazulene, hydrocodone, hydromorphone, hydroxypethidine, ibufenac, ibuprofen, ibuproxam, imidazole salicylate, indomethacin, indoprofen, isofezolac, isoladol, isomethadone, isonixin, isoxepac, isoxicam, ketobemidone, ketoprofen, ketorolac, p-lactophenetide, lefetamine, levorphanol, lofentanil, lonazolac, lomoxicam, loxoprofen, lysine acetylsalicylate, magnesium acetylsalicylate, meclofenamic acid, mefenamic acid, meperidine, meptazinol, mesalamine, metazocine, methadone hydrochloride, methotrimeprazine, metiazinic acid, metofoline, metopon, mofebutazone, mofezolac, morazone, morphine, morphine hydrochloride, morphine sulfate, morpholine salicylate, myrophine, nabumetone, nalbuphine, 1-naphthyl salicylate, naproxen, narceine, nefopam, nicomorphine, nifenazone, niflumic acid, nimesulide, 5'-nitro-2'-propoxyacetanilide, norlevorphanol, normethadone, normorphine, norpipanone, olsalazine, opium, oxaceprol, oxametacine, oxaprozin, oxycodone, oxymorphone, oxyphenbutazone, papaveretum, paranyline, parsalmide, pentazocine, perisoxal, phenacetin, phenadoxone, phenazocine, phenazopyridine hydrochloride, phenocoll, phenoperidine, phenopyrazone, phenyl acetylsalicylate, phenylbutazone, phenyl salicylate, phenyramidol, piketoprofen, piminodine, pipebuzone, piperylone, piprofen, pirazolac, piritramide, piroxicam, pranoprofen, proglumetacin, proheptazine, promedol, propacetamol, propiram, propoxyphene, propyphenazone, proquazone, protizinic acid, ramifenazone, remifentanil, rimazolium metilsulfate, salacetamide, salicin, salicylamide, salicylamide o-acetic acid, salicyl sulfuric acid, salsalte, salverine, simetride, sodium salicylate, sufentanil, sulfasalazine, sulindac, superoxide dismutase, suprofen, suxibuzone, talniflumate, tenidap, tenoxicam, terofenamate, tetrandrine, thiazolinobutazone, tiaprofenic acid, tiaramide, tilidine, tinoridine, tolfenamic acid, tolmetin, tramadol, tropesin, viminol, xenbucin, ximoprofen, zaltoprofen and zomepirac. Analgesics are well known in the art. See, for example, The Merck Index, 12th Edition (1996), Therapeutic Category and Biological Activity Index, and the lists provided under "Analgesic", "Anti-inflammatory" and "Antipyretic". As used herein, the recitation of an analgesic inherently encompasses the pharmaceutically acceptable salts thereof.

Immunostimulants

The term "immunostimulant" is used herein to describe a substance which evokes, increases, and/or prolongs an immune response to an antigen. Immunomodulatory agents modulate the immune system, and, as used herein, immunostimulants are also referred to as immunomodulatory agents, where it is understood that the desired modulation is to stimulate the immune system. There are two main categories of immunostimulants, specific and non-specific. Specific immunostimulants provide antigenic specificity in immune response, such as vaccines or any antigen, and non-specific immunostimulants act irrespective of antigenic specificity to augment immune response of other antigen or stimulate components of the immune system without antigenic specificity, such as adjuvants and non-specific immunostimulators. Immunostimulants can include, but are not limited to, levamisole, thalidomide, erythema nodosum leprosum, BCG, cytokines such as interleukins or interferons, including recombinant cytokines and interleukin 2 (aldesluukin), 3D-MPL, QS21, CpG ODN 7909, miltefosine, anti-PD-1 or PD-1 targeting drugs, and acid (DCA, a macrophage stimulator), imiquimod and resiquimod (which activate immune cells through the toll-like receptor 7), chlorooxygen compounds such as tetrachlorodecaoxide (TCDO), agonistic CD40 antibodies, soluble CD40L, 4-1BB:4-1BBL agonists, OX40 agonists, TLR agonists, moieties that deplete regulatory T cells, arabinitol-ceramide, glycerol-ceramide, 6-deoxy and 6-sulfono-myo-insitolceramide, iNKT agonists, and TLR agonists. As used herein, the recitation of an immunostimulant inherently encompasses the pharmaceutically acceptable salts thereof.

Immune-Based Product

As used herein, immune-based products include, but are not limited to, toll-like receptors modulators such as tlr1, tlr2, tlr3, tlr4, tlr5, tlr6, tlr7, tlr8, tlr9, tlr10, tlr11, tlr12, and tlr13; programmed cell death protein 1 (Pd-1) modulators; programmed death-ligand 1 (Pd-L1) modulators; IL-15 agonists; DermaVir; interleukin-7; plaquenil (hydroxychloroquine); proleukin (aldesleukin, IL-2); interferon alfa; interferon alfa-2b; interferon alfa-n3; pegylated interferon alfa; interferon gamma; hydroxyurea; mycophenolate mofetil (MPA) and its ester derivative mycophenolate mofetil (MMF); ribavirin; rintatolimod, polymer polyethyleneimine (PEI); gepon; rintatolimod; IL-12; WF-10; VGV-1; MOR-22; BMS-936559; CYT-107, interleukin-15/Fc fusion protein, normferon, peginterferon alfa-2a, peginterferon alfa-2b, recombinant interleukin-15, RPI-MN, GS-9620, and IR-103. As used herein, the recitation of an immune-based product inherently encompasses the pharmaceutically acceptable salts thereof.

IV. Kits

Disclosed herein is a kit comprising a disclosed isolated nucleic acid molecule, a disclosed vector, a disclosed pharmaceutical formulation, or a combination thereof. In an aspect, a kit can comprise a disclosed isolated nucleic acid molecule, a disclosed vector, a disclosed pharmaceutical formulation, or a combination thereof, and one or more agents. "Agents" are known to the art and are described supra. In an aspect, the one or more agents can treat, prevent, inhibit, and/or ameliorate one or more comorbidities in a subject. In an aspect, one or more active agents can treat, inhibit, prevent, and/or ameliorate a GSD III symptom or a GSD III related complication.

In an aspect, a disclosed kit can comprise at least two components constituting the kit. Together, the components constitute a functional unit for a given purpose (such as, for example, treating a subject diagnosed with or suspected of having GSD III). Individual member components may be physically packaged together or separately. For example, a kit comprising an instruction for using the kit may or may not physically include the instruction with other individual member components. Instead, the instruction can be supplied as a separate member component, either in a paper form or an electronic form which may be supplied on computer readable memory device or downloaded from an internet website, or as recorded presentation. In an aspect, a kit for use in a disclosed method can comprise one or more containers holding a disclosed isolated nucleic acid molecule, a disclosed vector, a disclosed pharmaceutical formulation, or a combination thereof, and a label or package insert with instructions for use. In an aspect, suitable containers include, for example, bottles, vials, syringes, blister pack, etc. The containers can be formed from a variety of materials such as glass or plastic. The container can hold a disclosed isolated nucleic acid molecule, a disclosed vector, a disclosed pharmaceutical formulation, or a combination thereof, and can have a sterile access port (for example the container may be an intravenous solution bag or a vial having a stopper pierceable by a hypodermic injection needle). The label or package insert can indicate that a disclosed isolated nucleic acid molecule, a disclosed vector, a disclosed pharmaceutical formulation, or a combination thereof can be used for treating, preventing, inhibiting, and/or ameliorating GSD III or complications and/or symptoms associated with GSD III. A kit can comprise additional components necessary for administration such as, for example, other buffers, diluents, filters, needles, and syringes.

EXAMPLES

Thus, there is an urgent need for a viable GSD III mouse model as well as viable therapies to treat and/or prevent GSD III. The Examples that follow are illustrative of specific embodiments of the invention, and various uses thereof. They set forth for explanatory purposes only and are not to be taken as limiting the invention.

Example 1. Generation of a GSD IIIa Knockout Mouse Model

Figure 8:
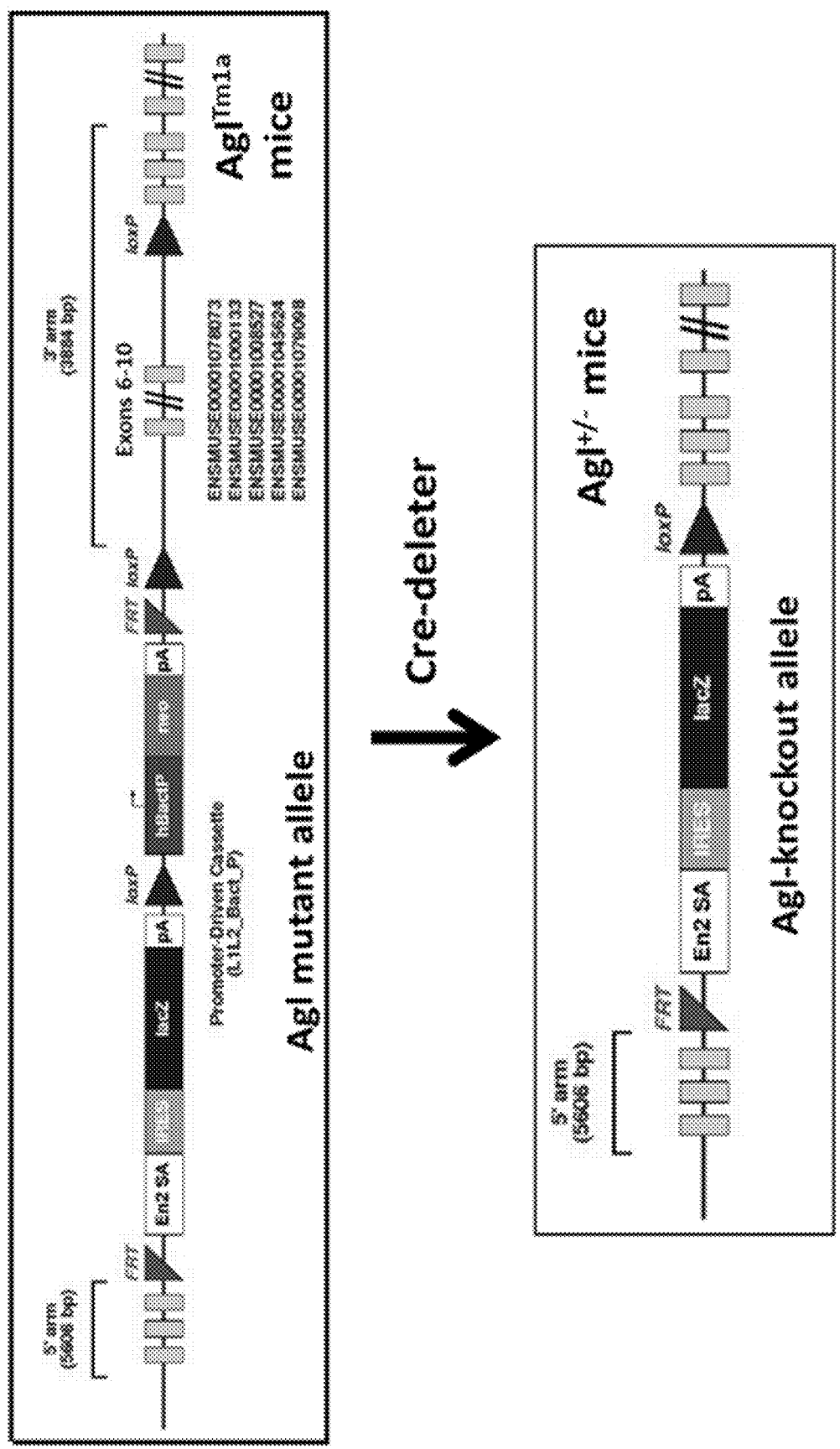
FIG. 8 shows schematic for generating GSD IIIa mouse model. Generation of heterozygous Agl$^{+/-}$ mice by crossing the AglTm1a mice with CMV-Cre mice. Homozygous Agl−/− mice were used as breeders to produce GSD IIIa (Agl knockout) mice. The heterozygous Agl mutant mice (AglTm1a) carrying a mutant Agl allele (A) were purchased form The European Mouse Mutant Archive (EMMA). The CMV-Cre mice were from The Jackson Laboratory.

A knockout mouse model of GSD IIIa (Agl-KO) was generated by deleting the exons 6-10 from the Agl gene. (FIG. 8). The affected mice (GSD IIIa) showed similar disease phenotypes as human GSD IIIa patients with massive glycogen accumulation in the liver, heart, skeletal muscles (e.g., quadriceps, gastrocnemius, soleus muscle, tongue, and diaphragm), smooth muscle (bladder), and significant amounts in the kidney and the entire region of the brain and spinal cord. [35] Fibrosis occurred at a young age (3 months) in both the liver and the kidney and some mice developed liver tumors at 18-month-old mice. GSD IIIa mice consistently exhibited increased liver/body weight ratio, elevated plasma activities of alanine aminotransferase (ALT), aspartate aminotransferase (AST), alkaline phosphatase (ALP), and creatine kinase (CK), increased levels of disease biomarker urinary glucose tetrasaccharide Glc4, and significantly decreased muscle functions at different ages. [35]

Using this model, an innovative gene therapy approach with AAV vectors expressing a small bacterial GDE (Pullulanase derived from *Bacillus subtilis*) was developed. [35] Human GDE encoded by the AGL gene is a bifunctional enzyme that breaks down glycogen via two separate enzyme activities, amylo-α-1,6-glucosidase and 4-α-D-glucanotransferase. [36-38] Unlike human GDE, Pullulanase encoded by the amyX gene has only the amylo-α-1,6-glucosidase activity and can directly cleave the α(1→6) bonds at the branching points in limit dextrin. [39] Intravenous injection of an AAV9 vector containing a 2.2-kb codon-optimized Pullulanase cDNA driven by the CB promoter (AAV-CB-Pull) into infant (two weeks old) GSD IIIa mice significantly decreased (by 75-80%) glycogen accumulation in the heart and skeletal muscles (not in the liver) and significantly improved muscle function 10 weeks after injection. [35] AAV treatment also reduced the concentrations of urinary Glc4, a breakdown product of glycogen being recognized as a disease biomarker for GSD III. [1, 35, 40, 41] Subsequent treatment with an AAV8 vector (AAV-LSP-Pull) containing an immunotolerant liver-specific promoter (LSP) further reduced liver glycogen content by 75%, significantly decreased liver size, and completely reversed hepatic fibrosis. [35] However, when administered in adult GSD IIIa mice, the AAV-CB-Pull vector elicited strong transgene-related cytotoxic T lymphocyte (CTL) response, resulting in transient Pullulanase expression the liver, heart, and skeletal muscle. When administered in adult GSD IIIa mice, however, the AAV-LSP-Pull did not provoke anti-Pullulanase CTL response, and instead, achieved long-term correction of glycogen storage in the liver, but not in the muscle.

Example 2. Novel Dual Promoter Prevents Transgene-Specific CTL Responses and Allows Pullulanase Expression in All Affected Tissues If transgene-induced immune responses can be prevented, then AAV-mediated gene therapy with Pullulanase is a possible treatment for GSD III. To examine whether a dual promoter having both a LSP promoter and the ubiquitous CB promoter would retain the ability of the LSP to induce immunotolerance to Pullulanase and enable therapeutic Pullulanase expression in all affected tissues by the CB in GSD IIIa mice, 3 different AAV vectors were constructed.

As shown in FIG. 1A, the 3 different AAV9 vectors were: (i) an AAV9 vector having the ubiquitous CB promoter (AAV-CB-Pull), (ii) an AAV9 vector having the LSP promoter (AAV-LSP-Pull), and (iii) an AAV9 vector having the LSP-CB dual promoter (AAV-Dual-Pull). This LSP contains a thyroid hormone-binding globulin promoter sequence, two copies of an α1-microglobulin/bikunin enhancer sequence, and a leader sequence. [53] Ten-week-old GSD IIIa mice were intravenously (IV via tail vein) injected with each of the 3 vectors at the same dose of $5 \times 10^{12}$ vector genome (vg)/kg. Another group of GSD IIIa mice were co-injected with the AAV-CB-Pull and AAV-LSP-Pull (Co) at the same dose. Mice were sacrificed either two weeks or ten weeks post-injection. Gender- and age-matched untreated (UT) GSD IIIa mice and wild type (WT) mice were used as controls. Tissues including the liver, heart, skeletal muscles, smooth muscles, brain, and spinal cord were analyzed after two or ten weeks.

To evaluate bio-distributions of AAV vectors, AAV genome copy numbers were quantified using real-time PCR in the liver, heart, and quadriceps of the AAV-treated GSD IIIa mice. At two weeks post injection, all treatments resulted in detectable AAV vector genomes in the liver, heart, and quadriceps but the highest number of vector genome were observed in the AAV-Dual-Pull treated tissues (FIGS. 1B-1D). All four AAV treatments significantly increased Pullulanase activities in the liver but only the AAV-Dual-Pull treatment also significantly increased Pullulanase activities in the heart and quadriceps. (FIGS. 1E-1G).

Figure 3A:
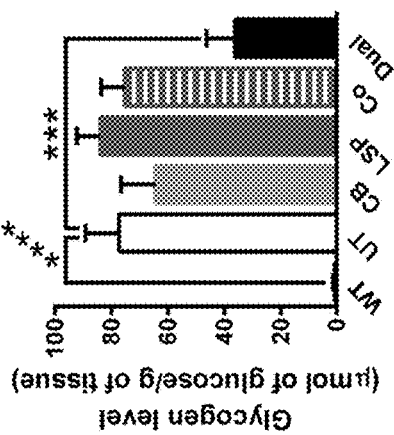
FIGS. 3A-3D show glycogen clearance in tissues after two weeks of treatment. Glycogen contents were measured in the liver (FIG. 3A), heart (FIG. 3B), and skeletal muscle (FIG. 3C). The graphs represent the mean±SD. n=4 for co-injection and n=5 for the rest groups. Multiple t-tests, p<0.01, *p<0.001 and ****p<0.0001 vs UT.
Figure 3B:
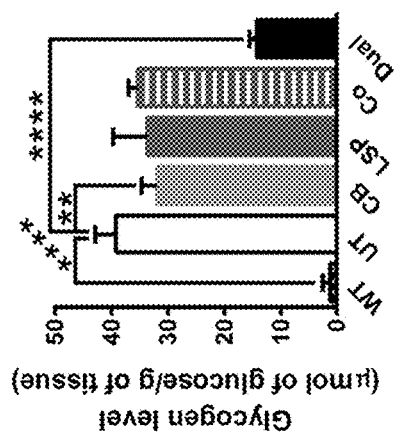
Figure 3C:
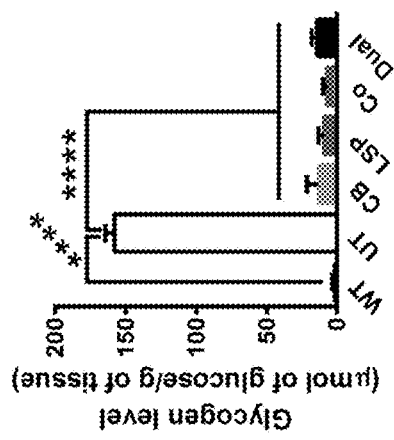
Figure 3D:
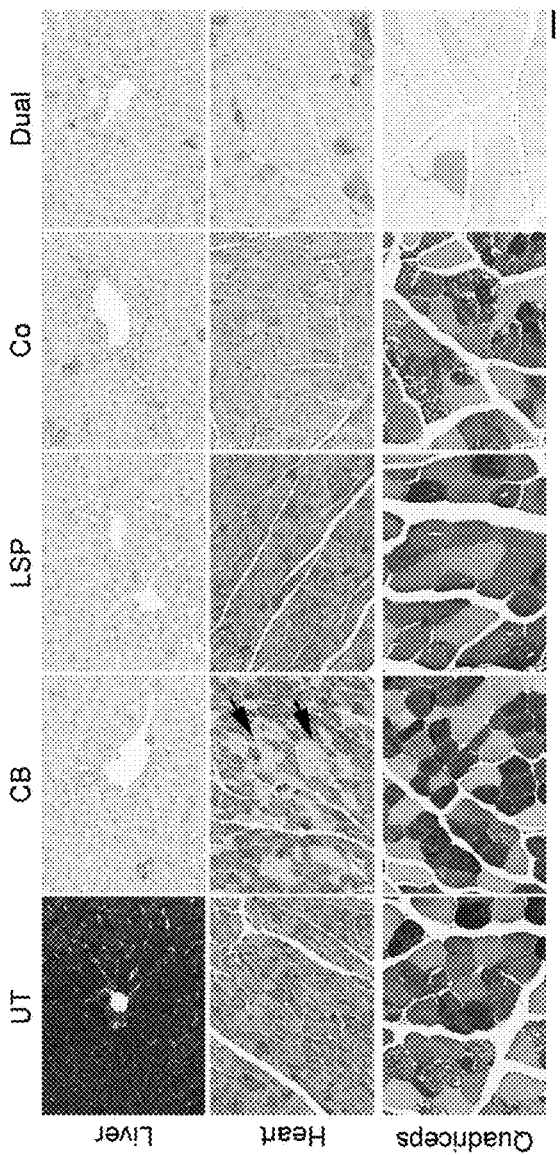

Consistent with the Pullulanase activity results, at two weeks post vector injection, all AAV treatments dramatically reduced liver glycogen accumulation to near wild-type (WT) level (FIGS. 3A-3C). Periodic acid-Schiff (PAS) staining of liver sections confirmed the glycogen content data as massive purple-stained glycogen observed in the untreated liver was cleared in all the AAV-treated livers (FIG. 3D). Neither the AAV-LSP-Pull alone nor the co-treatment significantly reduced glycogen accumulation in the heart and skeletal muscle (FIGS. 3B-3C). The AAV-CB-Pull treated heart demonstrated ~20% reduction in glycogen content (FIG. 3B) and the clearance of glycogen accumulation in some of the cardiomyocytes (FIG. 3D, black arrows). Notably, only the AAV-Dual-Pull treatment significantly reduced glycogen levels and markedly cleared glycogen accumulation throughout the liver, heart, and skeletal muscle (FIGS. 3A-3D).

IV injection of the AAV9-Dual-Pull vector in adult GSD IIIa mice effectively prevented a Pullulanase-induced CTL response two weeks after AAV treatment. The data showed that mice having received AAV-LSP-Pull and AAV-Dual-Pull effectively prevented a Pullulanase-related CTL response in GSD IIIa mice. As FIG. 2 demonstrates, the immunohistochemical (IHC) staining of liver sections with an anti-CD4 or CD8a antibody showed that infiltrations of CD4$^+$ and CD8$^+$ positive lymphocytes (black arrows) were abundant in the AAV-CB-Pull-treated liver, but barely detectable in the AAV-LSP-Pull-treated liver and the AAV-Dual-Pull treated liver (arrowheads). This indicates that the LSP-CB Dual promoter is almost equally effective to the LSP in preventing a Pullulanase-induced CTL response in GSD IIIa mice.

Example 3. AAV-Dual-Pull Enabled Long-Term Pullulanase Expression and Glycogen Clearance in All Affected Tissues At ten weeks post vector injection, glycogen content in liver was slightly increased in the AAV-LSP-Pull treated mice and moderately increased in the AAV-Dual-Pull treated mice from the 2-week treatment time point but still remained significantly reduced (−78% by AAV-LSP-Pull and −60% by AAV-Dual-Pull) compared to that of the UT mice (FIG. 4A). In contrast, liver glycogen contents returned to the UT levels in both the AAV-CB-Pull and Co-treated mice (p>0.05) (FIG. 4A). Only the AAV-Dual-Pull treatment also significantly decreased glycogen content in the heart (−76%) and skeletal muscle (−63%) (FIGS. 4B-4C). There was no difference between the glycogen content in the heart and skeletal muscle of the untreated, AAV-CB-Pull treated, AAV- LSP-Pull treated, or Co-treated mice (FIGS. 4B-4C). These glycogen content data were further confirmed by PAS staining of tissues (FIG. 4D).

At ten weeks, AAV vector genomes were significantly decreased in the liver, heart, and quadriceps treated with AAV-CB-Pull or with co-administration of AAV-LSP-Pull and AAV-CB-Pull, but remained high in the AAV-Dual-Pull treated tissues. The AAV-LSP-Pull treatment showed relatively high vector genomes in the liver but not in the muscles (FIGS. 13A-13C). As expected, Pullulanase activities were significantly elevated in the heart and quadriceps and moderately increased in the liver of the AAV-Dual-Pull treated mice. Pullulanase activity was significantly increased in only the liver of AAV-LSP-Pull treated mice. In contrast, Pullulanase activity was not significantly elevated in any tissues of the AAV-CB-Pull or Co-treated mice (FIGS. 13D-13F). The AAV-LSP-Pull treated liver showed lower vector genomes but higher Pullulanase activity than the AAV-Dual-Pull treated liver, indicating that the LSP promoter is more active than the dual promoter in liver (FIGS. 13A-13F).

Figure 12:
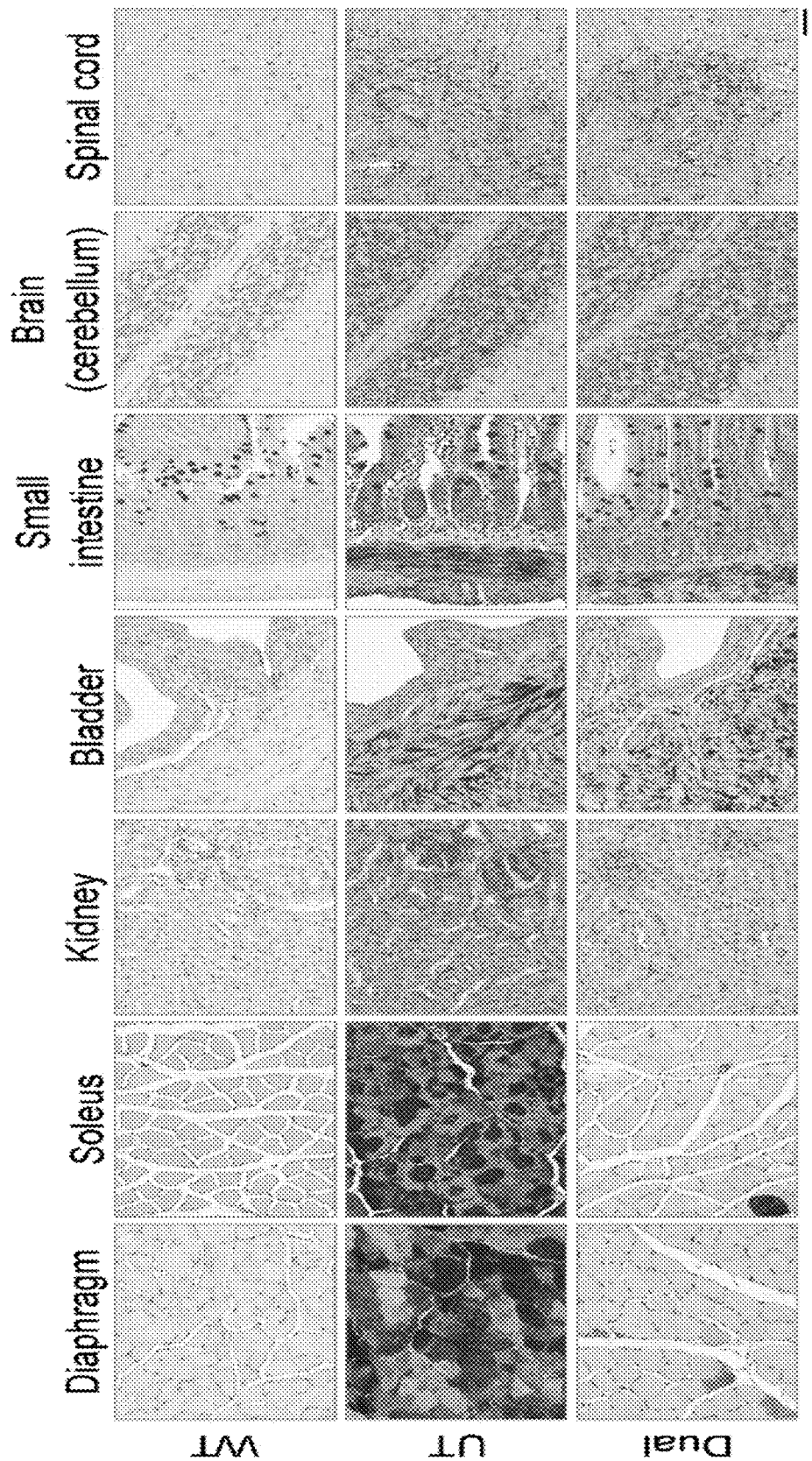
FIG. 12 shows PAS-stained tissue sections illustrating that the AAV-Dual-Pull treatment cleared glycogen storage from the diaphragm, soleus muscle, and kidney, but not in the bladder, small intestine, brain, and spinal cord. The images represent at least three mice in each group. Bar=50 µm.

PAS staining in various tissue sections showed that the AAV-Dual-Pull treatment markedly cleared glycogen storage in the diaphragm, soleus muscle, and kidney after ten weeks of AAV treatment (FIG. 12). However, there were no obvious differences in glycogen accumulation between the untreated and AAV-Dual-Pull treated GSD IIIa mice in the smooth muscles (bladder and small intestine) or the CNS (brain and spinal cord) (FIG. 12).

Example 4. Treatment with AAV9-Dual-Pull Significantly Reduced Plasma Liver and Muscle Enzyme Activities and Ameliorated Hepatic Abnormalities and Reversed Liver Fibrosis IV injection of the AAV9-Dual-Pull vector in adult GSD IIIa mice significantly improved liver function. FIG. 5A shows that 10 weeks after AAV administration, mice having received AAV-LSP-Pull and AAV-Dual-Pull exhibited significantly reduced liver size (ratio of liver to body weight) when compared to untreated mice. When compared to untreated mice, those mice having received AAV-LSP-Pull and AAV-Dual-Pull experience significantly reduced plasma liver ALT enzyme activity (FIG. 5B) and significantly reduced AST enzyme activity (FIG. 5C). Only the AAV-Dual-Pull treated GSD IIIa mice showed a significant reduction in CK levels compared to the untreated and other AAV-treated GSD IIIa mice (FIG. 5D). FIGS. 5A-5D also show that mice treated with AAV-CB-Pull did not have any significant differences in liver size or ALT or AST or CK enzymatic activity when compared to the untreated mice. As FIG. 5E shows, trichrome staining revealed significant fibrotic tissues (stained blue) in the untreated mice and those mice treated with AAV-CB-Pull. Fibrosis was not evident in mice treated with AAV-LSP-Pull and AAV-Dual-Pull.

Figure 6:
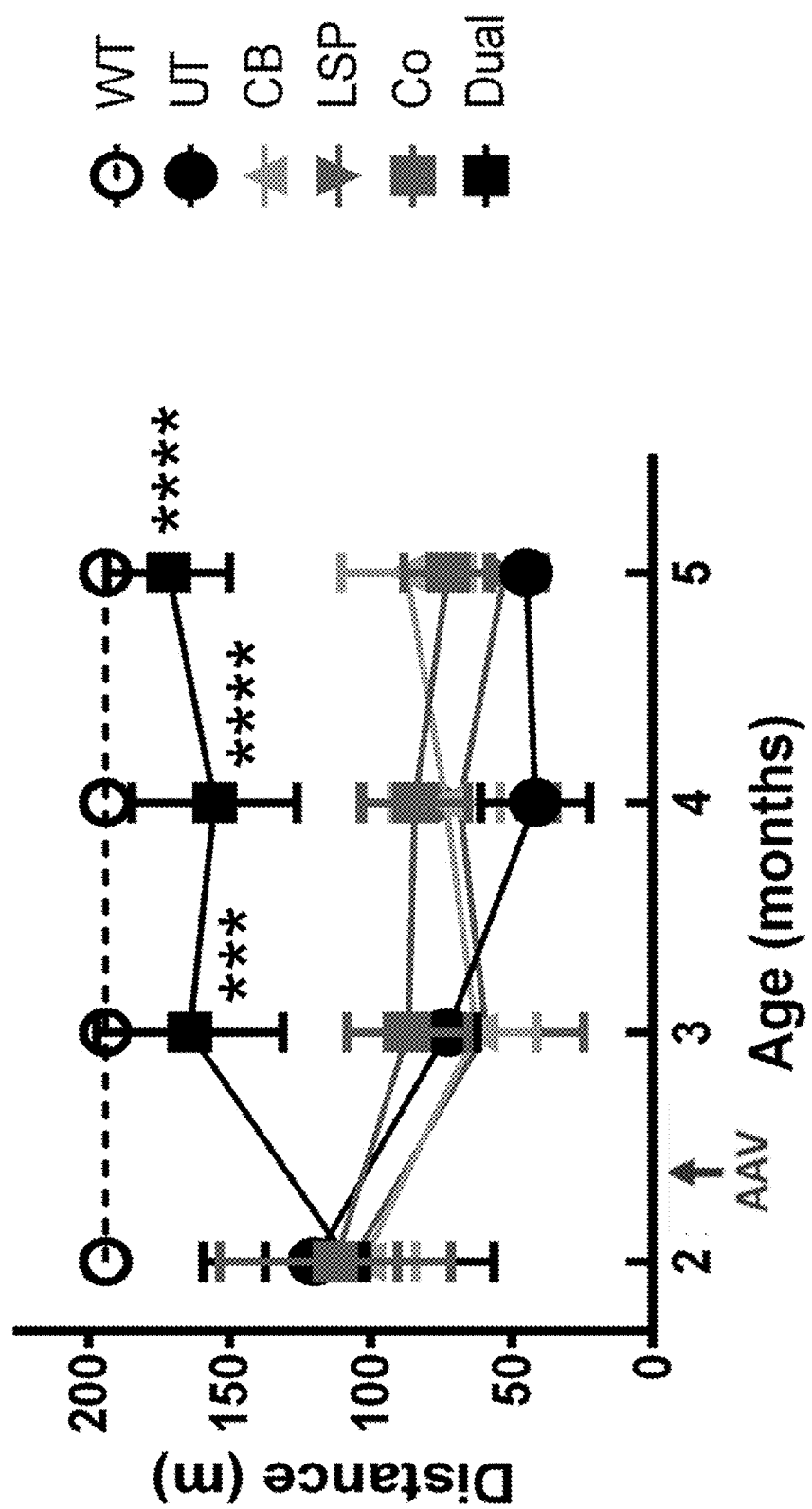
FIG. 6 shows the improvement of muscle function ten weeks after AAV administration. The treadmill test was performed to evaluate exercise intolerance of GSD IIIa mice during gene therapy by measuring the maximum running distance. WT, age-matched wild-type mice; UT, untreated GSD IIIa mice; CB, LSP, Dual, AAV-treated GSD IIIa mice. Data shown as mean±SD (n=5 mice/group). Student's test. *p<0.001 and **p<0.0001.

Example 5. Treatment with AAV9-Dual-Pull Improved Muscle Function in GSD IIIa Mice IV injection of the AAV9-Dual-Pull vector in adult GSD IIIa mice effectively significantly improved muscle function. Ten weeks after injection, a treadmill test was performed to evaluate exercise tolerance in the AAV-treated and untreated mice. Only those mice receiving AAV-Dual-Pull demonstrated a significant improvement in muscle function. FIG. 6 shows that this improvement was evidenced by the increased running distance on the treadmill.

Example 6. Depletion of CpG Motifs from Pullulanase Open-Reading Frame (ORF) Does Not Affect Pullulanase Expression and Glycogen Clearance in GSD IIIa Mice Unmethylated CpG motifs within an AAV vector genome can trigger robust innate immune responses and thereby provoke CTL responses to both AAV capsid and transgene product through the activation of the Toll-like receptor 9 (TLR9)-MyD88 signaling pathway. [59-62] Depletion of all CpG sequences from a LacZ transgene expression cassette in a highly immunogenic AAVrh32.33 vector remarkably reduced the CD8+ T cell responses to the AAV capsid and transgene product (β-gal protein) in mice. [62] In the clinic, AAV vectors containing CpG-depleted human factor IX (hFIX) ORFs have been successfully used to reduce capsid-specific CTL responses for long-term hFIX expression in patients with hemophilia B. [58] Depletion of CpG motifs from the Pullulanase ORF along with the use of an immunotolerant dual promoter is expected to prevent CTL immune responses to the AAV capsids and therapeutic Pullulanase in patients with GSD III.

A CpG-free Pullulanase ORF (Pull$^{CpG\text{-}free}$) was cloned into the AAV-Dual-Pull (LSP-CB) vector to replace the unmodified ORF (Pull), thereby generating the new AAV-Dual-Pull$^{CpG\text{-}free}$ vector plasmid. Both vectors were packaged in AAV9 and intravenously injected (via tail vein) into 3-month-old GSD IIIa mice at a dose of $5\times10^{12}$ vg/kg. Four (4) weeks after vector injection, mice were euthanized. Tissues (including liver, heart, diaphragm, quadriceps, gastrocnemius, kidney, and the brain) were collected. Fresh tissue specimens are immediately frozen on dry ice and stored at $-80°$ C. until used for biochemical analyses or fixed immediately for histology and IHC. [35] The CpG-free ORF (AAV9-Dual-Pull$^{CpG\text{-}free}$) resulted in higher Pullulanase activities (FIGS. 7A-7C) and lower glycogen levels (FIGS. 7D-7F) than the unmodified ORF (AAV9-Dual-Pull) in the liver and heart.

Figure 14A:
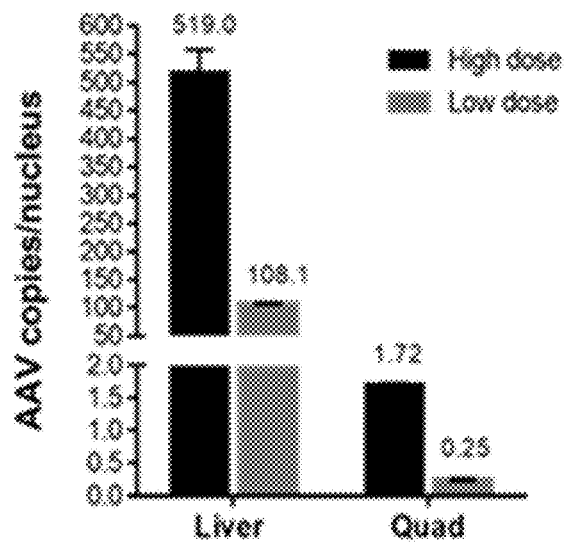
FIGS. 14A-14C show that liver-restricted Pullulanase expression with an AAV9-LSP-Pull$^{CpG-free}$ in two GSD IIIa dogs significantly decreased glycogen accumulation in the liver. Liver and muscle biopsy were performed two weeks after AAV administration.
Figure 14B:
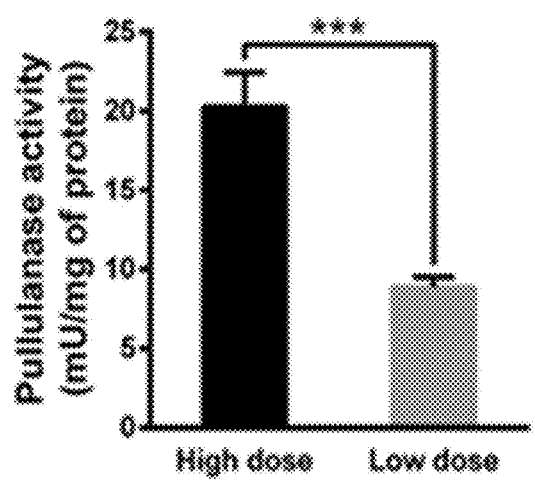
Figure 14C:
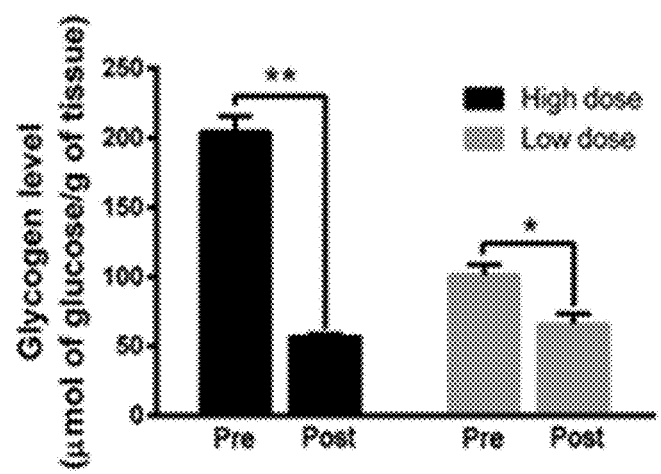

Example 7. An AAV9 Vector Containing a CpG-Free Pullulanase ORF under the LSP Promoter Effectively Reduced Glycogen Content in Liver of GSD IIIa Dogs in a Dose-Dependent Manner For proof-of-concept, two 10.5-month-old GSD IIIa dogs were intravenously injected with an AAV9 vector carrying a CpG-depleted cassette (AAV-LSP-Pull$^{CpG\text{-}free}$) at two different doses: one with $5\times10^{12}$ vg/kg (low dose) and the other with $2.5\times10^{13}$ vg/kg (high dose). Liver and muscle biopsy were performed at pre-treatment (baseline) and two weeks post-treatment. Two weeks after AAV treatment, a dose-dependent high AAV transduction was observed in both liver and muscle (FIG. 14A). As expected, dose-dependent increase in Pullulanase activity and decrease in glycogen content were observed in liver (FIGS. 14B-14C) but not in muscle (not shown). The long-term efficacy of gene therapy in these 2 dogs are being monitored.

Example 8. Effect of CpG Depletion from the Pullulanase ORF Under Control of Either a CpG-Free MCMV/HEF1α (EF1α) Promoter or a CpG-Depleted LSP-EF1α Dual Promoter on Pullulanase-Specific Immune Response The PullCpG-free ORF is cloned into the AAV-EF1α-Pull and AAV-Dual-Pull (LSP-EF1a) vectors to replace the unmodified ORF, thereby generating the new AAV-EF1α-PullCpG-free and AAV-Dual-PullCpG-free vector plasmids. Here, four additional AAV vectors are packaged in AAV9 and intravenously injected (via tail vein) into 3-month-old GSD IIIa mice at a dose of $1\times10^{13}$ vg/kg. Table 1 sets forth the four experimental groups plus the vehicle for this experiment, which enables a comparison of the PullCpG-free ORF and the unmodified Pull ORF for transgene-related CTL responses under the control of either the EF1α promoter (Group 2 vs. Group 3) or the LSP-EF1α dual promoter (Dual) (Group 4 vs. Group 5).

TABLE 1

| Group | Animal | Age | Treatment | Capsid | Dose (vg/kg) |
|---|---|---|---|---|---|
| 1 | Mice | 3 mo | Vehicle | x | x |
| 2 | Mice | 3 mo | AAV-EF1α-Pull | AAV9 | $1 \times 10^{13}$ |
| 3 | Mice | 3 mo | AAV-EF1α-Pull$^{CpG\text{-}free}$ | AAV9 | $1 \times 10^{13}$ |
| 4 | Mice | 3 mo | AAV-Dual-Pull | AAV9 | $1 \times 10^{13}$ |
| 5 | Mice | 3 mo | AAV-Dual-Pull$^{CpG\text{-}free}$ | AAV9 | $1 \times 10^{13}$ |

Four (4) weeks after vector injection, mice are euthanized. Blood and tissues (including liver, heart, diaphragm, quadriceps, gastrocnemius, kidney, and the brain) are collected. Fresh tissue specimens are immediately frozen on dry ice and stored at −80° C. until used for biochemical analyses, or fixed immediately for histology and IHC. [35] Splenocytes are isolated from fresh individual spleens by mashing them through a cell strainer, lysing red blood, washing with phosphate-buffered saline, and cells are frozen and stored in liquid nitrogen until use.

Example 9. Effect of CpG Depletion on Pullulanase-Specific CTL Responses in Splenocyte Obtained from AAV-CB-Pull Treated Mice Using a Pullulanase overlapping peptide library, a map of the Pullulanase-specific T cell epitopes in GSD IIIa mice is created. Using the splenocytes isolated from the AAV-CB-Pull treated GSD IIIa mice [71, 72], Pullulanase-specific immunodominant T cell epitopes are identified by interferon gamma (IFNγ) ELISpot. This overlapping peptide library was designed with 15 amino acid peptides overlapping by 10 amino acids (offset by 5) and 142 peptides in total were obtained from GenScript (Piscataway, NJ). Then, using the splenocytes isolated from the GSD IIIa mice treated with different AAV vectors [47, 48, 71-73] (including those AAV vectors described in Tables 2 and 3), the Pullulanase-specific CTL responses are again identified by IFNγ ELISpot. To confirm the ELISpot results, immunohistochemical staining of CD4$^+$, CD8$^+$ T cells will be performed with tissue sections (as performed in FIG. 2).

Moreover, biochemical analyses are performed to examine the correction of biochemical abnormalities. These analyses include measuring Pullulanase activity, and determining protein expression (Western blot), glycogen content, and AAV tissue bio-distribution (using real time-PCR) for at least the liver, heart, diaphragm, quadriceps, gastrocnemius, kidney, and the brain tissues. To ascertain the level of glycogen in various tissues, PAS staining is done. To ascertain the level of fibrosis in various tissues (especially the liver), Masson's trichrome staining is done. To evaluate histology, H&E staining of tissue is done. [16, 35, 69, 74].

Example 10. Cross-Species Evolution of AAV9 Variable Regions Yields Capsid Variants with Enhanced Skeletal Muscle Transduction Current AAV serotypes will transduce muscle and liver, especially AAV9. However, the high dosing regimens of AAV9 that are required to transduce skeletal muscles can lead to multiple adverse reactions. These adverse reaction (including hepatotoxicity or liver failure) subsequently eliminate the transgene from the liver. [29, 30] This issue underscores the need for the development of more potent vectors. One approach to address this need is to alter natural AAV capsids through protein engineering and evolutionary strategies and improve the vector tropism to skeletal muscle. Traditional approaches to engineer AAV have relied on rational domain swapping, DNA shuffling, or peptide insertions. These traditional approaches, however, they are often plagued by disparate results between animal models and human patients. Thus, a substantial challenge to GSD III gene therapy development is that newly engineered AAV vectors must show enhanced potency for muscle tissue transduction in multiple animal species to facilitate preclinical-to-clinical translation.

Figure 9A:
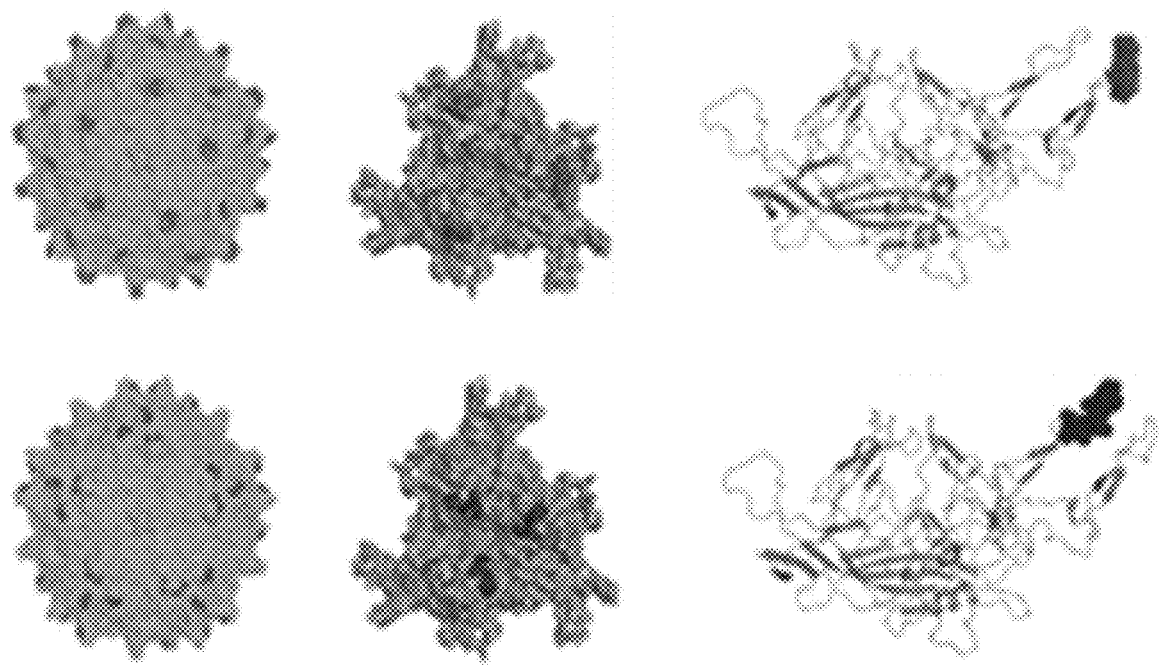
FIGS. 9A-9B show an AAV9 cross-species evolution schematic to screen for high potent novel AAV capsids for clinical translation.
Figure 9B:
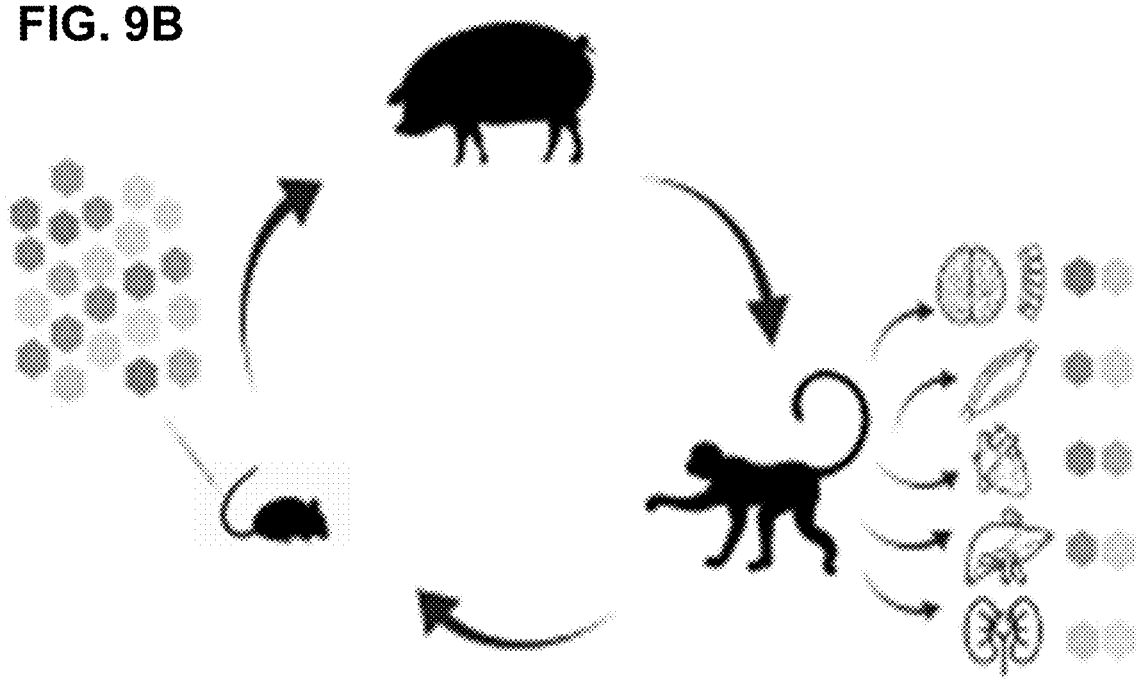
Figure 10A:
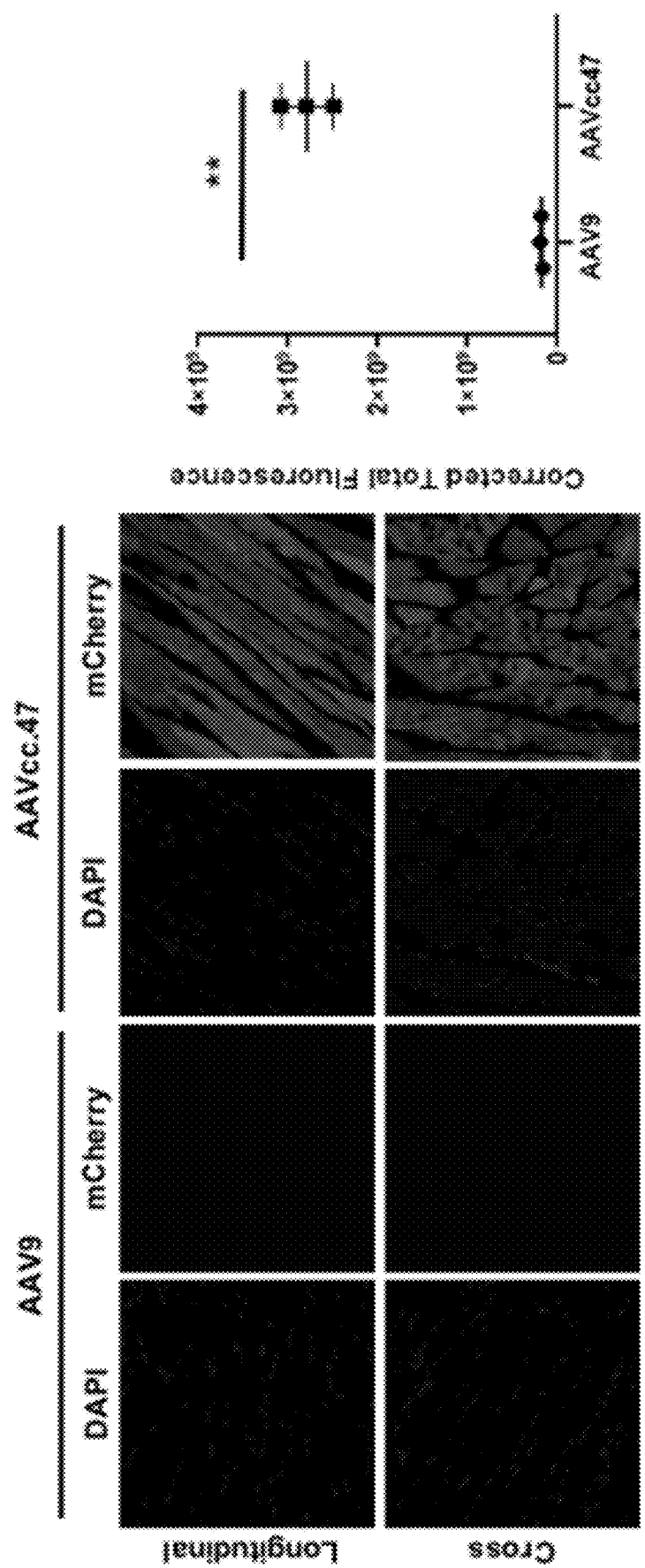
FIGS. 10A-10B show the skeletal muscle transduction of ccAAVs.
Figure 10B:
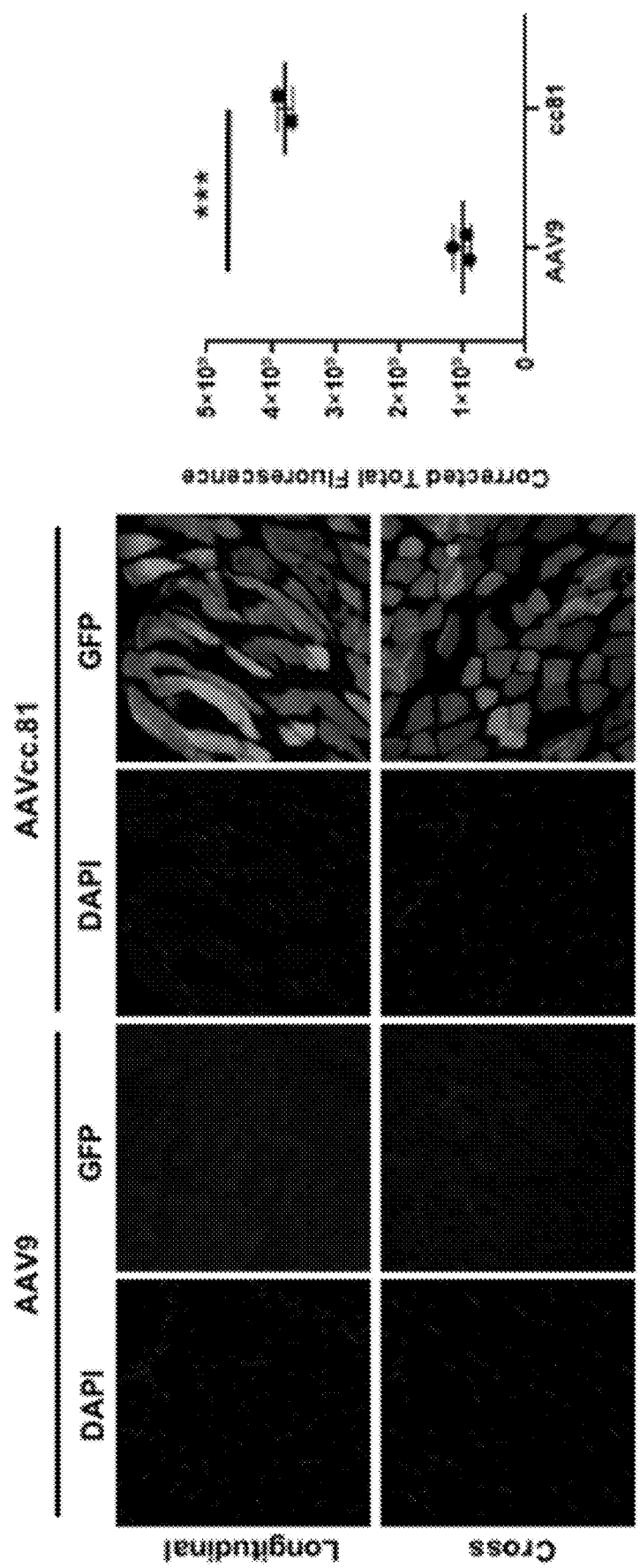

An iterative, structure-guided approach to evolve natural AAV isolates across multiple animal species so to improve properties suitable for clinical translation has emerged. [63] To isolate novel AAV9 capsid variants with enhanced skeletal muscle transduction, two libraries from the AAV9 parental serotype, were synthesized and intravenously injected into mice. The first library was from within variable region 4 (VR4, red) and the second library was from within variable region 8 (VR8, blue). (FIG. 9A). One-week post injection, AAV genomes were extracted from skeletal muscle tissues and enriched genomic sequences were identified by NOVAseq analysis. These enriched viral clones were then amplified to make a second-round library, which was then injected into pigs. This evolution cycling was then repeated in rhesus macaques to select top-enriched AAV clones from each library. (FIG. 9B). The new AAV clones were obtained by processing whole tissue lysates and were not selected for specific cellular tropism. Two lead cross-species compatible AAVs (ccAAVs) were identified, one from each parental library based on their enrichment in the target tissue following cross-species evolution. A self-complementary (sc) mCherry vector driven by a chicken beta-actin (CBA) promoter was packaged into the lead VR4 capsid, AAVcc.47, and a scGFP vector driven by the CBA promoter was packaged into the lead VR8 capsid, AAVcc.81. Mice were then injected at a dose of $1\times10^{12}$ vg/mouse via intravenous tail vein injection. Three weeks after vector injection, the liver and skeletal muscle of each mouse were collected. Using fluorescence microscopy, the ccAAV transduction profiles were determined. While the two AAVcc vectors and the parental AAV9 resulted in similar levels of transduction, both AAVcc.47 and AAVcc.81 showed significantly greater skeletal muscle transduction than did AAV9. (FIGS. 10A-10B). These data show the enhanced potency of ccAAV vectors for skeletal muscle transduction.

Example 11. Transduction Efficiencies and Glycogen Clearance Capacities of CcAAVs (AAVcc.47 and AAVcc.81) in GSD IIIa Mice The optimal AAV-Dual-PullCpG-free cassette (as determined from the Examples presented herein) is packaged into AAV9, AAVcc.47, and AAVcc.81 capsids according to Table 2. The resulting capsids are intravenously injected into GSD IIIa mice (tail vein) at the same dose ($1\times10^{13}$ vg/kg). Four weeks after administration, all animals are euthanized to collect tissues. Endpoints assessed include AAV vector tissue bio-distribution, Pullulanase expression, glycogen reduction, and histology of various tissues (including liver, heart, diaphragm, quadriceps, gastrocnemius, kidney, and the brain).

TABLE 2

| Group | Animal | Age | Treatment | Capsid | Dose (vg/kg) |
|---|---|---|---|---|---|
| 1 | Mice | 3 mo | Vehicle | x | x |
| 2 | Mice | 3 mo | AAV-Dual-Pull$^{CpG\text{-}free}$ | AAV9 | $1 \times 10^{13}$ |
| 3 | Mice | 3 mo | AAV-Dual-Pull$^{CpG\text{-}free}$ | AAVcc.47 | $1 \times 10^{13}$ |
| 4 | Mice | 3 mo | AAV-Dual-Pull$^{CpG\text{-}free}$ | AAVcc.81 | $1 \times 10^{13}$ |

Example 12. Transduction Efficiencies and Glycogen Clearance Capacities of AAVcc.47 and AAVcc.81 in GSD IIIa Dogs Prior to AAV treatment, all GSD IIIa dogs are pre-screened for pre-existing neutralizing antibodies against the three AAV capsids. The AAV-Dual-PullCpG-free vector is packaged in AAV9, AAVcc.47, and AAVcc.81 according to Table 3. These AAVs are intravenously injected (via jugular vein) into GSD IIIa dogs at the same dose ($1 \times 10^{13}$ vg/kg). Four (4) weeks after administration, all dogs are euthanized. At that time, tissues including liver, gastrocnemius, quadriceps, heart, diaphragm, spleen, bladder, kidney, brain, and reproductive organs are collected. Whole blood is used for isolating peripheral blood mononuclear cells (PBMCs) and fresh spleen is used for isolating splenocytes.

TABLE 3

| Group | Animal | Age | Treatment | Capsid | Dose (vg/kg) |
|---|---|---|---|---|---|
| 1 | Dogs | 6 mo | Vehicle | x | x |
| 2 | Dogs | 6 mo | AAV-Dual-Pull$^{CpG\text{-}free}$ | AAV9 | $1 \times 10^{13}$ |
| 3 | Dogs | 6 mo | AAV-Dual-Pull$^{CpG\text{-}free}$ | AAVcc.47 | $1 \times 10^{13}$ |
| 4 | Dogs | 6 mo | AAV-Dual-Pull$^{CpG\text{-}free}$ | AAVcc.81 | $1 \times 10^{13}$ |

Example 13. Examination of AAV Neutralizing Antibodies and AAV Pharmacokinetic Profiles Viral vectors packaging a luciferase transgene under control of the chicken beta actin (CBA) promoter are incubated with serial dilutions of dog serum or FBS control for 30 min. Huh7 cells are then added and incubated for 24-48 hours. After incubation, cells are lysed and luciferase activity is determined by bioluminescence measurement.

For pharmacokinetic studies, the vector genome copy numbers are calculated from total DNA isolated from 10 μL of blood at pre-dose, 0.25 hour, 1 hour, 2 hours, 6 hours, 24 hours, and 48 hours post-injection. Viral genome copy numbers are determined by qPCR using vector-specific primers normalized to lamin B2.

Example 14. Determination of Gene Therapy-Related Acute Immune Responses and Evaluation of Pullulanase-Specific CTL Response by IFNγ ELISpot and IHC Approximately 1-4 mL of blood is taken from each dog at the following time points: 0 (pre-dose), 0.25 hour, 1 hour, 2 hours, 6 hours, 24 hours, and 48 hours post-vector injection. Serum samples are analyzed for cytokines IFN-γ, IL-6, IL-8, IL-10, MCP-1, and TNF-α using a MILLIPLEX Map Canine Cytokine/Chemokine Premixed Magnetic Bead Kit. Splenocytes and peripheral blood mononuclear cells (PBMCs) are isolated from the Vehicle-treated and AAV-treated GSD IIIa dogs. [71, 72] Pullulanase-specific immunodominant T cell epitopes are mapped using the Pullulanase overlapping peptide library and the splenocytes from the AAV-treated dogs [71, 72] Pullulanase-specific CTL responses by IFNγ ELISpot with the splenocytes are determined. Whole blood is used for isolating peripheral blood mononuclear cells (PBMCs) and fresh spleen is used for isolating splenocytes. To confirm the ELISpot results, immunohistochemical staining of CD4+, CD8+ T cells is performed with tissue sections (as performed in FIG. 2). Biochemical analyses are performed to examine the correction of biochemical abnormalities. These analyses include measuring Pullulanase activity and determining protein expression (Western blot), glycogen content, and AAV tissue bio-distribution (using real time-PCR) for at least the liver, heart, diaphragm, quadriceps, gastrocnemius, kidney, and the brain tissues. To ascertain the level of glycogen in various tissues, PAS staining is done. To ascertain the level of fibrosis in various tissues (especially the liver), Masson's trichrome staining is done. To evaluate histology, H&E staining of tissue is done. [16, 35, 69, 74]

Example 15. Examination of Transduction Efficiencies and Glycogen Clearance Capacities of AAVcc.47 and AAVcc.81 in Human GSD IIIa Patient Muscle Cells The transduction efficiency of AAVcc.47 and AAVcc.81 and their glycogen clearance capability in isolated human primary myoblasts is examined. AAVcc.47, AAVcc.81, and AAV9 capsids packaging either the AAV-CBA-GFP or the AAV-Dual-PullCpG-free are prepared. Early-passage GSD IIIa patient myoblasts are seeded onto collagen-coated 6-well plates in growth medium (Day 1). When cells reached 70-80% confluence (Day 4), a low-serum differentiation medium is introduced to induce differentiation into myotubes. [76] On Day 10, cells are infected each AAV vector in differentiation medium at different multiplicity of infection (MOI) ranging from $2 \times 10^3$ to $1 \times 10^5$ in triplicates. [77] A proteasome inhibitor (e.g., Bortezomib) is used to improve in vitro AAV transduction. [78] After 5 days, cells are harvested for detection of transgene expression (i) by immunofluorescence microscopy (GFP and Pullulanase) or (ii) by enzyme activity assay and Western blot (Pullulanase). Glycogen reduction is determined by glycogen content assay and by PAS staining. [35]

Example 16. Human Liver Chimeric Mice are a Powerful Tool to Validate Human Gene Therapy and Increase Clinical Translatability GSD III patients present not only with muscle but also with liver problems. Therefore, it is important to evaluate this approach also in primary human hepatocytes. However, in contrast to muscle cells, hepatocytes ex vivo underlie a constantly changing expression profile and almost hourly deteriorate in tissue culture. To address this experimental limitation and validate the hepatocyte, humanized mice are used. Mice with human livers are repopulated with human hepatocytes, which upon genetic selection [67] expand in the murine liver and generate a human liver chimerism of up to 95%. [66] Humanization can be evaluated by measuring human proteins, such as human albumin, in the murine blood. In the FRG (Fah−/−/Rag2−/−/Il2rg−/−) mouse [67], human albumin levels correlate with human liver chimerism assessed by immunostaining for human cells. [66] (FIG. 11A-D). As shown in FIG. 11E, the FRG mice has been used to validate transduction efficiencies of different AAV capsids and correct underlying genetic disorders. [65] Here, humanized FRG mice are used to assess transduction of the lead capsids (AAVcc.47 and AAVcc.81) to AAV9 and determine hepatotoxicity of a macromolecular therapy with Pullulanase.

Example 17. Transduction Efficiencies of AAVcc.47 and AAVcc.81 and Evaluate Toxicity of Pullulanase Expression in Human Liver Chimeric Mice To generate human liver chimeric FRG mice, human hepatocyte transplantation is done by splenic injections as described for mouse hepatocytes. [79] In brief, $3\times10^6$ human hepatocytes (source: cadaveric, cryopreserved hepatocytes—from the same donor for all mice) in a volume of 50 µL is injected into the spleen of 2 months old FRG mice. Immediately after transplantation, selection pressure towards transplanted human hepatocytes is applied by withdrawing the drug NTBC from the drinking water. [64-66] After 2 weeks, mice are again put on the drug NTBC for 3 days before a second withdrawal (cycling). Cycling is repeated until mice have a human chimerism of >60%. Human chimerism is determined by measuring the human albumin in the murine blood (ELISA). (See FIG. 11D). 50-60% of transplanted animals reach a chimerism of >60% (>1 mg/mL human albumin) after selection for human hepatocytes for 4-6 months. Exclusively highly humanized (>60%) mice are used. Table 4 summarizes the experimental groups.

TABLE 4

| Group | Animal | Capsid | Dose (vg/kg) |
| --- | --- | --- | --- |
| 1 | Vehicle | X | X |
| 2 | AAV-Dual-Pull$^{CpG\text{-}free}$ | AAV9 | $1 \times 10^{13}$ |
| 3 | AAV-Dual-Pull$^{CpG\text{-}free}$ | AAVcc.47 | $1 \times 10^{13}$ |
| 4 | AAV-Dual-Pull$^{CpG\text{-}free}$ | AAVcc.81 | $1 \times 10^{13}$ |

AAV vectors are injected into the tail vein of highly humanized mice as previously described. [65] Mice are weighed prior to injection, 2 days post-injection, 7 days post-injection, and then weekly. To detect hepatotoxicity, several liver parameters (e.g., AST, ALT, GGT, AP and bilirubin) are measured in the blood at multiple time points (e.g., pre-injection and 2 days, 7 days, 14 days, 21 days, etc. post injection). Six weeks post-injection, all mice are euthanized and the liver of each mouse is harvested. Human hepatocytes are detected by immunostaining for FAH. The AAV transgene is detected by staining for the influenza Hemagglutinin (HA) peptide tagged to the c-terminus of the Pullulanase protein. To determine transduction efficiency of human hepatocytes in vivo, double stained cells are quantified using the Image J software as described previously. [65] Hepatotoxicity of all groups is determined by blood chemistry as described above and with immune staining for caspase 3 and the TUNEL assay (apoptosis test). Additionally, liver sections are examined for infiltration, microscopic signs of inflammation, and accumulation of macrophages by F4/80 staining.

Example 18. Examination of Long-Term Efficacy of AAV Vector in GSD IIIa Mice

To determine the minimum effective dose (MED), a short-term dose-ranging study is conducted by injecting AAV vector (either AAVcc.47 or AAVcc.81) at escalating doses ($2\times10^{12}$, $1\times10^{13}$, and $5\times10^{13}$ vg/kg) in 3-month-old male and female GSD IIIa mice. (See Table 5). Six weeks after injection, functional tests (including treadmill, wire-hang, and Rota-rod) are performed for mice in each group. [35, 81] All mice are then euthanized to collect blood, urine, and tissues (liver, heart, diaphragm, quadriceps, gastrocnemius, kidney, and the brain).

TABLE 5

| Group | Age | Treatment | Capsid | Dose (vg/kg) |
| --- | --- | --- | --- | --- |
| 1 | 3 mo | Vehicle | x | x |
| 2 | 3 mo | AAV-Dual-Pull$^{CpG\text{-}free}$ | AAVcc.47/81 | $2 \times 10^{12}$ |
| 3 | 3 mo | AAV-Dual-Pull$^{CpG\text{-}free}$ | AAVcc.47/81 | $1 \times 10^{13}$ |
| 4 | 3 mo | AAV-Dual-Pull$^{CpG\text{-}free}$ | AAVcc.47/81 | $5 \times 10^{13}$ |

Having identified the minimum effective dose for the lead AAV, a long-term efficacy study in 3-month-month old male and female mice with the lead AAV vector at the MED is conducted. (See Table 6). Functional tests are performed at time of administration, 13 weeks, 26 weeks, 39 weeks, and 52 weeks post-administration. To collect blood, urine, and tissues, mice are euthanized at either 26 weeks post-administration or at 52 weeks post-administration.

TABLE 6

| Group | Age | Treatment | Capsid | Dose (vg/kg) |
| --- | --- | --- | --- | --- |
| 1 | 3 mo | Vehicle | x | x |
| 2 | 3 mo | AAV-Dual-Pull$^{CpG\text{-}free}$ | AAVcc.47/81 | MED |

Finally, aged (12-month-old) male and female mice are treated with the lead AAV vector at 3 different doses (low, medium, high). (Table 7). Functional tests are performed at time of administration as well as at 13 weeks and 26 weeks post-administration. All mice are euthanized at 26 weeks post-administration to collect blood, urine, and tissues. Key assessments performed with the collected samples include (i) AAV bio-distribution, Pullulanase expression, glycogen reduction, fibrosis reversal, and histology correction in tissues [35]; (ii) improvement liver functions as determined by a liver panel assay with serum that includes ALT, ALP, AST, CK, glucose, albumin, bilirubin, and total protein; and (iii) normalization of disease biomarker Glc4 in urine analyzed by stable isotope-dilution electrospray tandem mass spectrometry. [82]

TABLE 7

| Group | Age | Treatment | Capsid | Dose (vg/kg) |
| --- | --- | --- | --- | --- |
| 1 | 12 mo | Vehicle | x | x |
| 2 | 12 mo | AAV-Dual-Pull | AAVcc.47/81 | $2 \times 10^{12}$ |
| 3 | 12 mo | AAV-Dual-Pull | AAVcc.47/81 | $1 \times 10^{13}$ |
| 4 | 12 mo | AAV-Dual-Pull | AAVcc.47/81 | $5 \times 10^{13}$ |

Example 19. Investigation of Safety and Efficacy of AAV Vector in GSD IIIa Dogs

To determine the long-term safety and efficacy of gene therapy, 6-month-old GSD IIIa dogs are treated with vehicle (Group 1) and the AAV vector at doses of $1\times10^{13}$ (Group 2) and $5\times10^{13}$ vg/kg (Group 3). Blood is collected from awake dogs via venipuncture at the indicated time points for serum preparation (0.5-1.0 mL blood) and/or PBMCs isolation (30 mL blood). Urine is collected at the indicated time points for urinary Glc4 analysis. A series of liver biopsies by laparotomy and skeletal muscle (quadriceps and gastrocnemius) biopsies are performed on each dog under general anesthesia at 0.5 months prior to injection and then 0.5 months, 3 months, 6 months, and 9 months post-injection. All dogs are euthanized at 12 months post-AAV injection.

Acute immune responses by cytokine-chemokine profiling with serum is determined at the time of injection as well as at 0.25 hour, 1 hour, 2 hours, 6 hours, 24 hours, and 48 hours post-injection. Pullulanase-specific CTL response by IFNγ ELISpot with PBMCs is measured at the time of injection as well as at 1 month, 3 months, 6 months, and 12 months post-injection. Blood chemistry for liver and muscle enzymes is determined at the time of injection as well as at 1 day, 3 days, 7 days, and 15 days post-injection and at 1 month, 3 months, 6 months, 9 months, and 12 months post-injection. Serum samples are sent to a commercial laboratory for a panel of routine biochemical tests that includes, but is not limited to, ALT, AST, ALP, CK, glucose, triglycerides, bilirubin, albumin, and cholesterol. [16, 41, 69] Liver and muscle biopsies obtained at the indicated time points or the tissues (liver, gastrocnemius, quadriceps, heart, diaphragm, spleen, bladder, kidney, brain, and reproductive organs) collected at euthanasia are analyzed for (i) AAV vector genome copies, (ii) Pullulanase activities, (iii) Western blot, and (iv) glycogen contents. These samples are also used for histological analysis including PAS staining (glycogen content), Trichrome staining (fibrosis), and H&E staining (morphology). Urine samples collected at the indicated time points are used to determine Glc4 concentrations.

All data are presented as mean±standard deviation. For analysis of data from multiple groups, one-way ANOVA with post hoc test (Tukey) is performed using Prism software (Graphpad). For two-group comparison, equal variance, unpaired, two-tailed Student's t-test is performed. A sample size of 5-7 mice or 3 dogs per group is projected to be sufficient to achieve statistical significance for detecting a difference of 35% in biochemical corrections of tissues, with a study power of 0.85 and significance level of 0.05.

Methods used in Examples 1-19

The following exemplary methods were used in the present disclosure.

AAV vector constructs and AAV viral packaging. To generate the pAAV-LSP-CB-Pull vector plasmid, the LSP promoter was amplified from the pAAV-LSP-Pull vector using primers: XbaI-LSP-F and AflII-LSP-R (Table 8) and the CB promoter was amplified from the pAAV-CB-Pull vector (14) using primers AflII-CB-F and KpnI-CB-R (Table 8). The amplified XbaI-LSP-AflII and AflII-CB-KpnI fragments were ligated through the AflII site and amplified again using primers: XbaI-LSP-F and KpnI-CB-R (Table 8). The amplified XbaI-LSP-CB-KpnI fragment was cloned into the pAAV-LSP-Pull vector at the XbaI and KpnI sites to replace the LSP promoter. The pAAV-LSP-Pull, pAAV-CB-Pull, and pAAV-LSP-CB-Pull vectors were packaged as AAV9 in HEK293T cells using the calcium phosphate transferase method and purified using the iodixanol gradient ultracentrifugation method (34). The titer of the viral stock was determined by Southern blot using purified viral DNA and a biotin-labeled probe generated with Prime-A-Gene labeling kit (Promega, Madison, WI). The viral vector stock was handled according to Biohazard Safety Level 2 guidelines published by the National Institutes of Health.

TABLE 8

| Target | | Name | Sequences | SEQ ID NO: |
|---|---|---|---|---|
| LSC | FWD | XbaI-LSP-F | AGTTCTAGAGCGGCCGCCAG | SEQ ID NO: 07 |
| | REV | AflII-LSP-R | CCCCTTAAGCCATTTTTATAGCATGTCCTGTATTGCAAAACTA | SEQ ID NO: 08 |
| CB | FWD | AflII-CB-F | CCCCTTAAGGTTCCGCGTTACATAACTTACGGTAAAT | SEQ ID NO: 09 |
| | REV | KpnI-CB-R | GTCGACGGTACCGCGCAG | SEQ ID NO: 10 |
| Pullulanase | FWD | Pull-F | GCCACTGGATGCCTACAACT | SEQ ID NO: 11 |
| | REV | Pull-R | CGTGCTGGTGCAGTGTATTG | SEQ ID NO: 12 |
| B-Actin | FWD | Actin-F | AGAGGGAAATCGTGCGTGAC | SEQ ID NO: 13 |
| | REV | Actin-R | CAATAGTGATGACCTGGCCGT | SEQ ID NO: 14 |

Animal and viral vector administration. Animal care and experiments were conducted following Duke University Institutional Animal Care and Use Committee approved guidelines. Ten-week-old GSD IIIa (Agl knockout) mice were injected with AAV9-LSP-Pull (LSP), AAV9-CB-Pull (CB), AAV9-LSP-Pull+AAV9-CB-Pull co-administration (Co), or AAV9-LSP-CB-Pull (Dual) at the same dose of $5.0 \times 10^{12}$ vg/kg (FIG. 1A). After two or ten weeks of treatment, the mice were sacrificed to collect tissues and blood following over-night fasting. The mice were examined by treadmill test at 2, 3, 4, and 5 months of age. Gender- and age-matched untreated GSD IIIa mice and WT mice were used as controls. Fresh tissue specimens were either immediately frozen on dry ice and stored at −80° C. until used for biochemical analyses, or fixed immediately for histology.

AAV vector biodistribution. AAV vector genomes were quantified by real-time PCR. Genomic DNA was extracted from frozen tissues using the Wizard Genomic DNA Purification kit (Promega, Madison, WI). PCR was performed using SYBR Green (Roche, Basel, Switzerland) and the gene-specific primer pairs for Pullulanase and mouse β-actin (Table 8). The pAAV-CB-Pull plasmid DNA was used to generate a standard curve for calculating viral vector copy numbers.

Pullulanase activity assay. Pullulanase activity was measured using the Pullulanase activity assay kit (Megazyme, Wicklow, Ireland) following the manufacturer's protocol. Briefly, tissues were homogenized using a tissue homogenizer (Caframo LTD, Ontario, Canada) on ice in PBS containing a protease/phosphatase inhibitor cocktail (Cell Signaling Technology, Danvers, MA). After centrifugation at 18,000×g at 4° C. for 15 min, the lysates were incubated with the substrate (6-O-Benzylidene-4-nitrophenyl-63-α-D-maltotri osyl-maltotriose), thermostable α-glucosidase, and thermostable β-glucosidase at 40° C. After 10 min, the reaction was stopped by adding the stop buffer [2% (w/v) Tris buffer, pH 9.0]. The absorbance was read at 405 nm using a victor X multi-label plate reader (PerkinElmer Corporation, Waltham, MA). Kit-provided Pullulanase enzyme was used as a standard to determine the enzyme activity. Protein concentrations in tissue lysates were determined by BCA assay and used to normalize the data.

Glycogen content assay. The same lysates from Pullulanase activity assay were diluted 1:5 in distilled water and boiled for 3 min to inactivate endogenous enzymes. The diluted samples were incubated with 0.175 U/mL (final concentration in the reaction) of Amyloglucosidase (Sigma-Aldrich Co., St. Louis, MO) for 90 min at 37° C. The reaction mixtures were then boiled again for 3 min to stop the reaction. 30 µL of the mixtures were incubated with 1 mL of Pointe Scientific Glucose (Hexokinase) Liquid Reagents (Fisher, Hampton, NH) for at least 10 min at room temperature. The absorbance at 340 nm was read using a UV-VIS Spectrophotometer (Shimadzu UV-1700 PharmaSpec, Tokyo, Japan).

Histology. Fresh tissues were fixed immediately in 10% neutral-buffered formalin (NBF) for 48 h. After primary immersion fixation, the samples were post-fixed with 1% periodic acid (PA) in 10% NBF for 48 h at 4° C. The samples were then washed with PBS, dehydrated with ascending grades of alcohol, cleared with xylene, and infiltrated with paraffin. For PAS staining, sections of paraffin-embedded tissues were processed and stained using Schiff reagent as described (14). Briefly, the slides were oxidized with freshly made 0.5% PA for 5 min and rinsed with distilled water for 1 min. The slides were then stained with Schiff reagent for 15 min and washed with tap water for 10 min. The slides were counterstained with Hematoxylin and rinsed with tap water, incubated with bluing reagent for 1 min, dehydrated, and mounted. For trichrome staining, the paraffin-embedded liver sections were processed and stained using Masson's trichrome staining kit (Sigma-Aldrich Co., St. Louis, MO) following the manufacturer's protocol. Images were taken on a BZ-X710 microscope (Keyence America, Itasca, IL).

Plasma enzyme activity tests. The activities of plasma ALT, AST, and CK were measured using the Liquid ALT (SGPT), Liquid AST (SGOT), and Liquid Creatine Kinase Reagent Set, respectively (Pointe Scientific, Inc. Canton, MI). Whole blood was collected in green blood collection tube (coated with lithium heparin) and plasma was separated by centrifugation at 2,000×g, 4° C. for 10 min and diluted (1:5) with normal saline [0.9% (w/v) of NaCl]. The diluted plasma was incubated with the working reagent (R1 and R2 mixture) at 37° C. and absorbance at 340 nm was recorded every minute for five minutes.

Treadmill exhaustion test. Mice were acclimated for 15 min in the chamber of the treadmill (LE8709, Panlab Harvard Apparatus, Holliston, MA) and warmed up by running at the lowest speed, 5 cm/sec and 25 degrees of slope for 3 min. Then, mice were allowed to run at 8 cm/sec for 3 min. The speed was increased by 4 cm/sec every three min until mice were exhausted or the maximal speed (32 cm/sec) was reached.

Immunohistochemistry. Paraffin-embedded sections were deparaffinized and rehydrated. The slides were incubated in Tris-EDTA (pH 9.0) buffer at 100° C. for 20 min for antigen retrieval and wash the slides with cold tap water and TBS containing 0.025% Triton X-100 (TBST). The samples were incubated with 10% normal goat serum with 1% BSA in TBS for 2 h at room temperature, and primary antibodies diluted in 1% BSA/TBS at 4° C. overnight. The following primary antibodies were used: recombinant anti-CD4 antibody (Abcam, Cambridge, MA, ab183685) and recombinant anti-CD8 alpha antibody (Abcam, Cambridge, MA, ab209775). The next day, the slides were washed with TBST, incubated with 0.3% H2O2 in TBS for 15 min, and incubated with HRP conjugated secondary antibody for 1 h at room temperature. The samples were washed and developed with SignalStain DAB substrate Kit (Cell Signaling Technology, Danvers, MA). The slides were rinsed, counterstained with Hematoxylin, dehydrated, cleared, and mounted. The images were taken on a BZ-X710 microscope (Keyence America, Itasca, IL).

Statistics. Statistical significance was determined by multiple t-tests using Prism software (GraphPad, La Jolla, CA); data are presented as mean±standard deviation (SD). $p<0.05$ was considered statistically significant.

REFERENCES

1. Kishnani P S, et al. (2010) Glycogen storage disease type III diagnosis and management guidelines. Genet Med. 12(7):446-63.
2. Dagli A, C. P. Sentner, and D. A. Weinstein, Glycogen Storage Disease Type III, in GeneReviews®, M. P. Adam, et al., Editors. 2010, University of Washington, Seattle: Seattle (Wash.).
3. Demo E, et al. (2007) Glycogen storage disease type III-hepatocellular carcinoma a long-term complication? J Hepatol. 46(3):492-8.
4. Halaby C A, et al. (2019) Liver fibrosis during clinical ascertainment of glycogen storage disease type III: a need for improved and systematic monitoring. Genet Med.
5. Lee P J, et al. (1997) Comparison of the functional significance of left ventricular hypertrophy in hypertrophic cardiomyopathy and glycogenosis type III. Am J Cardiol. 79(6):834-8.
6. Labrune P, et al. (1991) Cardiomyopathy in glycogen-storage disease type III: clinical and echographic study of 18 patients. Pediatr Cardiol. 12(3):161-3.
7. Olson L J, et al. (1984) Cardiac involvement in glycogen storage disease III: morphologic and biochemical characterization with endomyocardial biopsy. Am J Cardiol. 53(7):980-1.
8. Moses S W, et al. (1986) Neuromuscular involvement in glycogen storage disease type III. Acta Paediatr Scand. 75(2):289-96.
9. Mogahed E A, et al. (2015) Skeletal and cardiac muscle involvement in children with glycogen storage disease type III. Eur J Pediatr. 174(11):1545-8.
10. Sentner C P, et al. (2012) Heart Failure Due to Severe Hypertrophic Cardiomyopathy Reversed by Low Calorie, High Protein Dietary Adjustments in a Glycogen Storage Disease Type IIIa Patient. JIMD Rep. 5:13-6.
11. Kishnani P S, et al. (2009) Early treatment with alglucosidase alpha prolongs long-term survival of infants with Pompe disease. Pediatr Res. 66(3):329-35.
12. Kishnani P S, et al. (2010) Cross-reactive immunologic material status affects treatment outcomes in Pompe disease infants. Mol Genet Metab. 99(1):26-33.
13. Van der Ploeg A T, et al. (2010) A randomized study of alglucosidase alfa in late-onset Pompe's disease. N Engl J Med. 362(15):1396-406.

14. Van der Ploeg A T, et al. (2012) Open-label extension study following the Late-Onset Treatment Study (LOTS) of alglucosidase alfa. Mol Genet Metab. 107(3):456-61.
15. Sun B, et al. (2013) Alglucosidase alfa enzyme replacement therapy as a therapeutic approach for glycogen storage disease type III. Mol Genet Metab. 108(2):145-7.
16. Yi H, et al. (2014) Correction of glycogen storage disease type III with rapamycin in a canine model. J Mol Med (Berl). 92(6):641-50.
17. Pursell N, et al. (2018) Inhibition of Glycogen Synthase II with RNAi Prevents Liver Injury in Mouse Models of Glycogen Storage Diseases. Mol Ther. 26(7):1771-1782.
18. Inagaki K, et al. (2006) Robust systemic transduction with AAV9 vectors in mice: efficient global cardiac gene transfer superior to that of AAV8. Mol Ther. 14(1):45-53.
19. Zincarelli C, et al. (2008) Analysis of AAV serotypes 1-9 mediated gene expression and tropism in mice after systemic injection. Mol Ther. 16(6):1073-80.
20. Jacobs F, et al. (2011) Adeno-associated viral vectors for correction of inborn errors of metabolism: progressing towards clinical application. Curr Pharm Des. 17(24): 2500-15.
21. Dayton R D, et al. (2012) The advent of AAV9 expands applications for brain and spinal cord gene delivery. Expert Opin Biol Ther. 12(6):757-66.
22. Nathwani A C, et al. (2014) Long-term safety and efficacy of factor IX gene therapy in hemophilia B. N Engl J Med. 371(21):1994-2004.
23. Uspenskaya O, et al. (2020) Design of Phase ½a Study of AAV9-Based Gene Therapy for Parkinson's Disease with Pathogenic GBA1 Mutations (PROPEL Trial). Neurology. 94(15).
24. Flanigan K M, et al. (2020) Transpher A, a multicenter, single-dose, phase ½ clinical trial of ABO-102, an intravenous AAV9-based gene therapy for Sanfilippo Syndrome Type A (Mucopolysaccharidosis IIIA). Neurology. 94(15).
25. de los Reyes E, et al. (2020) Single-dose AAV9-CLN6 gene transfer stabilizes motor and language function in CLN6-type Batten disease: Interim results from the first clinical gene therapy trial. Molecular Genetics and Metabolism. 129(2): S46-S47.
26. Kuzmin D A, et al. (2020) A Systematic Review of Clinical Safety and Efficacy of AAV Gene Therapies. Molecular Therapy. 28(4):559-559.
27. Rittie L, et al. (2019) The Landscape of Early Clinical Gene Therapies outside of Oncology. Molecular Therapy. 27(10):1706-1717.
28. Vidal P, et al. (2018) Rescue of GSDIII Phenotype with Gene Transfer Requires Liver- and Muscle-Targeted GDE Expression. Mol Ther. 26(3):890-901.
29. Hinderer C, et al. (2018) Severe Toxicity in Nonhuman Primates and Piglets Following High-Dose Intravenous Administration of an Adeno-Associated Virus Vector Expressing Human SMN. Human Gene Therapy. 29(3): 285-298.
30. Feldman A G, et al. (2020) Subacute Liver Failure Following Gene Replacement Therapy for Spinal Muscular Atrophy Type 1. J Pediatr.
31. Lee C S, et al. (2017) Adenovirus-mediated gene delivery: Potential applications for gene and cell-based therapies in the new era of personalized medicine. Genes & Diseases. 4(2):43-63.
32. Carbonaro-Sarracino, D. A., et al. (2020) Dosing and Re-Administration of Lentiviral Vector for In Vivo Gene Therapy in Rhesus Monkeys and ADA-Deficient Mice. Mol Ther Methods Clin Dev. 16:78-93.
33. Themis M, et al. (2005) Oncogenesis following delivery of a nonprimate lentiviral gene therapy vector to fetal and neonatal mice. Mol Ther. 12(4):763-71.
34. Escors D. et al. (2010) Lentiviral Vectors in Gene Therapy: Their Current Status and Future Potential. Archivum Immunologiae Et Therapiae Experimentalis. 58(2):107-119.
35. Lim J A, et al. (2020) A Novel Gene Therapy Approach for GSD III Using an AAV Vector Encoding a Bacterial Glycogen Debranching Enzyme. Mol Ther Methods Clin Dev. 18:240-249.
36. Taylor C, et al. (1975) Debranching enzyme from rabbit skeletal muscle. Purification, properties and physiological role. Eur J Biochem. 51(1):105-15.
37. Zhai L, et al. (2016) Crystal structure of glycogen debranching enzyme and insights into its catalysis and disease-causing mutations. Nat Commun. 7:11229.
38. Bates E J, et al. (1975) Debranching enzyme from rabbit skeletal muscle; evidence for the location of two active centres on a single polypeptide chain. FEBS Lett. 58(1): 181-5.
39. Shim J H, et al. (2009) Role of maltogenic amylase and pullulanase in maltodextrin and glycogen metabolism of *Bacillus subtilis* 168. J Bacteriol. 191(15):4835-44.
40. Sluiter W, et al. (2012) Rapid ultraperformance liquid chromatography-tandem mass spectrometry assay for a characteristic glycogen-derived tetrasaccharide in Pompe disease and other glycogen storage diseases. Clin Chem. 58(7):1139-47.
41. Brooks E D, et al. (2016) Natural Progression of Canine Glycogen Storage Disease Type IIIa. Comp Med. 66(1): 41-51.
42. Mingozzi F, et al. (2003) Induction of immune tolerance to coagulation factor IX antigen by in vivo hepatic gene transfer. Journal of Clinical Investigation. 111(9):1347-1356.
43. Dobrzynski E, et al. (2006) Prevention of cytotoxic T lymphocyte responses to factor IX-expressing hepatocytes by gene transfer-induced regulatory T cells. Proceedings of the National Academy of Sciences of the United States of America. 103(12):4592-4597.
44. Cao O, et al. (2009) P. A. Loduca, and R. W. Herzog, Role of regulatory T cells in tolerance to coagulation factors. Journal of Thrombosis and Haemostasis. 7:88-91.
45. McIntosh J, et al. (2013) Therapeutic levels of FVIII following a single peripheral vein administration of rAAV vector encoding a novel human factor VIII variant. Blood. 121(17): 3335-44.
46. Keeler G D, et al. (2019) Liver induced transgene tolerance with AAV vectors. Cell Immunol. 342:103728.
47. Zhang P, et al. (2012) Immunodominant liver-specific expression suppresses transgene-directed immune responses in murine pompe disease. Hum Gene Ther. 23(5):460-72.
48. Franco L M, et al. (2005) Evasion of immune responses to introduced human acid alpha-glucosidase by liver-restricted expression in glycogen storage disease type II. Mol Ther. 12(5):876-84.
49. Koeberl D, et al. (2020) A phase 1 study of gene therapy with ACTUS-101 in late-onset Pompe disease. Mol Genet Metab. 129(2): S91.
50. Kishnani P S, et al. (2019) Liver depot gene therapy for Pompe disease. Ann Transl Med. 7(13):288.

51. Wang L, et al. (2000) Sustained expression of therapeutic level of factor IX in hemophilia B dogs by AAV-mediated gene therapy in liver. Mol Ther. 1(2):154-8.
52. Wang L, et al. (1999) Sustained correction of bleeding disorder in hemophilia B mice by gene therapy. Proc Natl Acad Sci U S A. 96(7):3906-10.
53. Ill C R, et al. (1997) Optimization of the human factor VIII complementary DNA expression plasmid for gene therapy of hemophilia A. Blood Coagul Fibrinolysis. 8 Suppl 2:S23-30.
54. Thomas J, et al. (2018) Pegvaliase for the treatment of phenylketonuria: Results of a long-term phase 3 clinical trial program (PRISM). Mol Genet Metab. 124(1):27-38.
55. Harding C O, et al. (2018) Pegvaliase for the treatment of phenylketonuria: A pivotal, double-blind randomized discontinuation Phase 3 clinical trial. Mol Genet Metab. 124(1):20-26.
56. Gupta S, et al. (2018) Association of immune response with efficacy and safety outcomes in adults with phenylketonuria administered pegvaliase in phase 3 clinical trials. EBioMedicine. 37:366-373.
57. Bell P, et al. (2011) Evaluation of adeno-associated viral vectors for liver-directed gene transfer in dogs. Hum Gene Ther. 22(8):985-97.
58. Wright J F, et al. (2020) Codon Modification and PAMPs in Clinical AAV Vectors: The Tortoise or the Hare? Molecular Therapy. 28(3):701-703.
59. Zhu J G, et al. (2009) The TLR9-MyD88 pathway is critical for adaptive immune responses to adeno-associated virus gene therapy vectors in mice. Journal of Clinical Investigation. 119(8):2388-2398.
60. Rogers G L, et al. (2015) Unique Roles of TLR9-and MyD88-Dependent and -Independent Pathways in Adaptive Immune Responses to AAV-Mediated Gene Transfer. Journal of Innate Immunity. 7(3):302-314.
61. Rogers G L, et al. (2013) Innate immune responses to AAV vectors. Frontiers in Microbiology, 011. 2.
62. Faust S M, et al. (2013) CpG-depleted adeno-associated virus vectors evade immune detection. J Clin Invest. 123(7):2994-3001.
63. Gonzalez T J, et al. (2020) Cross-Species Evolution of Synthetic AAV Strains for Clinical Translation. Molecular Therapy. 28(4S1):12-13.
64. Barzi M, et al. (2017) A novel humanized mouse lacking murine P450 oxidoreductase for studying human drug metabolism. Nat Commun. 8(1):39.
65. Bissig-Choisat B, et al. (2015), Development and rescue of human familial hypercholesterolaemia in a xenograft mouse model. Nat Commun. 6:7339.
66. Bissig K D, et al. (2010) Human liver chimeric mice provide a model for hepatitis B and C virus infection and treatment. J Clin Invest. 120(3):924-30.
67. Bissig K D, et al. (2007) Repopulation of adult and neonatal mice with human hepatocytes: a chimeric animal model. Proc Natl Acad Sci U S A. 104(51):20507-11.
68. Gregory B L, et al. (2007) Glycogen storage disease type IIIa in curly-coated retrievers. J Vet Intern Med. 21(1): 40-6.
69. Yi H, et al. (2012) Characterization of a canine model of glycogen storage disease type IIIa. Dis Model Mech. 5(6):804-11.
70. Mack D L, et al. (2017) Systemic AAV8-Mediated Gene Therapy Drives Whole-Body Correction of Myotubular Myopathy in Dogs. Molecular Therapy. 25(4):839-854.
71. Manno C S, et al. (2006) Successful transduction of liver in hemophilia by AAV-Factor IX and limitations imposed by the host immune response (vol 12, pg 342, 2006). Nature Medicine. 12(5):592-592.
72. Wang Z J, et al. (2012) Analyzing Cellular Immunity to AAV in a Canine Model Using ELISPOT Assay. Handbook of Elispot: Methods and Protocols. Second Edition. 792:65-74.
73. Martino A T, et al., Measuring Immune Responses to Recombinant AAV Gene Transfer. Adeno-Associated Virus: Methods and Protocols. 807:259-272.
74. Sun, B., et al. (2005) Correction of glycogen storage disease type II by an adeno-associated virus vector containing a muscle-specific promoter. Mol Ther. 11(6):889-98.
75. Wang Z., et al. (2007) Sustained AAV-mediated dystrophin expression in a canine model of Duchenne muscular dystrophy with a brief course of immunosuppression. Mol Ther. 15(6): 1160-6.
76. Sun B D, et al. (2013) Alglucosidase alfa enzyme replacement therapy as a therapeutic approach for glycogen storage disease type III. Molecular Genetics and Metabolism. 108(2): 145-147.
77. Kimura T. et al. (2019) Production of adeno-associated virus vectors for in vitro and in vivo applications. Sci Rep. 9(1):13601.
78. Mitchell A M et al. (2013) Mechanistic Insights into the Enhancement of Adeno-Associated Virus Transduction by Proteasome Inhibitors. Journal of Virology. 87(23): 13035-13041.
79. Ponder K P, et al. (1991) Mouse Hepatocytes Migrate to Liver Parenchyma and Function Indefinitely after Intrasplenic Transplantation. Proceedings of the National Academy of Sciences of the United States of America. 88(4):1217-1221.
80. Pankowicz F P, et al. (2018) Rapid Disruption of Genes Specifically in Livers of Mice Using Multiplex CRISPR/Cas9 Editing. Gastroenterology. 155(6):1967-+.
81. Lim J A, et al. (2018) A Single Intravenous Injection of an AAV-PHP. B Vector Encoding Human Acid alpha-Glucosidase Corrects Both Muscle and Brain Defects in Murine Pompe Disease. Molecular Therapy. 26(5): 382-383.
82. Young S P, et al. (2003) Analysis of a glucose tetrasaccharide elevated in Pompe disease by stable isotope dilution-electrospray ionization tandem mass spectrometry. Anal Biochem. 316(2): 175-80.
83. Mount J D, et al. (2002) Sustained phenotypic correction of hemophilia B dogs with a factor IX null mutation by liver-directed gene therapy. Blood. 99(8):2670-6.
84. Callan M B, et al. (2016) Successful Phenotype Improvement following Gene Therapy for Severe Hemophilia A in Privately Owned Dogs. PLoS One. 11(3): e0151800.
85. Crudele J M, et al. (2015) AAV liver expression of FIX-Padua prevents and eradicates FIX inhibitor without increasing thrombogenicity in hemophilia B dogs and mice. Blood. 125(10):1553-61.
86. Chao H, et al. (1999) Persistent expression of canine factor IX in hemophilia B canines. Gene Ther. 6(10): 1695-704.
87. Shin J H, et al. (2013) Microdystrophin Ameliorates Muscular Dystrophy in the Canine Model of Duchenne Muscular Dystrophy. Molecular Therapy. 21(4):750-757.

88. Childers M K, et al. (2014) Gene therapy prolongs survival and restores function in murine and canine models of myotubular myopathy. Sci Transl Med. 6(220):220ra10.
89. Dupont J B, et al. (2020) AAV-Mediated Gene Transfer Restores a Normal Muscle Transcriptome in a Canine Model of X-Linked Myotubular Myopathy. Molecular Therapy. 28(2):382-393.
90. Sun B, et al. (2010) Immunomodulatory gene therapy prevents antibody formation and lethal hypersensitivity reactions in murine pompe disease. Mol Ther. 18(2):353-60.
91. Sun B, et al. (2008) Correction of multiple striated muscles in murine Pompe disease through adeno-associated virus-mediated gene therapy. Mol Ther. 16(8):1366-71.
92. Yi H, et al. (2017) Systemic Correction of Murine Glycogen Storage Disease Type IV by an AAV-Mediated Gene Therapy. Hum Gene Ther. 28(3):286-294.
93. Koeberl D D, et al. (2008) AAV vector-mediated reversal of hypoglycemia in canine and murine glycogen storage disease type Ia. Mol Ther. 16(4):665-72.

What is claimed is:

1. An isolated nucleic acid molecule, comprising:
   a nucleic acid sequence comprising at least 70% identity to the sequence set forth in SEQ ID NO: 04,
   wherein the nucleic acid sequence encodes a microbial polypeptide capable of preventing glycogen accumulation and/or degrading accumulated glycogen, and
   wherein the nucleic acid sequence is CpG-depleted and codon-optimized for expression in a human or a mammalian cell.

2. The isolated nucleic acid molecule of claim 1, wherein the encoded microbial polypeptide comprises a type I Pullulanase from *Bacillus subtilis*.

3. An AAV vector comprising the isolated nucleic acid molecule of claim 1.

4. The vector of claim 3, wherein the AAV vector is an AAV9 vector.

5. The vector of claim 3, wherein the vector comprises a tissue-specific promoter operably linked to the isolated nucleic acid molecule.

6. The vector of claim 5, wherein the tissue-specific promoter is a liver-specific promoter.

7. The vector of claim 3, wherein the vector comprises an immunotolerant dual promoter operably linked to the isolated nucleic acid molecule.

8. The vector of claim 7, wherein the immunotolerant dual promoter comprises (i) a liver-specific promoter and a ubiquitous promoter or (ii) a liver-specific promoter and a muscle-specific promoter.

9. The vector of claim 7, wherein the immunotolerant dual promoter comprises a sequence having at least 70% identity to the sequence set forth in SEQ ID NO: 05.

* * * * *

SEQUENCE LISTING

```
<160> NUMBER OF SEQ ID NOS: 21

<210> SEQ ID NO 1
<211> LENGTH: 718
<212> TYPE: PRT
<213> ORGANISM: Artificial Sequence
<220> FEATURE:
<223> OTHER INFORMATION: Synthetic

<400> SEQUENCE: 1

Met Val Ser Ile Arg Arg Ser Phe Glu Ala Tyr Val Asp Asp Met Asn
1               5                   10                  15

Ile Ile Thr Val Leu Ile Pro Ala Glu Gln Lys Glu Ile Met Thr Pro
            20                  25                  30

Pro Phe Arg Leu Glu Thr Glu Ile Thr Asp Phe Pro Leu Ala Val Arg
        35                  40                  45

Glu Glu Tyr Ser Leu Glu Ala Lys Tyr Lys Tyr Val Cys Val Ser Asp
    50                  55                  60

His Pro Val Thr Phe Gly Lys Ile His Cys Val Arg Ala Ser Ser Gly
65                  70                  75                  80

His Lys Thr Asp Leu Gln Ile Gly Ala Val Ile Arg Thr Ala Ala Phe
                85                  90                  95

Asp Asp Glu Phe Tyr Tyr Asp Gly Glu Leu Gly Ala Val Tyr Thr Ala
            100                 105                 110

Asp His Thr Val Phe Lys Val Trp Ala Pro Ala Ala Thr Ser Ala Ala
        115                 120                 125

Val Lys Leu Ser His Pro Asn Lys Ser Gly Arg Thr Phe Gln Met Thr
    130                 135                 140

Arg Leu Glu Lys Gly Val Tyr Ala Val Thr Val Thr Gly Asp Leu His
145                 150                 155                 160

Gly Tyr Glu Tyr Leu Phe Cys Ile Cys Asn Asn Ser Glu Trp Met Glu
                165                 170                 175

Thr Val Asp Gln Tyr Ala Lys Ala Val Thr Val Asn Gly Glu Lys Gly
            180                 185                 190

Val Val Leu Arg Pro Asp Gln Met Lys Trp Thr Ala Pro Leu Lys Pro
        195                 200                 205

Phe Ser His Pro Val Asp Ala Val Ile Tyr Glu Thr His Leu Arg Asp
    210                 215                 220

Phe Ser Ile His Glu Asn Ser Gly Met Ile Asn Lys Gly Lys Tyr Leu
225                 230                 235                 240

Ala Leu Thr Glu Thr Asp Thr Gln Thr Ala Asn Gly Ser Ser Ser Gly
                245                 250                 255

Leu Ala Tyr Val Lys Glu Leu Gly Val Thr His Val Glu Leu Leu Pro
            260                 265                 270

Val Asn Asp Phe Ala Gly Val Asp Glu Glu Lys Pro Leu Asp Ala Tyr
```

-continued

```
                275                 280                 285
Asn Trp Gly Tyr Asn Pro Leu His Phe Phe Ala Pro Glu Gly Ser Tyr
290                 295                 300
Ala Ser Asn Pro His Asp Pro Gln Thr Arg Lys Thr Glu Leu Lys Gln
305                 310                 315                 320
Met Ile Asn Thr Leu His Gln His Gly Leu Arg Val Ile Leu Asp Val
                325                 330                 335
Val Phe Asn His Val Tyr Lys Arg Glu Asn Ser Pro Phe Glu Lys Thr
            340                 345                 350
Val Pro Gly Tyr Phe Phe Arg His Asp Glu Cys Gly Met Pro Ser Asn
            355                 360                 365
Gly Thr Gly Val Gly Asn Asp Ile Ala Ser Glu Arg Arg Met Ala Arg
        370                 375                 380
Lys Phe Ile Ala Asp Cys Val Val Tyr Trp Leu Glu Glu Tyr Asn Val
385                 390                 395                 400
Asp Gly Phe Arg Phe Asp Leu Leu Gly Ile Leu Asp Ile Asp Thr Val
                405                 410                 415
Leu Tyr Met Lys Glu Lys Ala Thr Lys Ala Lys Pro Gly Ile Leu Leu
            420                 425                 430
Phe Gly Glu Gly Trp Asp Leu Ala Thr Pro Leu Pro His Glu Gln Lys
        435                 440                 445
Ala Ala Leu Ala Asn Ala Pro Arg Met Pro Gly Ile Gly Phe Phe Asn
450                 455                 460
Asp Met Phe Arg Asp Ala Val Lys Gly Asn Thr Phe His Leu Lys Ala
465                 470                 475                 480
Thr Gly Phe Ala Leu Gly Asn Gly Glu Ser Ala Gln Ala Val Met His
                485                 490                 495
Gly Ile Ala Gly Ser Ser Gly Trp Lys Ala Leu Ala Pro Ile Val Pro
            500                 505                 510
Glu Pro Ser Gln Ser Ile Asn Tyr Val Glu Ser His Asp Asn His Thr
        515                 520                 525
Phe Trp Asp Lys Met Ser Phe Ala Leu Pro Gln Glu Asn Asp Ser Arg
    530                 535                 540
Lys Arg Ser Arg Gln Arg Leu Ala Ala Ala Ile Ile Leu Leu Ala Gln
545                 550                 555                 560
Gly Val Pro Phe Ile His Ser Gly Gln Glu Phe Phe Arg Thr Lys Gln
                565                 570                 575
Gly Val Glu Asn Ser Tyr Gln Ser Ser Asp Ser Ile Asn Gln Leu Asp
            580                 585                 590
Trp Asp Arg Arg Glu Thr Phe Lys Glu Asp Val His Tyr Ile Arg Arg
        595                 600                 605
Leu Ile Ser Leu Arg Lys Ala His Pro Ala Phe Arg Leu Arg Ser Ala
    610                 615                 620
Ala Asp Ile Gln Arg His Leu Glu Cys Leu Thr Leu Lys Glu His Leu
625                 630                 635                 640
Ile Ala Tyr Arg Leu Tyr Asp Leu Asp Glu Val Asp Glu Trp Lys Asp
                645                 650                 655
Ile Ile Val Ile His His Ala Ser Pro Asp Ser Val Glu Trp Arg Leu
            660                 665                 670
Pro Asn Asp Ile Pro Tyr Arg Leu Leu Cys Asp Pro Ser Gly Phe Gln
        675                 680                 685
Glu Asp Pro Thr Glu Ile Lys Lys Thr Val Ala Val Asn Gly Ile Gly
    690                 695                 700
```

```
Thr Val Ile Leu Tyr Leu Ala Ser Asp Leu Lys Ser Phe Ala
705                 710                 715

<210> SEQ ID NO 2
<211> LENGTH: 1532
<212> TYPE: PRT
<213> ORGANISM: Artificial Sequence
<220> FEATURE:
<223> OTHER INFORMATION: Synthetic

<400> SEQUENCE: 2

Met Gly His Ser Lys Gln Ile Arg Ile Leu Leu Asn Glu Met Glu
1               5                   10                  15

Lys Leu Glu Lys Thr Leu Phe Arg Leu Glu Gln Gly Tyr Glu Leu Gln
                20                  25                  30

Phe Arg Leu Gly Pro Thr Leu Gln Gly Lys Ala Val Thr Val Tyr Thr
            35                  40                  45

Asn Tyr Pro Phe Pro Gly Glu Thr Phe Asn Arg Glu Lys Phe Arg Ser
        50                  55                  60

Leu Asp Trp Glu Asn Pro Thr Glu Arg Glu Asp Ser Asp Lys Tyr
65                  70                  75                  80

Cys Lys Leu Asn Leu Gln Gln Ser Gly Ser Phe Gln Tyr Tyr Phe Leu
                85                  90                  95

Gln Gly Asn Glu Lys Ser Gly Gly Tyr Ile Val Val Asp Pro Ile
            100                 105                 110

Leu Arg Val Gly Ala Asp Asn His Val Leu Pro Leu Asp Cys Val Thr
        115                 120                 125

Leu Gln Thr Phe Leu Ala Lys Cys Leu Gly Pro Phe Asp Glu Trp Glu
130                 135                 140

Ser Arg Leu Arg Val Ala Lys Glu Ser Gly Tyr Asn Met Ile His Phe
145                 150                 155                 160

Thr Pro Leu Gln Thr Leu Gly Leu Ser Arg Ser Cys Tyr Ser Leu Ala
                165                 170                 175

Asn Gln Leu Glu Leu Asn Pro Asp Phe Ser Arg Pro Asn Arg Lys Tyr
            180                 185                 190

Thr Trp Asn Asp Val Gly Gln Leu Val Glu Lys Leu Lys Lys Glu Trp
        195                 200                 205

Asn Val Ile Cys Ile Thr Asp Val Val Tyr Asn His Thr Ala Ala Asn
    210                 215                 220

Ser Lys Trp Ile Gln Glu His Pro Glu Cys Ala Tyr Asn Leu Val Asn
225                 230                 235                 240

Ser Pro His Leu Lys Pro Ala Trp Val Leu Asp Arg Ala Leu Trp Arg
                245                 250                 255

Phe Ser Cys Asp Val Ala Glu Gly Lys Tyr Lys Glu Lys Gly Ile Pro
            260                 265                 270

Ala Leu Ile Glu Asn Asp His His Met Asn Ser Ile Arg Lys Ile Ile
        275                 280                 285

Trp Glu Asp Ile Phe Pro Lys Leu Lys Leu Trp Glu Phe Phe Gln Val
    290                 295                 300

Asp Val Asn Lys Ala Val Glu Gln Phe Arg Arg Leu Leu Thr Gln Glu
305                 310                 315                 320

Asn Arg Arg Val Thr Lys Ser Asp Pro Asn Gln His Leu Thr Ile Ile
                325                 330                 335

Gln Asp Pro Glu Tyr Arg Arg Phe Gly Cys Thr Val Asp Met Asn Ile
            340                 345                 350
```

```
Ala Leu Thr Thr Phe Ile Pro His Asp Lys Gly Pro Ala Ile Glu
            355                 360                 365

Glu Cys Cys Asn Trp Phe His Lys Arg Met Glu Glu Leu Asn Ser Glu
370                 375                 380

Lys His Arg Leu Ile Asn Tyr His Gln Glu Gln Ala Val Asn Cys Leu
385                 390                 395                 400

Leu Gly Asn Val Phe Tyr Glu Arg Leu Ala Gly His Gly Pro Lys Leu
                405                 410                 415

Gly Pro Val Thr Arg Lys His Pro Leu Val Thr Arg Tyr Phe Thr Phe
                420                 425                 430

Pro Phe Glu Glu Ile Asp Phe Ser Met Glu Ser Met Ile His Leu
            435                 440                 445

Pro Asn Lys Ala Cys Phe Leu Met Ala His Asn Gly Trp Val Met Gly
            450                 455                 460

Asp Asp Pro Leu Arg Asn Phe Ala Glu Pro Gly Ser Glu Val Tyr Leu
465                 470                 475                 480

Arg Arg Glu Leu Ile Cys Trp Gly Asp Ser Val Lys Leu Arg Tyr Gly
                485                 490                 495

Asn Lys Pro Glu Asp Cys Pro Tyr Leu Trp Ala His Met Lys Lys Tyr
                500                 505                 510

Thr Glu Ile Thr Ala Thr Tyr Phe Gln Gly Val Arg Leu Asp Asn Cys
            515                 520                 525

His Ser Thr Pro Leu His Val Ala Glu Tyr Met Leu Asp Ala Ala Arg
            530                 535                 540

Asn Leu Gln Pro Asn Leu Tyr Val Val Ala Glu Leu Phe Thr Gly Ser
545                 550                 555                 560

Glu Asp Leu Asp Asn Val Phe Val Thr Arg Leu Gly Ile Ser Ser Leu
                565                 570                 575

Ile Arg Glu Ala Met Ser Ala Tyr Asn Ser His Glu Glu Gly Arg Leu
            580                 585                 590

Val Tyr Arg Tyr Gly Gly Glu Pro Val Gly Ser Phe Val Gln Pro Cys
            595                 600                 605

Leu Arg Pro Leu Met Pro Ala Ile Ala His Ala Leu Phe Met Asp Ile
            610                 615                 620

Thr His Asp Asn Glu Cys Pro Ile Val His Arg Ser Ala Tyr Asp Ala
625                 630                 635                 640

Leu Pro Ser Thr Thr Ile Val Ser Met Ala Cys Cys Ala Ser Gly Ser
                645                 650                 655

Thr Arg Gly Tyr Asp Glu Leu Val Pro His Gln Ile Ser Val Val Ser
                660                 665                 670

Glu Glu Arg Phe Tyr Thr Lys Trp Asn Pro Glu Ala Leu Pro Ser Asn
            675                 680                 685

Thr Gly Glu Val Asn Phe Gln Ser Gly Ile Ile Ala Ala Arg Cys Ala
690                 695                 700

Ile Ser Lys Leu His Gln Glu Leu Gly Ala Lys Gly Phe Ile Gln Val
705                 710                 715                 720

Tyr Val Asp Gln Val Asp Glu Asp Ile Val Ala Val Thr Arg His Ser
                725                 730                 735

Pro Ser Ile His Gln Ser Val Val Ala Val Ser Arg Thr Ala Phe Arg
                740                 745                 750

Asn Pro Lys Thr Ser Phe Tyr Ser Lys Glu Val Pro Gln Met Cys Ile
            755                 760                 765
```

-continued

Pro Gly Lys Ile Glu Glu Val Val Leu Glu Ala Arg Thr Ile Glu Arg
770                 775                 780

Asn Thr Lys Pro Tyr Arg Lys Asp Glu Asn Ser Ile Asn Gly Thr Pro
785                 790                 795                 800

Asp Ile Thr Val Glu Ile Arg Glu His Ile Gln Leu Asn Glu Ser Lys
                805                 810                 815

Ile Val Lys Gln Ala Gly Val Ala Thr Lys Gly Pro Asn Glu Tyr Ile
            820                 825                 830

Gln Glu Ile Glu Phe Glu Asn Leu Ser Pro Gly Ser Val Ile Ile Phe
        835                 840                 845

Arg Val Ser Leu Asp Pro His Ala Gln Val Ala Val Gly Ile Leu Arg
    850                 855                 860

Asn His Leu Thr Gln Phe Ser Pro His Phe Lys Ser Gly Ser Leu Ala
865                 870                 875                 880

Val Asp Asn Ala Asp Pro Ile Leu Lys Ile Pro Phe Ala Ser Leu Ala
                885                 890                 895

Ser Arg Leu Thr Leu Ala Glu Leu Asn Gln Ile Leu Tyr Arg Cys Glu
            900                 905                 910

Ser Glu Glu Lys Glu Asp Gly Gly Cys Tyr Asp Ile Pro Asn Trp
        915                 920                 925

Ser Ala Leu Lys Tyr Ala Gly Leu Gln Gly Leu Met Ser Val Leu Ala
    930                 935                 940

Glu Ile Arg Pro Lys Asn Asp Leu Gly His Pro Phe Cys Asn Asn Leu
945                 950                 955                 960

Arg Ser Gly Asp Trp Met Ile Asp Tyr Val Ser Asn Arg Leu Ile Ser
                965                 970                 975

Arg Ser Gly Thr Ile Ala Glu Val Gly Lys Trp Leu Gln Ala Met Phe
            980                 985                 990

Phe Tyr Leu Lys Gln Ile Pro Arg Tyr Leu Ile Pro Cys Tyr Phe Asp
        995                 1000                1005

Ala Ile Leu Ile Gly Ala Tyr Thr Thr Leu Leu Asp Thr Ala Trp
    1010                1015                1020

Lys Gln Met Ser Ser Phe Val Gln Asn Gly Ser Thr Phe Val Lys
    1025                1030                1035

His Leu Ser Leu Gly Ser Val Gln Leu Cys Gly Val Gly Lys Phe
    1040                1045                1050

Pro Ser Leu Pro Ile Leu Ser Pro Ala Leu Met Asp Val Pro Tyr
    1055                1060                1065

Arg Leu Asn Glu Ile Thr Lys Glu Lys Glu Gln Cys Cys Val Ser
    1070                1075                1080

Leu Ala Ala Gly Leu Pro His Phe Ser Ser Gly Ile Phe Arg Cys
    1085                1090                1095

Trp Gly Arg Asp Thr Phe Ile Ala Leu Arg Gly Ile Leu Leu Ile
    1100                1105                1110

Thr Gly Arg Tyr Val Glu Ala Arg Asn Ile Ile Leu Ala Phe Ala
    1115                1120                1125

Gly Thr Leu Arg His Gly Leu Ile Pro Asn Leu Leu Gly Glu Gly
    1130                1135                1140

Ile Tyr Ala Arg Tyr Asn Cys Arg Asp Ala Val Trp Trp Trp Leu
    1145                1150                1155

Gln Cys Ile Gln Asp Tyr Cys Lys Met Val Pro Asn Gly Leu Asp
    1160                1165                1170

Ile Leu Lys Cys Pro Val Ser Arg Met Tyr Pro Thr Asp Asp Ser

```
                1175                1180                1185

Ala Pro Leu Pro Ala Gly Thr Leu Asp Gln Pro Leu Phe Glu Val
    1190                1195                1200

Ile Gln Glu Ala Met Gln Lys His Met Gln Gly Ile Gln Phe Arg
    1205                1210                1215

Glu Arg Asn Ala Gly Pro Gln Ile Asp Arg Asn Met Lys Asp Glu
    1220                1225                1230

Gly Phe Asn Ile Thr Ala Gly Val Asp Glu Thr Gly Phe Val
    1235                1240                1245

Tyr Gly Gly Asn Arg Phe Asn Cys Gly Thr Trp Met Asp Lys Met
    1250                1255                1260

Gly Glu Ser Asp Arg Ala Arg Asn Arg Gly Ile Pro Ala Thr Pro
    1265                1270                1275

Arg Asp Gly Ser Ala Val Glu Ile Val Gly Leu Ser Lys Ser Ala
    1280                1285                1290

Val Arg Trp Leu Leu Glu Leu Ser Lys Lys Asn Ile Phe Pro Tyr
    1295                1300                1305

His Glu Val Thr Val Lys Arg His Gly Lys Ala Ile Lys Val Ser
    1310                1315                1320

Tyr Asp Glu Trp Asn Arg Lys Ile Gln Asp Asn Phe Glu Lys Leu
    1325                1330                1335

Phe His Val Ser Glu Asp Pro Ser Asp Leu Asn Glu Lys His Pro
    1340                1345                1350

Asn Leu Val His Lys Arg Gly Ile Tyr Lys Asp Ser Tyr Gly Ala
    1355                1360                1365

Ser Ser Pro Trp Cys Asp Tyr Gln Leu Arg Pro Asn Phe Thr Ile
    1370                1375                1380

Ala Met Val Val Ala Pro Glu Leu Phe Thr Thr Glu Lys Ala Trp
    1385                1390                1395

Lys Ala Leu Glu Ile Ala Glu Lys Lys Leu Leu Gly Pro Leu Gly
    1400                1405                1410

Met Lys Thr Leu Asp Pro Asp Asp Met Val Tyr Cys Gly Ile Tyr
    1415                1420                1425

Asp Asn Ala Leu Asp Asn Asp Asn Tyr Asn Leu Ala Lys Gly Phe
    1430                1435                1440

Asn Tyr His Gln Gly Pro Glu Trp Leu Trp Pro Ile Gly Tyr Phe
    1445                1450                1455

Leu Arg Ala Lys Leu Tyr Phe Ser Arg Leu Met Gly Pro Glu Thr
    1460                1465                1470

Thr Ala Lys Thr Ile Val Leu Val Lys Asn Val Leu Ser Arg His
    1475                1480                1485

Tyr Val His Leu Glu Arg Ser Pro Trp Lys Gly Leu Pro Glu Leu
    1490                1495                1500

Thr Asn Glu Asn Ala Gln Tyr Cys Pro Phe Ser Cys Glu Thr Gln
    1505                1510                1515

Ala Trp Ser Ile Ala Thr Ile Leu Glu Thr Leu Tyr Asp Leu
    1520                1525                1530

<210> SEQ ID NO 3
<211> LENGTH: 2157
<212> TYPE: DNA
<213> ORGANISM: Artificial Sequence
<220> FEATURE:
<223> OTHER INFORMATION: Synthetic
```

<400> SEQUENCE: 3

```
atggtcagca tccgccgcag cttcgaagcg tatgtcgatg acatgaatat cattactgtt      60
ctgattcctg ctgaacaaaa ggaaatcatg acaccgccgt ttcggcttga cagagaaata     120
acagattttc ctctggctgt cagggaggaa tactcccttg aagcaaaata caagtacgtc     180
tgcgtatccg accatcctgt gacatttgga aaaatccatt gcgtcagagc atccagcggc     240
cacaaaacgg atctccaaat tggcgcggtc atccggacgg cagcgtttga tgacgaattt     300
tattatgacg gagagctggg cgccgtttat accgcggatc ataccgtatt taaagtatgg     360
gcgcctgctg caacctcagc tgctgtcaag cttttcacacc ccaataaaag cgggcgcaca     420
ttccaaatga ctcgcttgga aaaggcgtc tatgccgtta cggtcacagg tgaccttcac      480
ggatatgagt atttgttttg catctgcaac aattcagaat ggatggaaac agttgaccag     540
tatgccaagg ctgtgactgt aaatggagag aagggcgtcg tcttgcgccc ggatcaaatg     600
aaatggactg ctcctcttaa accattctca caccctgtgg atgccgtcat ctatgagacg     660
catcttcgcg acttctccat ccatgaaaac agcggcatga taaacaaggg aaaatactta     720
gcgctgacgg aaactgatac acaaaccgca atggcagtt cttcgggatt agcgtatgta      780
aaagagcttg tgtgtgacaca tgtggagctt ctgccggtga atgattttgc cggagttgat    840
gaagagaagc cgcttgatgc atacaattgg ggatataacc cgcttcattt ctttgccccg     900
gagggaagct atgcctcaaa tcctcatgat cctcaaacga gaaaacaga gctgaaacaa      960
atgatcaata ccctgcatca gcacggtctg cgagtcattc tggatgttgt tttttaaccat   1020
gtgtataaga gggagaattc ccccttgaa aagacagtgc ccggttattt tttccggcac     1080
gacgaatgtg ggatgccatc aaacggcacc ggcgttggca atgatattgc atcagaaaga    1140
aggatggcaa gaaaattcat tgcggattgc gtggtctatt ggcttgaaga atacaatgtt    1200
gacggcttcc gctttgatct cctcgggatt ttagatattg acaccgtgct ttatatgaaa    1260
gagaaagcaa ctaaggcaaa gcccggaatc ctgcttttg gagaagggtg ggacctggct     1320
acaccgctgc cgcatgaaca gaaagctgct ttggcgaacg cgccaagaat gccgggcatc    1380
ggcttttttta atgatatgtt tcgtgacgct gtaaaaggga acaccttca ccttaaggca     1440
acagggtttg cgctcggcaa cggtgaatca gcacaagctg tgatgcatgg aattgccggg    1500
tcttccggat ggaaggcatt agcaccgatt gttccggaac caagccagtc catcaattat    1560
gtcgaatcac acgacaatca ccccttttgg gataaaatga gctttgcgct tcctcaagaa    1620
aatgacagcc gaaagcgaag caggcaaagg cttcagccg cgattatttt gcttgcccaa     1680
ggggtgccgt ttattcacag cggccaggaa ttttttccgga cgaagcaggg agtggaaaac    1740
agctatcaat ccagtgacag catcaaccag ctcgactggg atcgccgtga acattcaaa    1800
gaagatgttc actatatccg caggctgatc tcgctgagaa aagcgcatcc tgcattccgt    1860
cttaggtccg ctgcagacat ccagcgccat cttgaatgct tgacgctaaa agaacacctt    1920
atcgcataca ggctttatga tcttgacgag gttgacgaat ggaaagatat cattgttatc    1980
catcacgcga gtccagactc cgtcgagtgg aggctgccaa acgacatacc ttatcggctt    2040
ttatgtgatc catcaggatt tcaggaagac ccaacagaaa tcaagaaaac ggttgcagta    2100
aacggcatcg gaacggttat cttatatta gcatcagatc ttaagagttt tgcttga       2157
```

<210> SEQ ID NO 4
<211> LENGTH: 2157
<212> TYPE: DNA
<213> ORGANISM: Artificial Sequence
<220> FEATURE:
<223> OTHER INFORMATION: Synthetic

<400> SEQUENCE: 4

```
atggtgagca tcagaagatc ctttgaggcc tatgtggatg atatgaacat catcacagtg      60
ctgatcccag ctgagcagaa ggagatcatg acaccccctt tcagactgga gacagagatc     120
acagactttc ccctggctgt gagagaggag tatagcctgg aggccaagta caagtatgtg     180
tgtgtgtctg accatcctgt gacctttggc aagatccact gtgtgagagc aagctctgga     240
cacaagacag acctgcagat tggagctgtg atcaggacag cagcctttga tgatgagttt     300
tactatgatg agagctggg agctgtgtac acagcagatc acacagtgtt caaggtctgg     360
gcaccagcag ccacatctgc tgcagtgaag ctgagccacc ccaacaagtc tggcaggacc     420
tttcagatga caagactgga aagggagtg tatgctgtga cagtgacagg agatctgcat     480
ggctatgagt atctgttctg catctgtaac aattctgagt ggatggagac agtggatcag     540
tatgccaagg ctgtgacagt gaatggagag aagggagtgg tgctgaggcc agaccagatg     600
aagtggacag cacccctgaa gcctttcagc caccctgtgg atgctgtgat ctatgagaca     660
cacctgagag attttttctat ccatgagaac tctggcatga tcaataaggg caagtacctg     720
gccctgacag agacagacac ccagacagcc aatggctcta gctctggcct ggcctatgtg     780
aaggagctgg gagtgaccca tgtggagctg ctgcctgtga atgactttgc tggagtggat     840
gaggagaagc cactggatgc ctacaactgg ggctataatc cactgcactt ctttgcccct     900
gagggctctt atgccagcaa cccacatgac ccccagacca ggaagacaga gctgaagcag     960
atgatcaata cactgcacca gcatggcctg agagtgatcc tggatgtggt gttcaaccat    1020
gtgtacaaga gagagaatag ccctttttgag aagacagtgc caggctattt ctttagacat    1080
gatgagtgtg gcatgccatc taatggcaca ggagtgggca tgatattgc ctctgagagg    1140
agaatggcca gaaagttcat tgctgactgt gtggtgtact ggctggagga gtataatgtg    1200
gatggcttca gatttgatct gctgggcatc ctggacattg atacagtgct gtacatgaag    1260
gagaaggcca caaaggccaa gccaggcatc ctgctgtttg gagagggatg ggacctggca    1320
acccactgc cacatgagca gaaggctgcc ctggcaaatg cacctaggat gccaggcatt    1380
ggcttcttca tgacatgtt tagagatgct gtgaagggca atccttcca cctgaaggcc    1440
acaggctttg cactgggaaa tggagagtct gcccaggctg tgatgcatgg aattgcagga    1500
tcttctggat ggaaggccct ggcaccaatt gtgcctgagc aagccagtc catcaactat    1560
gtggagtccc atgacaatca caccttctgg gataagatgt cttttgccct gcctcaggag    1620
aatgattcta ggaagagaag caggcagaga ctggcagcag caatcatcct gctggcccag    1680
ggagtgccat tcatccactc tggccaggag ttctttagaa ccaagcaggg agtggagaac    1740
tcctaccagt cctctgattc tatcaatcag ctggactggg ataggagaga gacattcaag    1800
gaggatgtgc actatatcag gagactgatc agcctgagaa aggcacaccc agcctttaga    1860
ctgagatctg ctgcagacat ccagaggcac ctggagtgcc tgaccctgaa ggagcacctg    1920
attgcctaca actgtatga cctggatgag gtggatgagt ggaaggatat cattgtgatc    1980
caccatgcct cccctgactc tgtggagtgg agactgccca tgatatccc ttacagactg    2040
ctgtgtgacc cctctggctt ccaggaggat cctacagaga tcaagaagac agtggctgtg    2100
aatggcattg gcacagtgat cctgtatctg gcctctgacc tgaagtcttt tgcctga    2157
```

<210> SEQ ID NO 5

```
<211> LENGTH: 1265
<212> TYPE: DNA
<213> ORGANISM: Artificial Sequence
<220> FEATURE:
<223> OTHER INFORMATION: Synthetic

<400> SEQUENCE: 5
gagttaattt ttaaaaagca gtcaaaagtc caagtggccc ttgcgagcat ttactctctc      60
tgtttgctct ggttaataat ctcaggagca caaaattcct tactagtcct agaagttaat     120
ttttaaaaag cagtcaaaag tccaagtcca agtggcccct gcgagcattt actctctctg     180
tttgctctgg ttaataatct caggagcaca acattcctt actagttcta gagcggccgc      240
cagtgtgctg gaattcggct tttttagggc tggaagctac ctttgacatc atctcctctg     300
cgaatgcatg tataatttct acagaaccta ttagaaagga tcacccagcc tctgcttttg     360
tacaactttc ccttaaaaaa ctgccaatcc cactgctgtt tggcccaata gtgagaactt     420
tttctgctgc ctcttggtgc ttttgcctat ggccccatt ctgctgctga agacactctt      480
gccagcatgg acttaaaccc ctccagctct gacaatcctc tttctctttt gttttacatg     540
aagggtctgg cagccaaagc aatcactcaa agttcaaacc ttatcatttt ttgctttgtt    600
cctcttggcc ttggttttgt acatcagctt tgaaaatacc atcccagggt taatgctggg     660
gttaatttat aactgagagt gctctagttt tgcaatacag gacatgctat aaaaatggct     720
taaggttccg cgttacataa cttacggtaa atggcccgcc tggctgaccg cccaacgacc     780
cccgcccatt gacgtcaata atgacgtatg ttcccatagt aacgccaata gggactttcc     840
attgacgtca atgggtggag tatttacggt aaactgccca cttggcagta catcaagtgt     900
atcatatgcc aagtacgccc cctattgacg tcaatgacgg taaatggccc gcctggcatt     960
atgcccagta catgacctta tgggactttc ctacttggca gtacatctac gtattagtca    1020
tcgctattac catgcatggt cgaggtgagc ccacgttct gcttcactct ccccatctcc     1080
cccccctccc cacccccaat tttgtattta ttatttttt aattattttg tgcagcgagg      1140
ggcggggcgg ggcgaggcgg agaggtgcgg cggcagccaa tcagagcggc gcgctccgaa    1200
agtttccttt tatggcgagg cggcggcgg ggcggcccta taaaaagcga agcgcgcggc     1260
gggcg                                                                1265

<210> SEQ ID NO 6
<211> LENGTH: 1372
<212> TYPE: DNA
<213> ORGANISM: Artificial Sequence
<220> FEATURE:
<223> OTHER INFORMATION: Synthetic

<400> SEQUENCE: 6
gagttaattt ttaaaaagca gtcaaaagtc caagtggccc ttgcgagcat ttactctctc      60
tgtttgctct ggttaataat ctcaggagca caaaattcct tactagtcct agaagttaat     120
ttttaaaaag cagtcaaaag tccaagtcca agtggcccct gcgagcattt actctctctg     180
tttgctctgg ttaataatct caggagcaca acattcctt actagttcta gagcggccgc      240
cagtgtgctg gaattcggct tttttagggc tggaagctac ctttgacatc atctcctctg     300
cgaatgcatg tataatttct acagaaccta ttagaaagga tcacccagcc tctgcttttg     360
tacaactttc ccttaaaaaa ctgccaatcc cactgctgtt tggcccaata gtgagaactt     420
ttttctgctg cctcttggtg cttttgccta tggcccctat tctgctgctg aagacactct     480
tgccagcatg gacttaaacc cctccagctc tgacaatcct ctttctcttt tgttttacat     540
```

```
gaagggtctg gcagccaaag caatcactca aagttcaaac cttatcattt tttgctttgt      600
tcctcttggc cttggttttg tacatcagct ttgaaaatac catcccaggg ttaatgctgg      660
ggttaattta taactgagag tgctctagtt ttgcaataca ggacatgcta taaaaatggc      720
ttaaggagtc aatgggaaaa acccattgga gccaagtaca ctgactcaat agggactttc      780
cattgggttt tgcccagtac ataaggtcaa taggggtgat gtcaacagga aagtcccatt      840
ggagccaagt acattgagtc aatagggact ttccaatggg ttttgcccag tacataaggt      900
caatgggagg taagccaatg ggttttttccc attactgaca tgtatactga gtcattaggg      960
actttccaat gggttttgcc cagtacataa ggtcaatagg ggtgaatcaa caggaaagtc     1020
ccattggagc caagtacact gagtcaatag ggactttcca ttgggttttg cccagtacaa     1080
aaggtcaata gggggtgagt caatgggttt ttcccattat ggcacatac ataaggtcaa      1140 tagggtgac tagtggagaa gagcatgctt gagggctgag tgcccctcag tgggcagaga       1200
gcacatggcc cacagtccct gagaagttgg ggggagggt gggcaattga actggtgcct       1260
agagaaggtg gggcttgggt aaactgggaa agtgatgtgg tgtactggct ccacctttt       1320 ccccagggtg ggggagaacc atatataagt gcagtagtct ctgtgaacat tc              1372

<210> SEQ ID NO 7
<211> LENGTH: 20
<212> TYPE: DNA
<213> ORGANISM: Artificial Sequence
<220> FEATURE:
<223> OTHER INFORMATION: Synthetic

<400> SEQUENCE: 7
agttctagag cggccgccag                                                   20

<210> SEQ ID NO 8
<211> LENGTH: 43
<212> TYPE: DNA
<213> ORGANISM: Artificial Sequence
<220> FEATURE:
<223> OTHER INFORMATION: Synthetic

<400> SEQUENCE: 8
ccccttaagc cattttata gcatgtcctg tattgcaaaa cta                           43

<210> SEQ ID NO 9
<211> LENGTH: 37
<212> TYPE: DNA
<213> ORGANISM: Artificial Sequence
<220> FEATURE:
<223> OTHER INFORMATION: Synthetic

<400> SEQUENCE: 9
ccccttaagg ttccgcgtta cataacttac ggtaaat                                 37

<210> SEQ ID NO 10
<211> LENGTH: 18
<212> TYPE: DNA
<213> ORGANISM: Artificial Sequence
<220> FEATURE:
<223> OTHER INFORMATION: Synthetic

<400> SEQUENCE: 10
gtcgacggta ccgcgcag                                                      18

<210> SEQ ID NO 11
```

```
<211> LENGTH: 20
<212> TYPE: DNA
<213> ORGANISM: Artificial Sequence
<220> FEATURE:
<223> OTHER INFORMATION: Synthetic

<400> SEQUENCE: 11
gccactggat gcctacaact                                                  20

<210> SEQ ID NO 12
<211> LENGTH: 20
<212> TYPE: DNA
<213> ORGANISM: Artificial Sequence
<220> FEATURE:
<223> OTHER INFORMATION: Synthetic

<400> SEQUENCE: 12
cgtgctggtg cagtgtattg                                                  20

<210> SEQ ID NO 13
<211> LENGTH: 20
<212> TYPE: DNA
<213> ORGANISM: Artificial Sequence
<220> FEATURE:
<223> OTHER INFORMATION: Synthetic

<400> SEQUENCE: 13
agagggaaat cgtgcgtgac                                                  20

<210> SEQ ID NO 14
<211> LENGTH: 21
<212> TYPE: DNA
<213> ORGANISM: Artificial Sequence
<220> FEATURE:
<223> OTHER INFORMATION: Synthetic

<400> SEQUENCE: 14
caatagtgat gacctggccg t                                                21

<210> SEQ ID NO 15
<211> LENGTH: 755
<212> TYPE: DNA
<213> ORGANISM: Artificial Sequence
<220> FEATURE:
<223> OTHER INFORMATION: Synthetic

<400> SEQUENCE: 15
gagttaattt ttaaaaagca gtcaaaagtc caagtggccc ttgcgagcat ttactctctc      60
tgtttgctct ggttaataat ctcaggagca caaaattcct tactagtcct agaagttaat     120
ttttaaaaag cagtcaaaag tccaagtcca agtggccctt gcgagcattt actctctctg     180
tttgctctgg ttaataatct caggagcaca acattcctt actagttcta gagcggccgc      240
cagtgtgctg gaattcggct tttttagggc tggaagctac ctttgacatc atttcctctg     300
cgaatgcatg tataatttct acagaaccta ttagaaagga tcacccagcc tctgcttttg     360
tacaactttc ccttaaaaaa tgccaattcc actgctgttt ggcccaatag tgagaacttt     420
ttcctgctgc ctcttggtgc ttttgcctat ggccctatt ctgcctgctg aagcactct       480 tgccagcatg gacttaaacc cctccagctc tgacaatcct ctttctcttt tgttttacat     540
gaagggtctg gcagccaaag caatcactca aaggttcaaa ccttatcatt ttttgctttg     600
ttcctcttgg ccttggtttt gtacatcagc tttgaaaata ccatcccagg ttaatgctg      660 gggttaattt ataactaaga gtgctctagt tttgcaatac aggacatgct ataaaaatgg     720
```
aaagatgttg ctttctgaga gatcagctta catgt            755

<210> SEQ ID NO 16
<211> LENGTH: 5428
<212> TYPE: DNA
<213> ORGANISM: Artificial Sequence
<220> FEATURE:
<223> OTHER INFORMATION: Synthetic

<400> SEQUENCE: 16
cagatctttg gccactccct ctctgcgcgc tcgctcgctc actgaggccg ggcgaccaaa     60
ggtcgcccga cgcccgggct tgcccgggc ggcctcagtg agcgagcgag cgcgcagaga    120
gggagtggcc aactccatca ctaggggttc ctggagggt ggagtcgtga cgtgaattac    180
gtcatagggt tagggaggtc ggccgtctag aatatatagt tgctctagtt attaatagta    240
atcaattacg gggtcattag ttcatagccc atatatggag ttccgcgtta cataacttac    300
ggtaaatggc ccgcctggct gaccgcccaa cgacccccgc ccattgacgt caataatgac    360
gtatgttccc atagtaacgc caatagggac tttccattga cgtcaatggg tggactattt    420
acggtaaact gcccacttgg cagtacatca agtgtatcat atgccaagta cgccccctat    480
tgacgtcaat gacggtaaat ggcccgcctg gcattatgcc cagtacatga ccttatggga    540
ctttcctact tggcagtaca tctacgtatt agtcatcgct attaccatgc atggtcgagg    600
tgagccccac gttctgcttc actctcccca tctccccccc ctccccaccc caatttttgt    660
atttatttat tttttaatta ttttgtgcag cgatgggggc ggggggggg gggggcgcg    720
cgccaggcgg ggcggggcgg ggcgagggc ggggcgggcg aggcggagag gtgcggcggc    780
agccaatcag agcggcgcgc tccgaaagtt cctttttatg gcgaggcggc ggcggcggcg    840
gccctataaa aagcgaagcg cgcggcgggc gggagtcgct gcgcggtacc gtcgacgcca    900
ccatggtgag catccggaga tccttcgagg cctacgtgga cgatatgaac atcatcaccg    960
tgctgatccc agccgagcag aaggagatca tgacaccccc tttccggctg agaccgaga    1020
tcacagactt tccctggcc gtgagagagg agtatagcct ggaggccaag tacaagtacg   1080
tgtgcgtgag cgatcaccct gtgacctttg caagatcca ctgcgtgcgg gcaagctccg   1140
gacacaagac cgacctgcag atcggagccg tgatcaggac agcagccttc gacgatgagt   1200
tttactatga cggagagctg ggagccgtgt acaccgcaga tcacacagtg ttcaaggtct   1260
gggcaccagc agccacatcc gccgcagtga agctgagcca ccccaacaag tccggcagga   1320
cctttcagat gacacgcctg gagaagggcg tgtacgccgt gaccgtgaca ggcgatctgc   1380
acggctacga gtatctgttc tgcatctgta acaattctga gtggatggag accgtggatc   1440
agtatgccaa ggccgtgaca gtgaatggag agaagggagt ggtgctgagg ccagaccaga   1500
tgaagtggac cgcaccctg aagcctttca gccaccctgt ggacgccgtg atctacgaga   1560
cacacctgcg cgatttttct atccacgaga acagcggcat gatcaataag ggcaagtacc   1620
tggccctgac cgagacagac acccagacag ccaacggctc tagctccggc ctggcctatg   1680
tgaaggagct gggagtgacc cacgtggagc tgctgcctgt gaatgacttt gccggcgtgg   1740
atgaggagaa gccactggat gcctacaact ggggctataa tccactgcac ttctttgccc   1800
ccgagggctc ttatgccagc aacccacacg accccagac caggaagaca gagctgaagc   1860
agatgatcaa tacactgcac cagcacgcc tgagagtgat cctggatgtg gtgttcaacc   1920
acgtgtacaa gcgcgagaat agccctttg agaagaccgt gccaggctat ttctttcggc   1980

```
acgacgagtg cggcatgcca tctaacggca caggcgtggg caatgatatc gccagcgaga   2040
ggcgcatggc ccggaagttc atcgccgact gcgtggtgta ctggctggag gagtataacg   2100
tggacggctt cagatttgat ctgctgggca tcctggacat cgataccgtg ctgtacatga   2160
aggagaaggc cacaaaggcc aagccaggca tcctgctgtt cggagaggga tgggacctgg   2220
caacccccact gccacacgag cagaaggccg ccctggcaaa cgcacctagg atgccaggca   2280
tcggcttctt taacgacatg tttcgcgatg ccgtgaaggg caataccttc cacctgaagg   2340
ccacaggctt tgcactggga aatggagagt ccgcccaggc cgtgatgcac ggaatcgcag   2400
gatctagcgg atggaaggcc ctggcaccaa tcgtgcctga gccaagccag tccatcaact   2460
acgtggagtc ccacgacaat cacaccttct gggataagat gtcttttgcc ctgcctcagg   2520
agaatgattc taggaagaga agcaggcagc gcctggcagc agcaatcatc ctgctggccc   2580
agggcgtgcc attcatccac agcggccagg agttctttcg gaccaagcag ggcgtggaga   2640
actcctacca gtcctctgat tctatcaatc agctggactg ggatcggaga gagacattca   2700
aggaggacgt gcactatatc aggcgcctga tcagcctgag aaaggcacac ccagcctttc   2760
ggctgagatc cgccgcagac atccagaggc acctggagtg cctgaccctg aaggagcacc   2820
tgatcgccta cagactgtat gacctggatg aggtggacga gtggaaggat atcatcgtga   2880
tccaccacgc ctccctgac tctgtggagt ggcggctgcc caacgatatc ccttacagac   2940
tgctgtgcga cccctccggc ttccaggagg atcctaccga gatcaagaag acagtggccg   3000
tgaatggcat cggcaccgtg atcctgtatc tggcctccga cctgaagtct tttgcctacc   3060
catacgatgt tccagattac gcttgagaat tctgcagatc tgtggcttct agctgcccgg   3120
gtggcatccc tgtgacccct ccccagtgcc tctcctggcc ttggaagttg ccactccagt   3180
gcccaccagc cttgtcctaa taaaattaag ttgcatcatt ttgtctgact aggtgtcctc   3240
tataatatta tggggtggag ggggtggtt tggagcaagg ggcccaagtt gggaagacac   3300
accatattgg tcgagtagat aagtagcatg gcgggttaat cattaactac aaggaacccc   3360
tagtgatgga gttggccact ccctctctgc gcgctcgctc gctcactgag gccgggcgac   3420
caaaggtcgc ccgacgcccg gctttgccc gggcggcctc agtgagcgag cgagcgcgca   3480
gagagggagt ggccaaagat ctgcgacgcg aggctggatg gccttcccca ttatgattct   3540
tctcgcttcc ggcggcatcg ggatgcccgc gttgcaggcc atgctgtcca ggcaggtaga   3600
tgacgaccat cagggacagc ttcagcaaaa ggccagcaaa aggccaggaa ccgtaaaaag   3660
gccgcgttgc tggcgttttt ccataggctc cgcccccctg acgagcatca caaaaatcga   3720
cgctcaagtc agaggtggcg aaacccgaca ggactataaa gataccaggc gtttccccct   3780
ggaagctccc tcgtgcgctc tcctgttccg accctgccgc ttaccggata cctgtccgcc   3840
tttctccctt cgggaagcgt ggcgctttct catagctcac gctgtaggta tctcagttcg   3900
gtgtaggtcg ttcgctccaa gctgggctgt gtgcacgaac ccccgttca gcccgaccgc   3960
tgcgccttat ccggtaacta tcgtcttgag tccaacccgg taagacacga cttatcgcca   4020
ctggcagcag ccactggtaa caggattagc agagcgaggt atgtaggcgg tgctacagag   4080
ttcttgaagt ggtggcctaa ctacggctac actagaagga cagtatttgg tatctgcgct   4140
ctgctgaagc cagttacctt cggaaaaaga gttggtagct cttgatccgg caaacaaacc   4200
accgctggta gcgtggtttt tttgtttgc aagcagcaga ttacgcgcag aaaaaagga   4260
tctcaagaag atcctttgat cttttctacg ggtctgacg ctcagtggaa cgaaaactca   4320
cgttaaggga ttttggtcat gagattatca aaaaggatct tcacctagat ccttttaaat   4380
```

-continued

```
taaaaatgaa gttttaaatc aatctaaagt atatatgagt aaacttggtc tgacagttac    4440
caatgcttaa tcagtgaggc acctatctca gcgatctgtc tatttcgttc atccatagtt    4500
gcctgactcc ccgtcgtgta gataactacg atacgggagg gcttaccatc tggccccagt    4560
gctgcaatga taccgcgaga cccacgctca ccggctccag atttatcagc aataaaccag    4620
ccagccggaa gggccgagcg cagaagtggt cctgcaactt tatccgcctc catccagtct    4680
attaattgtt gccgggaagc tagagtaagt agttcgccag ttaatagttt gcgcaacgtt    4740
gttgccattg ctgcaggcat cgtggtgtca cgctcgtcgt ttggtatggc ttcattcagc    4800
tccggttccc aacgatcaag gcgagttaca tgatccccca tgttgtgcaa aaaagcggtt    4860
agctccttcg gtcctccgat cgttgtcaga agtaagttgg ccgcagtgtt atcactcatg    4920
gttatggcag cactgcataa ttctcttact gtcatgccat ccgtaagatg cttttctgtg    4980
actggtgagt actcaaccaa gtcattctga gaatagtgta tgcggcgacc gagttgctct    5040
tgcccggcgt caacacggga taataccgcg ccacatagca gaactttaaa agtgctcatc    5100
attggaaaac gttcttcggg gcgaaaactc tcaaggatct taccgctgtt gagatccagt    5160
tcgatgtaac ccactcgtgc acccaactga tcttcagcat cttttacttt caccagcgtt    5220
tctgggtgag caaaaacagg aaggcaaaat gccgcaaaaa agggaataag ggcgacacgg    5280
aaatgttgaa tactcatact cttccttttt caatattatt gaagcattta tcagggttat    5340
tgtctcatga gcggatacat atttgaatgt atttagaaaa ataaacaaat aggggttccg    5400
cgcacatttc cccgaaaagt gccacctg                                       5428
```

<210> SEQ ID NO 17
<211> LENGTH: 5377
<212> TYPE: DNA
<213> ORGANISM: Artificial Sequence
<220> FEATURE:
<223> OTHER INFORMATION: Synthetic

<400> SEQUENCE: 17

```
cagatctttg ccactccct ctctgcgcgc tcgctcgctc actgaggccg ggcgaccaaa      60
ggtcgcccga cgcccgggct ttgcccgggc ggcctcagtg agcgagcgag cgcgcagaga    120
gggagtggcc aactccatca ctaggggttc ctggaggggt ggagtcgtga cgtgaattac    180
gtcatagggt tagggaggtc ggccgtctag aatatatagt tgctctagtt attaatagta    240
atcaattacg gggtcattag ttcatagccc atatatggag ttccgcgtta cataacttac    300
ggtaaatggc ccgcctggct gaccgcccaa cgacccccgc ccattgacgt caataatgac    360
gtatgttccc atagtaacgc caatagggac tttccattga cgtcaatggg tggactattt    420
acggtaaact gcccacttgg cagtacatca agtgtatcat atgccaagta cgccccctat    480
tgacgtcaat gacggtaaat ggcccgcctg gcattatgcc cagtacatga ccttatggga    540
ctttcctact tggcagtaca tctacgtatt agtcatcgct attaccatgc atggtcgagg    600
tgagccccac gttctgcttc actctcccca tctccccccc ctccccaccc caatttttgt    660
atttatttat tttttaatta tttttgtgcag cgaggggcgg ggcggggcga ggcggagagg    720
tgcggcggca gccaatcaga gcggcgcgct ccgaaagttt ccttttatgg cgaggcggcg    780
gcggcggcgg ccctataaaa agcgaagcgc gcggcgggcg ggagtcgctg cgcggtaccg    840
tcgacgccac catggtgagc atcagaagat cctttgaggc ctatgtggat gatatgaaca    900
tcatcacagt gctgatccca gctgagcaga aggagatcat gacaccccct ttcagactgg    960
```

```
agacagagat cacagacttt cccctggctg tgagagagga gtatagcctg gaggccaagt    1020
acaagtatgt gtgtgtgtct gaccatcctg tgacctttgg caagatccac tgtgtgagag    1080
caagctctgg acacaagaca gacctgcaga ttggagctgt gatcaggaca gcagcctttg    1140
atgatgagtt ttactatgat ggagagctgg gagctgtgta cacagcagat cacacagtgt    1200
tcaaggtctg ggcaccagca gccacatctg ctgcagtgaa gctgagccac cccaacaagt    1260
ctggcaggac ctttcagatg acaagactgg agaagggagt gtatgctgtg acagtgacag    1320
gagatctgca tggctatgag tatctgttct gcatctgtaa caattctgag tggatggaga    1380
cagtggatca gtatgccaag gctgtgacag tgaatggaga aagggagtg gtgctgaggc    1440 cagaccagat gaagtggaca gcacccctga agcctttcag ccaccctgtg gatgctgtga    1500
tctatgagac acctgaga gatttttcta tccatgagaa ctctggcatg atcaataagg    1560
gcaagtacct ggccctgaca gagacagaca cccagacagc caatggctct agctctggcc    1620
tggcctatgt gaaggagctg ggagtgaccc atgtggagct gctgcctgtg aatgactttg    1680
ctggagtgga tgaggagaag ccactggatg cctacaactg ggctataat ccactgcact    1740

tctttgcccc tgagggctct tatgccagca cccacatga ccccagacc aggaagacag    1800 agctgaagca gatgatcaat acactgcacc agcatgcct gagagtgatc ctggatgtgg    1860
tgttcaacca tgtgtacaag agagagaata gcccttttga aagacagtg ccaggctatt    1920

tctttagaca tgatgagtgt ggcatgccat ctaatgcac aggagtgggc aatgatattg    1980
cctctgagag gagaatggcc agaaagttca ttgctgactg tgtggtgtac tggctggagg    2040
agtataatgt ggatggcttc agatttgatc tgctgggcat cctggacatt gatacagtgc    2100

tgtacatgaa ggagaaggcc acaaaggcca agccaggcat cctgctgttt ggagagggat    2160
gggacctggc aaccccactg ccacatgagc agaaggctgc cctggcaaat gcacctagga    2220

tgccaggcat tggcttcttc aatgacatgt ttagagatgc tgtgaagggc aataccttcc    2280
acctgaaggc cacaggcttt gcactgggaa atggagagtc tgcccaggct gtgatgcatg    2340
gaattgcagg atcttctgga tggaaggccc tggcaccaat tgtgcctgag ccaagccagt    2400 ccaтcaaacтa tgtggagtcc catgacaatc acaccttctg ggataagatg тcтттттgccc    2460

tgcctcagga gaatgattct aggaagagaa gcaggcagag actggcagca gcaatcatcc    2520

tgctggccca gggagtgcca ttcatccact ctggccagga gттcттттaga accaagcagg    2580 gagtggagaa ctcctaccag tcctctgatt ctatcaatca gctggactgg gataggagag    2640
agacattcaa ggaggatgtg cactatatca ggagactgat cagcctgaga aaggcacacc    2700
cagcctttag actgagatct gctgcagaca tccagaggca cctggagtgc ctgaccctga    2760
aggagcacct gattgcctac agactgtatg acctggatga ggtggatgag tggaaggata    2820

tcattgtgat ccaccatgcc tccctgact ctgtggagtg gagactgccc aatgatatcc    2880
cttacagact gctgtgtgac ccctctggct tccaggagga tcctacagag atcaagaaga    2940
cagtggctgt gaatggcatt ggcacagtga tcctgtatct ggcctctgac ctgaagtctt    3000

ttgcctaccc ctatgatgtt ccagattatg cttgagaatt ctgcagatct gtggcttcta    3060
gctgccgggg tggcatccct gtgacccctc ccagtgcct ctcctggcct tggaagttgc    3120
cactccagtg cccaccagcc ttgtcctaat aaaattaagt tgcatcattt tgtctgacta    3180
ggtgtcctct ataatattat gggtggagg ggggtggttt ggagcaaggg gcccaagttg    3240
ggaagacaca ccatattggt cgagtagata agtagcatgg cgggttaatc attaactaca    3300
aggaacccct agtgatggag ttggccactc cctctctgcg cgctcgctcg ctcactgagg    3360
```

```
ccgggcgacc aaaggtcgcc cgacgcccgg gctttgcccg ggcggcctca gtgagcgagc    3420
gagcgcgcag agagggagtg gccaaagatc tgcgacgcga ggctggatgg ccttcccat     3480 tatgattctt ctcgcttccg gcggcatcgg gatgcccgcg ttgcaggcca tgctgtccag    3540
gcaggtagat gacgaccatc agggacagct tcagcaaaag gccagcaaaa ggccaggaac    3600
cgtaaaaagg ccgcgttgct ggcgtttttc cataggctcc gccccctga cgagcatcac     3660 aaaaatcgac gctcaagtca gaggtggcga acccgacag gactataaag ataccaggcg     3720
tttccccctg gaagctccct cgtgcgctct cctgttccga ccctgccgct taccggatac    3780
ctgtccgcct ttctcccttc gggaagcgtg gcgctttctc atagctcacg ctgtaggtat    3840
ctcagttcgg tgtaggtcgt tcgctccaag ctgggctgtg tgcacgaacc cccgttcag     3900 cccgaccgct gcgccttatc cggtaactat cgtcttgagt ccaacccggt aagacacgac    3960
ttatcgccac tggcagcagc cactggtaac aggattagca gagcgaggta tgtaggcggt    4020
gctacagagt tcttgaagtg gtggcctaac tacggctaca ctagaaggac agtatttggt    4080
atctgcgctc tgctgaagcc agttaccttc ggaaaaagag ttggtagctc ttgatccggc    4140
aaacaaacca ccgctggtag cggtggtttt tttgtttgca agcagcagat tacgcgcaga    4200
aaaaaaggat ctcaagaaga tcctttgatc ttttctacgg ggtctgacgc tcagtggaac    4260
gaaaactcac gttaagggat tttggtcatg agattatcaa aaaggatctt cacctagatc    4320
cttttaaatt aaaaatgaag ttttaaatca atctaaagta tatatgagta aacttggtct    4380
gacagttacc aatgcttaat cagtgaggca cctatctcag cgatctgtct atttcgttca    4440
tccatagttg cctgactccc cgtcgtgtag ataactacga tacgggaggg cttaccatct    4500
ggccccagtg ctgcaatgat accgcgagac ccacgctcac cggctccaga tttatcagca    4560 ataaccagc cagccggaag ggccgagcgc agaagtggtc ctgcaacttt atccgcctcc     4620
atccagtcta ttaattgttg ccgggaagct agagtaagta gttcgccagt taatagtttg    4680
cgcaacgttg ttgccattgc tgcaggcatc gtggtgtcac gctcgtcgtt ggtatggct     4740 tcattcagct ccggttccca acgatcaagg cgagttacat gatccccat gttgtgcaaa     4800 aaagcggtta gctccttcgg tcctccgatc gttgtcagaa gtaagttggc cgcagtgtta    4860
tcactcatgg ttatggcagc actgcataat tctcttactg tcatgccatc cgtaagatgc    4920
ttttctgtga ctggtgagta ctcaaccaag tcattctgag aatagtgtat gcggcgaccg    4980
agttgctctt gcccggcgtc aacacgggat aataccgcgc cacatagcag aactttaaaa    5040
gtgctcatca ttggaaaacg ttcttcgggg cgaaaactct caaggatctt accgctgttg    5100
agatccagtt cgatgtaacc cactcgtgca cccaactgat cttcagcatc ttttactttc    5160
accagcgttt ctgggtgagc aaaaacagga aggcaaaatg ccgcaaaaaa gggaataagg    5220
gcgacacgga aatgttgaat actcatactc ttcctttttc aatattattg aagcatttat    5280
cagggttatt gtctcatgag cggatacata tttgaatgta tttagaaaaa taaacaaata    5340
ggggttccgc gcacatttcc ccgaaaagtg ccacctg                             5377
```

<210> SEQ ID NO 18
<211> LENGTH: 6032
<212> TYPE: DNA
<213> ORGANISM: Artificial Sequence
<220> FEATURE:
<223> OTHER INFORMATION: Synthetic

<400> SEQUENCE: 18

-continued

```
cagatctttg gccactccct ctctgcgcgc tcgctcgctc actgaggccg ggcgaccaaa      60
ggtcgcccga cgcccgggct ttgcccgggc ggcctcagtg agcgagcgag cgcgcagaga     120
gggagtggcc aactccatca ctaggggttc ctggaggggt ggagtcgtga cgtgaattac     180
gtcatagggt tagggaggtc ggccgtctag gagttaattt ttaaaaagca gtcaaaagtc     240
caagtggccc ttgcgagcat ttactctctc tgtttgctct ggttaataat ctcaggagca     300
caaaattcct tactagtcct agaagttaat ttttaaaaag cagtcaaaag tccaagtcca     360
agtggccctt gcgagcattt actctctctg tttgctctgg ttaataatct caggagcaca     420
aacattcctt actagttcta gagcggccgc cagtgtgctg gaattcggct tttttagggc     480
tggaagctac ctttgacatc atctcctctg cgaatgcatg tataatttct acagaaccta     540
ttagaaagga tcacccagcc tctgcttttg tacaactttc ccttaaaaaa ctgccaatcc     600
cactgctgtt tggcccaata gtgagaactt tttctgctgc ctcttggtgc ttttgcctat     660
ggcccctatt ctgctgctga agacactctt gccagcatgg acttaaaccc ctccagctct     720
gacaatcctc tttctctttt gttttacatg aagggtctgg cagccaaagc aatcactcaa     780
agttcaaacc ttatcatttt ttgctttgtt cctcttggcc ttggttttgt acatcagctt     840
tgaaaatacc atcccagggt taatgctggg gttaattat aactgagagt gctctagttt      900
tgcaatacag gacatgctat aaaaatggct taaggttccg cgttacataa cttacggtaa     960
atggcccgcc tggctgaccg cccaacgacc cccgcccatt gacgtcaata atgacgtatg    1020
ttcccatagt aacgccaata gggactttcc attgacgtca atgggtggag tatttacggt    1080
aaactgccca cttggcagta catcaagtgt atcatatgcc aagtacgccc cctattgacg    1140
tcaatgacgg taaatggccc gcctggcatt atgcccagta catgacctta tgggactttc    1200
ctacttggca gtacatctac gtattagtca tcgctattac catgcatggt cgaggtgagc    1260
cccacgttct gcttcactct ccccatctcc cccccctccc cacccccaat tttgtattta    1320
tttatttttt aattattttg tgcagcgagg ggcggggcgg ggcgaggcgg agaggtgcgg    1380
cggcagccaa tcagagcggc gcgctccgaa agtttccttt tatggcgagg cggcggcggc    1440
ggcggcccta taaaaagcga agcgcgcggc gggcgggagt cgctgcgcgg taccgtcgac    1500
gccaccatgg tgagcatccg gagatccttc gaggcctacg tggacgatat gaacatcatc    1560
accgtgctga tccagccgga gcagaaggag atcatgacac ccctttccg gctggagacc    1620
gagatcacag actttcccct ggccgtgaga gaggagtata gcctggaggc caagtacaag    1680
tacgtgtgcg tgagcgatca ccctgtgacc tttggcaaga tccactgcgt gcgggcaagc    1740
tccggacaca agaccgacct gcagatcgga gccgtgatca ggacagcagc cttcgacgat    1800
gagttttact atgacggaga gctgggagcc gtgtacaccg cagatcacac agtgttcaag    1860
gtctgggcac cagcagccac atccgccgca gtgaagctga gccaccccaa caagtccggc    1920
aggaccttc agatgacacg cctggagaag ggcgtgtacg ccgtgaccgt gacaggcgat    1980
ctgcacggct acgagtatct gttctgcatc tgtaacaatt ctgagtggat ggagaccgtg    2040
gatcagtatg ccaaggccgt gacagtgaat ggagagaagg gagtggtgct gaggccagac    2100
cagatgaagt ggaccgcacc cctgaagcct ttcagccacc ctgtggacgc cgtgatctac    2160
gagacacacc tgcgcgattt ttctatccac gagaacagcg gcatgatcaa taagggcaag    2220
tacctggccc tgaccgagac agacacccag acagccaacg gctctagctc cggcctggcc    2280
tatgtgaagg agctgggagt gacccacgtg gagctgctgc ctgtgaatga ctttgccggc    2340
gtggatgagg agaagccact ggatgcctac aactgggggct ataatccact gcacttcttt    2400
```

```
gcccccgagg gctcttatgc cagcaaccca cacgaccccc agaccaggaa gacagagctg    2460
aagcagatga tcaatacact gcaccagcac ggcctgagag tgatcctgga tgtggtgttc    2520
aaccacgtgt acaagcgcga gaatagccct tttgagaaga ccgtgccagg ctatttcttt    2580
cggcacgacg agtgcggcat gccatctaac ggcacaggcg tgggcaatga tatcgccagc    2640
gagaggcgca tggcccggaa gttcatcgcc gactgcgtgg tgtactggct ggaggagtat    2700
aacgtggacg gcttcagatt tgatctgctg ggcatcctgg acatcgatac cgtgctgtac    2760
atgaaggaga aggccacaaa ggccaagcca ggcatcctgc tgttcggaga gggatgggac    2820
ctggcaaccc cactgccaca cgagcagaag gccgccctgg caaacgcacc taggatgcca    2880
ggcatcggct tctttaacga catgtttcgc gatgccgtga agggcaatac cttccacctg    2940
aaggccacag gctttgcact gggaaatgga gagtccgccc aggccgtgat gcacggaatc    3000
gcaggatcta gcggatggaa ggccctggca ccaatcgtgc ctgagccaag ccagtccatc    3060
aactacgtgg agtcccacga caatcacacc ttctgggata gatgtctttt gccctgcct    3120 caggagaatg attctaggaa gagaagcagg cagcgcctgg cagcagcaat catcctgctg    3180
gcccagggcg tgccattcat ccacagcggc caggagttct tccggaccaa gcagggcgtg    3240
gagaactcct accagtcctc tgattctatc aatcagctgg actgggatcg gagagagaca    3300
ttcaaggagg acgtgcacta tatcaggcgc ctgatcagcc tgagaaaggc acacccagcc    3360
tttcggctga gatccgccgc agacatccag aggcacctgg agtgcctgac cctgaaggag    3420
cacctgatcg cctacagact gtatgacctg gatgaggtgg acgagtggaa ggatatcatc    3480
gtgatccacc acgcctcccc tgactctgtg gagtggcggc tgcccaacga tatcccttac    3540
agactgctgt gcgaccccte cggcttccag gaggatccta ccgagatcaa gaagacagtg    3600
gccgtgaatg gcatcggcac cgtgatcctg tatctggcct ccgacctgaa gtcttttgcc    3660
tacccatacg atgttccaga ttacgcttga gaattctgca gatctgtggc ttctagctgc    3720
ccgggtggca tccctgtgac ccctccccag tgcctctcct ggccttggaa gttgccactc    3780
cagtgcccac cagccttgtc ctaataaaat taagttgcat cattttgtct gactaggtgt    3840
cctctataat attatggggt ggaggggggt ggtttggagc aaggggccca agttgggaag    3900
acacaccata ttggtcgagt agataagtag catggcgggt taatcattaa ctacaaggaa    3960
cccctagtga tggagttggc cactccctct ctgcgcgctc gctcgctcac tgaggccggg    4020
cgaccaaagg tcgcccgacg cccgggcttt gcccgggcgg cctcagtgag cgagcgagcg    4080
cgcagagagg gagtggccaa agatctgcga cgcgaggctg gatggccttc cccattatga    4140
ttcttctcgc ttccggcggc atcgggatgc ccgcgttgca ggccatgctg tccaggcagg    4200
tagatgacga ccatcaggga cagcttcagc aaaaggccag caaaaggcca ggaaccgtaa    4260
aaaggccgcg ttgctggcgt ttttccatag gctccgcccc cctgacgagc atcacaaaaa    4320
tcgacgctca gtcagaggt ggcgaaaccc gacaggacta taaagatacc aggcgtttcc    4380
ccctggaagc tccctcgtgc gctctcctgt tccgaccctg ccgcttaccg gatacctgtc    4440
cgcctttctc ccttcgggaa gcgtggcgct ttctcatagc tcacgctgta ggtatctcag    4500
ttcggtgtag gtcgttcgct ccaagctggg ctgtgtgcac gaaccccccg ttcagcccga    4560
ccgctgcgcc ttatccggta actatcgtct tgagtccaac ccggtaagac acgacttatc    4620
gccactggca gcagccactg gtaacaggat tagcagagcg aggtatgtag gcggtgctac    4680
agagttcttg aagtggtggc ctaactacgg ctacactaga aggacagtat ttggtatctg    4740
```

```
cgctctgctg aagccagtta ccttcggaaa aagagttggt agctcttgat ccggcaaaca    4800
aaccaccgct ggtagcggtg gttttttttgt ttgcaagcag cagattacgc gcagaaaaaa    4860
aggatctcaa gaagatcctt tgatcttttc tacggggtct gacgctcagt ggaacgaaaa    4920
ctcacgttaa gggattttgg tcatgagatt atcaaaaagg atcttcacct agatcctttt    4980
aaattaaaaa tgaagtttta atcaatcta aagtatatat gagtaaactt ggtctgacag    5040
ttaccaatgc ttaatcagtg aggcaccat ctcagcgatc tgtctatttc gttcatccat    5100
agttgcctga ctccccgtcg tgtagataac tacgatacgg gagggcttac catctggccc    5160
cagtgctgca atgataccgc gagacccacg ctcaccggct ccagatttat cagcaataaa    5220
ccagccagcc ggaagggccg agcgcagaag tggtcctgca actttatccg cctccatcca    5280
gtctattaat tgttgccggg aagctagagt aagtagttcg ccagttaata gtttgcgcaa    5340
cgttgttgcc attgctgcag gcatcgtggt gtcacgctcg tcgtttggta tggcttcatt    5400
cagctccggt tcccaacgat caaggcgagt tacatgatcc cccatgttgt gcaaaaaagc    5460
ggttagctcc ttcggtcctc cgatcgttgt cagaagtaag ttggccgcag tgttatcact    5520
catggttatg gcagcactgc ataattctct tactgtcatg ccatccgtaa gatgcttttc    5580
tgtgactggt gagtactcaa ccaagtcatt ctgagaatag tgtatgcggc gaccgagttg    5640
ctcttgcccg gcgtcaacac gggataatac cgcgccacat agcagaactt taaaagtgct    5700
catcattgga aaacgttctt cggggcgaaa actctcaagg atcttaccgc tgttgagatc    5760
cagttcgatg taacccactc gtgcacccaa ctgatcttca gcatctttta ctttcaccag    5820
cgtttctggg tgagcaaaaa caggaaggca aaatgccgca aaaaagggaa taagggcgac    5880
acggaaatgt tgaatactca tactcttcct ttttcaatat tattgaagca tttatcaggg    5940
ttattgtctc atgagcggat acatatttga atgtatttag aaaaataaac aaataggggt    6000
tccgcgcaca tttccccgaa aagtgccacc tg                                  6032
```

<210> SEQ ID NO 19
<211> LENGTH: 6039
<212> TYPE: DNA
<213> ORGANISM: Artificial Sequence
<220> FEATURE:
<223> OTHER INFORMATION: Synthetic

<400> SEQUENCE: 19

```
cagatctttg ccactccct ctctgcgcgc tcgctcgctc actgaggccg ggcgaccaaa      60
ggtcgcccga cgcccgggct ttgcccgggc ggcctcagtg agcgagcgag cgcgcagaga    120
gggagtggcc aactccatca ctaggggttc ctggaggggt ggagtcgtga cgtgaattac    180
gtcatagggt tagggaggtc ggccgctcta ggagttaatt tttaaaaagc agtcaaaagt    240
ccaagtggcc cttgcgagca tttactctct ctgtttgctc tggttaataa tctcaggagc    300
acaaaattcc ttactagtcc tagaagttaa ttttttaaaaa gcagtcaaaa gtccaagtcc    360
aagtggccct tgcgagcatt tactctctct gtttgctctg gttaataatc tcaggagcac    420
aaacattcct tactagttct agagcggccg ccagtgtgct ggaattcggc ttttttaggg    480
ctggaagcta ccttttgacat catctcctct gcgaatgcat gtataatttc tacagaacct    540
attagaaagg atcacccagc ctctgctttt gtacaacttt cccttaaaaa actgccaatc    600
ccactgctgt ttggcccaat agtgagaact ttttctgct gcctcttggt gcttttgcct    660
atggccccta ttctgctgct gaagacactc ttgccagcat ggacttaaac ccctccagct    720
ctgacaatcc tctttctctt tgttttaca tgaagggtct ggcagccaaa gcaatcactc    780
```

-continued

| | |
|---|---|
| aaagttcaaa ccttatcatt ttttgctttg ttcctcttgg ccttggtttt gtacatcagc | 840 |
| tttgaaaata ccatcccagg gttaatgctg gggttaattt ataactgaga gtgctctagt | 900 |
| tttgcaatac aggacatgct ataaaaatgg cttaaggttc cgcgttacat aacttacggt | 960 |
| aaatggcccg cctggctgac cgcccaacga cccccgccca ttgacgtcaa taatgacgta | 1020 |
| tgttcccata gtaacgccaa tagggacttt ccattgacgt caatgggtgg agtatttacg | 1080 |
| gtaaactgcc cacttggcag tacatcaagt gtatcatatg ccaagtacgc ccctattga | 1140 |
| cgtcaatgac ggtaaatggc ccgcctggca ttatgcccag tacatgacct tatgggactt | 1200 |
| tcctacttgg cagtacatct acgtattagt catcgctatt accatgcatg gtcgaggtga | 1260 |
| gccccacgtt ctgcttcact ctccccatct ccccccctc ccaccccca attttgtatt | 1320 |
| tatttatttt ttaattattt tgtgcagcga ggggcgggc ggggcgaggc ggagaggtgc | 1380 |
| ggcggcagcc aatcagagcg gcgcgctccg aaagtttcct tttatggcga ggcggcggcg | 1440 |
| gcggcggccc tataaaaagc gaagcgcgcg gcgggcggga gtcgctgcgc ggtaccgtcg | 1500 |
| acgccaccat ggtgagcatc agaagatcct ttgaggccta tgtggatgat atgaacatca | 1560 |
| tcacagtgct gatcccagct gagcagaagg agatcatgac accccttc agactggaga | 1620 |
| cagagatcac agactttccc ctggctgtga gagaggagta tagcctggag gccaagtaca | 1680 |
| agtatgtgtg tgtgtctgac catcctgtga ccttggcaa gatccactgt gtgagagcaa | 1740 |
| gctctggaca caagacagac ctgcagattg agctgtgat caggacagca gcctttgatg | 1800 |
| atgagtttta ctatgatgga gagctgggag ctgtgtacac agcagatcac acagtgttca | 1860 |
| aggtctgggc accagcagcc acatctgctg cagtgaagct gagccacccc aacaagtctg | 1920 |
| gcaggacctt tcagatgaca agactggaga agggagtgta tgctgtgaca gtgacaggag | 1980 |
| atctgcatgg ctatgagtat ctgttctgca tctgtaacaa ttctgagtgg atggagacag | 2040 |
| tggatcagta tgccaaggct gtgacagtga atggagagaa gggagtggtg ctgaggccag | 2100 |
| accagatgaa gtggacagca cccctgaagc ctttcagcca ccctgtggat gctgtgatct | 2160 |
| atgagacaca cctgagagat ttttctatcc atgagaactc tggcatgatc aataagggca | 2220 |
| agtacctggc cctgacagag acagacaccc agacagccaa tggctctagc tctggcctgg | 2280 |
| cctatgtgaa ggagctggga gtgacccatg tggagctgct gcctgtgaat gactttgctg | 2340 |
| gagtggatga ggagaagcca ctggatgcct acaactgggg ctataatcca ctgcacttct | 2400 |
| ttgcccctga gggctcttat gccagcaacc cacatgaccc ccagaccagg aagacagagc | 2460 |
| tgaagcagat gatcaataca ctgcaccagc atggcctgag agtgatcctg gatgtggtgt | 2520 |
| tcaaccatgt gtacaagaga gagaatagcc ttttgagaa gacagtgcca ggctatttct | 2580 |
| ttagacatga tgagtgtggc atgccatcta atggcacagg agtgggcaat gatattgcct | 2640 |
| ctgagaggag aatggccaga aagttcattg ctgactgtgt ggtgtactgg ctggaggagt | 2700 |
| ataatgtgga tggcttcaga tttgatctgc tgggcatcct ggacattgat acagtgctgt | 2760 |
| acatgaagga gaaggccaca aaggccaagc caggcatcct gctgtttgga gagggatggg | 2820 |
| acctggcaac cccactgcca catgagcaga aggctgccct ggcaaatgca cctaggatgc | 2880 |
| caggcattgg cttcttcaat gacatgttta gagatgctgt gaagggcaat accttccacc | 2940 |
| tgaaggccac aggctttgca ctgggaaatg agagtctgc ccaggctgtg atgcatggaa | 3000 |
| ttgcaggatc ttctgatgg aaggccctgg caccaattgt gcctgagcca agccagtcca | 3060 |
| tcaactatgt ggagtcccat gacaatcaca ccttctggga taagatgtct tttgccctgc | 3120 |

```
ctcaggagaa tgattctagg aagagaagca ggcagagact ggcagcagca atcatcctgc   3180
tggcccaggg agtgccattc atccactctg gccaggagtt cctttagaacc aagcagggag   3240
tggagaactc ctaccagtcc tctgattcta tcaatcagct ggactgggat aggagagaga   3300
cattcaagga ggatgtgcac tatatcagga gactgatcag cctgagaaag gcacacccag   3360
cctttagact gagatctgct gcagacatcc agaggcacct ggagtgcctg accctgaagg   3420
agcacctgat tgcctacaga ctgtatgacc tggatgaggg ggatgagtgg aaggatatca   3480
ttgtgatcca ccatgcctcc cctgactctg tggagtggag actgcccaat gatatccctt   3540
acagactgct gtgtgacccc tctggcttcc aggaggatcc tacagagatc aagaagacag   3600
tggctgtgaa tggcattggc acagtgatcc tgtatctggc ctctgacctg aagtcttttg   3660
cctacccccta tgatgttcca gattatgctt gagaattctg cagatctgtg gcttctagct   3720
gcccgggtgg catccctgtg acccctcccc agtgcctctc ctggccttgg aagttgccac   3780
tccagtgccc accagccttg tcctaataaa attaagttgc atcattttgt ctgactaggt   3840
gtcctctata atattatggg gtggaggggg gtggtatgga gcaaggggca agttgggaag   3900
acaacctgag ttgttgggat tccaggcatc gagtagataa gtagcatggc gggttaatca   3960
ttaactacaa ggaacccta gtgatggagt tggccactcc ctctctgcgc gctcgctcgc   4020
tcactgaggc cgggcgacca aaggtcgccc gacgcccggg cttttgcccgg gcggcctcag   4080
tgagcgagcg agcgcgcaga gagggacaga tctgcgacgc gaggctggat ggccttcccc   4140
attatgattc ttctcgcttc cggcggcatc gggatgcccg cgttgcaggc catgctgtcc   4200
aggcaggtag atgacgacca tcagggacag cttcagcaaa aggccagcaa aaggccagga   4260
accgtaaaaa ggccgcgttg ctggcgtttt tccataggct ccgcccccct gacgagcatc   4320
acaaaaatcg acgctcaagt cagaggtggc gaaacccgac aggactataa agataccagg   4380
cgtttccccc tggaagctcc ctcgtgcgct ctcctgttcc gaccctgccg cttaccggat   4440
acctgtccgc ctttctccct tcgggaagcg tggcgctttc tcatagctca cgctgtaggt   4500
atctcagttc ggtgtaggtc gttcgctcca agctgggctg tgtgcacgaa ccccccgttc   4560
agcccgaccg ctgcgcctta tccggtaact atcgtcttga gtccaacccg gtaagacacg   4620
acttatcgcc actggcagca gccactggta acaggattag cagagcgagg tatgtaggcg   4680
gtgctacaga gttcttgaag tggtggccta actacggcta cactagaagg acagtatttg   4740
gtatctgcgc tctgctgaag ccagttacct tcggaaaaag agttggtagc tcttgatccg   4800
gcaaacaaac caccgctggt agcggtggtt tttttgtttg caagcagcag attacgcgca   4860
gaaaaaaagg atctcaagaa gatcctttga tcttttctac ggggtctgac gctcagtgga   4920
acgaaaactc acgttaaggg attttggtca tgagattatc aaaaaggatc ttcacctaga   4980
tccttttaaa ttaaaaatga agttttaaat caatctaaag tatatatgag taaacttggt   5040
ctgacagtta ccaatgctta atcagtgagg cacctatctc agcgatctgt ctatttcgtt   5100
catccatagt tgcctgactc cccgtcgtgt agataactac gatacgggag ggcttaccat   5160
ctggccccag tgctgcaatg ataccgcgag acccacgctc accggctcca gatttatcag   5220
caataaacca gccagccgga agggccgagc gcagaagtgg tcctgcaact ttatccgcct   5280
ccatccagtc tattaattgt tgccgggaag ctagagtaag tagttcgcca gttaatagtt   5340
tgcgcaacgt tgttgccatt gctgcaggca tcgtggtgtc acgctcgtcg tttggtatgg   5400
cttcattcag ctccggttcc caacgatcaa ggcgagttac atgatccccc atgttgtgca   5460
aaaaagcggt tagctccttc ggtcctccga tcgttgtcag aagtaagttg gccgcagtgt   5520
```

| | |
|---|---|
| tatcactcat ggttatggca gcactgcata attctcttac tgtcatgcca tccgtaagat | 5580 |
| gcttttctgt gactggtgag tactcaacca agtcattctg agaatagtgt atgcggcgac | 5640 |
| cgagttgctc ttgcccggcg tcaacacggg ataataccgc gccacatagc agaactttaa | 5700 |
| aagtgctcat cattggaaaa cgttcttcgg ggcgaaaact ctcaaggatc ttaccgctgt | 5760 |
| tgagatccag ttcgatgtaa cccactcgtg cacccaactg atcttcagca tcttttactt | 5820 |
| tcaccagcgt ttctgggtga gcaaaaacag gaaggcaaaa tgccgcaaaa aagggaataa | 5880 |
| gggcgacacg gaaatgttga atactcatac tcttcctttt tcaatattat tgaagcattt | 5940 |
| atcagggtta ttgtctcatg agcggataca tatttgaatg tatttagaaa aataaacaaa | 6000 |
| tagggggttcc gcgcacattt ccccgaaaag tgccacctg | 6039 |

<210> SEQ ID NO 20
<211> LENGTH: 5509
<212> TYPE: DNA
<213> ORGANISM: Artificial Sequence
<220> FEATURE:
<223> OTHER INFORMATION: Synthetic

<400> SEQUENCE: 20

| | |
|---|---|
| cagatctttg gccactccct ctctgcgcgc tcgctcgctc actgaggccg ggcgaccaaa | 60 |
| ggtcgcccga cgcccgggct ttgcccgggc ggcctcagtg agcgagcgag cgcgcagaga | 120 |
| gggagtggcc aactccatca ctaggggttc ctggaggggt ggagtcgtga cgtgaattac | 180 |
| gtcatagggt tagggaggtc ggccgtctag gagttaattt ttaaaaagca gtcaaaagtc | 240 |
| caagtggccc ttgcgagcat ttactctctc tgtttgctct ggttaataat ctcaggagca | 300 |
| caaaattcct tactagtcct agaagttaat ttttaaaaag cagtcaaaag tccaagtcca | 360 |
| agtggccctt gcgagcattt actctctctg tttgctctgg ttaataatct caggagcaca | 420 |
| aacattcctt actagttcta gagcggccgc cagtgtgctg gaattcggct ttttagggc | 480 |
| tggaagctac ctttgacatc atttcctctg cgaatgcatg tataatttct acagaaccta | 540 |
| ttagaaagga tcacccagcc tctgcttttg tacaactttc ccttaaaaaa tgccaattcc | 600 |
| actgctgttt ggcccaatag tgagaacttt ttcctgctgc ctcttggtgc ttttgcctat | 660 |
| ggcccctatt ctgcctgctg aagacactct tgccagcatg gacttaaacc cctccagctc | 720 |
| tgacaatcct ctttctcttt tgttttacat gaagggtctg gcagccaaag caatcactca | 780 |
| aaggttcaaa ccttatcatt ttttgctttg ttcctcttgg ccttggtttt gtacatcagc | 840 |
| tttgaaaata ccatcccagg gttaatgctg gggttaattt ataactaaga gtgctctagt | 900 |
| tttgcaatac aggacatgct ataaaaatgg aaagatgttg ctttctgaga gatcagctta | 960 |
| catgtggtac cgtcgacgcc accatggtga gcatccggag atccttcgag gcctacgtgg | 1020 |
| acgatatgaa catcatcacc gtgctgatcc agccgagca aaggagatc atgacacccc | 1080 |
| ctttccggct ggagaccgag atcacagact tccccctggc cgtgagagag gagtatagcc | 1140 |
| tggaggccaa gtacaagtac gtgtgcgtga gcgatcaccc tgtgaccttt ggcaagatcc | 1200 |
| actgcgtgcg ggcaagctcc ggacacaaga ccgacctgca gatcggagcc gtgatcagga | 1260 |
| cagcagccct cgacgatgag ttttactatg acggagagct gggagccgtg tacaccgcag | 1320 |
| atcacacagt gttcaaggtc tgggcaccag cagccacatc cgccgcagtg aagctgagcc | 1380 |
| accccaacaa gtccggcagg acctttcaga tgacacgcct ggagaagggc gtgtacgccg | 1440 |
| tgaccgtgac aggcgatctg cacggctacg agtatctgtt ctgcatctgt aacaattctg | 1500 |

```
agtggatgga gaccgtggat cagtatgcca aggccgtgac agtgaatgga gagaagggag    1560
tggtgctgag gccagaccag atgaagtgga ccgcacccct gaagcctttc agccaccctg    1620
tggacgccgt gatctacgag acacacctgc gcgattttc tatccacgag aacagcggca    1680
tgatcaataa gggcaagtac ctggccctga ccgagacaga cacccagaca gccaacggct    1740
ctagctccgg cctggcctat gtgaaggagc tgggagtgac ccacgtggag ctgctgcctg    1800
tgaatgactt tgccggcgtg gatgaggaga agccactgga tgcctacaac tggggctata    1860
atccactgca cttctttgcc cccgagggct cttatgccag caacccacac gaccccaga    1920 ccaggaagac agagctgaag cagatgatca atacactgca ccagcacggc ctgagagtga    1980
tcctggatgt ggtgttcaac cacgtgtaca gcgcgagaa tagcccttt gagaagaccg    2040 tgccaggcta tttctttcgg cacgacgagt gcggcatgcc atctaacggc acaggcgtgg    2100
gcaatgatat cgccagcgag aggcgcatgg cccggaagtt catcgccgac tgcgtggtgt    2160
actggctgga ggagtataac gtggacggct tcagatttga tctgctgggc atcctggaca    2220
tcgataccgt gctgtacatg aaggagaagg ccacaaaggc caagccaggc atcctgctgt    2280
tcggagaggg atgggacctg gcaaccccac tgccacacga gcagaaggcc gccctggcaa    2340
acgcacctag gatgccaggc atcggcttct ttaacgacat gtttcgcgat gccgtgaagg    2400
gcaataccaa ccacctgaag gccacaggct ttgcactggg aaatggagag tccgcccagg    2460
ccgtgatgca cggaatcgca ggatctagcg gatggaaggc cctggcacca atcgtgcctg    2520
agccaagcca gtccatcaac tacgtggagt cccacgacaa tcacaccttc tgggataaga    2580
tgtcttttgc cctgcctcag gagaatgatt ctaggaagaa aagcaggcag cgcctggcag    2640
cagcaatcat cctgctggcc cagggcgtgc cattcatcca cagcggccag gagttcttc    2700 ggaccaagca gggcgtggag aactcctacc agtcctctga ttctatcaat cagctggact    2760
gggatcggag agagacattc aaggaggacg tgcactatat caggcgcctg atcagcctga    2820
gaaaggcaca cccagccttt cggctgagat ccgccgcaga catccagagg cacctggagt    2880
gcctgaccct gaaggagcac ctgatcgcct acagactgta tgacctggat gaggtggacg    2940
agtggaagga tatcatcgtg atccaccacg cctcccctga ctctgtggag tggcggctgc    3000
ccaacgatat ccccttacaga ctgctgtgcg acccctccgg cttccaggag atcctaccg    3060 agatcaagaa gacagtggcc gtgaatgcca tcggcaccgt gatcctgtat ctggcctccg    3120
acctgaagtc ttttgcctac ccatacgatg ttccagatta cgcttgagaa ttctgcagat    3180
ctgtggcttc tagctgcccg gtggcatcc ctgtgacccc tccccagtgc ctctcctggc    3240
cttggaagtt gccactccag tgcccaccag ccttgtccta ataaaattaa gttgcatcat    3300
tttgtctgac taggtgtcct ctataatatt atggggtgga gggggtggt ttggagcaag    3360 gggcccaagt tgggaagaca caccatattg gtcgagtaga taagtagcat ggcgggttaa    3420
tcattaacta caaggaaccc ctagtgatgg agttggccac tccctctctg cgcgctcgct    3480
cgctcactga ggccgggcga ccaaaggtcg cccgacgccc gggctttgcc cggcggcct    3540 cagtgagcga gcgagcgcgc agagagggag tggccaaaga tctgcgacgc gaggctggat    3600
ggccttcccc attatgattc ttctcgcttc cggcggcatc gggatgcccg cgttgcaggc    3660
catgctgtcc aggcaggtag atgacgacca tcagggacag cttcagcaaa aggccagcaa    3720
aaggccagga accgtaaaaa ggccgcgttg ctggcgtttt tccataggct ccgcccccct    3780
gacgagcatc acaaaaatcg acgctcaagt cagaggtggc gaaacccgac aggactataa    3840
agataccagg cgtttccccc tggaagctcc ctcgtgcgct ctcctgttcc gaccctgccg    3900
```

```
cttaccggat acctgtccgc ctttctccct tcgggaagcg tggcgctttc tcatagctca    3960
cgctgtaggt atctcagttc ggtgtaggtc gttcgctcca agctgggctg tgtgcacgaa    4020
ccccccgttc agcccgaccg ctgcgcctta tccggtaact atcgtcttga gtccaacccg    4080
gtaagacacg acttatcgcc actggcagca gccactggta acaggattag cagagcgagg    4140
tatgtaggcg gtgctacaga gttcttgaag tggtggccta actacggcta cactagaagg    4200
acagtatttg gtatctgcgc tctgctgaag ccagttacct tcggaaaaag agttggtagc    4260
tcttgatccg gcaaacaaac caccgctggt agcggtggtt ttttttgtttg caagcagcag    4320
attacgcgca gaaaaaaagg atctcaagaa gatcctttga tcttttctac ggggtctgac    4380
gctcagtgga acgaaaactc acgttaaggg attttggtca tgagattatc aaaaaggatc    4440
ttcacctaga tccttttaaa ttaaaaatga agttttaaat caatctaaag tatatatgag    4500
taaacttggt ctgacagtta ccaatgctta atcagtgagg cacctatctc agcgatctgt    4560
ctatttcgtt catccatagt tgcctgactc cccgtcgtgt agataactac gatacgggag    4620
ggcttaccat ctggccccag tgctgcaatg ataccgcgag acccacgctc accggctcca    4680
gatttatcag caataaacca gccagccgga agggccgagc gcagaagtgg tcctgcaact    4740
ttatccgcct ccatccagtc tattaattgt tgccgggaag ctagagtaag tagttcgcca    4800
gttaatagtt tgcgcaacgt tgttgccatt gctgcaggca tcgtggtgtc acgctcgtcg    4860
tttggtatgg cttcattcag ctccggttcc caacgatcaa ggcgagttac atgatccccc    4920
atgttgtgca aaaaagcggt tagctccttc ggtcctccga tcgttgtcag aagtaagttg    4980
gccgcagtgt tatcactcat ggttatggca gcactgcata attctcttac tgtcatgcca    5040
tccgtaagat gcttttctgt gactggtgag tactcaacca agtcattctg agaatagtgt    5100
atgcggcgac cgagttgctc ttgcccggcg tcaacacggg ataataccgc gccacatagc    5160
agaactttaa aagtgctcat cattggaaaa cgttcttcgg ggcgaaaact ctcaaggatc    5220
ttaccgctgt tgagatccag ttcgatgtaa cccactcgtg cacccaactg atcttcagca    5280
tcttttactt tcaccagcgt ttctgggtga gcaaaaacag gaaggcaaaa tgccgcaaaa    5340
aagggaataa gggcgacacg gaaatgttga atactcatac tcttcctttt tcaatattat    5400
tgaagcattt atcagggtta ttgtctcatg agcggataca tatttgaatg tatttagaaa    5460
aataaacaaa taggggttcc gcgcacattt ccccgaaaag tgccacctg              5509
```

<210> SEQ ID NO 21
<211> LENGTH: 5507
<212> TYPE: DNA
<213> ORGANISM: Artificial Sequence
<220> FEATURE:
<223> OTHER INFORMATION: Synthetic

<400> SEQUENCE: 21

```
ttgtcagaag taagttggcc gcagtgttat cactcatggt tatggcagca ctgcataatt     60
ctcttactgt catgccatcc gtaagatgct tttctgtgac tggtgagtac tcaaccaagt    120
cattctgaga atagtgtatg cggcgaccga gttgctcttg cccggcgtca acacgggata    180
ataccgcgcc acatagcaga actttaaaag tgctcatcat tggaaaacgt tcttcggggc    240
gaaaactctc aaggatctta ccgctgttga tccagttc gatgtaaccc actcgtgcac    300
ccaactgatc ttcagcatct tttactttca ccagcgtttc tgggtgagca aaaacaggaa    360
ggcaaaatgc cgcaaaaaag ggaataaggg cgacacggaa atgttgaata ctcatactct    420
```

```
tcctttttca atattattga agcatttatc agggttattg tctcatgagc ggatacatat    480
ttgaatgtat ttagaaaaat aaacaaatag gggttccgcg cacatttccc cgaaaagtgc    540
cacctgcaga tctttggcca ctccctctct gcgcgctcgc tcgctcactg aggccgggcg    600
accaaaggtc gcccgacgcc cgggctttgc ccgggcggcc tcagtgagcg agcgagcgcg    660
cagagaggga gtggccaact ccatcactag gggttcctgg aggggtggag tcgtgacgtg    720
aattacgtca tagggttagg gaggtcggcc gtctaggagt taattttaa aaagcagtca     780
aaagtccaag tggcccttgc gagcatttac tctctctgtt tgctctggtt aataatctca    840
ggagcacaaa attccttact agtcctagaa gttaattttt aaaaagcagt caaaagtcca    900
agtccaagtg gcccttgcga gcatttactc tctctgtttg ctctggttaa taatctcagg    960
agcacaaaca ttccttacta gttctagagc ggccgccagt gtgctggaat tcggcttttt   1020
tagggctgga agctaccttt gacatcatct cctctgcgaa tgcatgtata atttctacag   1080
aacctattag aaaggatcac ccagcctctg cttttgtaca actttccctt aaaaaactgc   1140
caatcccact gctgtttggc ccaatagtga aactttttc tgctgcctct tggtgctttt    1200
gcctatggcc cctattctgc tgctgaagac actcttgcca gcatggactt aaacccctcc   1260
agctctgaca atcctctttc tcttttgttt tacatgaagg gtctggcagc caaagcaatc   1320
actcaaagtt caaaccttat cattttttgc tttgttcctc ttggccttgg ttttgtacat   1380
cagctttgaa ataccatcc cagggttaat gctggggtta atttataact gagagtgctc    1440
tagttttgca atacaggaca tgctataaaa atggaaagat gttgctttct gagagatcag   1500
cttacatgtg gtaccgtcga cgccaccatg gtgagcatca aagatcctt tgaggcctat     1560
gtggatgata tgaacatcat cacagtgctg atcccagctg agcagaagga gatcatgaca   1620
cccccttca gactggagac agagatcaca gactttcccc tggctgtgag agaggagtat    1680
agcctggagg ccaagtacaa gtatgtgtgt gtgtctgacc atcctgtgac ctttggcaag   1740
atccactgtg tgagagcaag ctctggacac aagacagacc tgcagattgg agctgtgatc   1800
aggacagcag cctttgatga tgagttttac tatgatggag agctgggagc tgtgtacaca   1860
gcagatcaca cagtgttcaa ggtctgggca ccagcagcca tctgctgc agtgaagctg     1920
agccacccca acaagtctgg caggaccttt cagatgacaa gactggagaa gggagtgtat   1980
gctgtgacag tgacaggaga tctgcatggc tatgagtatc tgttctgcat ctgtaacaat   2040
tctgagtgga tggagacagt ggatcagtat gccaaggctg tgacagtgaa tggagagaag   2100
ggagtggtgc tgaggccaga ccagatgaag tggacagcac ccctgaagcc tttcagccac   2160
cctgtggatg ctgtgatcta tgagacacac ctgagagatt tttctatcca tgagaactct   2220
ggcatgatca ataagggcaa gtacctggcc ctgacagaga cagacaccca gacagccaat   2280
ggctctagct ctggcctggc ctatgtgaag gagctgggag tgacccatgt ggagctgctg   2340
cctgtgaatg acttttgctgg agtggatgag gagaagccac tggatgccta caactggggc   2400
tataatccac tgcacttctt tgcccctgag ggctcttatg ccagcaaccc acatgacccc   2460
cagaccagga agacagagct gaagcagatg atcaatacac tgcaccagca tggcctgaga   2520
gtgatcctgg atggtgttt caaccatgtg tacaagagag agaatagccc ttttgagaag   2580
acagtgccag gctatttctt tagacatgat gagtgtggca tgccatctaa tggcacagga   2640
gtgggcaatg atattgcctc tgagaggaga atgccagaaa agttcattgc tgactgtgtg   2700
gtgtactggc tggaggagta taatgtggat ggcttcagat ttgatctgct gggcatcctg   2760
gacattgata cagtgctgta catgaaggag aaggccacaa aggccaagcc aggcatcctg   2820
```

```
ctgtttggag agggatggga cctggcaacc ccactgccac atgagcagaa ggctgccctg    2880
gcaaatgcac ctaggatgcc aggcattggc ttcttcaatg acatgtttag agatgctgtg    2940
aagggcaata ccttccacct gaaggccaca ggctttgcac tgggaaatgg agagtctgcc    3000
caggctgtga tgcatggaat tgcaggatct tctggatgga aggccctggc accaattgtg    3060
cctgagccaa gccagtccat caactatgtg gagtcccatg acaatcacac cttctgggat    3120
aagatgtctt ttgccctgcc tcaggagaat gattctagga agagaagcag gcagagactg    3180
gcagcagcaa tcatcctgct ggcccaggga gtgccattca tccactctgg ccaggagttc    3240
tttagaacca agcagggagt ggagaactcc taccagtcct ctgattctat caatcagctg    3300
gactgggata ggagagagac attcaaggag gatgtgcact atatcaggag actgatcagc    3360
ctgagaaagg cacacccagc ctttagactg agatctgctg cagacatcca gaggcacctg    3420
gagtgcctga ccctgaagga gcacctgatt gcctacagac tgtatgacct ggatgaggtg    3480
gatgagtgga aggatatcat tgtgatccac catgcctccc ctgactctgt ggagtggaga    3540
ctgcccaatg atatccctta cagactgctg tgtgaccct ctggcttcca ggaggatcct    3600
acagagatca agaagacagt ggctgtgaat ggcattggca cagtgatcct gtatctggcc    3660
tctgacctga agtcttttgc ctaccccctat gatgttccag attatgcttg agaattctgc    3720
agatctgtgg cttctagctg cccgggtggc atccctgtga cccctcccca gtgcctctcc    3780
tggccttgga agttgccact ccagtgccca ccagccttgt cctaataaaa ttaagttgca    3840
tcattttgtc tgactaggtg tcctctataa tattatgggg tggagggggg tggtttggag    3900
caagggccc aagttgggaa gacacaccat attggtcgag tagataagta gcatggcggg    3960
ttaatcatta actacaagga acccctagtg atggagttgg ccactccctc tctgcgcgct    4020
cgctcgctca ctgaggccgg gcgaccaaag gtcgcccgac gcccgggctt tgcccgggcg    4080
gcctcagtga gcgagcgagc gcgcagagag ggagtggcca agatctgcg acgcgaggct    4140
ggatggcctt cccattatg attcttctcg cttccggcgg catcgggatg cccgcgttgc    4200
aggccatgct gtccaggcag gtagatgacg accatcaggg acagcttcag caaaaggcca    4260
gcaaaaggcc aggaaccgta aaaaggccgc gttgctggcg ttttccata ggctccgccc    4320
ccctgacgag catcacaaaa atcgacgctc aagtcagagg tggcgaaacc cgacaggact    4380
ataaagatac caggcgtttc ccctggaag ctccctcgtg cgctctcctg ttccgaccct    4440
gccgcttacc ggatacctgt ccgcctttct cccttcggga agcgtggcgc tttctcatag    4500
ctcacgctgt aggtatctca gttcggtgta ggtcgttcgc tccaagctgg gctgtgtgca    4560
cgaaccccc gttcagcccg accgctgcgc cttatccggt aactatcgtc ttgagtccaa    4620
cccggtaaga cacgacttat cgccactggc agcagccact ggtaacagga ttagcagagc    4680
gaggtatgta ggcggtgcta cagagttctt gaagtggtgg cctaactacg gctacactag    4740
aaggacagta tttggtatct gcgctctgct gaagccagtt accttcggaa aaagagttgg    4800
tagctcttga tccggcaaac aaaccaccgc tggtagcggt ggtttttttg tttgcaagca    4860
gcagattacg cgcagaaaaa aaggatctca agaagatcct ttgatctttt ctacggggtc    4920
tgacgctcag tggaacgaaa actcacgtta agggattttg gtcatgagat tatcaaaaag    4980
gatcttcacc tagatccttt taaattaaaa atgaagtttt aaatcaatct aaagtatata    5040
tgagtaaact tggtctgaca gttaccaatg cttaatcagt gaggcaccta tctcagcgat    5100
ctgtctattt cgttcatcca tagttgcctg actccccgtc gtgtagataa ctacgatacg    5160
```

-continued

```
ggagggctta  ccatctggcc  ccagtgctgc  aatgataccg  cgagacccac  gctcaccggc      5220
tccagattta  tcagcaataa  accagccagc  cggaagggcc  gagcgcagaa  gtggtcctgc      5280
aactttatcc  gcctccatcc  agtctattaa  ttgttgccgg  gaagctagag  taagtagttc      5340
gccagttaat  agtttgcgca  acgttgttgc  cattgctgca  ggcatcgtgg  tgtcacgctc      5400
gtcgtttggt  atggcttcat  tcagctccgg  ttcccaacga  tcaaggcgag  ttacatgatc      5460
ccccatgttg  tgcaaaaaag  cggttagctc  cttcggtcct  ccgatcg                     5507
```